United States Patent [19]
Okuyama et al.

[11] Patent Number: 6,144,493
[45] Date of Patent: Nov. 7, 2000

[54] OPTICAL LOW-PASS FILTER AND OPTICAL APPARATUS HAVING THE SAME

[75] Inventors: Atsushi Okuyama, Tokorozawa; Shuichi Kobayashi; Ken Wada, both of Yokohama, all of Japan

[73] Assignee: Canon Kabushiki Kaisha, Tokyo, Japan

[21] Appl. No.: 08/804,155

[22] Filed: Feb. 20, 1997

[30] Foreign Application Priority Data

| Feb. 23, 1996 | [JP] | Japan | 8-036529 |
|---|---|---|---|
| Jun. 13, 1996 | [JP] | Japan | 8-152316 |
| Jun. 13, 1996 | [JP] | Japan | 8-152317 |
| Jun. 13, 1996 | [JP] | Japan | 8-152323 |
| Sep. 6, 1996 | [JP] | Japan | 8-236569 |
| Sep. 27, 1996 | [JP] | Japan | 8-256263 |
| Oct. 25, 1996 | [JP] | Japan | 8-283813 |

[51] Int. Cl.[7] .................................. G02B 5/18
[52] U.S. Cl. ...................... 359/566; 359/737; 250/201.9; 348/335
[58] Field of Search ...................... 359/558, 566, 359/737; 250/201.9, 216; 348/335, 340

[56] References Cited

U.S. PATENT DOCUMENTS

| T909,010 | 4/1973 | Kelch . |
| 5,142,413 | 8/1992 | Kelly . |
| 5,471,344 | 11/1995 | Sugawara .............................. 359/566 |

FOREIGN PATENT DOCUMENTS

| 0 584 769 | 3/1994 | European Pat. Off. . |
| 44-1155 | 1/1944 | Japan . |
| 4-109213 | 4/1992 | Japan . |
| 6-003624 | 1/1994 | Japan . |
| 6-118228 | 4/1994 | Japan . |
| 6-186504 | 7/1994 | Japan . |

OTHER PUBLICATIONS

"Antialiasing—Lenses of Too High Quality", W. Kroninger, et al., Laser Und Optoelektronik, DE, Fachverlag GMBH. Stuttgart, vol. 25, No. 5, pp. 48–52, XP000395058, ISSN: 0722–9003.

Born, M., et al., Section 9.4: "The Diffraction Pattern Associated with a Single Aberration", *Principles of Optics* (5th Ed.), published by Pergamon Press, pp. 473–478 (1975).

*Primary Examiner*—Darren Schuberg
*Attorney, Agent, or Firm*—Fitzpatrick, Cella, Harper & Scinto

[57] ABSTRACT

An optical low-pass filter comprises a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays, the phase advancing area and the phase retarding area alternately existing in the optical low-pass filter, and an optical apparatus comprises an image forming optical system, an image pickup element, and such an optical low-pass filter.

31 Claims, 73 Drawing Sheets

1line→0.2λ

1line→0.2λ

1line→0.15λ

FIG.42
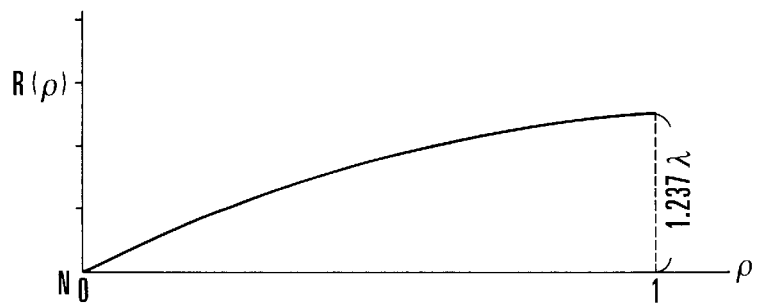
FIG.43
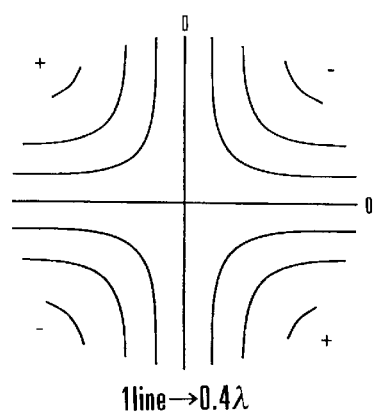
FIG.44
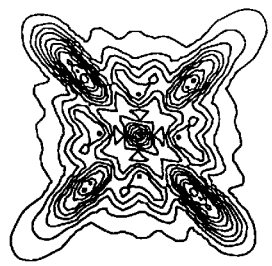
FIG.45
FIG.46
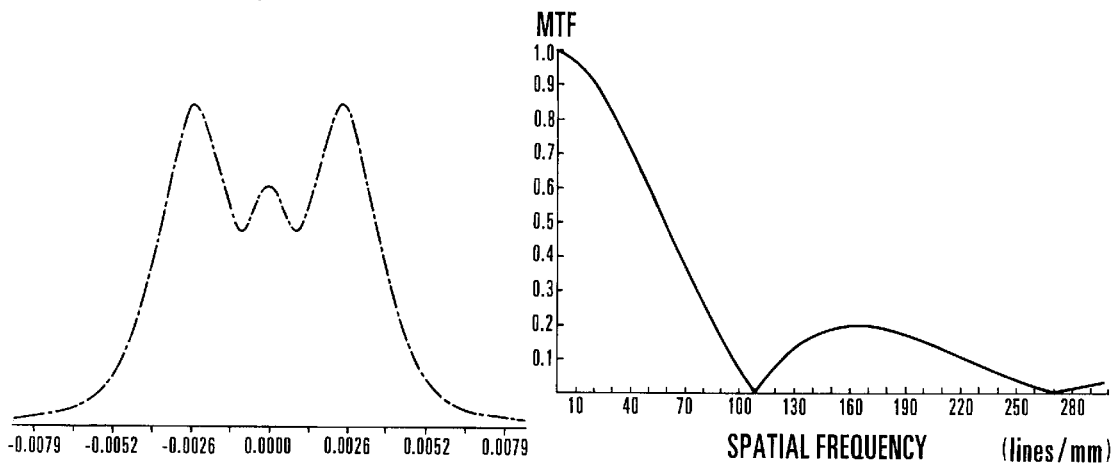

0.2λ/line 0.2λ/line 0.003327mm 0.005232mm 0.003325mm 0.00321mm 0.2λ/line 0.003358mm

-0.0079 -0.0053 -0.0026 0.0000 0.0026 0.0053 0.0079

SPATIAL FREQUENCY (lines/mm)

0.2λ/line 0.005257mm

-0.0124 -0.0083 -0.0041 0.0000 0.0041 0.0083 0.0124

SPATIAL FREQUENCY (lines/mm)

0.2λ/line 0.2λ/line 0.003407mm 0.003408mm 0.2λ/line 0.2λ/line 0.003408mm 0.005294mm 0.2λ/line 0.003322mm 0.2λ/line 0.003404mm

-0.0080  -0.0054  -0.0027  0.0000  0.0027  0.0054  0.0080

SPATIAL FREQUENCY (lines/mm)

0.2λ/line 0.003286mm

-0.0078  -0.0052  -0.0026  0.0000  0.0026  0.0052  0.0078

SPATIAL FREQUENCY (lines/mm)

0.2λ/line 0.006863mm 0.2λ/line 0.006623mm 0.2λ/line 0.003321mm 0.2λ/line 0.005257mm 0.2λ/line 0.008273mm 0.008274mm 0.2λ/line 0.2λ/line 0.008273mm 0.008274mm 0.2λ/line 0.008274mm 0.2λ/line 0.003325mm

-0.0079  -0.0052  -0.0026  0.0000  0.0026  0.0052  0.0079

SPATIAL FREQUENCY    (lines/mm)

0.2λ/line 0.003211mm

-0.0076  -0.0051  -0.0025  0.0000  0.0025  0.0051  0.0076

SPATIAL FREQUENCY    (lines/mm)

0.2λ/line 0.003322mm 0.2λ/line 0.005257mm 0.2λ/line 0.006697mm 0.2λ/line 0.0106mm 0.2λ/line 0.003322mm

-0.0078  -0.0052  -0.0026  0.0000  0.0026  0.0052  0.0078

0.2λ/line 0.005257mm

-0.0124  -0.0083  -0.0041  0.0000  0.0041  0.0083  0.0124

0.2λ/line 0.003322mm

-0.0078  -0.0052  -0.0026  0.0000  0.0026  0.0052  0.0078

SPATIAL FREQUENCY (lines/mm)

0.2λ/line 0.005256mm

-0.0124  -0.0083  -0.0041  0.0000  0.0041  0.0083  0.0124

SPATIAL FREQUENCY (lines/mm)

0.2λ/line 0.003322mm

-0.0078  -0.0052  -0.0026  0.0000  0.0026  0.0052  0.0078

0.2λ/line 0.005256mm

-0.0124  -0.0083  -0.0041  0.0000  0.0041  0.0083  0.0124

0.2λ/line 0.003325mm 0.2λ/line 0.003211mm 0.2λ/line 0.003325mm 0.2λ/line 0.2λ/line 0.003325mm

-0.0052   0.0000   0.0052
   -0.0026   0.0026

0.00321mm

-0.0051   0.0000   0.0051
-0.0076  -0.0025   0.0025   0.0076

SPATIAL FREQUENCY (lines/mm)

SPATIAL FREQUENCY (lines/mm)

0.2λ/line 0.003325mm

FIG.227
0.2λ/line
FIG.231
0.2λ/line
FIG.228
FIG.232
FIG.229  0.005641mm
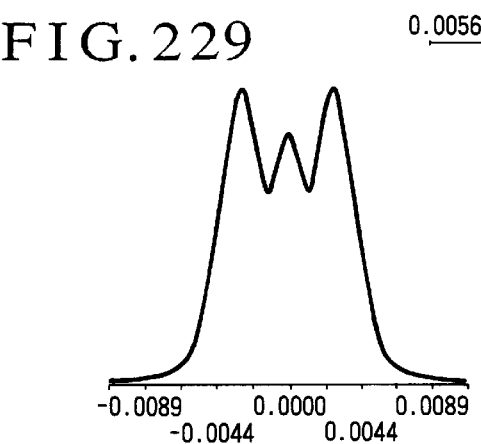
-0.0089   0.0000   0.0089
  -0.0044   0.0044
FIG.233  0.01129mm
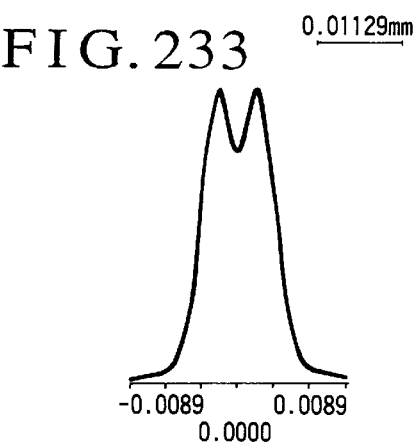
-0.0089       0.0089
      0.0000
FIG.230
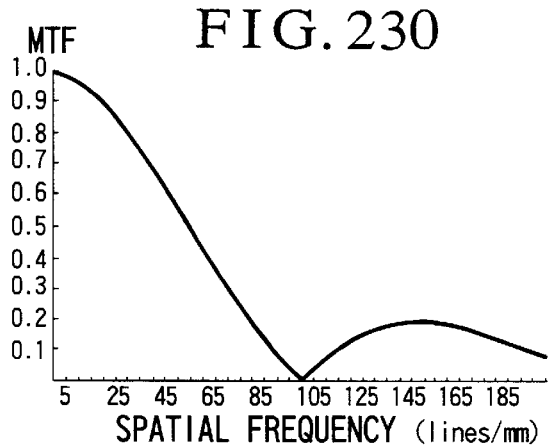
SPATIAL FREQUENCY (lines/mm)
FIG.234
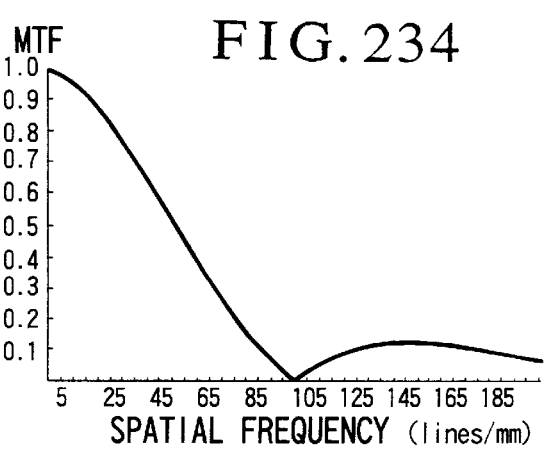
SPATIAL FREQUENCY (lines/mm)

FIG.235
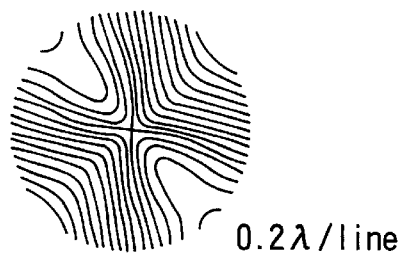
0.2λ/line
FIG.239
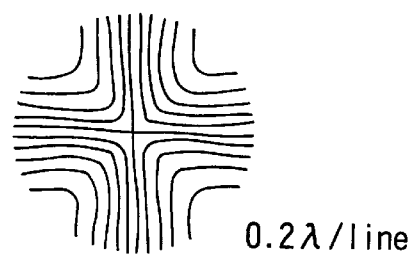
0.2λ/line
FIG.236
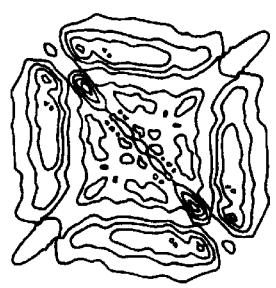
FIG.240
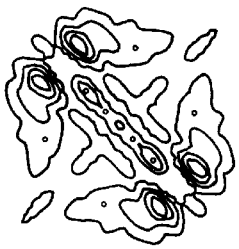
FIG.237  0.003325mm
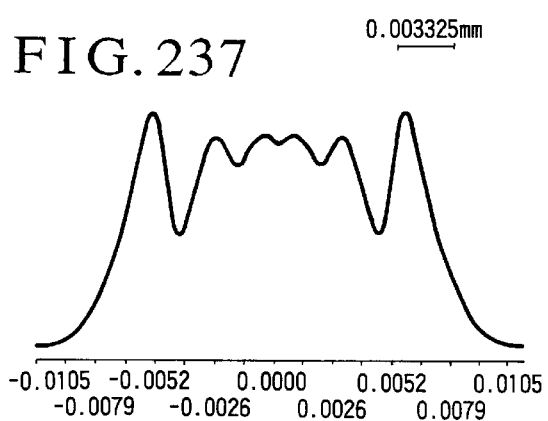
-0.0105  -0.0052   0.0000   0.0052   0.0105
  -0.0079  -0.0026   0.0026   0.0079
0.005257mm
FIG.241
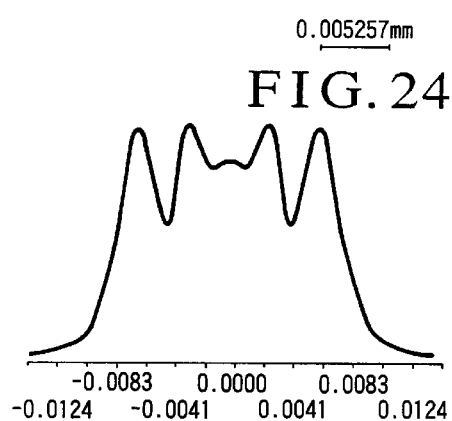
-0.0083   0.0000   0.0083
  -0.0124   -0.0041   0.0041   0.0124
FIG.238
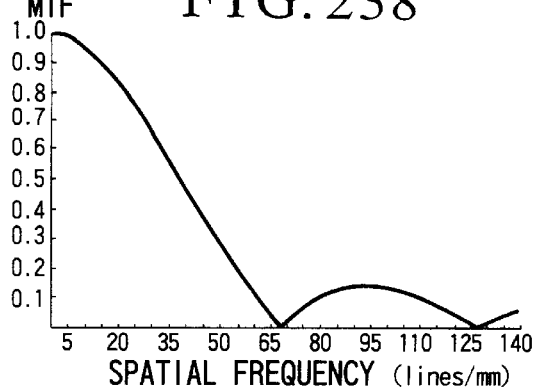
SPATIAL FREQUENCY (lines/mm)
FIG.242
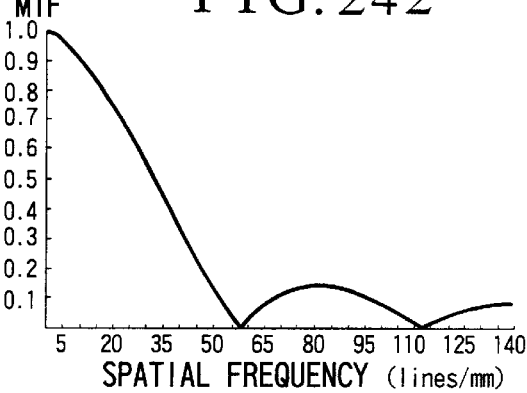
SPATIAL FREQUENCY (lines/mm)

FIG. 243
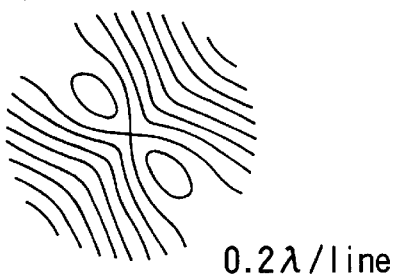
0.2λ/line
FIG. 247
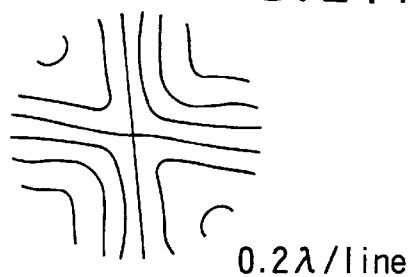
0.2λ/line
FIG. 244
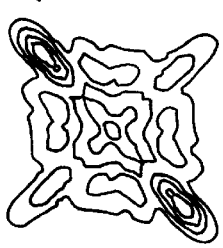
FIG. 248
FIG. 245
0.003325mm
FIG. 249
0.005257mm
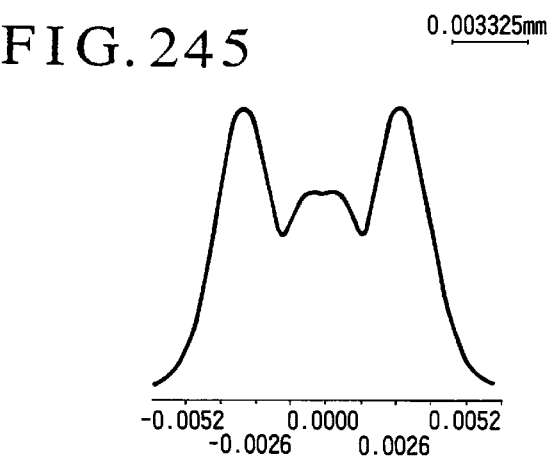
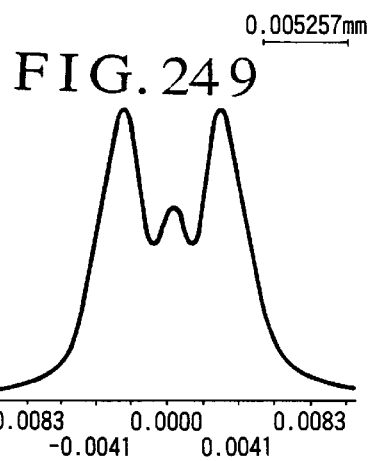
FIG. 246
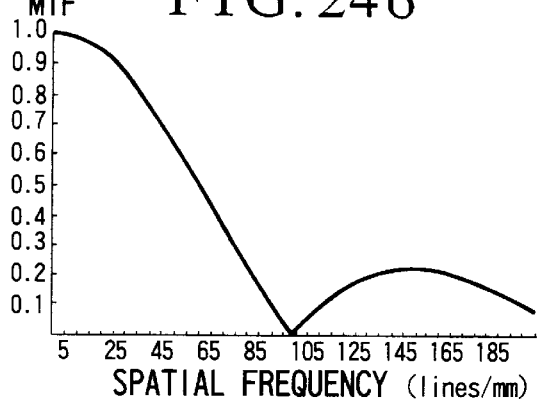
FIG. 250
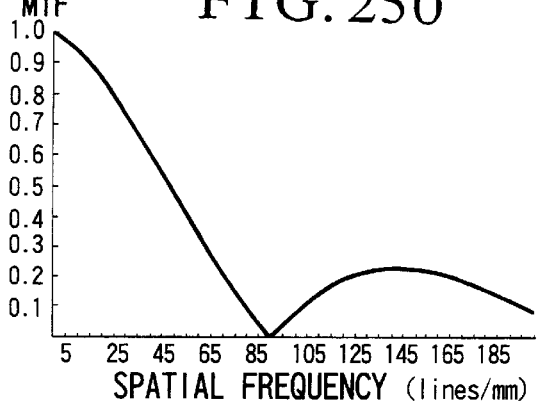

0.2λ/line 0.008274mm 0.2λ/line 0.2λ/line 0.008274mm 0.008273mm 0.2λ/line 0.008274mm 0.2λ/line 0.2λ/line 0.003325mm 0.005257mm SPATIAL FREQUENCY (lines/mm)

SPATIAL FREQUENCY (lines/mm)

FIG. 279
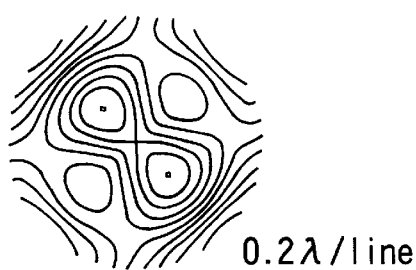
0.2λ/line
FIG. 283
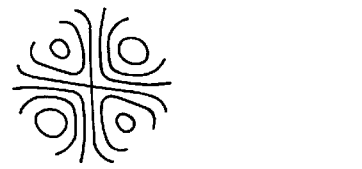
0.2λ/line
FIG. 280
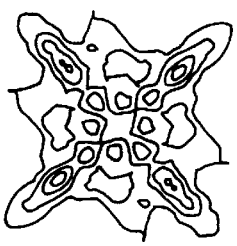
FIG. 284
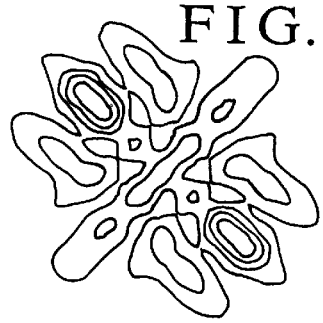
0.003325mm
FIG. 281
0.00321mm
FIG. 285
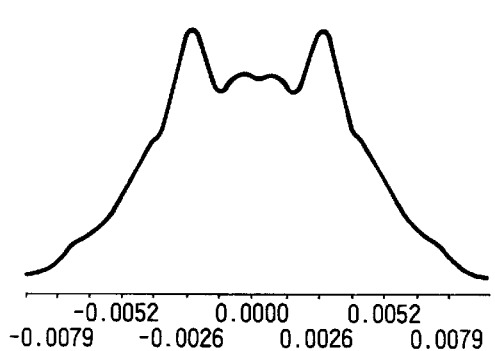
```
   -0.0052   0.0000   0.0052
-0.0079   -0.0026   0.0026   0.0079
```
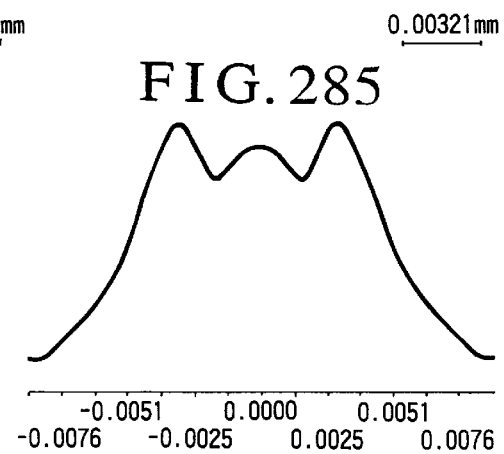
```
   -0.0051   0.0000   0.0051
-0.0076   -0.0025   0.0025   0.0076
```
FIG. 282
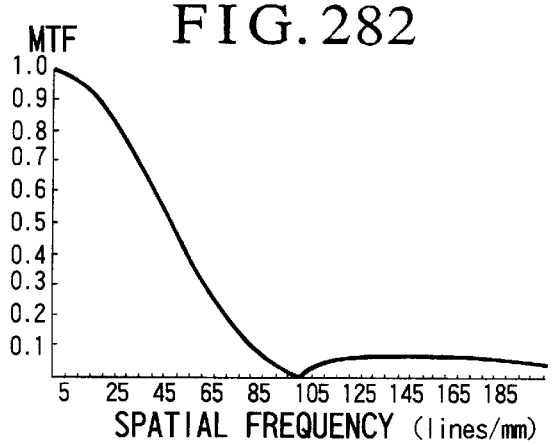
SPATIAL FREQUENCY (lines/mm)
FIG. 286
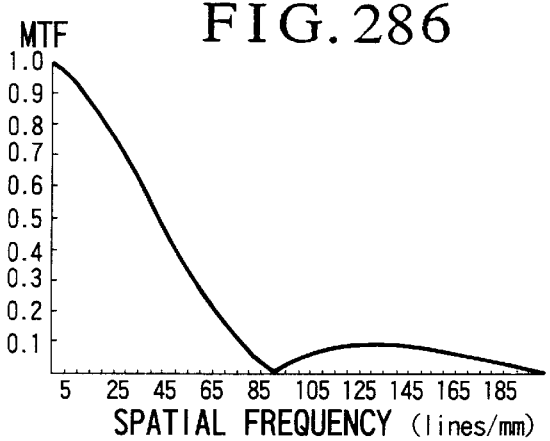
SPATIAL FREQUENCY (lines/mm)

0.2λ/line 0.2λ/line 0.006703mm 0.006472mm

-0.0106  0.0000  0.0106
   -0.0053  0.0053

-0.0103  0.0000  0.0103
   -0.0051  0.0051

SPATIAL FREQUENCY (lines/mm)

SPATIAL FREQUENCY (lines/mm)

FIG.295
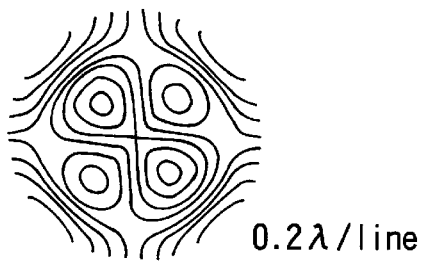
0.2λ/line
FIG.299
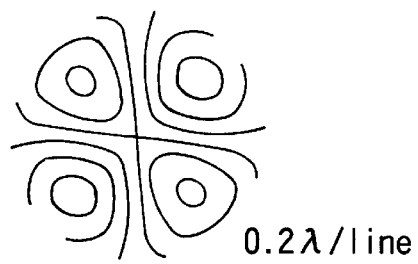
0.2λ/line
FIG.296
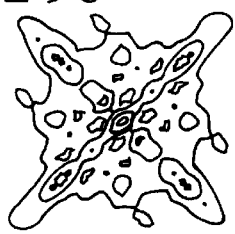
FIG.300
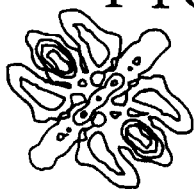
FIG.297  0.003325mm
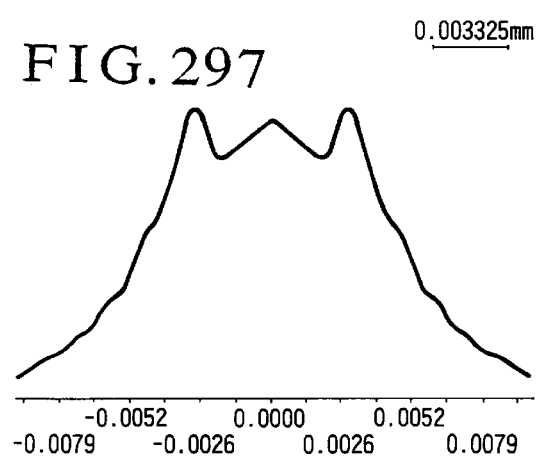
FIG.301  0.005257mm
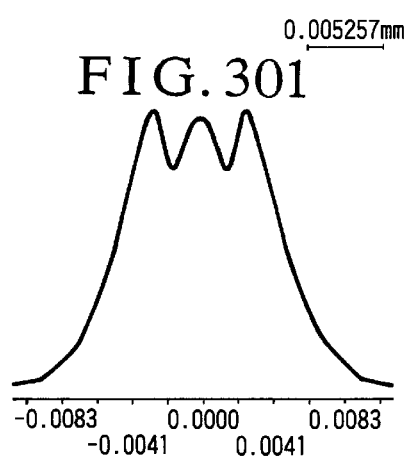
FIG.298
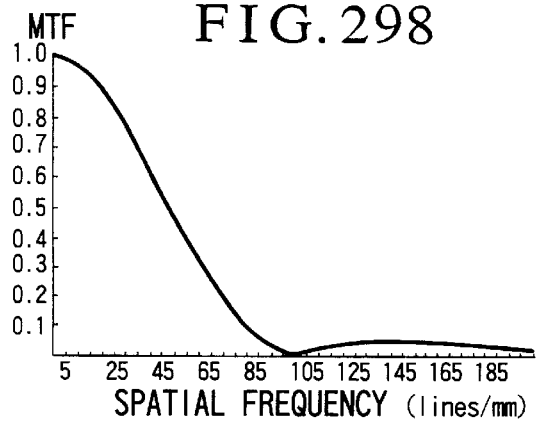
SPATIAL FREQUENCY (lines/mm)
FIG.302
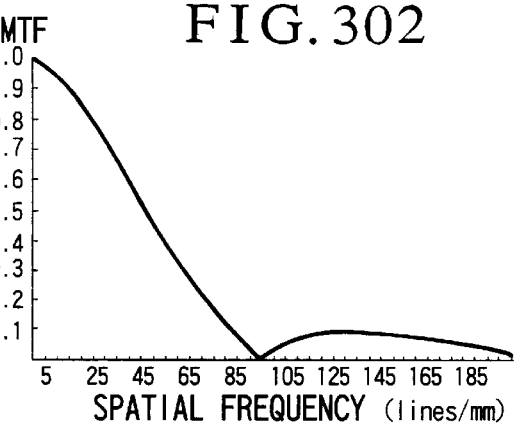
SPATIAL FREQUENCY (lines/mm)

0.2λ/line 0.008274mm 0.2λ/line 0.2λ/line 0.008274mm 0.008274mm

SPATIAL FREQUENCY (lines/mm)

SPATIAL FREQUENCY (lines/mm)

0.2λ/line 0.008274mm 0.2λ/line 0.2λ/line 0.003325mm

-0.0079  -0.0026   0.0026   0.0079
   -0.0052   0.0000   0.0052

0.005257mm

-0.0083    0.0000    0.0083
   -0.0041      0.0041

SPATIAL FREQUENCY (lines/mm)

SPATIAL FREQUENCY (lines/mm)

0.2λ/line 0.2λ/line 0.003325mm

-0.0052   0.0000   0.0052
-0.0079   -0.0026   0.0026   0.0079

0.005641mm

-0.0089   0.0000   0.0089
-0.0044   0.0044

SPATIAL FREQUENCY (lines/mm)

SPATIAL FREQUENCY (lines/mm)

0.2λ/line 0.2λ/line 0.01129mm 0.005257mm

SPATIAL FREQUENCY (lines/mm)

SPATIAL FREQUENCY (lines/mm)

FIG. 346
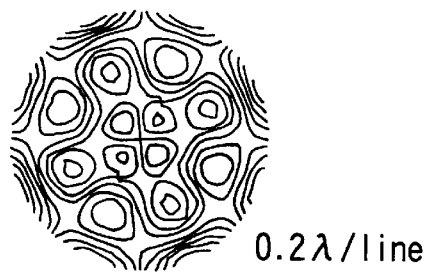
0.2λ/line
FIG. 350
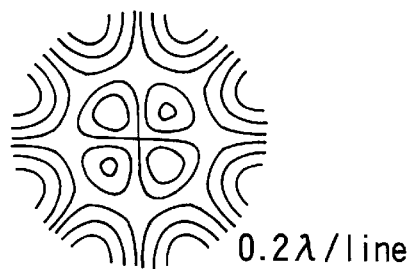
0.2λ/line
FIG. 347
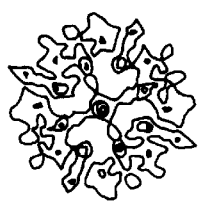
FIG. 351
FIG. 348  0.006697mm
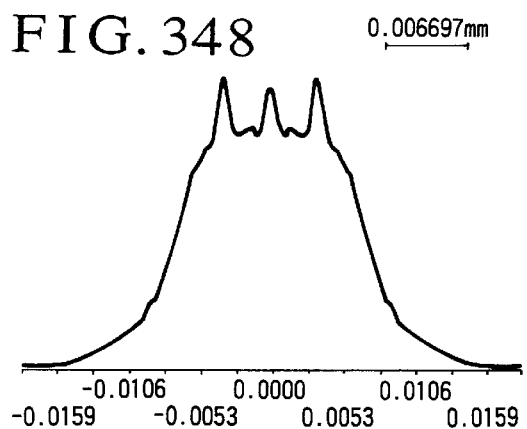
FIG. 352  0.0106mm
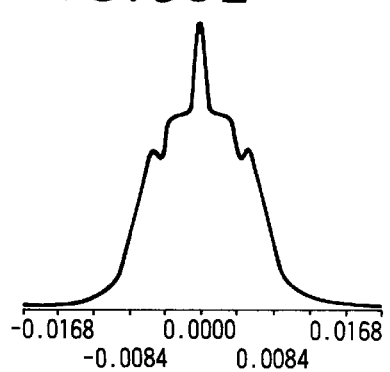
FIG. 349
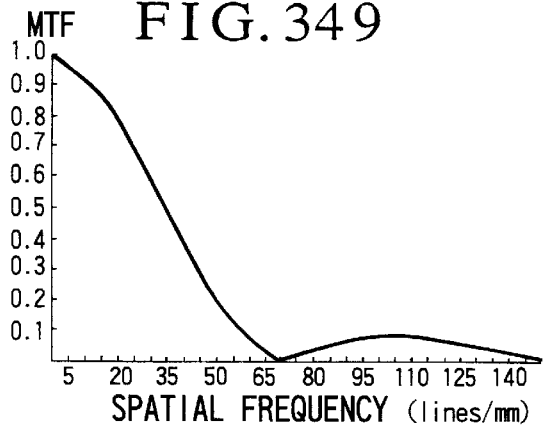
SPATIAL FREQUENCY (lines/mm)
FIG. 353
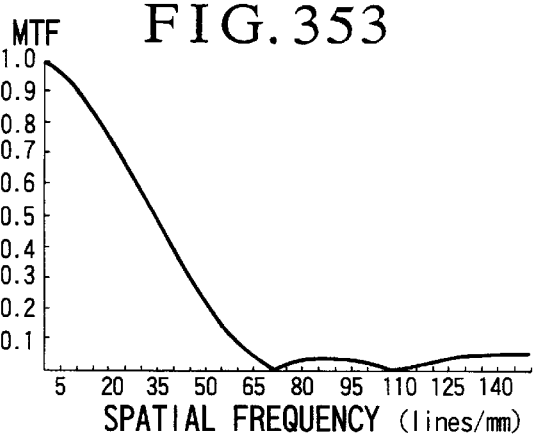
SPATIAL FREQUENCY (lines/mm)

FIG.354
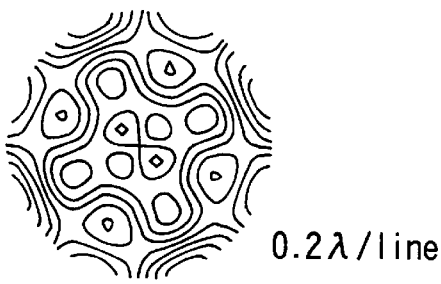
0.2λ/line
FIG.358
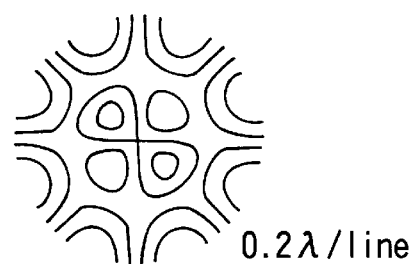
0.2λ/line
FIG.355
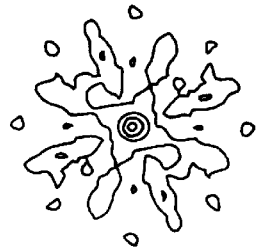
FIG.359
FIG.356
0.003322mm
FIG.360
0.005257mm
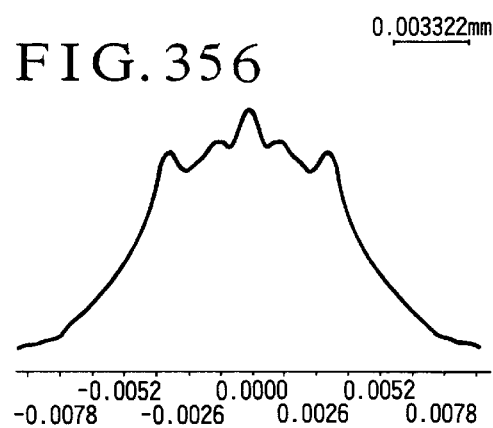
FIG.357
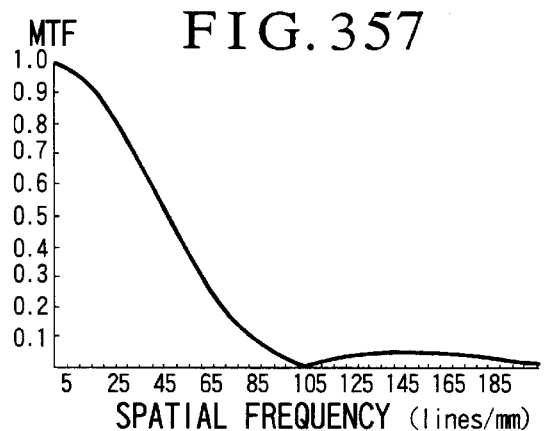
FIG.361
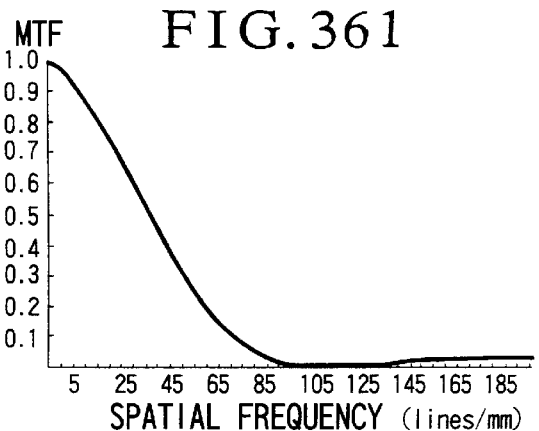

FIG. 363
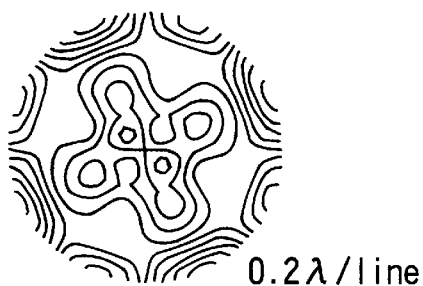
0.2λ/line
FIG. 367
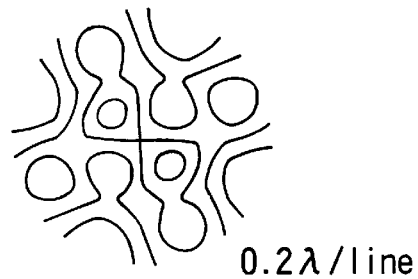
0.2λ/line
FIG. 364
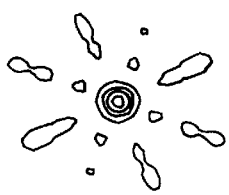
FIG. 368
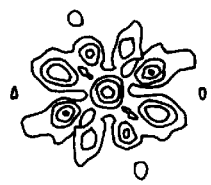
FIG. 365    0.003325mm
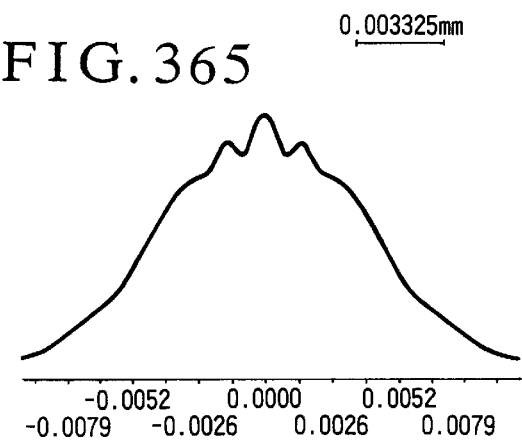
FIG. 369    0.005614mm
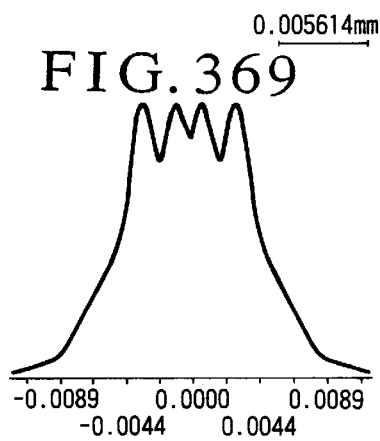
FIG. 366
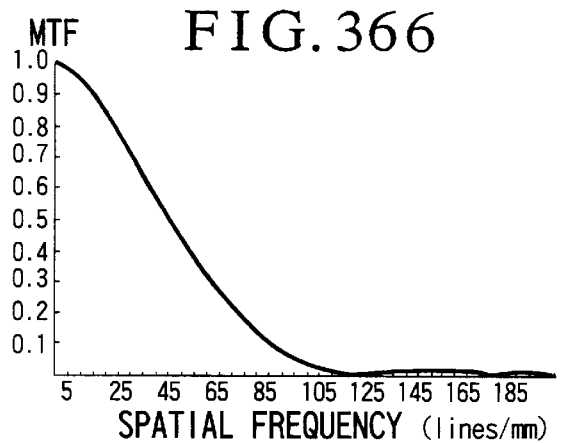
SPATIAL FREQUENCY (lines/mm)
FIG. 370
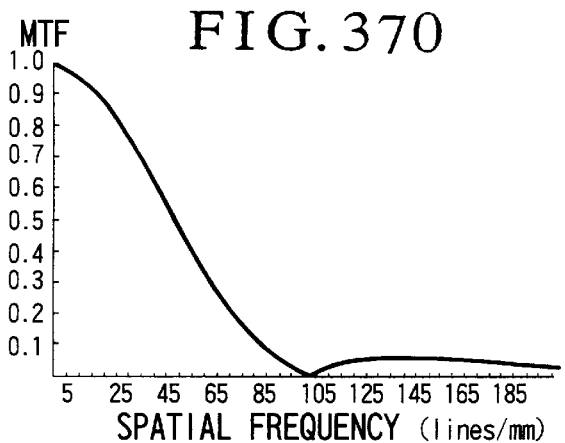
SPATIAL FREQUENCY (lines/mm)

FIG. 371
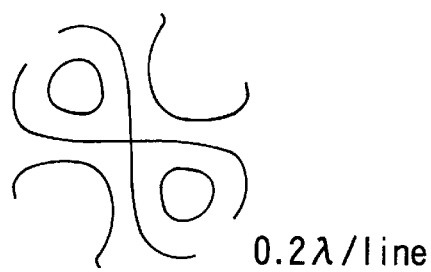
0.2λ/line
FIG. 372
FIG. 375
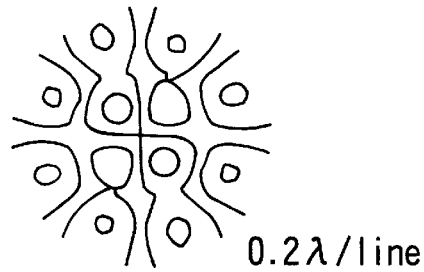
0.2λ/line
FIG. 376
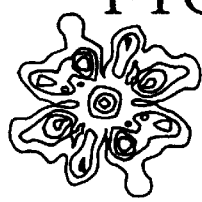
FIG. 373          0.01129mm
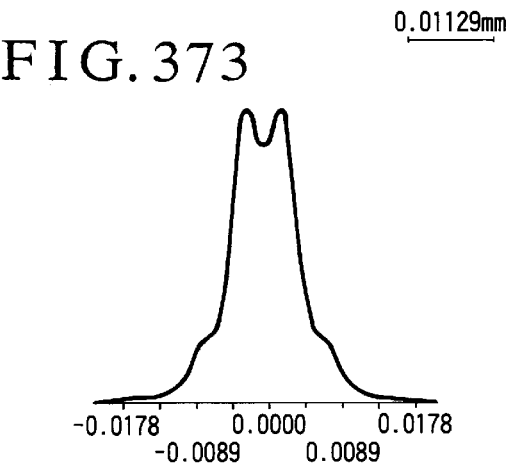
-0.0178   0.0000   0.0178
   -0.0089   0.0089
FIG. 377          0.005257mm
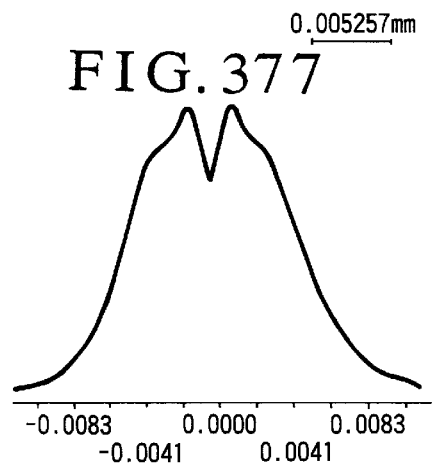
-0.0083   0.0000   0.0083
   -0.0041   0.0041
FIG. 374
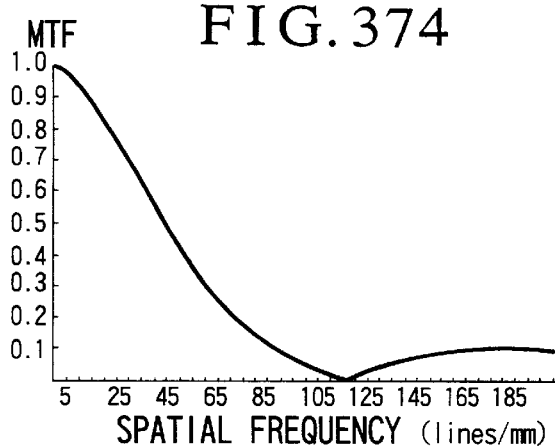
SPATIAL FREQUENCY (lines/mm)
FIG. 378
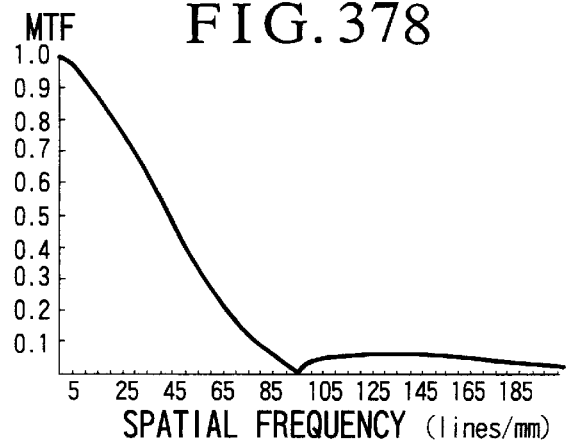
SPATIAL FREQUENCY (lines/mm)

FIG.379

0.2λ/line

FIG.383

0.2λ/line

0.25 λ / line

FIG.396
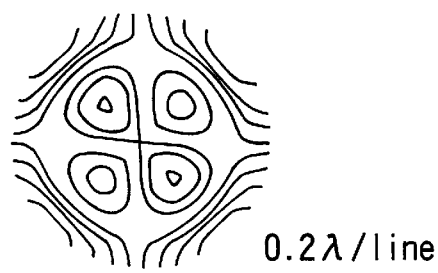
0.2λ/line
FIG.397
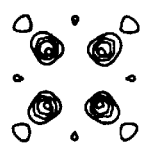
FIG.400
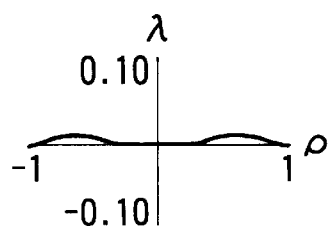
FIG.401
◉
FIG.398  0.005798mm
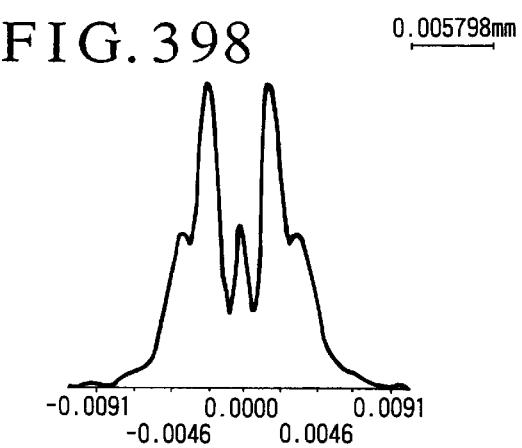
FIG.402  0.005798mm
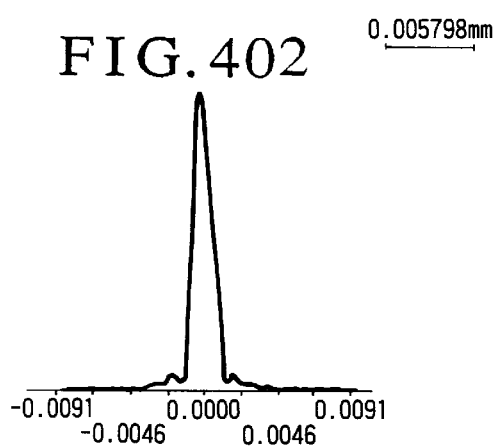
FIG.399
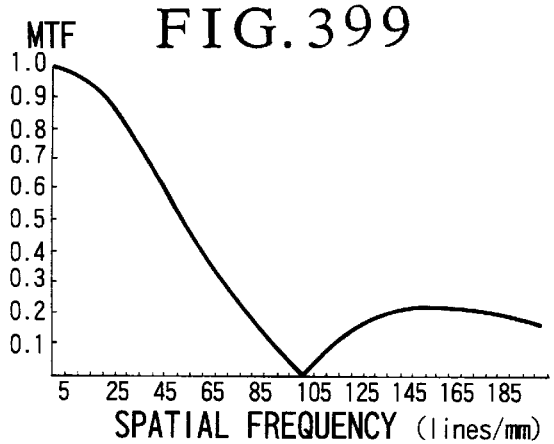
FIG.403
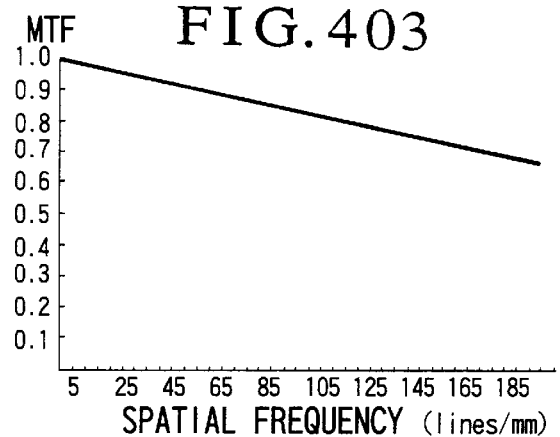

0.2λ/line 0.1λ/line 0.5λ/line 0.5λ/line

FIG.411
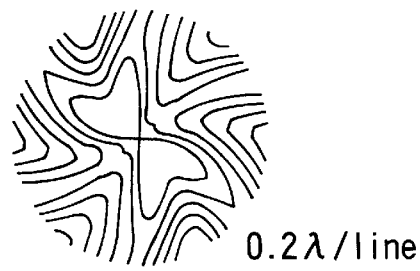
0.2λ/line
FIG.415
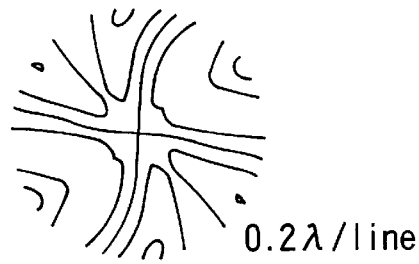
0.2λ/line
FIG.412
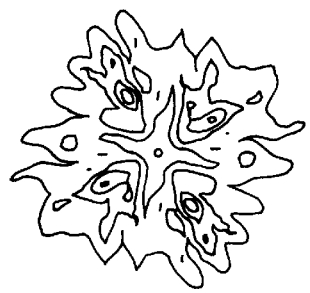
FIG.416
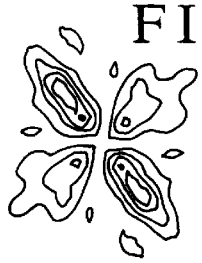
FIG.413 0.003322mm
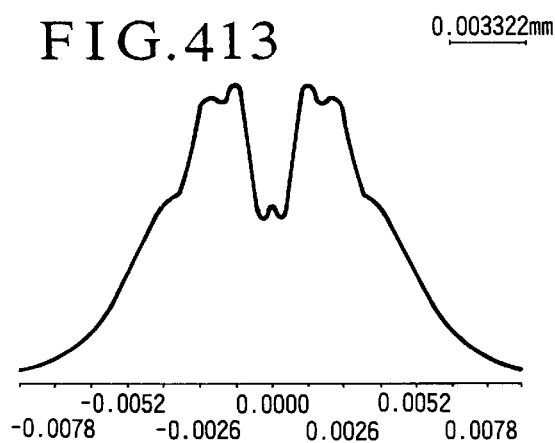
FIG.417 0.005257mm
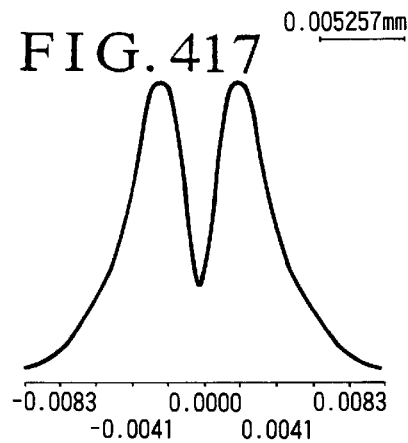
FIG.414
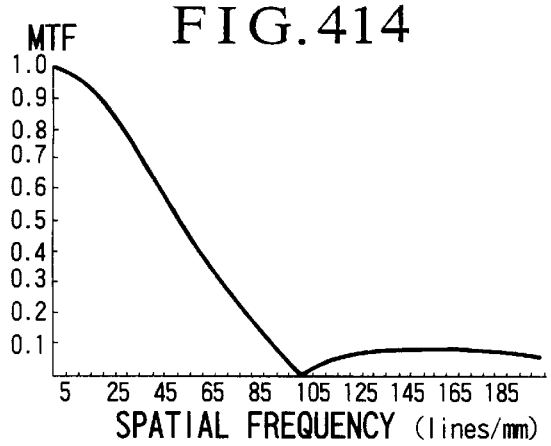
FIG.418
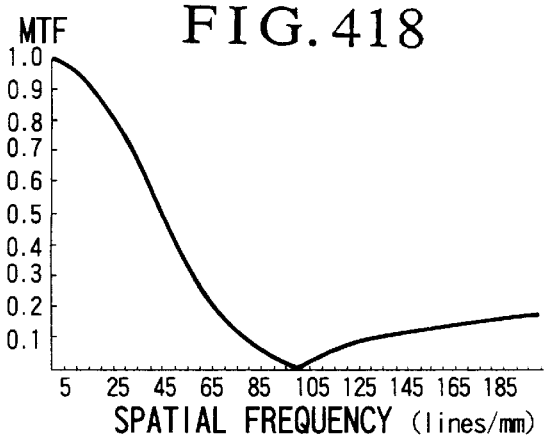

OPTICAL LOW-PASS FILTER AND OPTICAL APPARATUS HAVING THE SAME

BACKGROUND OF THE INVENTION

1. Field of the Invention

The present invention relates to an optical low-pass filter suitable for use with an optical apparatus having an image pickup element, such as a video camera or a digital camera.

2. Description of Related Art

If an object having a periodical structure whose frequency is higher than a frequency corresponding to the pixel period of an image pickup element such as a CCD is to be photographed by using an optical apparatus having such an image pickup element, for example, a video camera or a digital camera, the image pickup element will output a false signal or a false color and the phenomenon of a degradation of a photographed image occurs.

To prevent this phenomenon, it is known to employ an optical low-pass filter which separates an image of an object into two or more images and cuts the high-frequency component of the image by making use of the double refraction of a crystal plate.

If a sufficient low-pass effect is to be achieved by such optical low-pass filter, the optical low-pass filter needs to have at least two crystal plates. However, the use of expensive crystal plates leads to the problem of an increase in cost. Furthermore, since the action of crystal does not have an appropriate effect on a polarization type of object, the problem of a decrease in the low-pass effect will occur.

To cope with these problems, Japanese Patent Publication No. Sho 44-1155 discloses an optical low-pass filter which separates a wavefront into two or more images by means of a plurality of prisms.

However, the optical low-pass filter disclosed in Japanese Patent Publication No. Sho 44-1155 still has a problem. As shown in FIG. 1, the optical low-pass filter can separate an image into two images on an image plane IS1, but there is another image plane IS2 on which the two images are mixed into one image. In an optical apparatus provided with an AF mechanism which determines the state of focus on the basis of the state of an image plane, the AF mechanism determines the image plane IS2 as an in-focus position, with the result that the low-pass effect decreases.

BRIEF SUMMARY OF THE INVENTION

It is, therefore, an object of the present invention to provide an optical low-pass filter which, when it is used with an optical apparatus, can exhibit a stable low-pass effect and provide an good image.

To achieve the above object, in accordance with the present invention, there is provided an optical low-pass filter which comprises a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays, the phase advancing area and the phase retarding area alternately existing in the optical low-pass filter.

In accordance with another aspect of the present invention, there is provided an optical low-pass filter which comprises a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays, at least either one of the phase advancing area and the phase retarding area being provided as a plurality of phase advancing areas or a plurality of phase retarding areas in the optical low-pass filter.

In accordance with another aspect of the present invention, there is provided an optical low-pass filter which comprises an area having an optical path length longer than an optical path length of a center of the optical low-pass filter, and an area having an optical path length shorter than the optical path length of the center of the optical low-pass filter, the area having the longer optical path length and the area having the shorter optical path length alternately existing in the optical low-pass filter.

In accordance with another aspect of the present invention, there is provided a method of manufacturing an optical low-pass filter, which comprises the steps of charging a material into a mold and removing the material molded by the mold, the optical low-pass filter alternately including a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays, and the mold having a shape which corrects an error occurring during molding of the optical low-pass filter.

In accordance with another aspect of the present invention, there is provided an optical apparatus which comprises an image forming optical system, an image pickup element, and an optical low-pass filter, the optical low-pass filter alternately including a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays.

Various embodiments of the optical low-pass filter according to the present invention and the optical apparatus using such optical low-pass filter will be described later in detail with reference to the accompanying drawings.

BRIEF DESCRIPTION OF THE SEVERAL VIEWS OF THE DRAWING

FIG. 42 is a view showing the gradient refractive index of an optical low-pass filter according to Embodiment 7;

FIG. 43 is a view showing the contour lines of a wavefront aberration in an exit pupil in Embodiment 7;

FIG. 44 is a view showing a point spread in an image plane in Embodiment 7;

FIG. 45 is a view showing a line spread of Embodiment 7 at F2.8;

FIG. 46 is a graph showing the MTF curve of Embodiment 7 at F2.8;

FIG. 120 is a view showing a wavefront aberration obtained on a longer focal length side of the photographing optical system according to Embodiment 15;

FIG. 121 is a view showing a relative point spread obtained on the longer focal length side of the photographing optical system according to Embodiment 15;

FIG. 122 is a view showing a relative line spread obtained on the longer focal length side of the photographing optical system according to Embodiment 15;

FIG. 123 is a graph showing an MTF curve obtained on the longer focal length side of the photographing optical system according to Embodiment 15;

FIG. 124 is a diagrammatic view showing the essential portion of a photographing optical system according to Embodiment 16;

FIG. 125 is a view showing a wavefront aberration of the photographing optical system according to Embodiment 16;

FIG. 126 is a view showing a relative point spread of the photographing optical system according to Embodiment 16;

FIG. 127 is a view showing a relative line spread of the photographing optical system according to Embodiment 16;

FIG. 128 is a graph showing an MTF curve of the photographing optical system according to Embodiment 16;

FIG. 129 is a view showing a wavefront aberration of a photographing optical system according to Embodiment 16, which is not provided with an optical low-pass filter;

FIG. 130 is a view showing a relative point spread of the photographing optical system according to Embodiment 16, which is not provided with an optical low-pass filter;

FIG. 131 is a view showing a relative line spread of the photographing optical system according to Embodiment 16, which is not provided with an optical low-pass filter;

Figure 132:
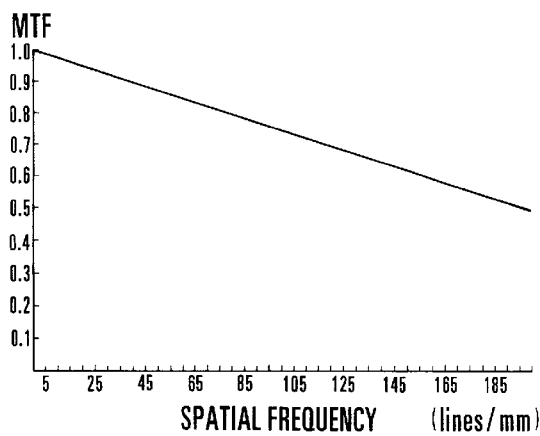
Figure 133:
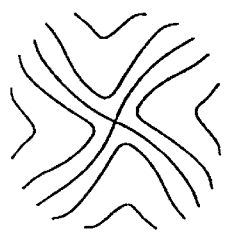
Figure 137:
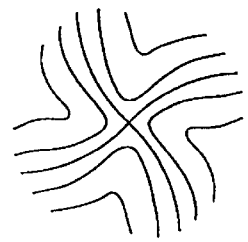
Figure 134:
Figure 138:
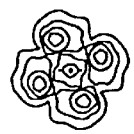
Figure 135:
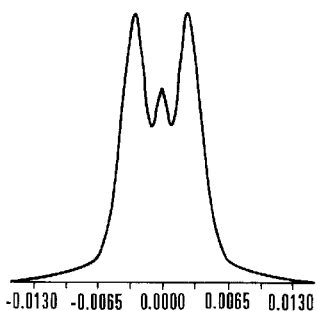
Figure 139:
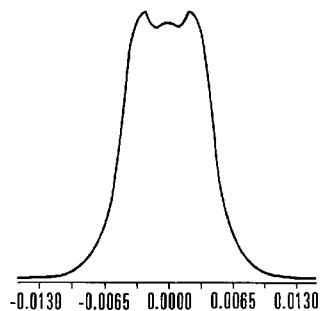
Figure 136:
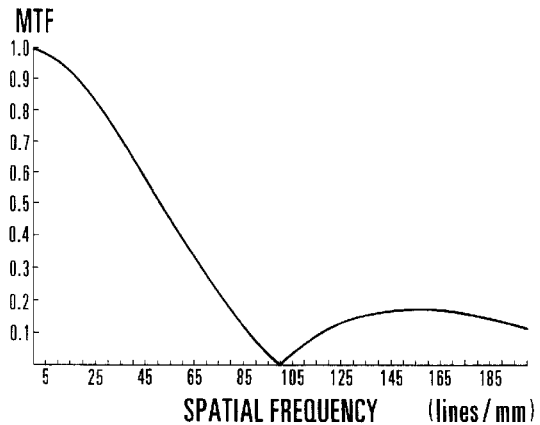
Figure 140:
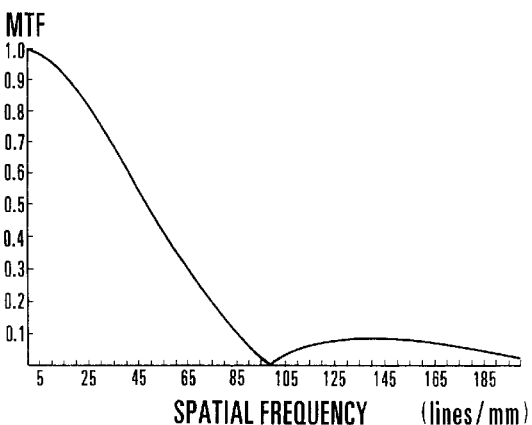
Figure 141:
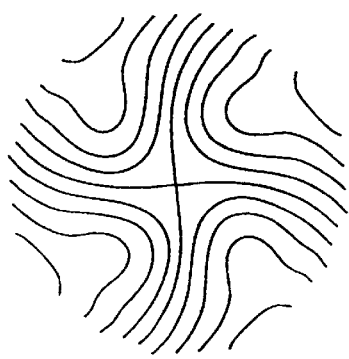
Figure 142:
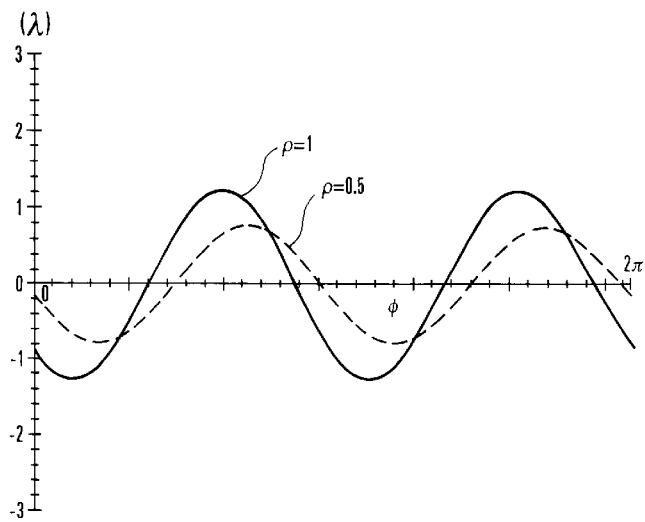
Figure 143:
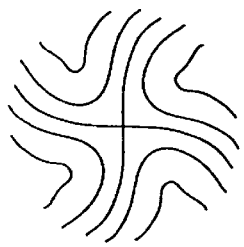
Figure 144:
Figure 145:
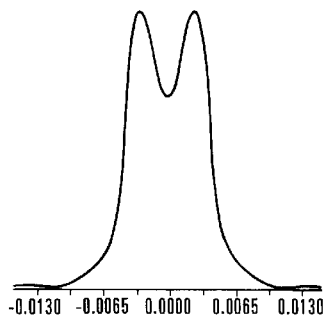
Figure 146:
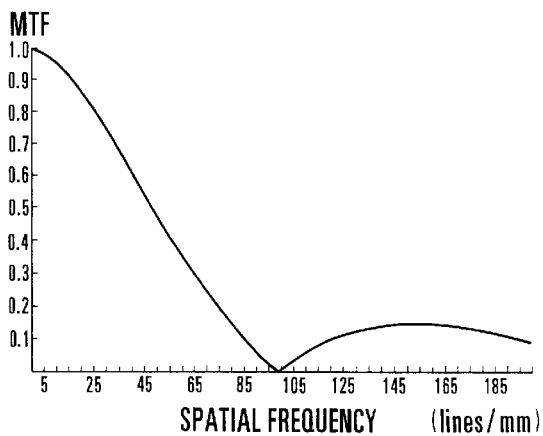
Figure 147:
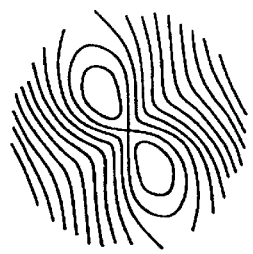
Figure 148:
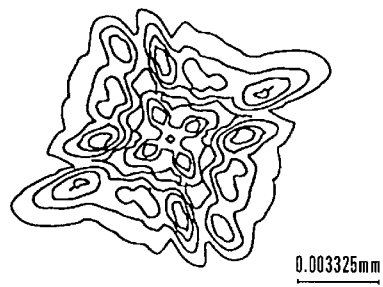
Figure 149:
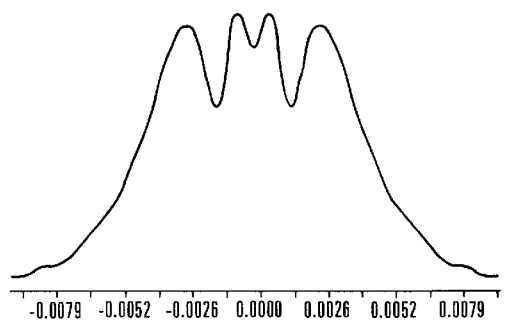
Figure 150:
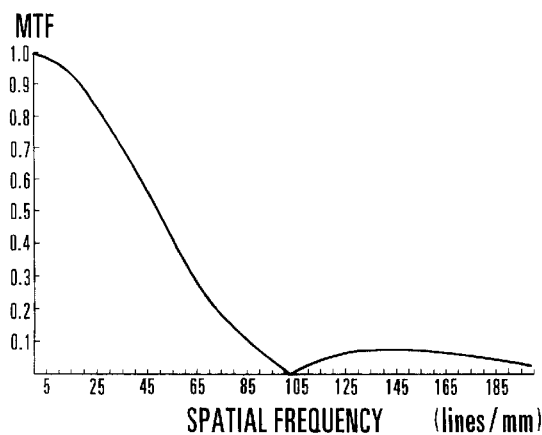
Figure 151:
Figure 152:
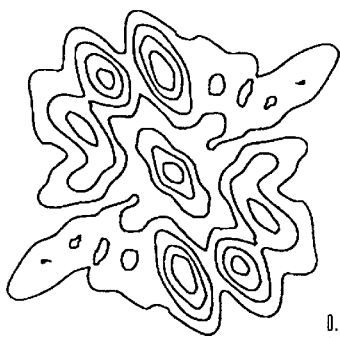
Figure 153:
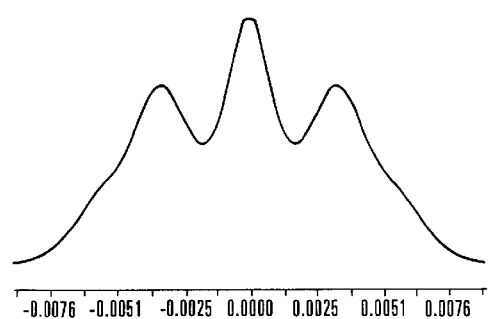
Figure 154:
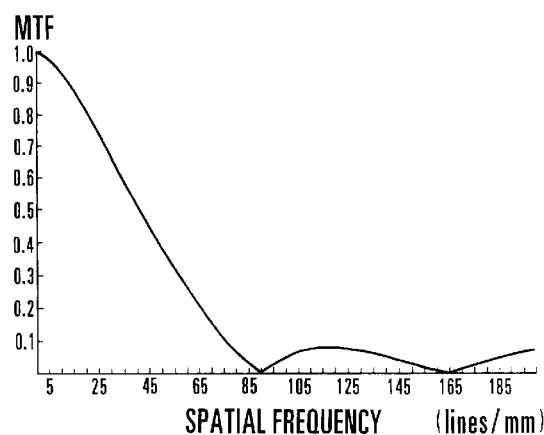
Figure 155:
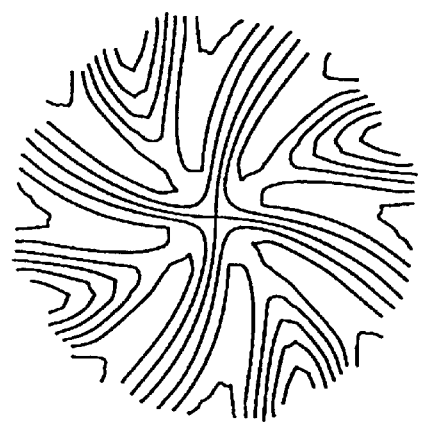
Figure 156:
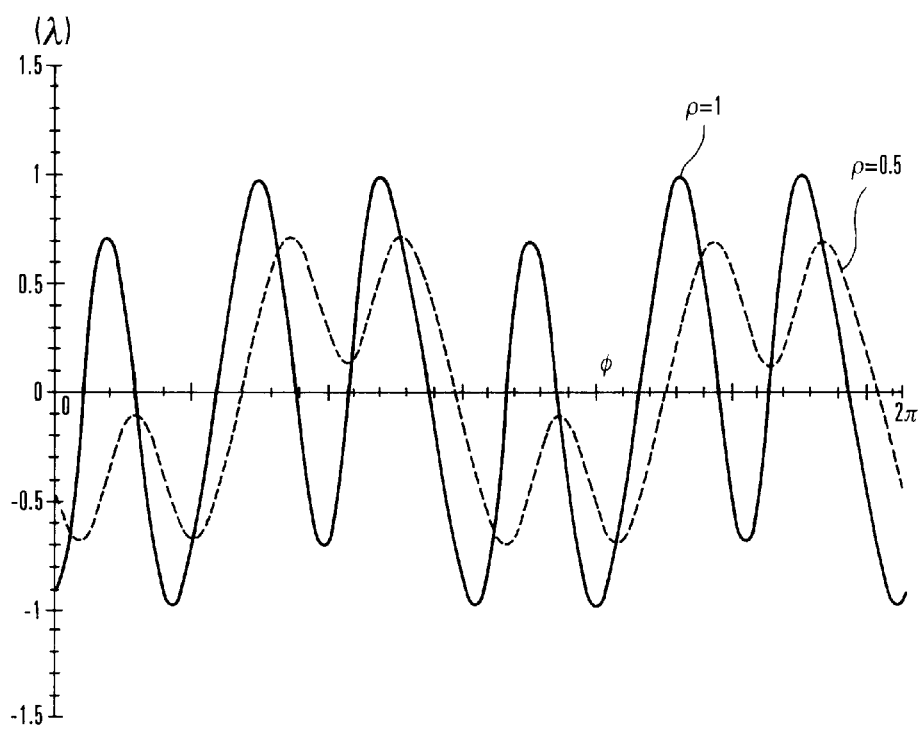
Figure 157:
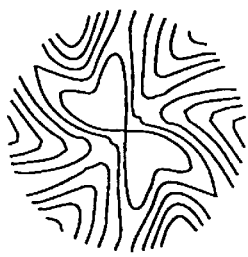
Figure 158:
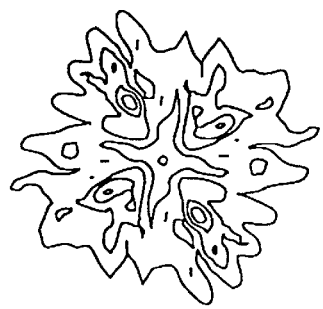
Figure 159:
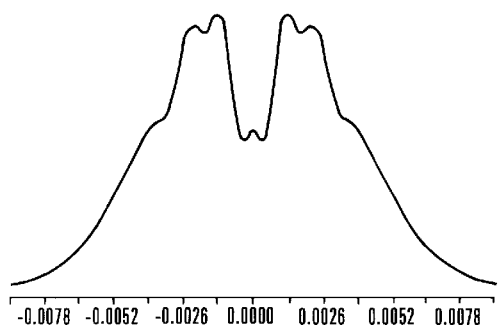
Figure 160:
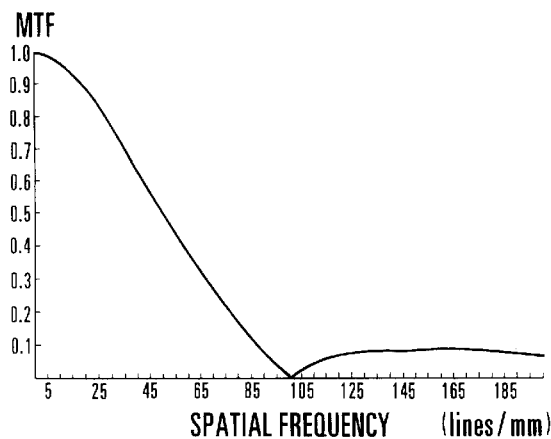
Figure 161:
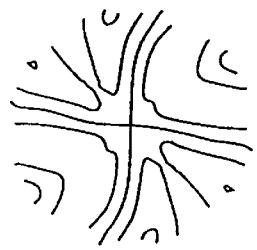
Figure 162:
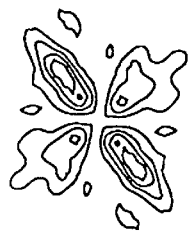
Figure 163:
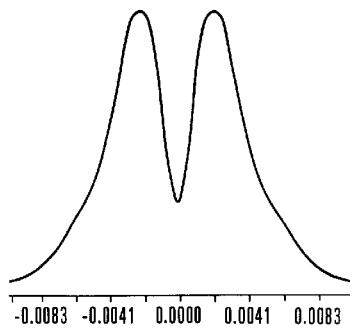
Figure 164:
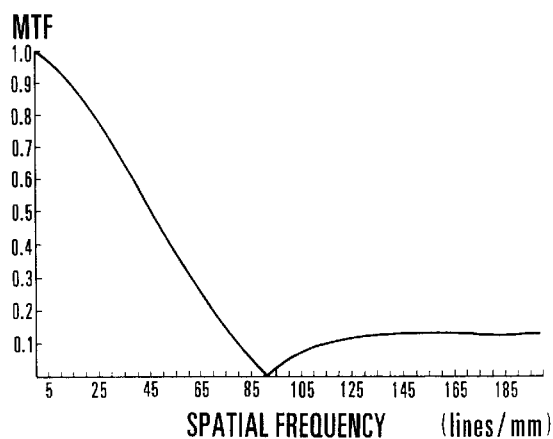
Figure 165:
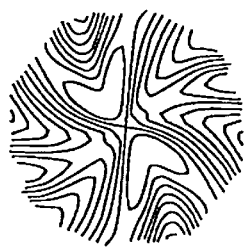
Figure 166:
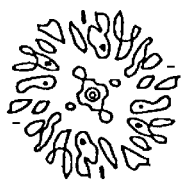
Figure 167:
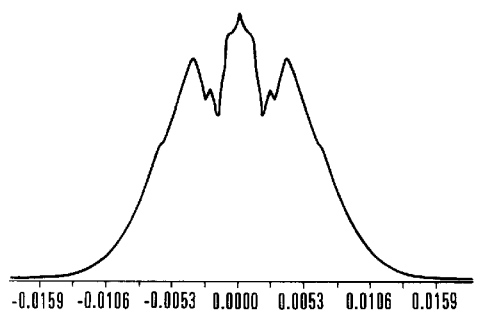
Figure 168:
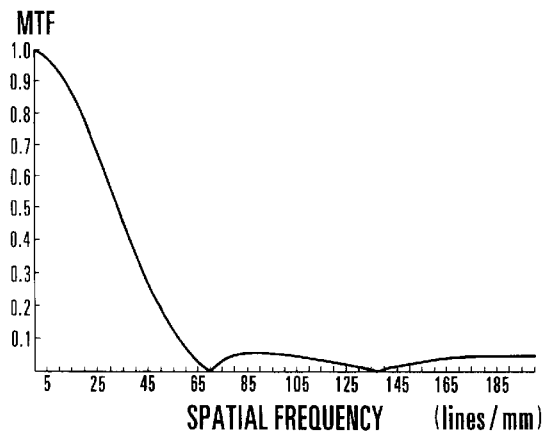
Figure 169:
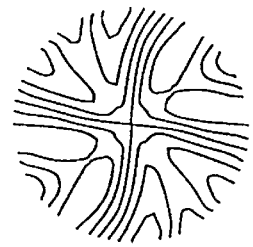
Figure 170:
Figure 171:
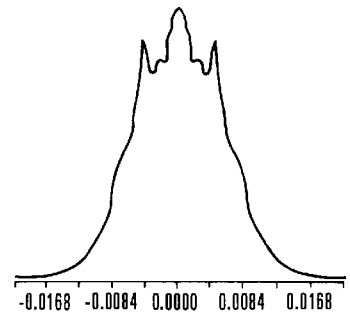
Figure 172:
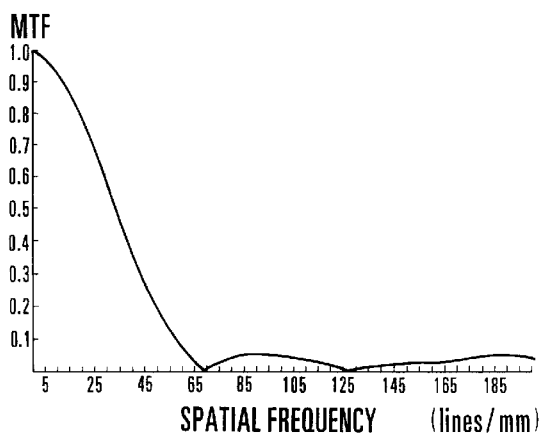
Figure 173:
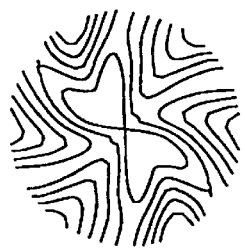
Figure 174:
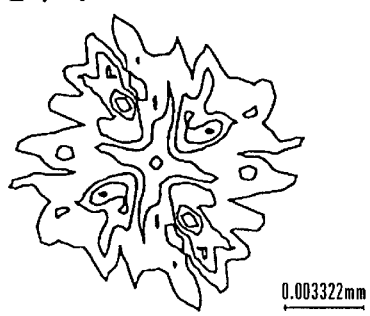
Figure 175:
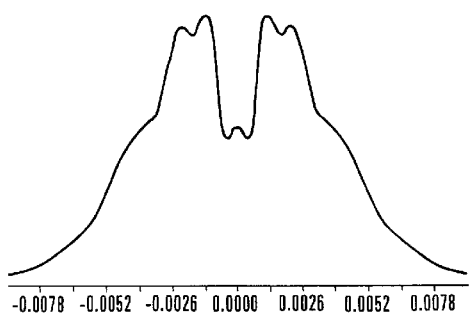
Figure 176:
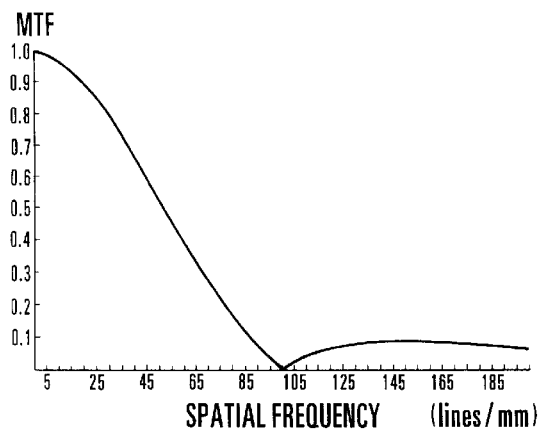
Figure 177:
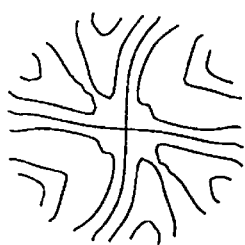
Figure 178:
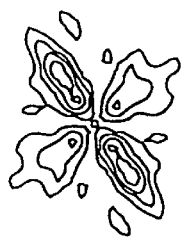
Figure 179:
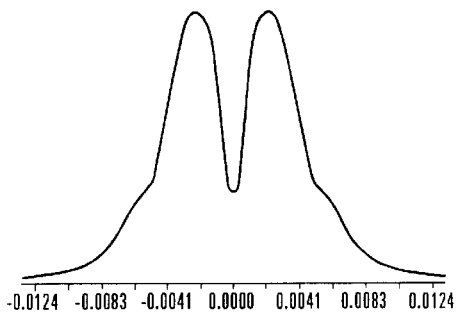
Figure 180:
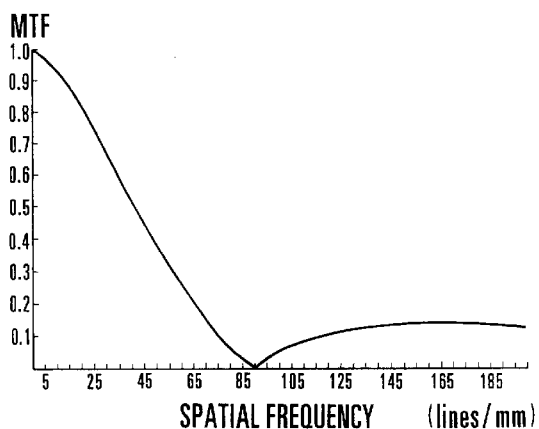
Figure 181:
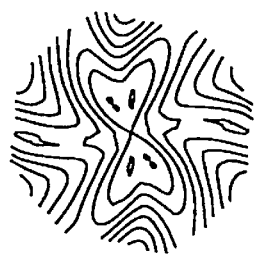
Figure 182:
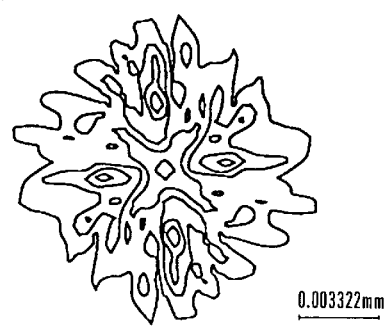
Figure 183:
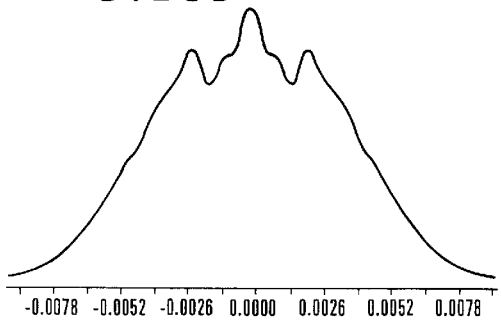
Figure 184:
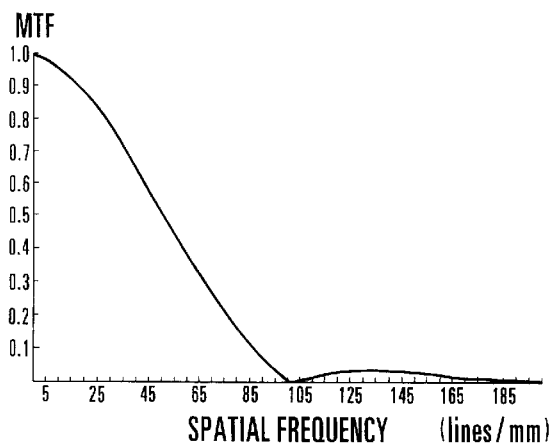
Figure 185:
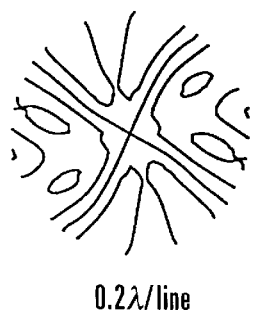
Figure 186:
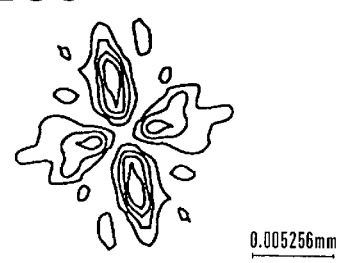
Figure 187:
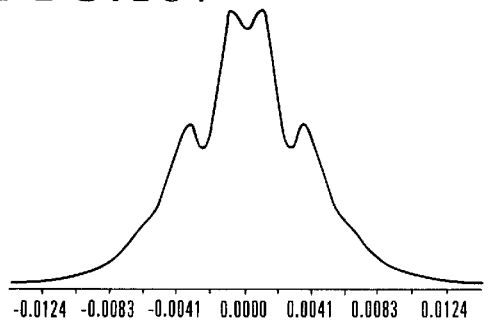
Figure 188:
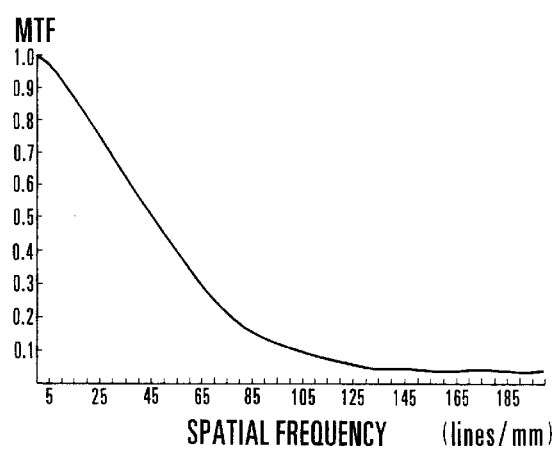
Figure 189:
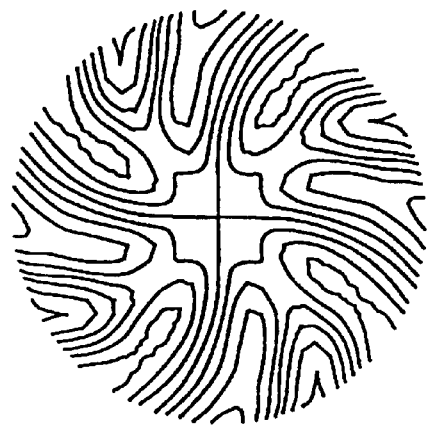
Figure 190:
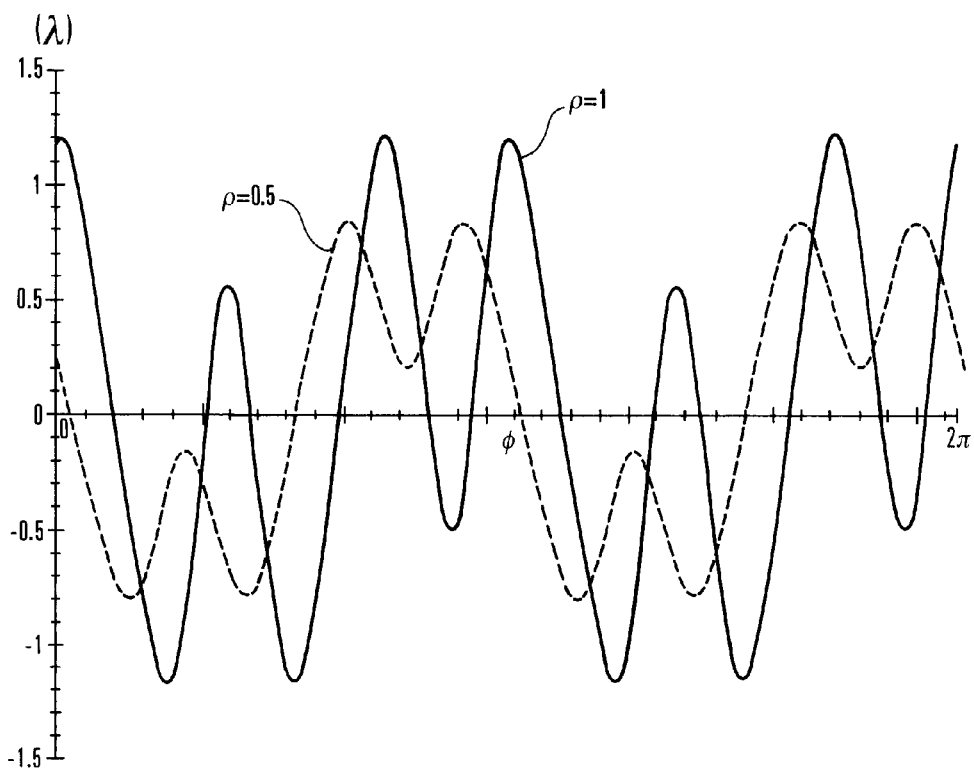
Figure 191:
Figure 192:
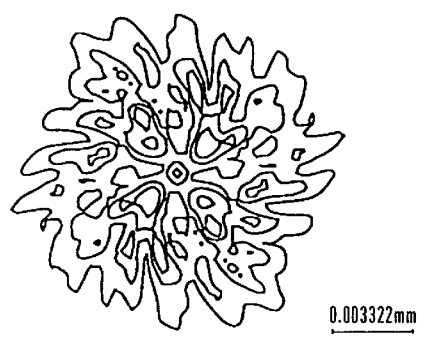
Figure 193:
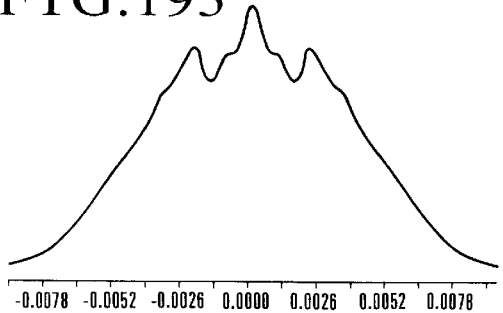
Figure 194:
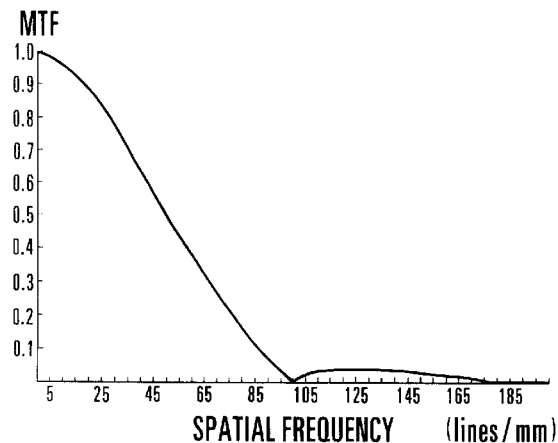
Figure 195:
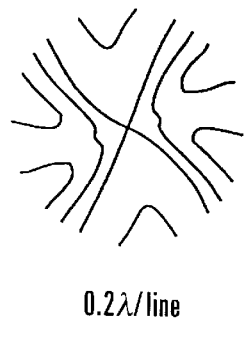
Figure 196:
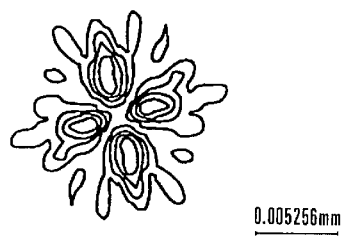
Figure 197:
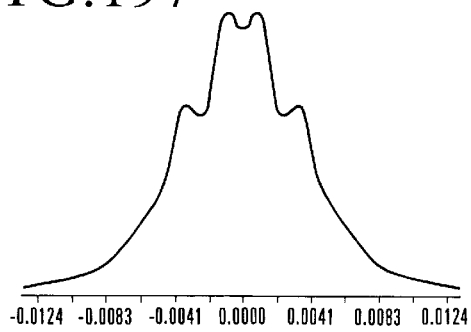
Figure 198:
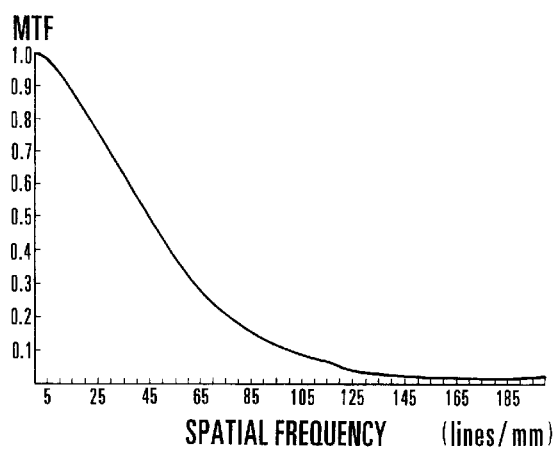
Figure 199:
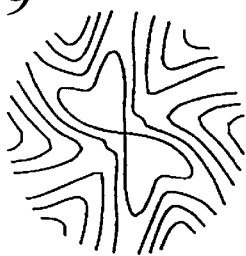
Figure 200:
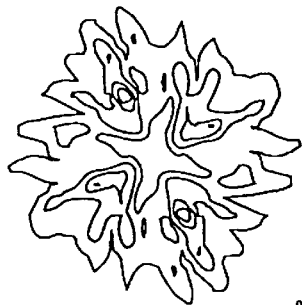
Figure 201:
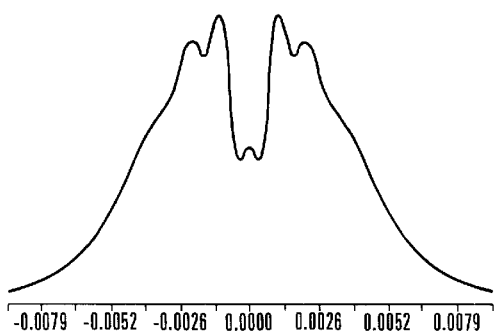
Figure 202:
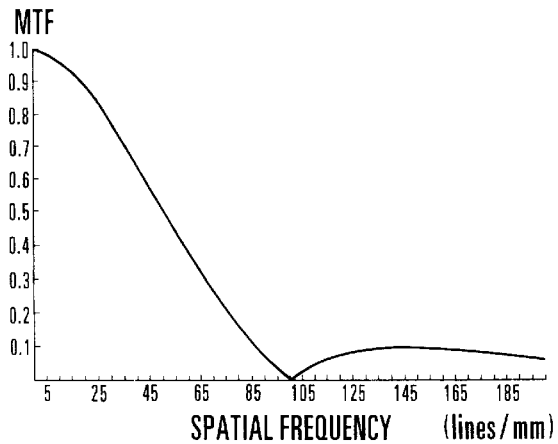
Figure 203:
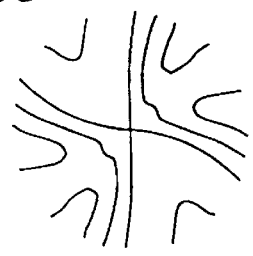
Figure 204:
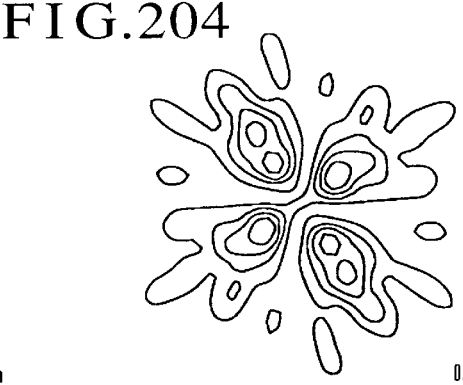
Figure 205:
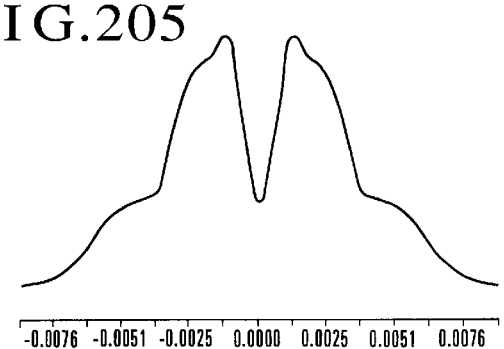
Figure 206:
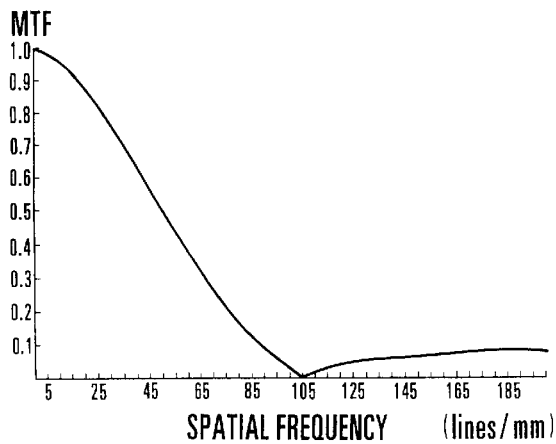
Figure 207:
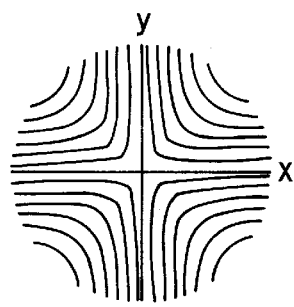
Figure 216:
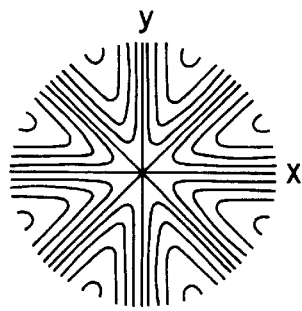
Figure 217:
Figure 218:
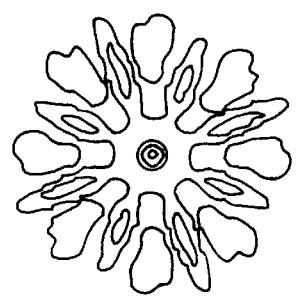
Figure 219:
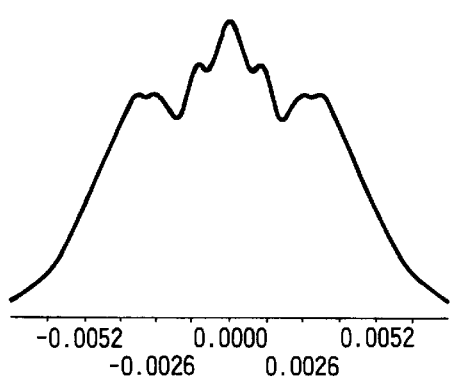
Figure 220:
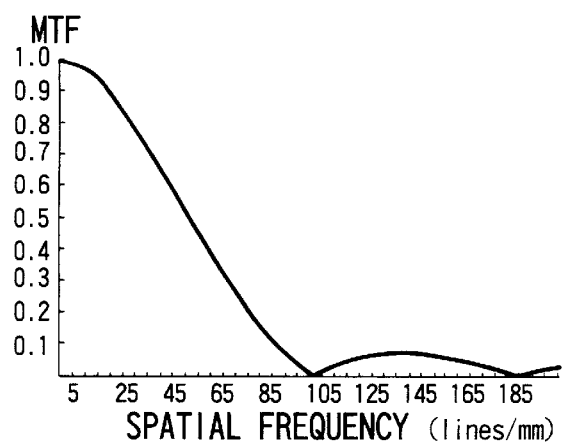
Figure 208:
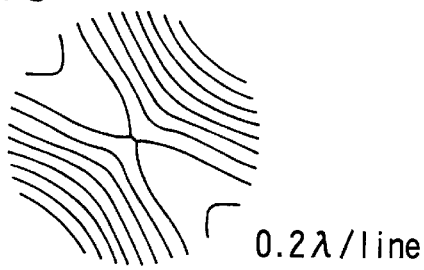
Figure 212:
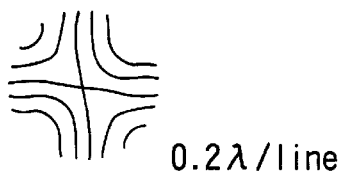
Figure 209:
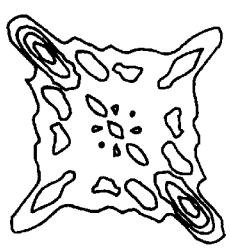
Figure 213:
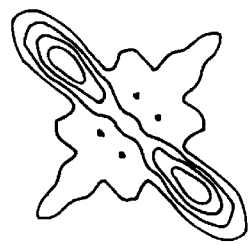
Figure 210:
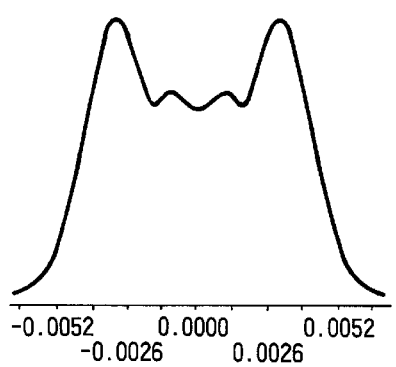
Figure 214:
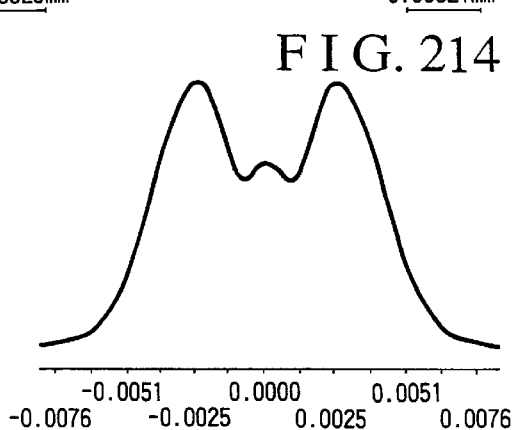
Figure 211:
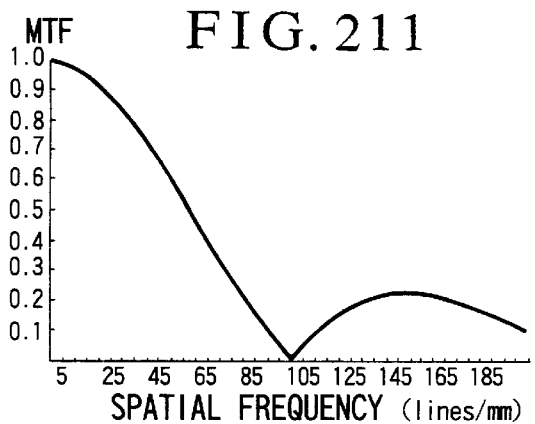
Figure 215:
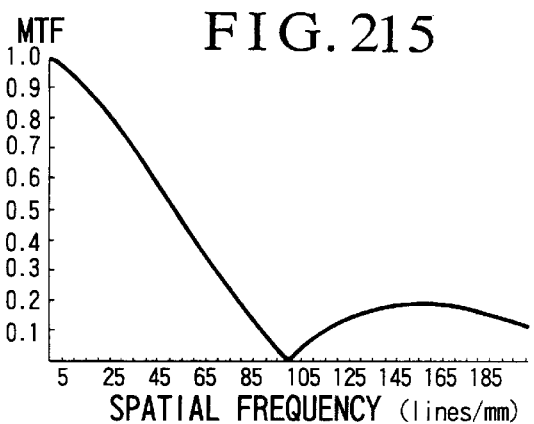
Figure 221:
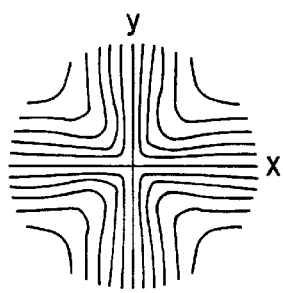
Figure 222:
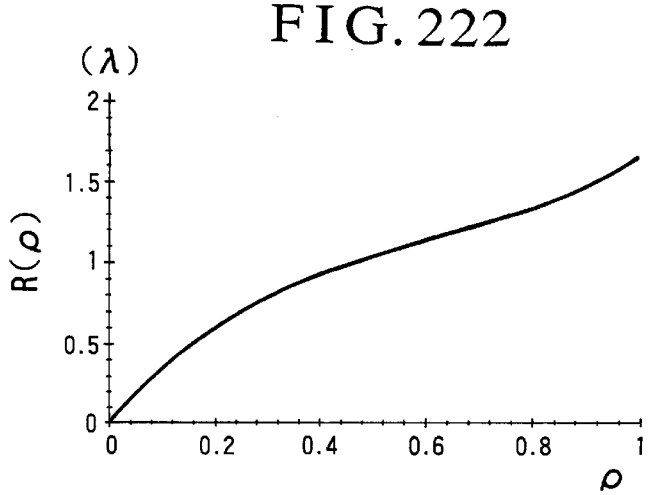
Figure 223:
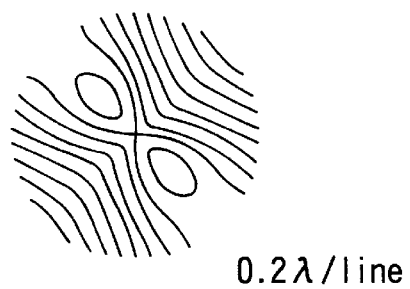
Figure 224:
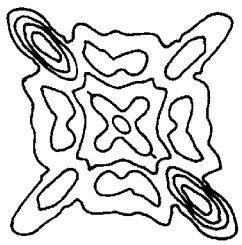
Figure 225:
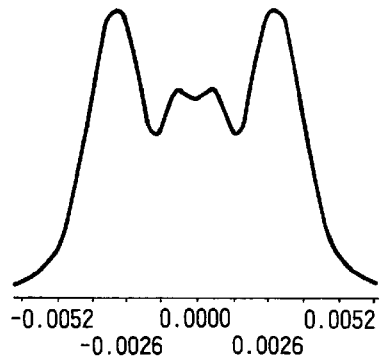
Figure 226:
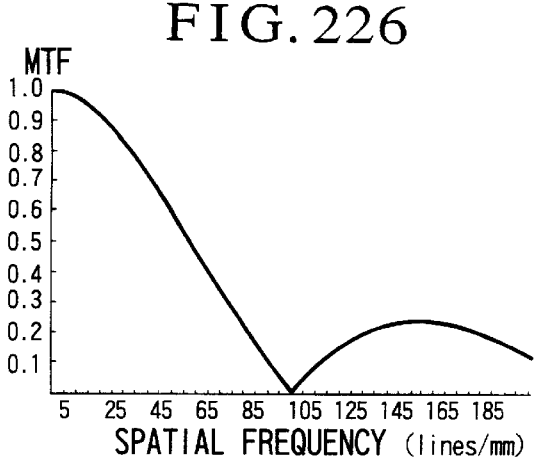
Figure 251:
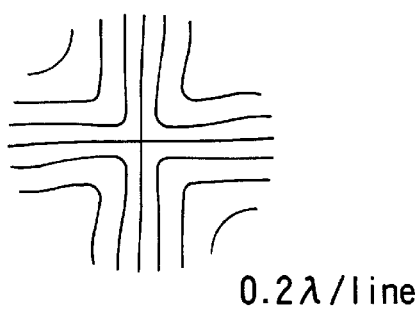
Figure 252:
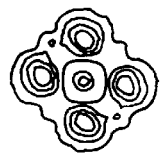
Figure 253:
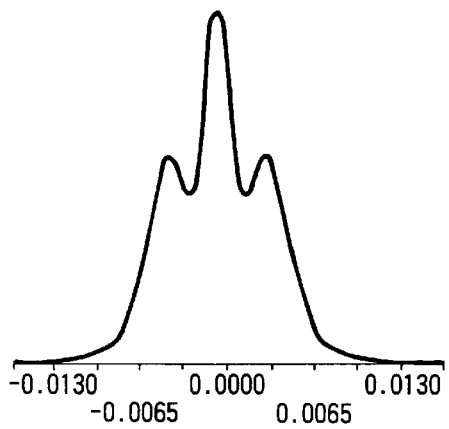
Figure 254:
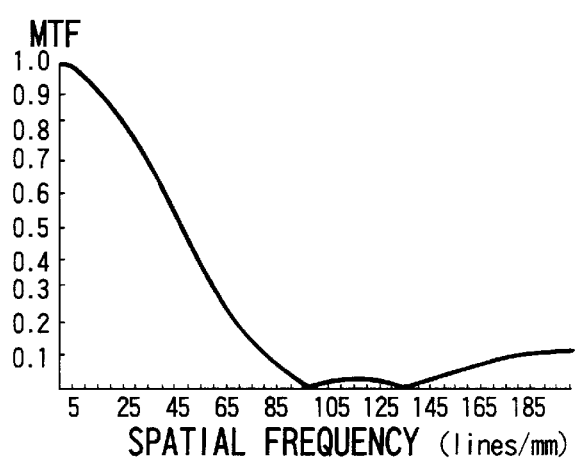
Figure 255:
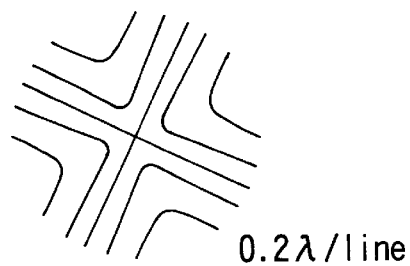
Figure 259:
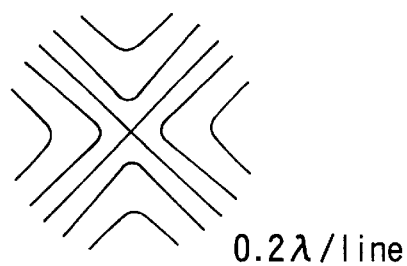
Figure 256:
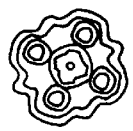
Figure 260:
Figure 257:
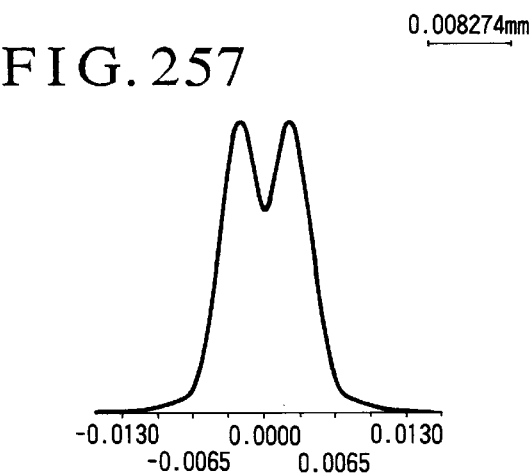
Figure 261:
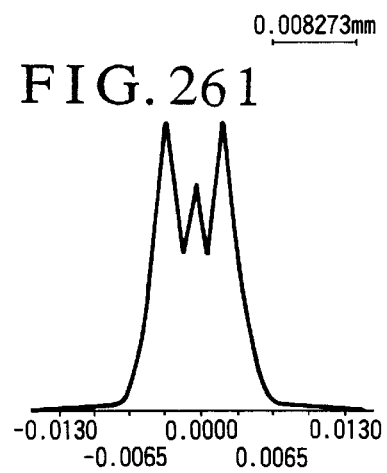
Figure 258:
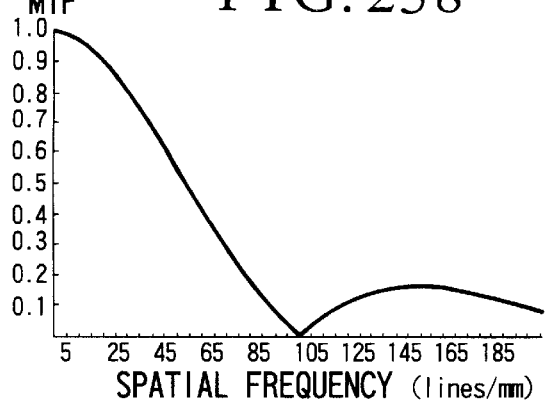
Figure 262:
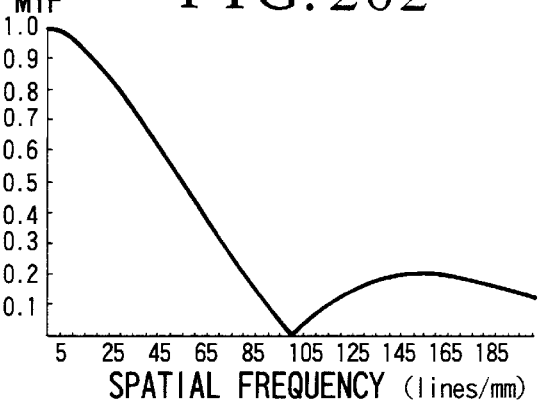
Figure 263:
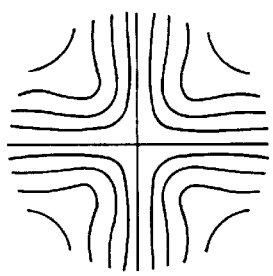
Figure 264:
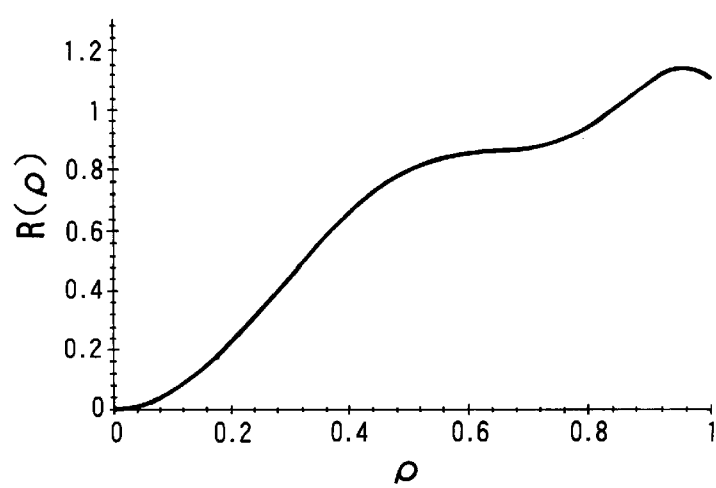
Figure 265:
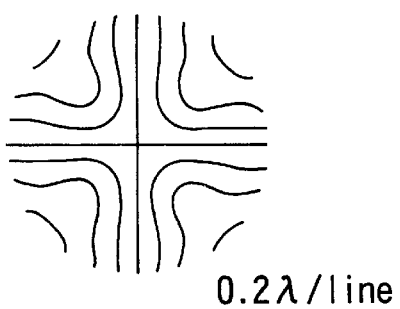
Figure 266:
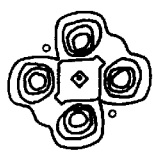
Figure 267:
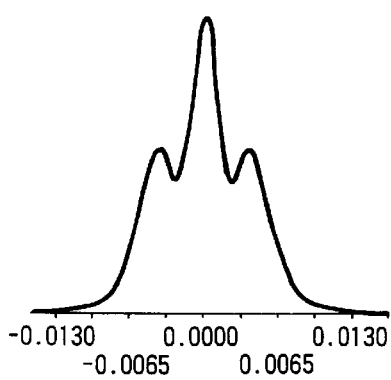
Figure 268:
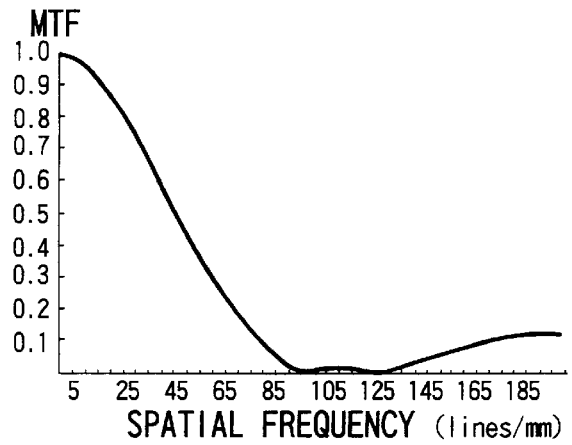
Figure 269:
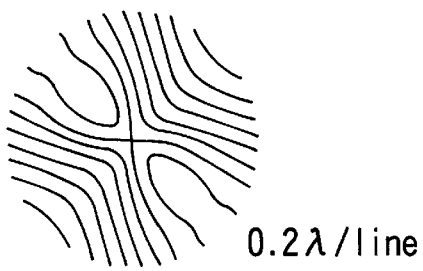
Figure 273:
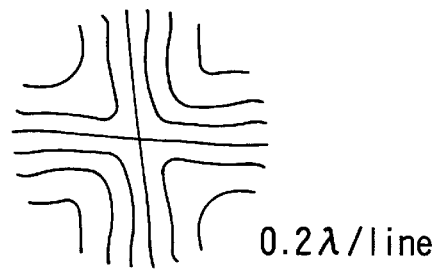
Figure 270:
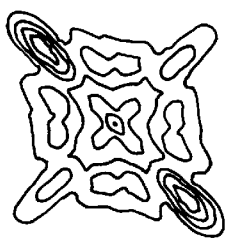
Figure 274:
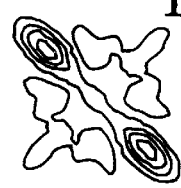
Figure 271:
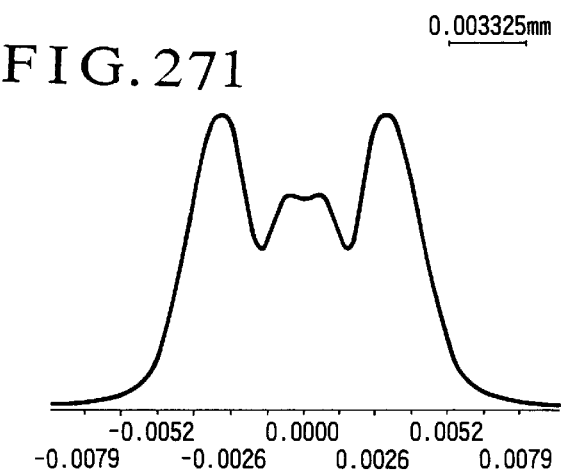
Figure 275:
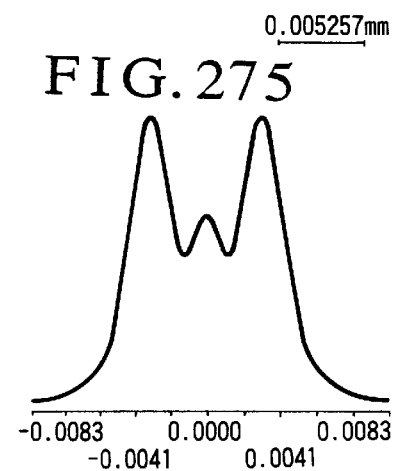
Figure 272:
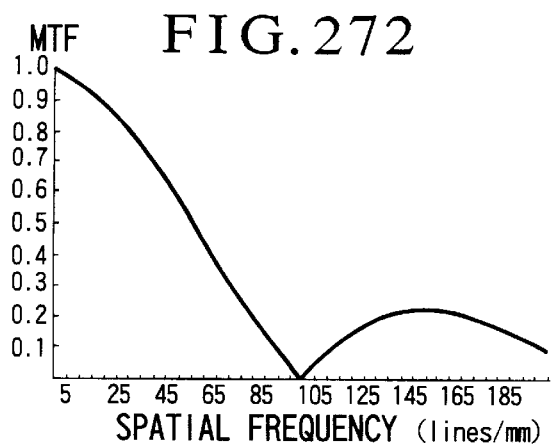
Figure 276:
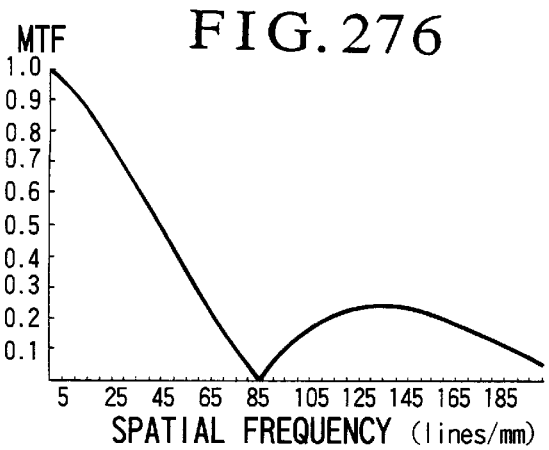
Figure 277:
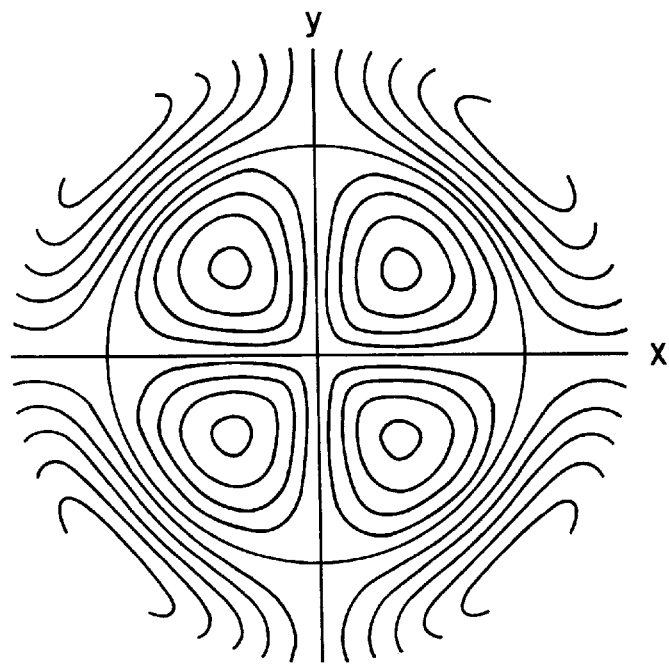
Figure 278:
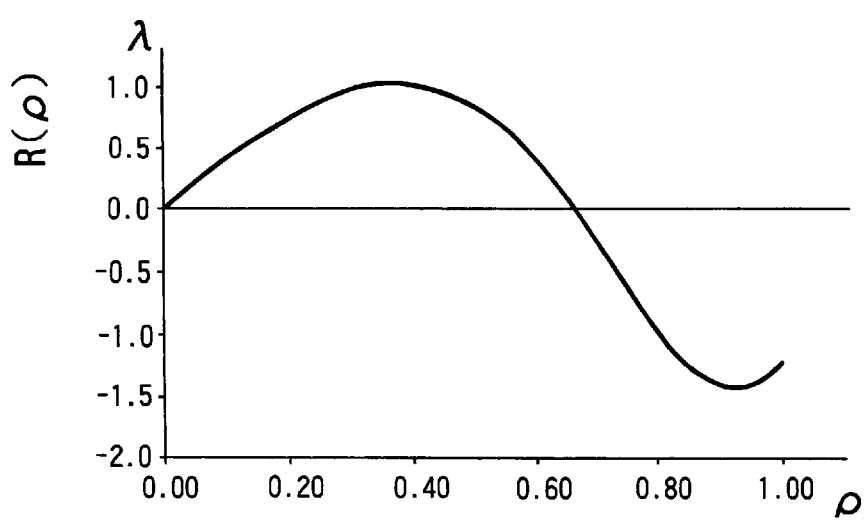
Figure 287:
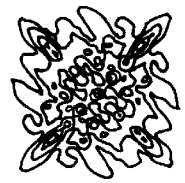
Figure 291:
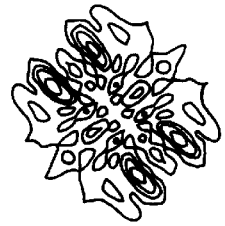
Figure 288:
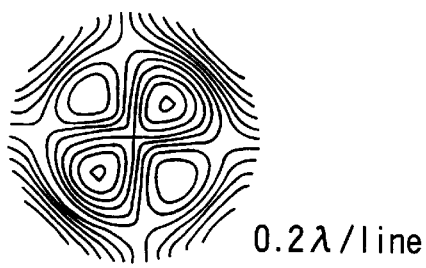
Figure 292:
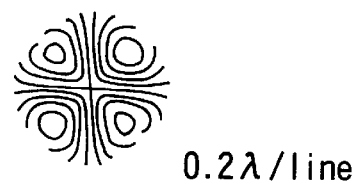
Figure 289:
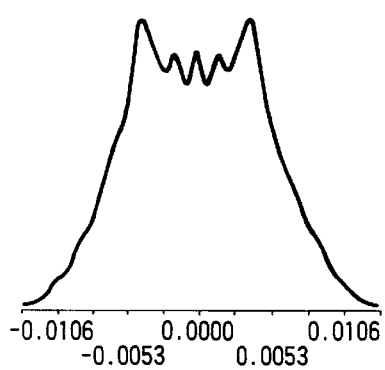
Figure 293:
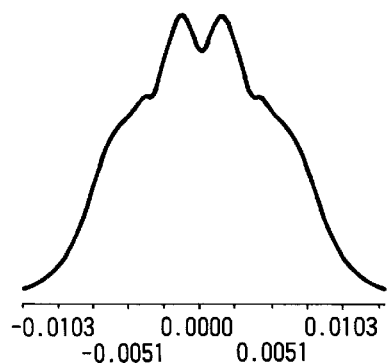
Figure 290:
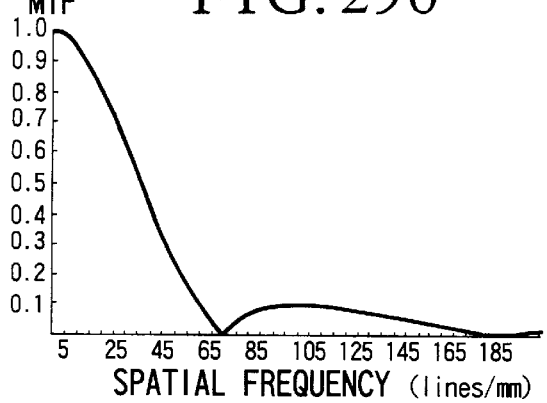
Figure 294:
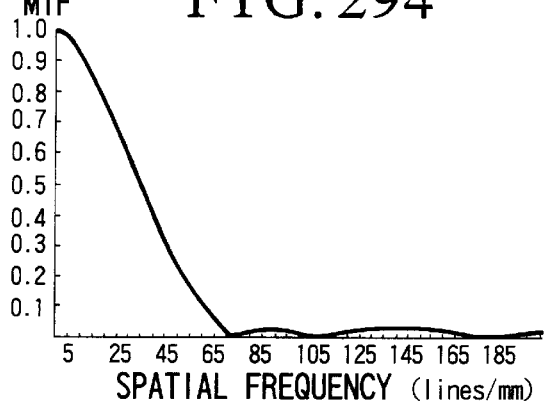
Figure 303:
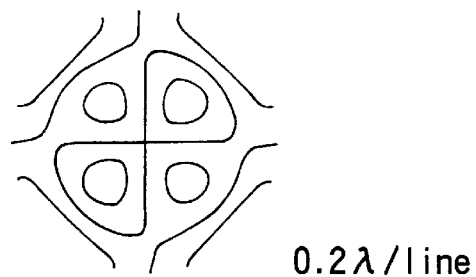
Figure 304:
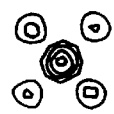
Figure 305:
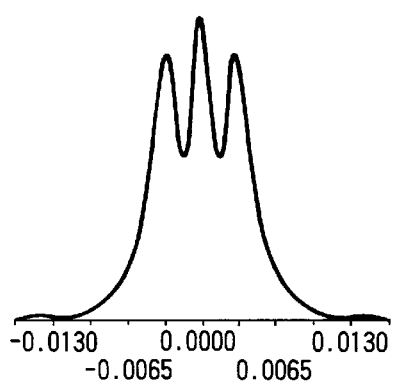
Figure 306:
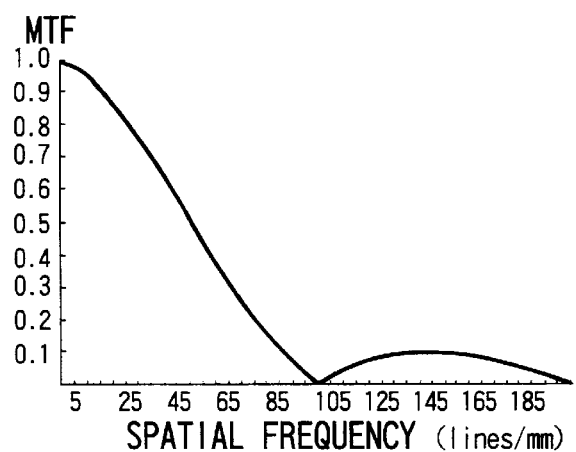
Figure 307:
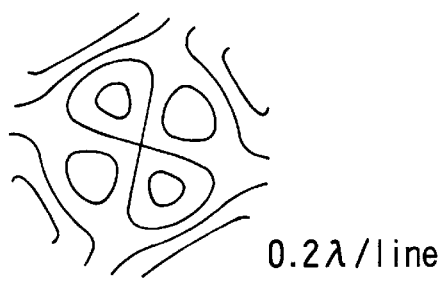
Figure 311:
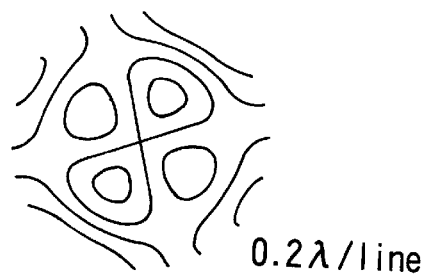
Figure 308:
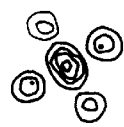
Figure 312:
Figure 309:
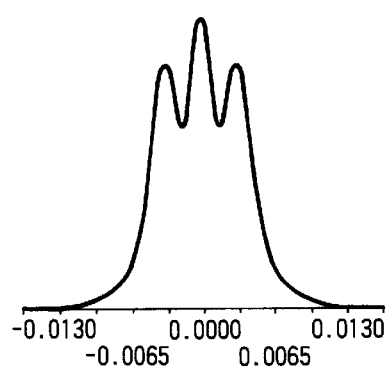
Figure 313:
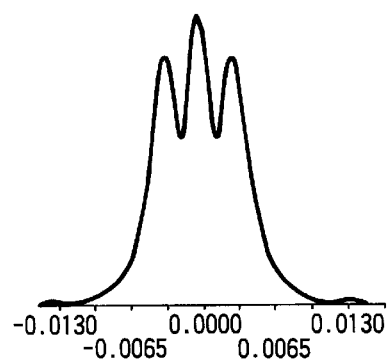
Figure 310:
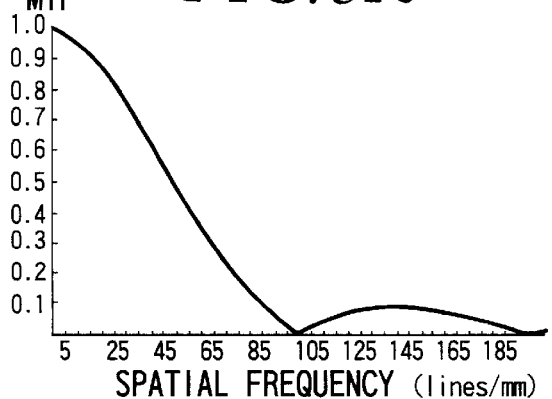
Figure 314:
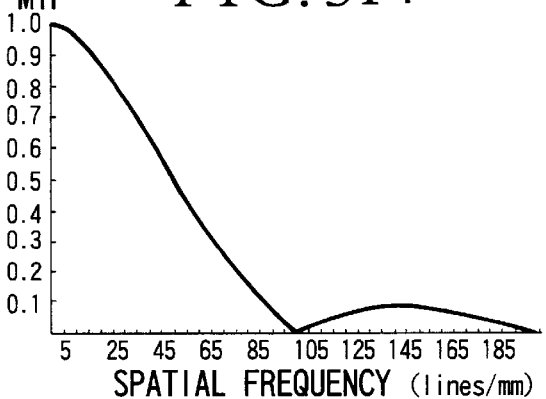
Figure 315:
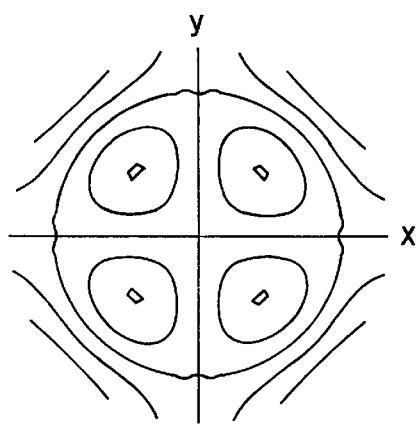
Figure 316:
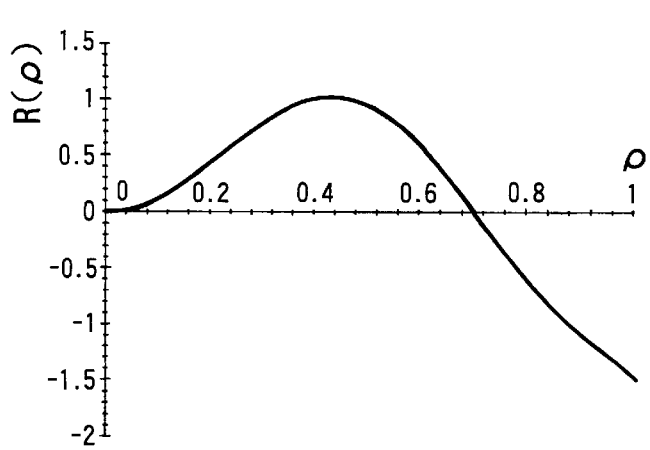
Figure 317:
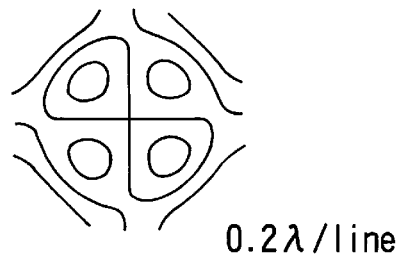
Figure 318:
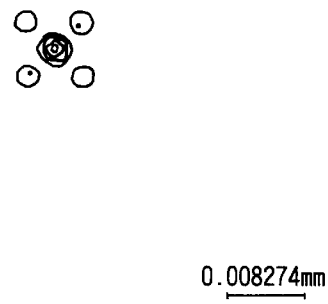
Figure 319:
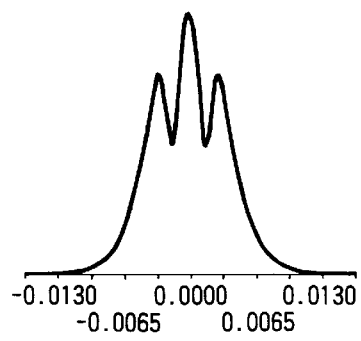
Figure 320:
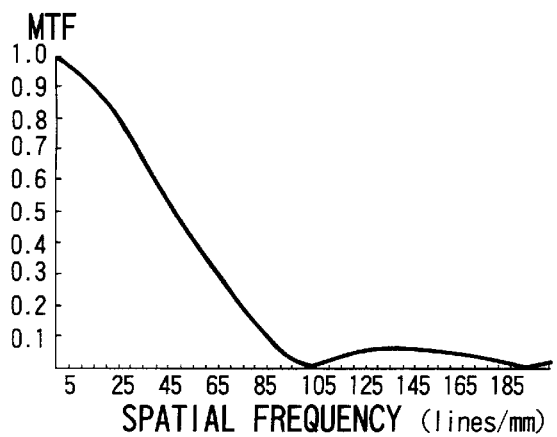
Figure 321:
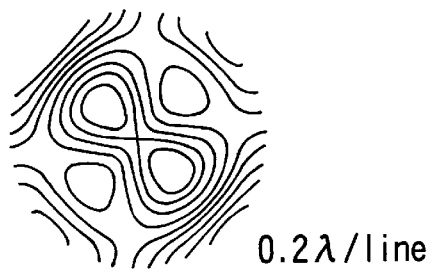
Figure 325:
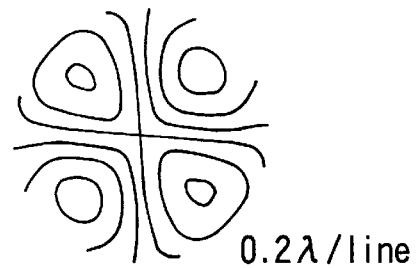
Figure 322:
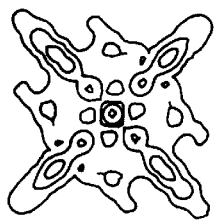
Figure 326:
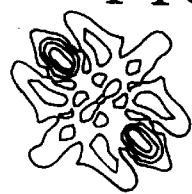
Figure 323:
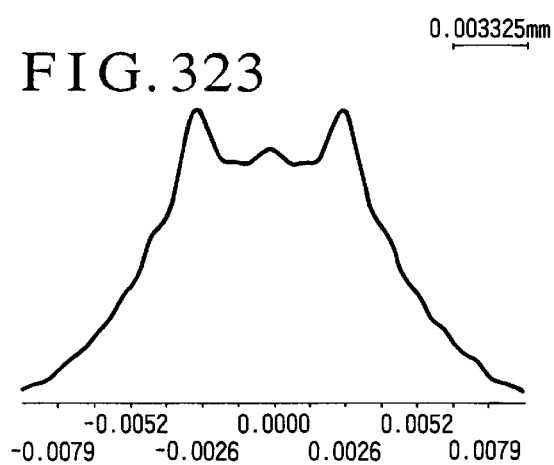
Figure 327:
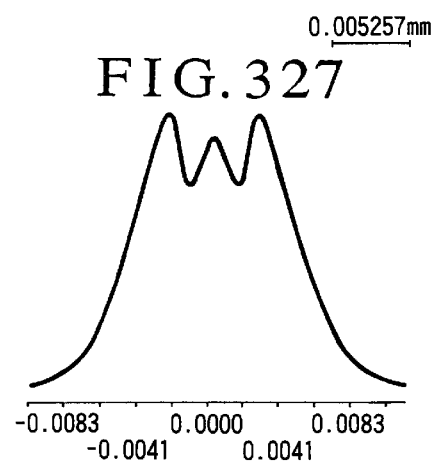
Figure 324:
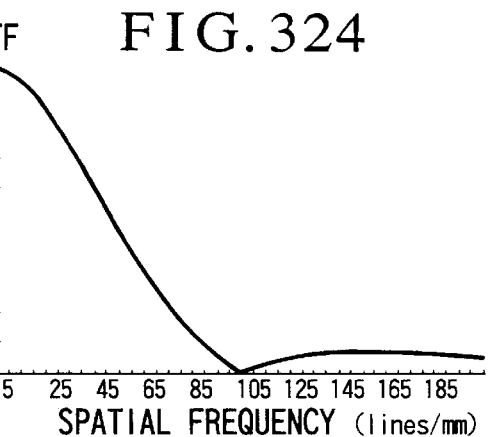
Figure 328:
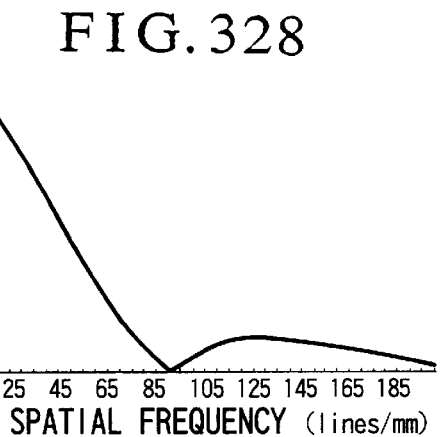
Figure 329:
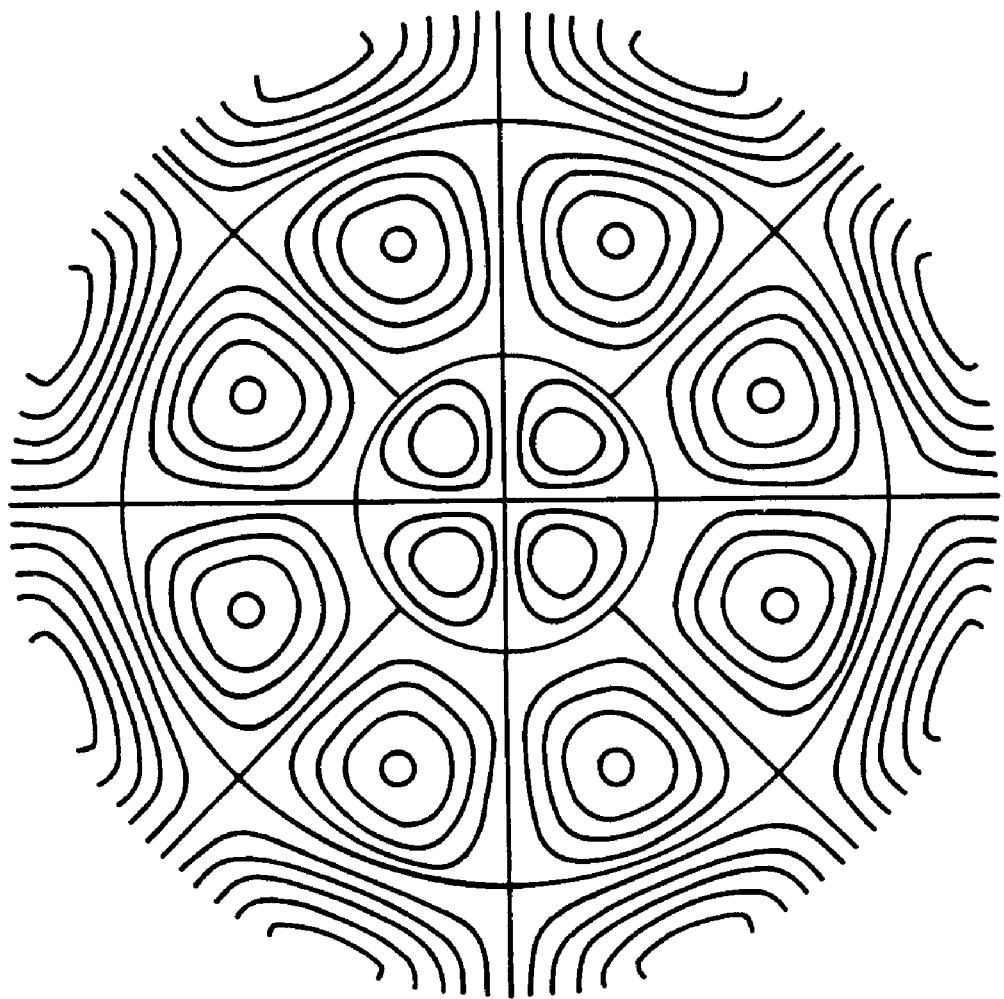
Figure 330:
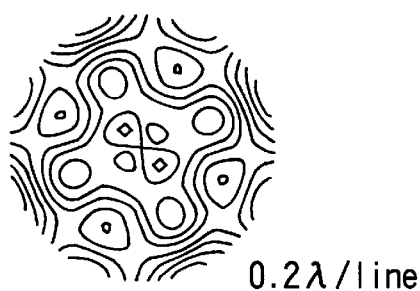
Figure 334:
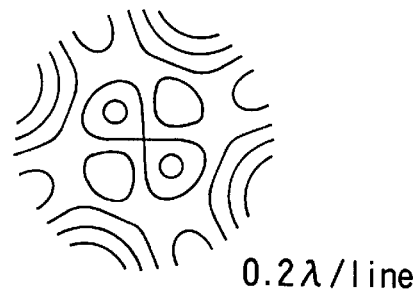
Figure 331:
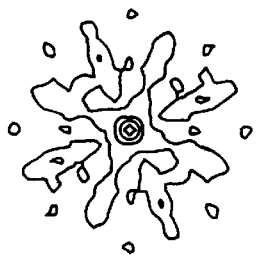
Figure 335:
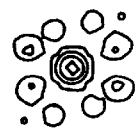
Figure 332:
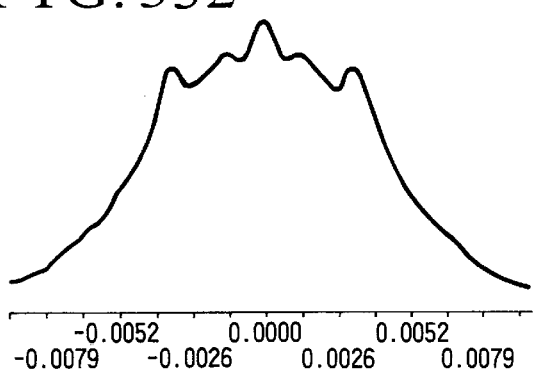
Figure 336:
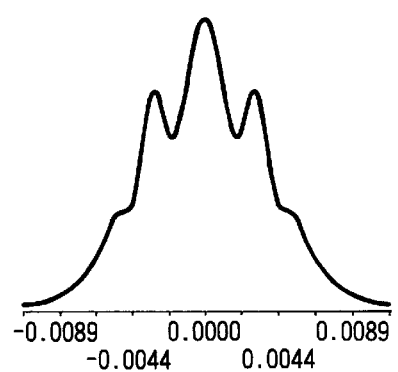
Figure 333:
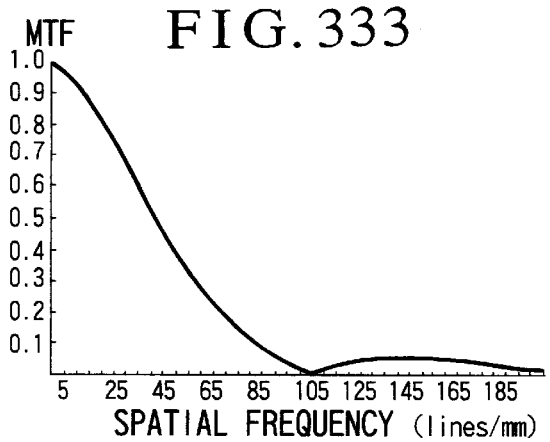
Figure 337:
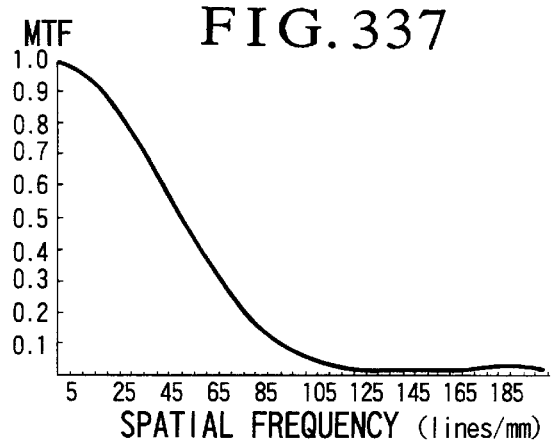
Figure 338:
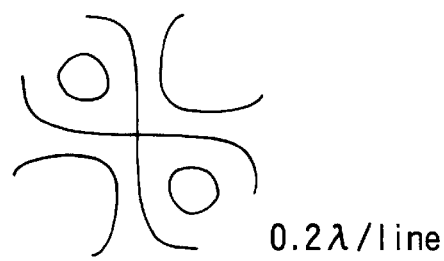
Figure 342:
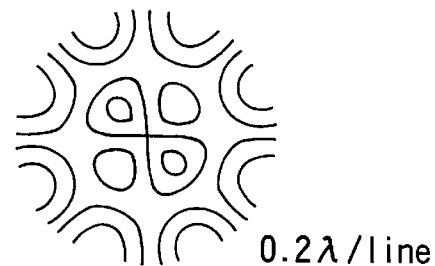
Figure 339:
Figure 343:
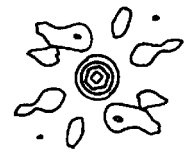
Figure 340:
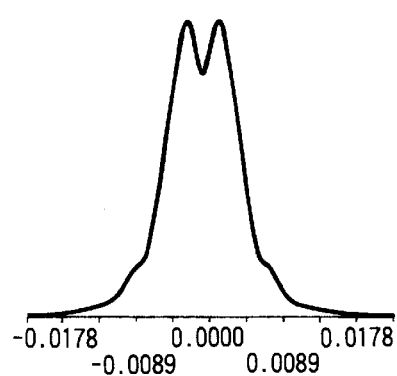
Figure 344:
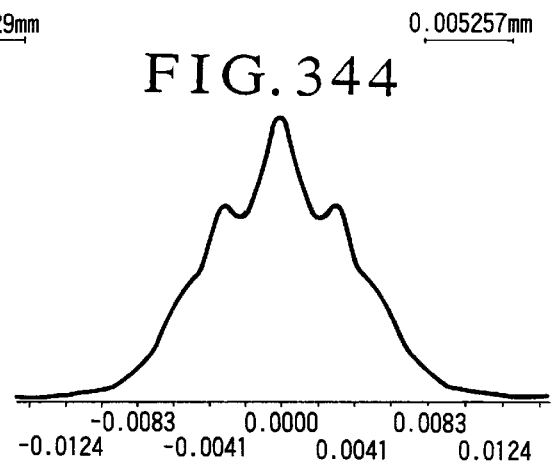
Figure 341:
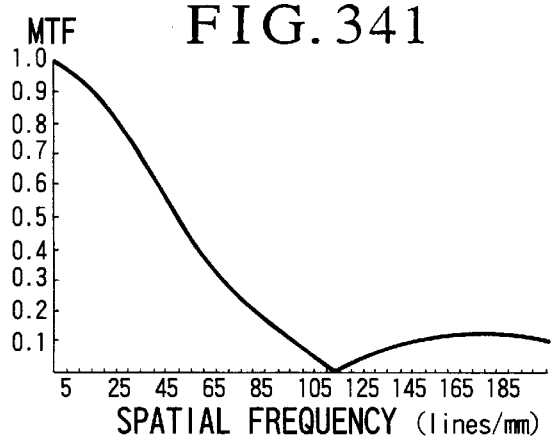
Figure 345:
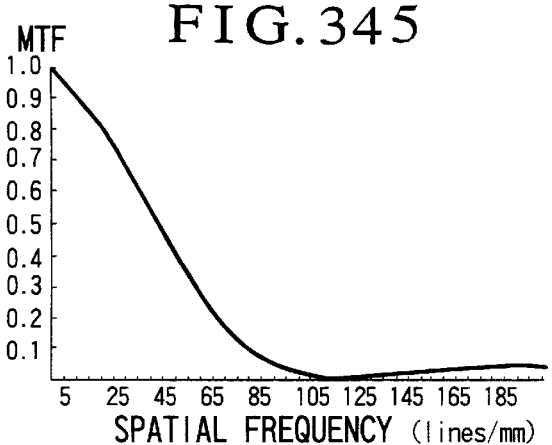
Figure 362:
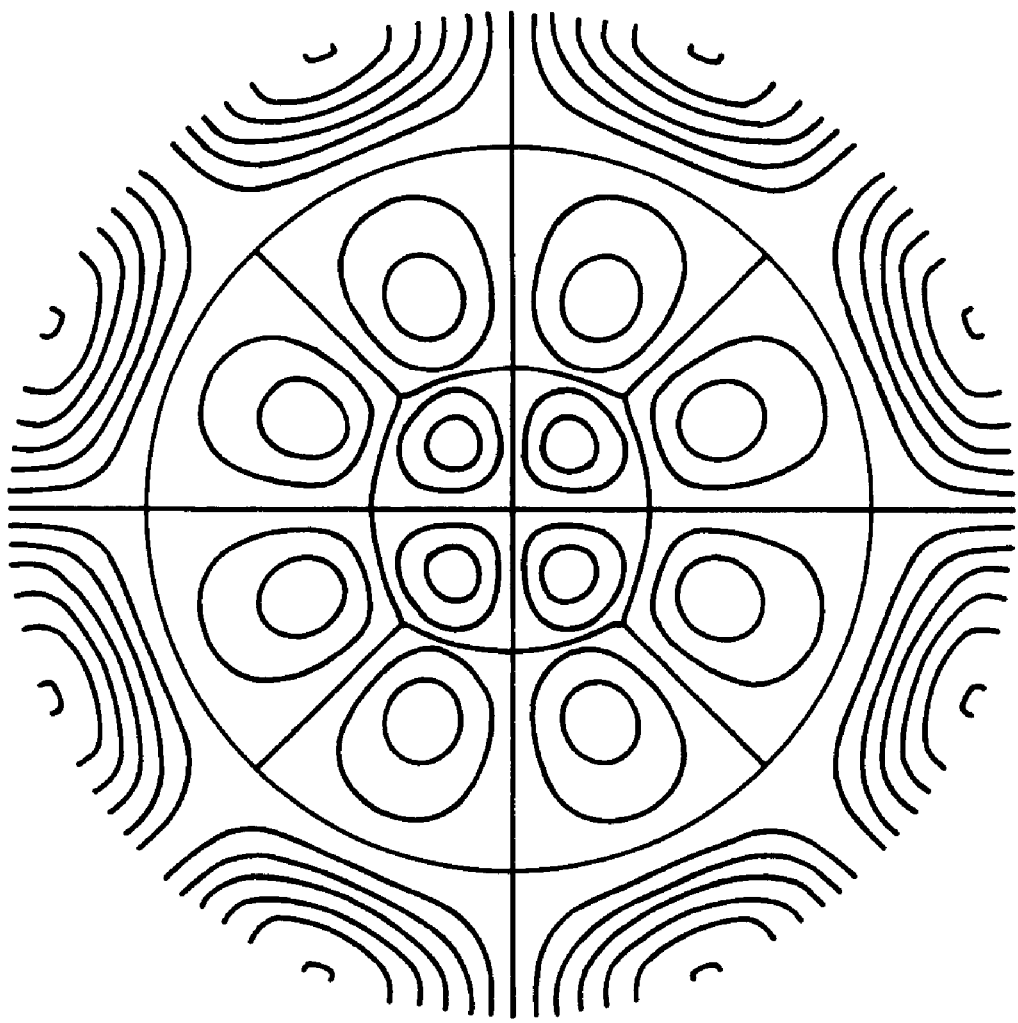
Figure 387:
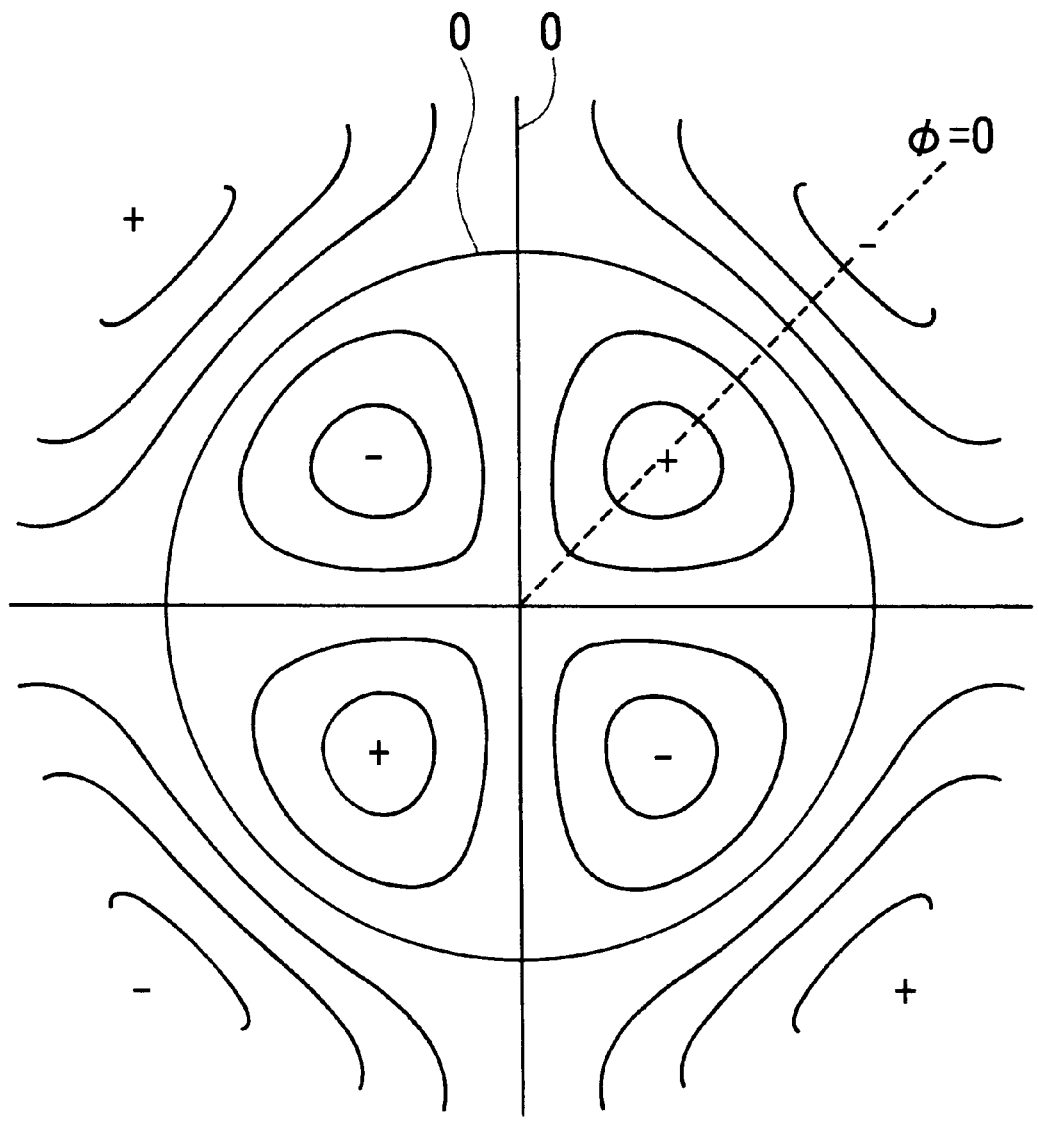
Figure 388:
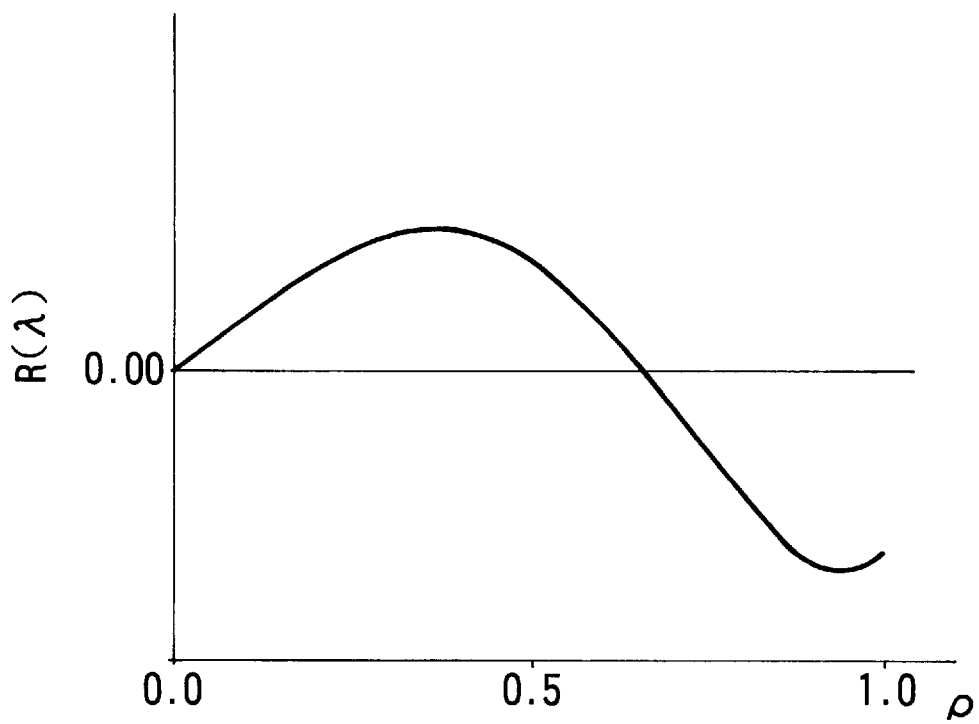
Figure 389:
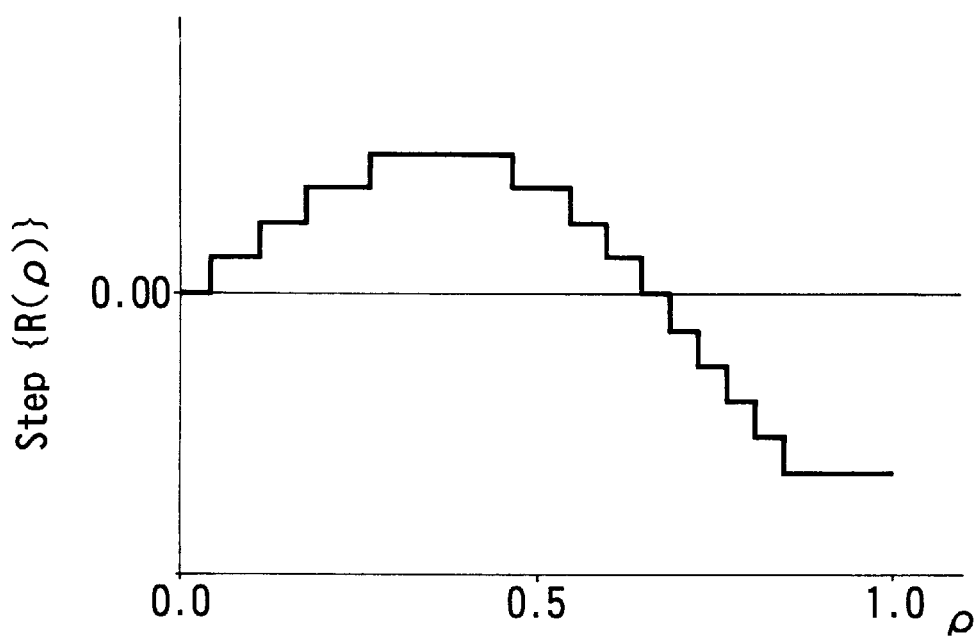

FIG. 132 is a graph showing an MTF curve of the photographing optical system according to Embodiment 16, which is not provided with an optical low-pass filter;

FIG. 133 is a view showing a wavefront aberration of a photographing optical system according to a first example of Embodiment 17;

FIG. 134 is a view showing a relative point spread of the photographing optical system according to the first example of Embodiment 17;

FIG. 135 is a view showing a relative line spread of the photographing optical system according to the first example of Embodiment 17;

FIG. 136 is a graph showing an MTF curve of the photographing optical system according to the first example of Embodiment 17;

FIG. 137 is a view showing a wavefront aberration of a photographing optical system according to a second example of Embodiment 17;

FIG. 138 is a view showing a relative point spread of the photographing optical system according to the second example of Embodiment 17;

FIG. 139 is a view showing a relative line spread of the photographing optical system according to the second example of Embodiment 17;

FIG. 140 is a graph showing an MTF curve of the photographing optical system according to the second example of Embodiment 17;

FIG. 141 is a view showing the contour lines of the shape of an optical low-pass filter according to Embodiment 18;

FIG. 142 is a view showing the variation in shape of the optical low-pass filter according to Embodiment 18, relative to the rotational direction of the optical low-pass filter;

FIG. 143 is a view showing a wavefront aberration of the photographing optical system according to Embodiment 18;

FIG. 144 is a view showing a relative point spread of the photographing optical system according to Embodiment 18;

FIG. 145 is a view showing a relative line spread of the photographing optical system according to Embodiment 18;

FIG. 146 is a graph showing an MTF curve of the photographing optical system according to Embodiment 18;

FIG. 147 is a view showing a wavefront aberration obtained on a shorter focal length side of a photographing optical system according to Embodiment 19;

FIG. 148 is a view showing a relative point spread obtained on the shorter focal length side of the photographing optical system according to Embodiment 19;

FIG. 149 is a view showing a relative line spread obtained on the shorter focal length side of the photographing optical system according to Embodiment 19;

FIG. 150 is a graph showing an MTF curve obtained on the shorter focal length side of the photographing optical system according to Embodiment 19;

FIG. 151 is a view showing a wavefront aberration obtained on a longer focal length side of the photographing optical system according to Embodiment 19;

FIG. 152 is a view showing a relative point spread obtained on the longer focal length side of the photographing optical system according to Embodiment 19;

FIG. 153 is a view showing a relative line spread obtained on the longer focal length side of the photographing optical system according to Embodiment 19;

FIG. 154 is a graph showing an MTF curve obtained on the longer focal length side of the photographing optical system according to Embodiment 19;

FIG. 155 is a view showing the contour lines of the shape of an optical low-pass filter according to Embodiment 20;

FIG. 156 is a view showing the variation in shape of the optical low-pass filter according to Embodiment 20, relative to the rotational direction of the optical low-pass filter;

FIG. 157 is a view showing a wavefront aberration obtained on a shorter focal length side of the photographing optical system according to Embodiment 20;

FIG. 158 is a view showing a relative point spread obtained on the shorter focal length side of the photographing optical system according to Embodiment 20;

FIG. 159 is a view showing a relative line spread obtained on the shorter focal length side of the photographing optical system according to Embodiment 20;

FIG. 160 is a graph showing an MTF curve obtained on the shorter focal length side of the photographing optical system according to Embodiment 20;

FIG. 161 is a view showing a wavefront aberration obtained on a longer focal length side of the photographing optical system according to Embodiment 20;

FIG. 162 is a view showing a relative point spread obtained on the longer focal length side of the photographing optical system according to Embodiment 20;

FIG. 163 is a view showing a relative line spread obtained on the longer focal length side of the photographing optical system according to Embodiment 20;

FIG. 164 is a graph showing an MTF curve obtained on the longer focal length side of the photographing optical system according to Embodiment 20;

FIG. 165 is a view showing a wavefront aberration obtained on a shorter focal length side of a photographing optical system according to Embodiment 21;

FIG. 166 is a view showing a relative point spread obtained on the shorter focal length side of the photographing optical system according to Embodiment 21;

FIG. 167 is a view showing a relative line spread obtained on the shorter focal length side of the photographing optical system according to Embodiment 21;

FIG. 168 is a graph showing an MTF curve obtained on the shorter focal length side of the photographing optical system according to Embodiment 21;

FIG. 169 is a view showing a wavefront aberration obtained on a longer focal length side of the photographing optical system according to Embodiment 21;

FIG. 170 is a view showing a relative point spread obtained on the longer focal length side of the photographing optical system according to Embodiment 21;

FIG. 171 is a view showing a relative line spread obtained on the longer focal length side of the photographing optical system according to Embodiment 21;

FIG. 172 is a graph showing an MTF curve obtained on the longer focal length side of the photographing optical system according to Embodiment 21;

FIG. 173 is a view showing a wavefront aberration obtained on a shorter focal length side of a photographing optical system according to Embodiment 22;

FIG. 174 is a view showing a relative point spread obtained on the shorter focal length side of the photographing optical system according to Embodiment 22;

FIG. 175 is a view showing a relative line spread obtained on the shorter focal length side of the photographing optical system according to Embodiment 22;

FIG. 176 is a graph showing an MTF curve obtained on the shorter focal length side of the photographing optical system according to Embodiment 22;

FIG. 177 is a view showing a wavefront aberration obtained on a longer focal length side of the photographing optical system according to Embodiment 22;

FIG. 178 is a view showing a relative point spread obtained on the longer focal length side of the photographing optical system according to Embodiment 22;

FIG. 179 is a view showing a relative line spread obtained on the longer focal length side of the photographing optical system according to Embodiment 22;

FIG. 180 is a graph showing an MTF curve obtained on the longer focal length side of the photographing optical system according to Embodiment 22;

FIG. 181 is a view showing a wavefront aberration obtained on a shorter focal length side of a photographing optical system according to Embodiment 23;

FIG. 182 is a view showing a relative point spread obtained on the shorter focal length side of the photographing optical system according to Embodiment 23;

FIG. 183 is a view showing a relative line spread obtained on the shorter focal length side of the photographing optical system according to Embodiment 23;

FIG. 184 is a graph showing an MTF curve obtained on the shorter focal length side of the photographing optical system according to Embodiment 23;

FIG. 185 is a view showing a wavefront aberration obtained on a longer focal length side of the photographing optical system according to Embodiment 23;

FIG. 186 is a view showing a relative point spread obtained on the longer focal length side of the photographing optical system according to Embodiment 23;

FIG. 187 is a view showing a relative line spread obtained on the longer focal length side of the photographing optical system according to Embodiment 23;

FIG. 188 is a graph showing an MTF curve obtained on the longer focal length side of the photographing optical system according to Embodiment 23;

FIG. 189 is a view showing the contour lines of the shape of an optical low-pass filter according to Embodiment 24;

FIG. 190 is a view showing the variation in shape of the optical low-pass filter according to Embodiment 24, relative to the rotational direction of the optical low-pass filter;

FIG. 191 is a view showing a wavefront aberration obtained on a shorter focal length side of the photographing optical system according to Embodiment 24;

FIG. 192 is a view showing a relative point spread obtained on the shorter focal length side of the photographing optical system according to Embodiment 24;

FIG. 193 is a view showing a relative line spread obtained on the shorter focal length side of the photographing optical system according to Embodiment 24;

FIG. 194 is a graph showing an MTF curve obtained on the shorter focal length side of the photographing optical system according to Embodiment 24;

FIG. 195 is a view showing a wavefront aberration obtained on a longer focal length side of the photographing optical system according to Embodiment 24;

FIG. 196 is a view showing a relative point spread obtained on the longer focal length side of the photographing optical system according to Embodiment 24;

FIG. 197 is a view showing a relative line spread obtained on the longer focal length side of the photographing optical system according to Embodiment 24;

FIG. 198 is a graph showing an MTF curve obtained on the longer focal length side of the photographing optical system according to Embodiment 24;

FIG. 199 is a view showing a wavefront aberration obtained on a shorter focal length side of a photographing optical system according to Embodiment 25;

FIG. 200 is a view showing a relative point spread obtained on the shorter focal length side of the photographing optical system according to Embodiment 25;

FIG. 201 is a view showing a relative line spread obtained on the shorter focal length side of the photographing optical system according to Embodiment 25;

FIG. 202 is a graph showing an MTF curve obtained on the shorter focal length side of the photographing optical system according to Embodiment 25;

FIG. 203 is a view showing a wavefront aberration obtained on a longer focal length side of the photographing optical system according to Embodiment 25;

FIG. 204 is a view showing a relative point spread obtained on the longer focal length side of the photographing optical system according to Embodiment 25;

FIG. 205 is a view showing a relative line spread obtained on the longer focal length side of the photographing optical system according to Embodiment 25;

FIG. 206 is a graph showing an MTF curve obtained on the longer focal length side of the photographing optical system according to Embodiment 25;

FIG. 207 is a view showing the contour lines of the shape of an optical low-pass filter according to a first example of Embodiment 26;

FIG. 208 is a view showing a wavefront aberration obtained on a shorter focal length side of a photographing optical system according to the first example of Embodiment 26;

FIG. 209 is a view showing a relative point spread obtained on the shorter focal length side of the photographing optical system according to the first example of Embodiment 26;

FIG. 210 is a view showing a relative line spread obtained on the shorter focal length side of the photographing optical system according to the first example of Embodiment 26;

FIG. 211 is a graph showing an MTF curve obtained on the shorter focal length side of the photographing optical system according to the first example of Embodiment 26;

FIG. 212 is a view showing a wavefront aberration obtained on a longer focal length side of the photographing optical system according to the first example of Embodiment 26;

FIG. 213 is a view showing a relative point spread obtained on the longer focal length side of the photographing optical system according to the first example of Embodiment 26;

FIG. 214 is a view showing a relative line spread obtained on the longer focal length side of the photographing optical system according to the first example of Embodiment 26;

FIG. 215 is a graph showing an MTF curve obtained on the longer focal length side of the photographing optical system according to the first example of Embodiment 26;

FIG. 216 is a view showing the contour lines of the shape of an optical low-pass filter according to a second example of Embodiment 26;

FIG. 217 is a view showing a wavefront aberration obtained on a shorter focal length side of a photographing optical system according to the second example of Embodiment 26;

FIG. 218 is a view showing a relative point spread obtained on the shorter focal length side of the photographing optical system according to the second example of Embodiment 26;

FIG. 219 is a view showing a relative line spread obtained on the shorter focal length side of the photographing optical system according to the second example of Embodiment 26;

FIG. 220 is a graph showing an MTF curve obtained on the shorter focal length side of the photographing optical system according to the second example of Embodiment 26;

FIG. 221 is a view showing the contour lines of the shape of an optical low-pass filter according to Embodiment 27;

FIG. 222 is a cross-sectional view showing the shape of the optical low-pass filter according to Embodiment 27;

FIG. 223 is a view showing a wavefront aberration obtained at F1.65 on a shorter focal length side of a photographing optical system according to Embodiment 27;

FIG. 224 is a view showing a relative point spread obtained at F1.65 on the shorter focal length side of the photographing optical system according to Embodiment 27;

FIG. 225 is a view showing a relative line spread obtained at F1.65 on the shorter focal length side of the photographing optical system according to Embodiment 27;

FIG. 226 is a graph showing an MTF curve obtained at F1.65 on the shorter focal length side of the photographing optical system according to Embodiment 27;

FIG. 227 is a view showing a wavefront aberration obtained at F2.8 on the shorter focal length side of the photographing optical system according to Embodiment 27;

FIG. 228 is a view showing a relative point spread obtained at F2.8 on the shorter focal length side of the photographing optical system according to Embodiment 27;

FIG. 229 is a view showing a relative line spread obtained at F2.8 on the shorter focal length side of the photographing optical system according to Embodiment 27;

FIG. 230 is a graph showing an MTF curve obtained at F2.8 on the shorter focal length side of the photographing optical system according to Embodiment 27;

FIG. 231 is a view showing a wavefront aberration obtained at F5.6 on the shorter focal length side of the photographing optical system according to Embodiment 27;

FIG. 232 is a view showing a relative point spread obtained at F5.6 on the shorter focal length side of the photographing optical system according to Embodiment 27;

FIG. 233 is a view showing a relative line spread obtained at F5.6 on the shorter focal length side of the photographing optical system according to Embodiment 27;

FIG. 234 is a graph showing an MTF curve obtained at F5.6 on the shorter focal length side of the photographing optical system according to Embodiment 27;

FIG. 235 is a view showing a wavefront aberration obtained on a shorter focal length side of a photographing optical system according to Embodiment 28;

FIG. 236 is a view showing a relative point spread obtained on the shorter focal length side of the photographing optical system according to Embodiment 28;

FIG. 237 is a view showing a relative line spread obtained on the shorter focal length side of the photographing optical system according to Embodiment 28;

FIG. 238 is a graph showing an MTF curve obtained on the shorter focal length side of the photographing optical system according to Embodiment 28;

FIG. 239 is a view showing a wavefront aberration obtained on a longer focal length side of the photographing optical system according to Embodiment 28;

FIG. 240 is a view showing a relative point spread obtained on the longer focal length side of the photographing optical system according to Embodiment 28;

FIG. 241 is a view showing a relative line spread obtained on the longer focal length side of the photographing optical system according to Embodiment 28;

FIG. 242 is a graph showing an MTF curve obtained on the longer focal length side of the photographing optical system according to Embodiment 28;

FIG. 243 is a view showing a wavefront aberration obtained on a shorter focal length side of a photographing optical system according to Embodiment 29;

FIG. 244 is a view showing a relative point spread obtained on the shorter focal length side of the photographing optical system according to Embodiment 29;

FIG. 245 is a view showing a relative line spread obtained on the shorter focal length side of the photographing optical system according to Embodiment 29;

FIG. 246 is a graph showing an MTF curve obtained on the shorter focal length side of the photographing optical system according to Embodiment 29;

FIG. 247 is a view showing a wavefront aberration obtained on a longer focal length side of the photographing optical system according to Embodiment 29;

FIG. 248 is a view showing a relative point spread obtained on the longer focal length side of the photographing optical system according to Embodiment 29;

FIG. 249 is a view showing a relative line spread obtained on the longer focal length side of the photographing optical system according to Embodiment 29;

FIG. 250 is a graph showing an MTF curve obtained on the longer focal length side of the photographing optical system according to Embodiment 29;

FIG. 251 is a view showing a wavefront aberration of a photographing optical system according to Embodiment 30;

FIG. 252 is a view showing a relative point spread of the photographing optical system according to Embodiment 30;

FIG. 253 is a view showing a relative line spread of the photographing optical system according to Embodiment 30;

FIG. 254 is a graph showing an MTF curve of the photographing optical system according to Embodiment 30;

FIG. 255 is a view showing a wavefront aberration of a photographing optical system according to a first example of Embodiment 31;

FIG. 256 is a view showing a relative point spread of the photographing optical system according to the first example of Embodiment 31;

FIG. 257 is a view showing a relative line spread of the photographing optical system according to the first example of Embodiment 31;

FIG. 258 is a graph showing an MTF curve of the photographing optical system according to the first example of Embodiment 31;

FIG. 259 is a view showing a wavefront aberration of a photographing optical system according to a second example of Embodiment 31;

FIG. 260 is a view showing a relative point spread of the photographing optical system according to the second example of Embodiment 31;

FIG. 261 is a view showing a relative line spread of the photographing optical system according to the second example of Embodiment 31;

FIG. 262 is a graph showing an MTF curve of the photographing optical system according to the second example of Embodiment 31;

FIG. 263 is a view showing the contour lines of the shape of an optical low-pass filter according to Embodiment 32;

FIG. 264 is a cross-sectional view showing the shape of the optical low-pass filter according to Embodiment 32;

FIG. 265 is a view showing a wavefront aberration of a photographing optical system according to Embodiment 32;

FIG. 266 is a view showing a relative point spread of the photographing optical system according to Embodiment 32;

FIG. 267 is a view showing a relative line spread of the photographing optical system according to Embodiment 32;

FIG. 268 is a graph showing an MTF curve of the photographing optical system according to Embodiment 32;

FIG. 269 is a view showing a wavefront aberration obtained on a shorter focal length side of a photographing optical system according to Embodiment 33;

FIG. 270 is a view showing a relative point spread obtained on the shorter focal length side of the photographing optical system according to Embodiment 33;

FIG. 271 is a view showing a relative line spread obtained on the shorter focal length side of the photographing optical system according to Embodiment 33;

FIG. 272 is a graph showing an MTF curve obtained on the shorter focal length side of the photographing optical system according to Embodiment 33;

FIG. 273 is a view showing a wavefront aberration obtained on a longer focal length side of the photographing optical system according to Embodiment 33;

FIG. 274 is a view showing a relative point spread obtained on the longer focal length side of the photographing optical system according to Embodiment 33;

FIG. 275 is a view showing a relative line spread obtained on the longer focal length side of the photographing optical system according to Embodiment 33;

FIG. 276 is a graph showing an MTF curve obtained on the longer focal length side of the photographing optical system according to Embodiment 33;

FIG. 277 is a view showing the contour lines of the shape of an optical low-pass filter according to Embodiment 34;

FIG. 278 is a view showing the variation in shape of the optical low-pass filter according to Embodiment 34, relative to the rotational direction of the optical low-pass filter;

FIG. 279 is a view showing a wavefront aberration obtained on a shorter focal length side of a photographing optical system according to Embodiment 34;

FIG. 280 is a view showing a relative point spread obtained on the shorter focal length side of the photographing optical system according to Embodiment 34;

FIG. 281 is a view showing a relative line spread obtained on the shorter focal length side of the photographing optical system according to Embodiment 34;

FIG. 282 is a graph showing an MTF curve obtained on the shorter focal length side of the photographing optical system according to Embodiment 34;

FIG. 283 is a view showing a wavefront aberration obtained on a longer focal length side of the photographing optical system according to Embodiment 34;

FIG. 284 is a view showing a relative point spread obtained on the longer focal length side of the photographing optical system according to Embodiment 34;

FIG. 285 is a view showing a relative line spread obtained on the longer focal length side of the photographing optical system according to Embodiment 34;

FIG. 286 is a graph showing an MTF curve obtained on the longer focal length side of the photographing optical system according to Embodiment 34;

FIG. 287 is a view showing a wavefront aberration obtained on a shorter focal length side of a photographing optical system according to Embodiment 35;

FIG. 288 is a view showing a relative point spread obtained on the shorter focal length side of the photographing optical system according to Embodiment 35;

FIG. 289 is a view showing a relative line spread obtained on the shorter focal length side of the photographing optical system according to Embodiment 35;

FIG. 290 is a graph showing an MTF curve obtained on the shorter focal length side of the photographing optical system according to Embodiment 35;

FIG. 291 is a view showing a wavefront aberration obtained on a longer focal length side of the photographing optical system according to Embodiment 35;

FIG. 292 is a view showing a relative point spread obtained on the longer focal length side of the photographing optical system according to Embodiment 35;

FIG. 293 is a view showing a relative line spread obtained on the longer focal length side of the photographing optical system according to Embodiment 35;

FIG. 294 is a graph showing an MTF curve obtained on the longer focal length side of the photographing optical system according to Embodiment 35;

FIG. 295 is a view showing a wavefront aberration obtained on a shorter focal length side of a photographing optical system according to Embodiment 36;

FIG. 296 is a view showing a relative point spread obtained on the shorter focal length side of the photographing optical system according to Embodiment 36;

FIG. 297 is a view showing a relative line spread obtained on the shorter focal length side of the photographing optical system according to Embodiment 36;

FIG. 298 is a graph showing an MTF curve obtained on the shorter focal length side of the photographing optical system according to Embodiment 36;

FIG. 299 is a view showing a wavefront aberration obtained on a longer focal length side of the photographing optical system according to Embodiment 36;

FIG. 300 is a view showing a relative point spread obtained on the longer focal length side of the photographing optical system according to Embodiment 36;

FIG. 301 is a view showing a relative line spread obtained on the longer focal length side of the photographing optical system according to Embodiment 36;

FIG. 302 is a graph showing an MTF curve obtained on the longer focal length side of the photographing optical system according to Embodiment 36;

FIG. 303 is a view showing a wavefront aberration of a photographing optical system according to Embodiment 37;

FIG. 304 is a view showing a relative point spread of the photographing optical system according to Embodiment 37;

FIG. 305 is a view showing a relative line spread of the photographing optical system according to Embodiment 37;

FIG. 306 is a graph showing an MTF curve of the photographing optical system according to Embodiment 37;

FIG. 307 is a view showing a wavefront aberration of a photographing optical system according to a first example of Embodiment 38;

FIG. 308 is a view showing a relative point spread of the photographing optical system according to the first example of Embodiment 38;

FIG. 309 is a view showing a relative line spread of the photographing optical system according to the first example of Embodiment 38;

FIG. 310 is a graph showing an MTF curve of the photographing optical system according to the first example of Embodiment 38;

FIG. 311 is a view showing a wavefront aberration of a photographing optical system according to a second example of Embodiment 38;

FIG. 312 is a view showing a relative point spread of the photographing optical system according to the second example of Embodiment 38;

FIG. 313 is a view showing a relative line spread of the photographing optical system according to the second example of Embodiment 38;

FIG. 314 is a graph showing an MTF curve of the photographing optical system according to the second example of Embodiment 38;

FIG. 315 is a view showing the contour lines of the shape of an optical low-pass filter according to Embodiment 39;

FIG. 316 is a cross-sectional view showing the shape of the optical low-pass filter according to Embodiment 39;

FIG. 317 is a view showing a wavefront aberration of a photographing optical system according to Embodiment 39;

FIG. 318 is a view showing a relative point spread of the photographing optical system according to Embodiment 39;

FIG. 319 is a view showing a relative line spread of the photographing optical system according to Embodiment 39;

FIG. 320 is a graph showing an MTF curve of the photographing optical system according to Embodiment 39;

FIG. 321 is a view showing a wavefront aberration obtained on a shorter focal length side of a photographing optical system according to Embodiment 40;

FIG. 322 is a view showing a relative point spread obtained on the shorter focal length side of the photographing optical system according to Embodiment 40;

FIG. 323 is a view showing a relative line spread obtained on the shorter focal length side of the photographing optical system according to Embodiment 40;

FIG. 324 is a graph showing an MTF curve obtained on the shorter focal length side of the photographing optical system according to Embodiment 40;

FIG. 325 is a view showing a wavefront aberration obtained on a longer focal length side of the photographing optical system according to Embodiment 40;

FIG. 326 is a view showing a relative point spread obtained on the longer focal length side of the photographing optical system according to Embodiment 40;

FIG. 327 is a view showing a relative line spread obtained on the longer focal length side of the photographing optical system according to Embodiment 40;

FIG. 328 is a graph showing an MTF curve obtained on the longer focal length side of the photographing optical system according to Embodiment 40;

FIG. 329 is a view showing the contour lines of the shape of an optical low-pass filter according to Embodiment 41;

FIG. 330 is a view showing a wavefront aberration obtained at F1.65 on a shorter focal length side of a photographing optical system according to Embodiment 41;

FIG. 331 is a view showing a relative point spread obtained at F1.65 on the shorter focal length side of the photographing optical system according to Embodiment 41;

FIG. 332 is a view showing a relative line spread obtained at F1.65 on the shorter focal length side of the photographing optical system according to Embodiment 41;

FIG. 333 is a graph showing an MTF curve obtained at F1.65 on the shorter focal length side of the photographing optical system according to Embodiment 41;

FIG. 334 is a view showing a wavefront aberration obtained at F2.8 on the shorter focal length side of the photographing optical system according to Embodiment 41;

FIG. 335 is a view showing a relative point spread obtained at F2.8 on the shorter focal length side of the photographing optical system according to Embodiment 41;

FIG. 336 is a view showing a relative line spread obtained at F2.8 on the shorter focal length side of the photographing optical system according to Embodiment 41;

FIG. 337 is a graph showing an MTF curve obtained at F2.8 on the shorter focal length side of the photographing optical system according to Embodiment 41;

FIG. 338 is a view showing a wavefront aberration obtained at F5.6 on the shorter focal length side of the photographing optical system according to Embodiment 41;

FIG. 339 is a view showing a relative point spread obtained at F5.6 on the shorter focal length side of the photographing optical system according to Embodiment 41;

FIG. 340 is a view showing a relative line spread obtained at F5.6 on the shorter focal length side of the photographing optical system according to Embodiment 41;

FIG. 341 is a graph showing an MTF curve obtained at F5.6 on the shorter focal length side of the photographing optical system according to Embodiment 41;

FIG. 342 is a view showing a wavefront aberration obtained at F1.65 on a longer focal length side of the photographing optical system according to Embodiment 41;

FIG. 343 is a view showing a relative point spread obtained at F1.65 on the longer focal length side of the photographing optical system according to Embodiment 41;

FIG. 344 is a view showing a relative line spread obtained at F1.65 on the longer focal length side of the photographing optical system according to Embodiment 41;

FIG. 345 is a graph showing an MTF curve obtained at F1.65 on the longer focal length side of the photographing optical system according to Embodiment 41;

FIG. 346 is a view showing a wavefront aberration obtained on a shorter focal length side of a photographing optical system according to Embodiment 42;

FIG. 347 is a view showing a relative point spread obtained on the shorter focal length side of the photographing optical system according to Embodiment 42;

FIG. 348 is a view showing a relative line spread obtained on the shorter focal length side of the photographing optical system according to Embodiment 42;

FIG. 349 is a graph showing an MTF curve obtained on the shorter focal length side of the photographing optical system according to Embodiment 42;

FIG. 350 is a view showing a wavefront aberration obtained on a longer focal length side of the photographing optical system according to Embodiment 42;

FIG. 351 is a view showing a relative point spread obtained on the longer focal length side of the photographing optical system according to Embodiment 42;

FIG. 352 is a view showing a relative line spread obtained on the longer focal length side of the photographing optical system according to Embodiment 42;

FIG. 353 is a graph showing an MTF curve obtained on the longer focal length side of the photographing optical system according to Embodiment 42;

FIG. 354 is a view showing a wavefront aberration obtained on a shorter focal length side of a photographing optical system according to Embodiment 43;

FIG. 355 is a view showing a relative point spread obtained on the shorter focal length side of the photographing optical system according to Embodiment 43;

FIG. 356 is a view showing a relative line spread obtained on the shorter focal length side of the photographing optical system according to Embodiment 43;

FIG. 357 is a graph showing an MTF curve obtained on the shorter focal length side of the photographing optical system according to Embodiment 43;

FIG. 358 is a view showing a wavefront aberration obtained on a longer focal length side of the photographing optical system according to Embodiment 43;

FIG. 359 is a view showing a relative point spread obtained on the longer focal length side of the photographing optical system according to Embodiment 43;

FIG. 360 is a view showing a relative line spread obtained on the longer focal length side of the photographing optical system according to Embodiment 43;

FIG. 361 is a graph showing an MTF curve obtained on the longer focal length side of the photographing optical system according to Embodiment 43;

FIG. 362 is a view showing the contour lines of the shape of an optical low-pass filter according to Embodiment 44;

FIG. 363 is a view showing a wavefront aberration obtained at F1.65 on a shorter focal length side of a photographing optical system according to Embodiment 44;

FIG. 364 is a view showing a relative point spread obtained at F1.65 on the shorter focal length side of the photographing optical system according to Embodiment 44;

FIG. 365 is a view showing a relative line spread obtained at F1.65 on the shorter focal length side of the photographing optical system according to Embodiment 44;

FIG. 366 is a graph showing an MTF curve obtained at F1.65 on the shorter focal length side of the photographing optical system according to Embodiment 44;

FIG. 367 is a view showing a wavefront aberration obtained at F2.8 on the shorter focal length side of the photographing optical system according to Embodiment 44;

FIG. 368 is a view showing a relative point spread obtained at F2.8 on the shorter focal length side of the photographing optical system according to Embodiment 44;

FIG. 369 is a view showing a relative line spread obtained at F2.8 on the shorter focal length side of the photographing optical system according to Embodiment 44;

FIG. 370 is a graph showing an MTF curve obtained at F2.8 on the shorter focal length side of the photographing optical system according to Embodiment 44;

FIG. 371 is a view showing a wavefront aberration obtained at F5.6 on the shorter focal length side of the photographing optical system according to Embodiment 44;

FIG. 372 is a view showing a relative point spread obtained at F5.6 on the shorter focal length side of the photographing optical system according to Embodiment 44;

FIG. 373 is a view showing a relative line spread obtained at F5.6 on the shorter focal length side of the photographing optical system according to Embodiment 44;

FIG. 374 is a graph showing an MTF curve obtained at F5.6 on the shorter focal length side of the photographing optical system according to Embodiment 44;

FIG. 375 is a view showing a wavefront aberration obtained at F1.65 on a longer focal length side of the photographing optical system according to Embodiment 44;

FIG. 376 is a view showing a relative point spread obtained at F1.65 on the longer focal length side of the photographing optical system according to Embodiment 44;

FIG. 377 is a view showing a relative line spread obtained at F1.65 on the longer focal length side of the photographing optical system according to Embodiment 44;

FIG. 378 is a graph showing an MTF curve obtained at F1.65 on the longer focal length side of the photographing optical system according to Embodiment 44;

FIG. 379 is a view showing a wavefront aberration obtained on a shorter focal length side of a photographing optical system according to Embodiment 45;

FIG. 380 is a view showing a relative point spread obtained on the shorter focal length side of the photographing optical system according to Embodiment 45;

FIG. 381 is a view showing a relative line spread obtained on the shorter focal length side of the photographing optical system according to Embodiment 45;

FIG. 382 is a graph showing an MTF curve obtained on the shorter focal length side of the photographing optical system according to Embodiment 45;

FIG. 383 is a view showing a wavefront aberration obtained on a longer focal length side of the photographing optical system according to Embodiment 45;

FIG. 384 is a view showing a relative point spread obtained on the longer focal length side of the photographing optical system according to Embodiment 45;

FIG. 385 is a view showing a relative line spread obtained on the longer focal length side of the photographing optical system according to Embodiment 45;

FIG. 386 is a graph showing an MTF curve obtained on the longer focal length side of the photographing optical system according to Embodiment 45;

FIG. 387 is a view showing the contour lines of the shape of an optical low-pass filter according to Embodiment 46;

FIG. 388 is a cross-sectional view of the basic shape of the optical low-pass filter according to Embodiment 46;

FIG. 389 is a cross-sectional view of the actual shape of the optical low-pass filter according to Embodiment 46.

Figure 390:
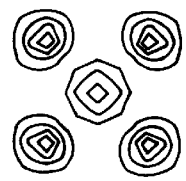
Figure 391:
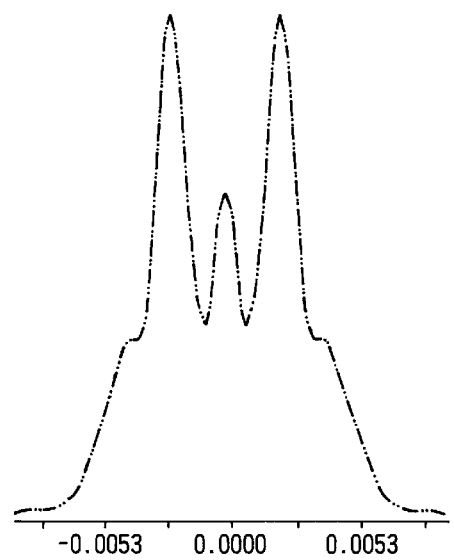
Figure 392:
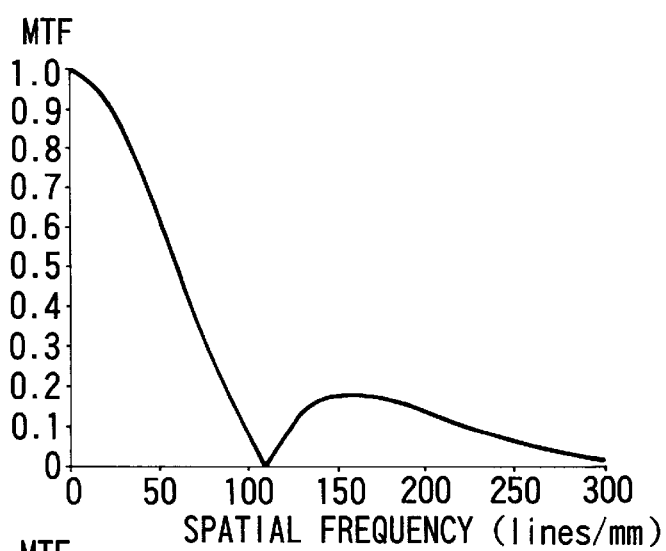
Figure 393:
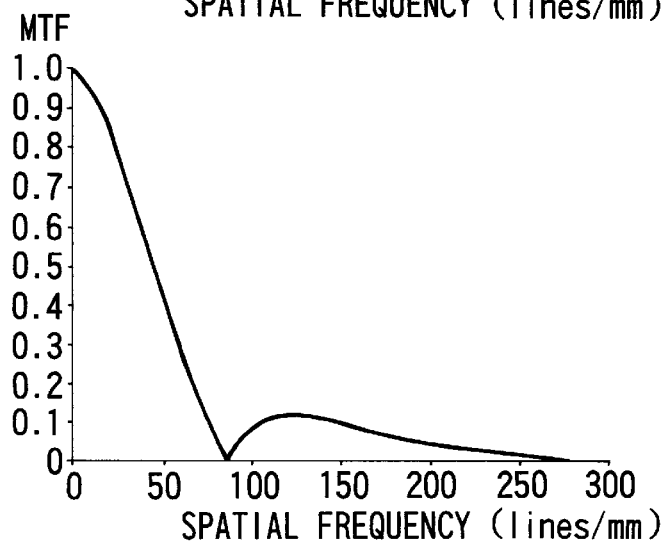
Figure 394:
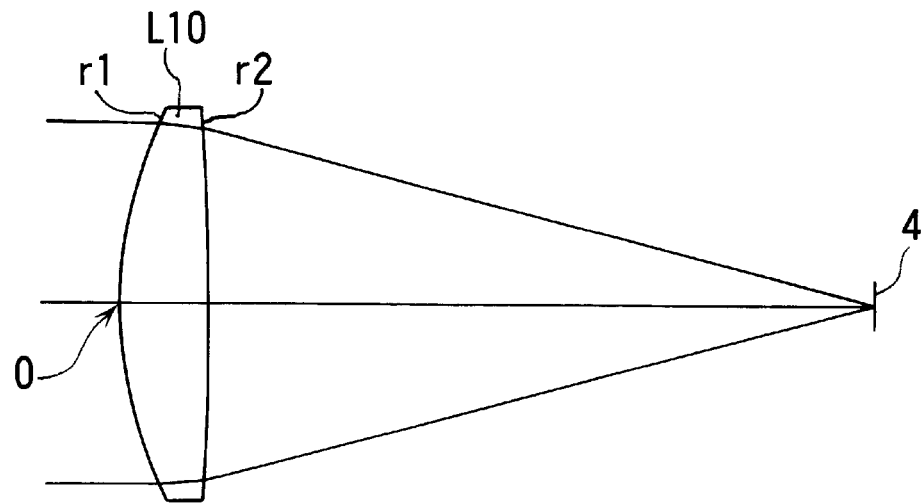
Figure 395:
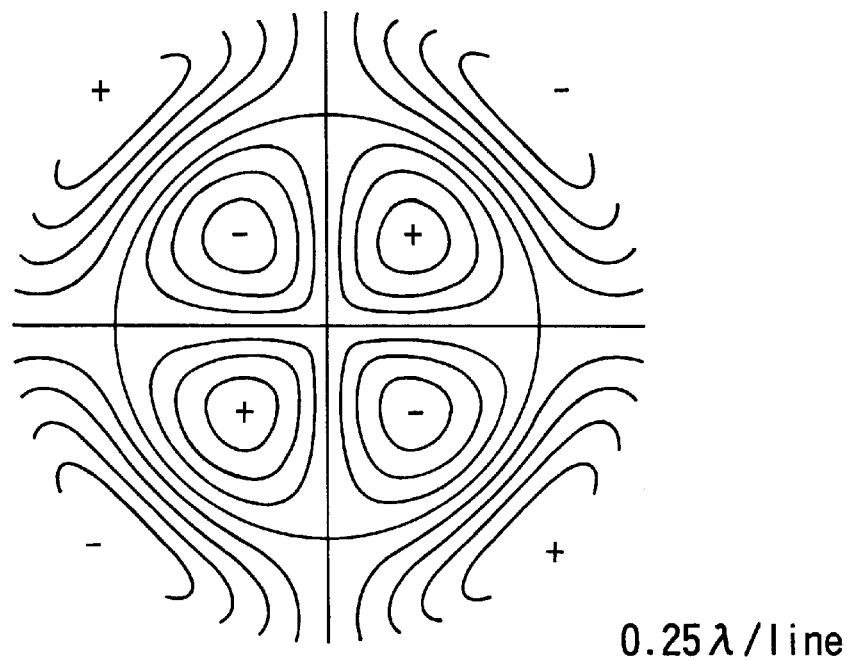
Figure 404:
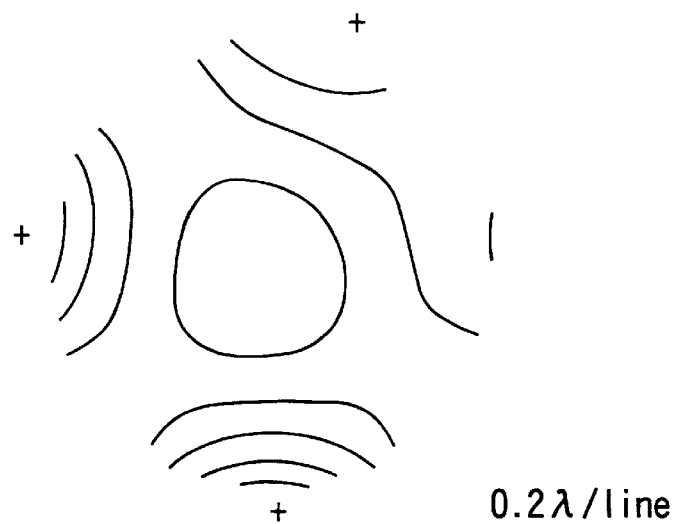
Figure 405:
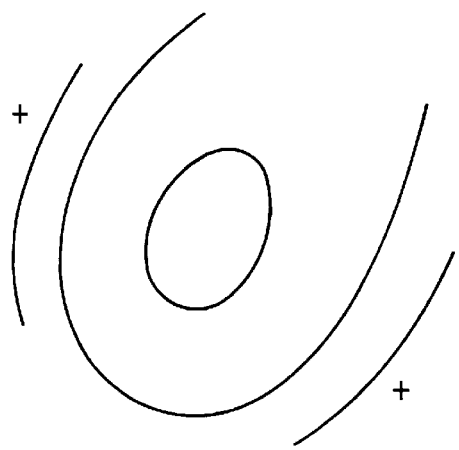
Figure 406:
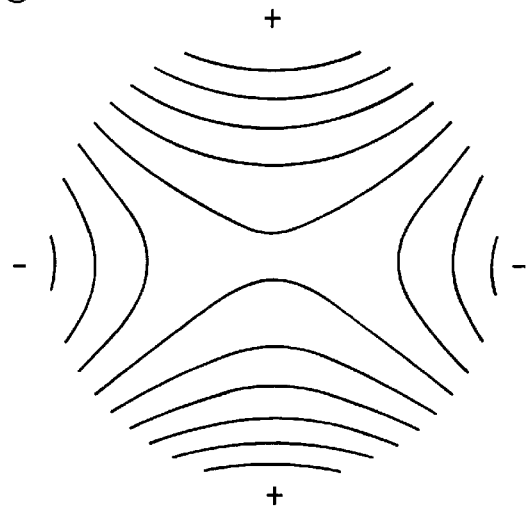
Figure 407:
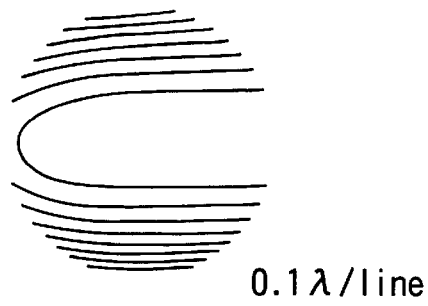
Figure 408:
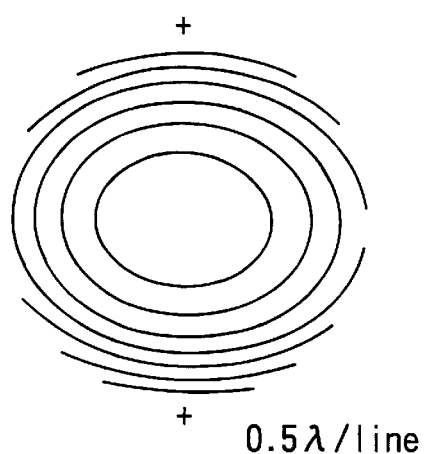
Figure 409:
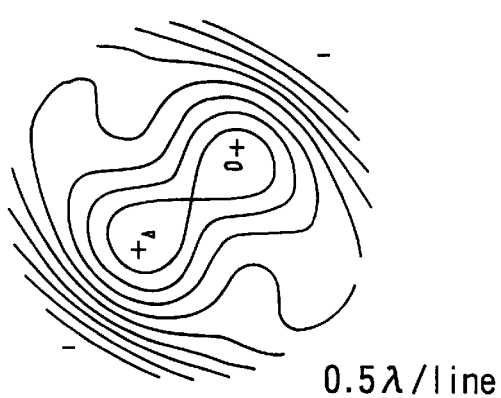
Figure 410:
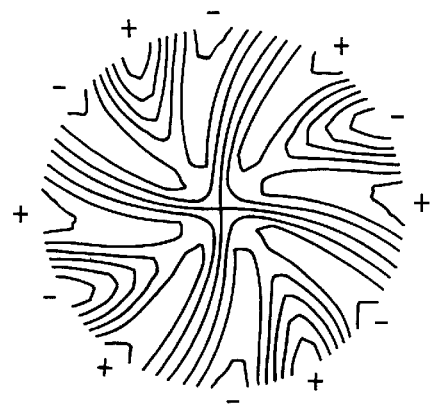
Figure 419:
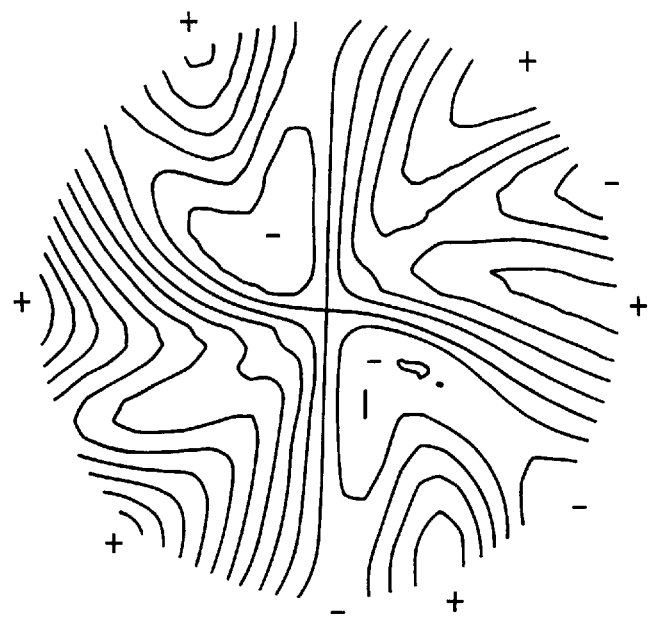
Figure 420:
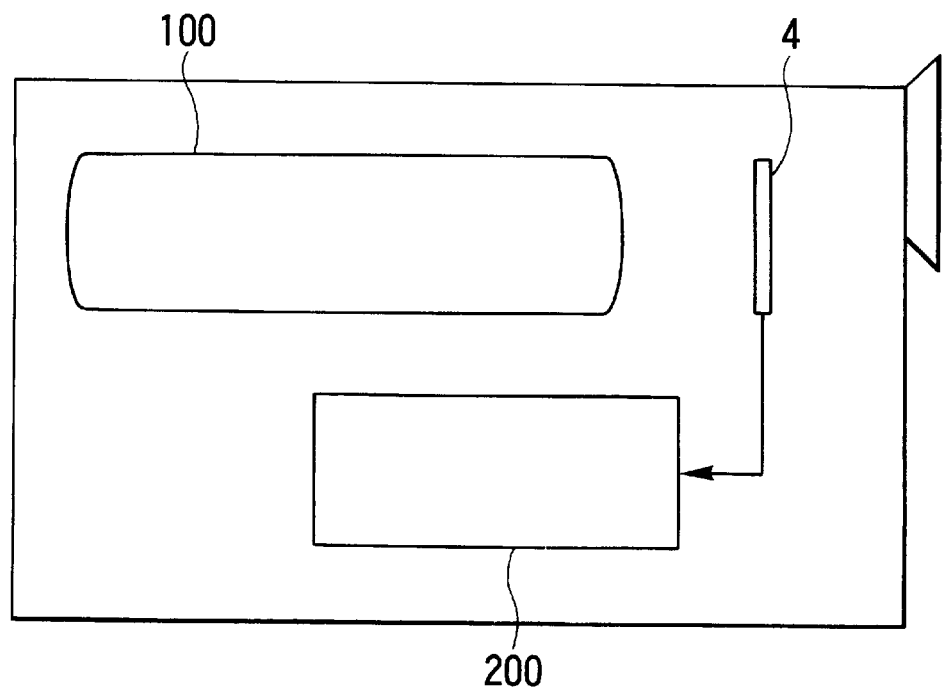

FIG. 390 is a view showing a relative point spread in the image plane of a photographing optical system according to Embodiment 46;

FIG. 391 is a view showing the relative line spread at F1.65 of the photographing optical system according to Embodiment 46;

FIG. 392 is a view showing the MTF curve at F1.65 of the photographing optical system according to Embodiment 46;

FIG. 393 is a graph showing the MTF curve at F5.6 of the photographing optical system according to Embodiment 46;

FIG. 394 is a diagrammatic view showing the essential portion of a photographing optical system according to Embodiment 47;

FIG. 395 is a view showing the contour lines of the shape of an optical low-pass filter according to Embodiment 47;

FIG. 396 is a view showing a wavefront aberration of the photographing optical system according to Embodiment 47;

FIG. 397 is a view showing a relative point spread of the photographing optical system according to Embodiment 47;

FIG. 398 is a view showing a relative line spread of the photographing optical system according to Embodiment 47;

FIG. 399 is a graph showing an MTF curve of the photographing optical system according to Embodiment 47;

FIG. 400 is a view showing a wavefront aberration of a photographing optical system according to Embodiment 47, which is not provided with an optical low-pass filter;

FIG. 401 is a view showing a relative point spread of the photographing optical system according to Embodiment 47, which is not provided with an optical low-pass filter;

FIG. 402 is a view showing a relative line spread of the photographing optical system according to Embodiment 47, which is not provided with an optical low-pass filter;

FIG. 403 is a graph showing an MTF curve of the photographing optical system according to Embodiment 47, which is not provided with an optical low-pass filter;

FIG. 404 is a view showing in contour line an example of deformation of a surface r1 which occurs during molding;

FIG. 405 is a view showing in contour line an example of deformation of a surface r2 which occurs during molding;

FIG. 406 is a view showing in contour line an example of non-uniform distribution of an inner refractive index which occurs during molding;

FIG. 407 is a view showing the contour lines of a transmitted wavefront obtainable when the amounts of errors shown in FIGS. 405 and 406 are added to the surface r2 in Embodiment 47;

FIG. 408 is a view showing in contour line the deviation of the surface r1 from the spheric shape thereof, which deviation is intended to correct the amounts of errors shown in FIGS. 405 and 406 in Embodiment 47;

FIG. 409 is a view showing in contour line the deviation of the surface r1 from the spheric shape thereof, a shape for correcting the amounts of errors shown in FIGS. 405 and 406 and a low-pass shape being added to the surface r1 according to Embodiment 47;

FIG. 410 is a view showing the contour lines of the shape of an optical low-pass filter according to Embodiment 48;

FIG. 411 is a view showing a wavefront aberration obtained on a shorter focal length side of a photographing optical system according to Embodiment 48;

FIG. 412 is a view showing a relative point spread obtained on the shorter focal length side of the photographing optical system according to Embodiment 48;

FIG. 413 is a view showing a relative line spread obtained on the shorter focal length side of the photographing optical system according to Embodiment 48;

FIG. 414 is a graph showing an MTF curve obtained on the shorter focal length side of the photographing optical system according to Embodiment 48;

FIG. 415 is a view showing a wavefront aberration obtained on a longer focal length side of the photographing optical system according to Embodiment 48;

FIG. 416 is a view showing a relative point spread obtained on the longer focal length side of the photographing optical system according to Embodiment 48;

FIG. 417 is a view showing a relative line spread obtained on the longer focal length side of the photographing optical system according to Embodiment 48;

FIG. 418 is a graph showing an MTF curve obtained on the longer focal length side of the photographing optical system according to Embodiment 48;

FIG. 419 is a view showing in contour line the deviation of a surface r14 from the spheric shape thereof, a shape for correcting the amount of error and a low-pass shape being added to the surface r14 according to Embodiment 48; and FIG. 420 is a diagrammatic view showing the essential portion of an optical apparatus which includes a photographing optical system according to any of the embodiments of the present invention.

DETAILED DESCRIPTION OF THE INVENTION (Embodiment 1)

Figure 1:
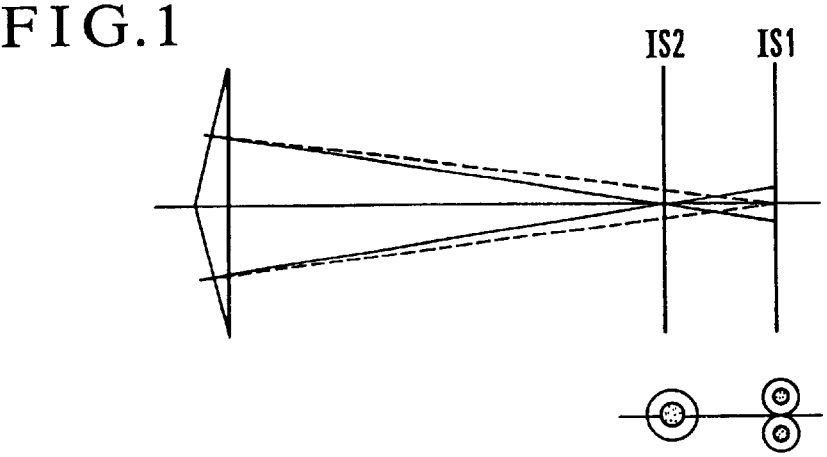
FIG. 1 is a view aiding in describing the problem of an optical low-pass filter which makes use of a conventional prism.
Figure 2:
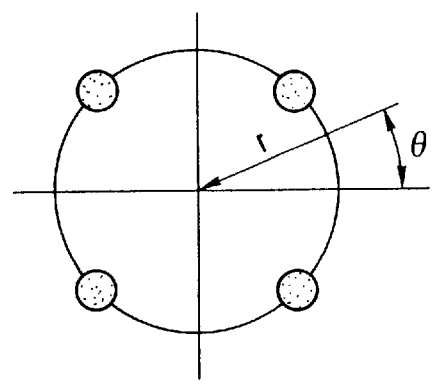
FIG. 2 is a view aiding in describing the coordinate system of an image plane.

FIG. 2 is a view aiding in describing the coordinate system of an image plane.

In the present embodiment, as shown in FIG. 2, an amplitude distribution obtainable when a point image is separated into four point images in an image plane is expressed as the following cylindrical coordinate system:

$$U(r,\theta)=U(r)\times\cos(2\theta+\delta), \quad (1)$$

where $\delta$ is a constant.

The shape of an optical low-pass filter which is represented by a cylindrical coordinate system is obtained from the shape of a wavefront (aberration) which gives that amplitude distribution.

Figure 3:
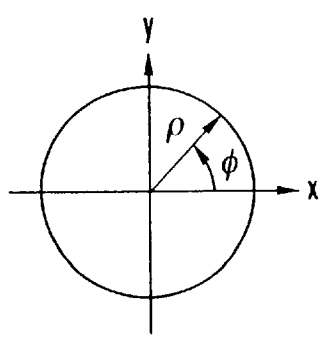
FIG. 3 is a view showing a cylindrical coordinate system.

The procedure for obtaining the shape of such optical low-pass filter will be described below. First of all, the shape of an optical low-pass filter which is represented by the cylindrical coordinate system shown in FIG. 3 is expressed as:

$$S(\rho,\phi)=A\times R(\rho)\times\cos(m\phi+\delta), \quad (2)$$

where A and $\delta$ are constants, $\rho$ ($0 \leq \rho \leq 1$) is a coordinate system relative to a radial direction of the optical low-pass filter, which coordinate system is standardized on a radius "a" of the optical low-pass filter, $R(\rho)$ is the radial shape of the optical low-pass filter, $\phi$ ($0 \leq \phi \leq 2\pi$) is a coordinate system relative to the rotational direction of the optical low-pass filter, and m is defined as m=2, 3, 4, ... (an integer) on the basis of the periodicity of the optical low-pass filter relative to the rotational direction. In the present embodiment, $\delta=0$.

Letting n be the refractive index of the optical low-pass filter, a wavefront aberration to be given to a transmitted wavefront by the aforesaid shape is expressed as:

$$W(\rho,\phi)=S(\rho,\phi)\times(1-n),$$

$$=A'\times R(\rho)\times\cos(m\phi), \quad (3)$$

where $A'=(1-n)A$.

It is known that an amplitude distribution in an image plane due to a wavefront having such wavefront aberration is obtained by the diffraction integral of a pupil function. As can be seen from "Principles of Optics" written by M. Born and E. Wolf, Section 9.4, pp 473–478 (5th Edition 1975), the diffraction integral becomes:

$$U(u,v,\theta)=C\int_0^1\int_0^{2\pi}e^{i\{kA'R(\rho)\cos(m\phi)-v\rho\cos(\phi-\theta)-\frac{1}{2}u\rho^2\}}\rho d\rho d\phi, \quad (4)$$

where C is a constant, k is a wave number ($k=2\pi/\lambda$), $\lambda$ is a wavelength, and (u, v, $\theta$) are standardized cylindrical coordinates in the image plane, u representing a coordinate axis relative to the direction of an optical axis, v representing a coordinate axis relative to a radial direction, and $\theta$ representing a coordinate axis relative to a rotational direction.

If an object is at infinity, the following relation is established between v and actual coordinates:

$$v=\pi r/\lambda F, \quad (5)$$

where r is an actual distance and F is the F number of a photographing optical system.

If the distribution of the amplitude in a reference image plane is considered, u=0 and Expression (4) is re-written as:

$$U(v,\theta)=C\int_0^1\int_0^{2\pi}e^{i\{kA'R(\rho)\cos(m\phi)-v\rho\cos(\phi-\theta)\}}\rho d\rho d\phi. \quad (6)$$

In accordance with § 9.4 of "Principles of Optics", Expression (6) is re-written as follows by using the Jacobi identity:

$$U(v,\theta)=4C\sum_{s=0}^{\infty}\sum_{s'=0}^{\infty}(-i)^s(-i)^{s'}\int_0^1\int_0^{2\pi}J_s\{kA'R(\rho)\}J_{s'}(v\rho)\cos(ms\phi)\cos\{s'(\phi-\theta)\}\rho d\rho d\phi, \quad (7)$$

where $J_s(x)$ is a Bessel function of the first kind.

Further, it follows from a termwise integration for $\phi$ that:

$$\begin{aligned}U(v,\theta) &= 4C\sum_{s=0}^{\infty}(-i)^{(m-1)s}\cos(ms\theta)\int_0^1 J_s\{kA'R(\rho)\}J_{ms}(v\rho)\rho d\rho \quad (8)\\ &= 4C\Bigg[\frac{1}{2}\int_0^1 J_0\{kA'R(\rho)\}J_0(v\rho)\rho d\rho + \\ &\quad (-i)^{(m-1)}\cos(m\theta)\int_0^1 J_1\{kA'R(\rho)\}J_m(v\rho)\rho d\rho + \\ &\quad (-i)^{2(m-1)}\cos(2m\theta)\int_0^1 J_2\{kA'R(\rho)\}J_{2m}(v\rho)\rho d\rho + \\ &\quad (-i)^{3(m-1)}\cos(3m\theta)\int_0^1 J_3\{kA'R(\rho)\}J_{3m}(v\rho)\rho d\rho + \\ &\quad \ldots \Bigg].\end{aligned}$$

The first term of Expression (8) represents an amplitude which is distributed uniformly in the rotational direction with respect to the origin of the cylindrical coordinates, and the second term and the following represent an amplitude which is distributed periodically in the rotational direction. From the integral of the second term, it can be seen that an amplitude (or intensity) distribution occurs with a period of cos (mθ) in the rotational direction of the image plane.

Specifically, it can be seen that if an optical low-pass filter having a plurality of areas formed continuously in the rotational direction of its opening portion is provided in a photographing optical system, some of the areas serving to exert a phase advancing action on the wavefront of an incident pencil of rays so as to advance the phase of the wavefront of the incident pencil of rays with respect to the phase of the wavefront at the center of the opening portion, and the other areas serving to exert a phase retarding action on the wavefront of the incident pencil of rays so as to retard the phase of the wavefront of the incident pencil of rays with respect to the phase of the wavefront at the center of the opening portion, the wavefront of the pencil of rays transmitted through the optical system can be given a phase variation for phase advance or retardation, so that its Fraunhofer diffraction image can be formed as a plurality of separate spots in an image forming plane in which the pencil of rays is focused.

The optical low-pass filter of the present invention, like conventional optical low-pass filters, has the effect of making MTF zero for a predetermined spatial frequency and decreasing MTF relative to spatial frequencies higher than the predetermined spatial frequency, but can be inexpensively manufactured without the need to use an expensive material. In addition, it is desirable to dispose the optical low-pass filter of the present invention in the neighborhood of the stop of a photographing optical system since an equal phase advancing/retarding action can be exerted on pencils of rays each having a different image height.

In Expression (8), letting the second term represent the amplitude distribution shown by Expression (1), m of cos (mθ) becomes 2. Therefore, the shape of the optical low-pass filter is:

$$S(\rho,\phi)=A \times R(\rho) \times \cos(2\phi). \tag{9}$$

The amplitude distribution expressed by Expression (8) is:

$$U(v, \theta) = 4C\left[\frac{1}{2}\int_0^1 J_o\{kA'R(\rho)\}J_o(v\rho)\rho d\rho - \right. \tag{10}$$

$$i\cos 2\theta \int_0^1 J_1\{kA'R(\rho)\}J_2(v\rho)\rho d\rho -$$

$$-\cos 4\theta \int_0^1 J_2\{kA'R(\rho)\}J_4(v\rho)\rho d\rho +$$

$$\left. i\cos 6\theta \int_0^1 J_3\{kA'R(\rho)\}J_6(v\rho)\rho d\rho + \cdots \right].$$

It can be considered that if the amount of aberration (W) is small, almost all integral values are contained in the first several terms of Expression (10) and the integral of the second term substantially represents the spread of the amplitude (=U×U*) which is produced periodically in the rotational direction in the image plane. Therefore, the radial shape R(ρ) of the optical low-pass filter may be determined so that the absolute value of the integral of the second term of Expression (10) reaches its maximum value in the neighborhood of a predetermined position vc determined by the pixels of an image pickup element, for example, a CCD:

$$|\int_0^1 J_1\{kA'R(\rho)\}J_2(v\rho)\rho d\rho|_{v=vc} \tag{11}$$

If the pitch of the pixels of the CCD is p, the cutoff frequency of a luminance signal, which is required for the CCD, is fc=1/(2p), and a distance dc by which point images are separated from each other in the pixel-array direction of the CCD by the optical low-pass filter becomes:

$$dc=1/(2\times fc)=p. \tag{12}$$

Figure 4:
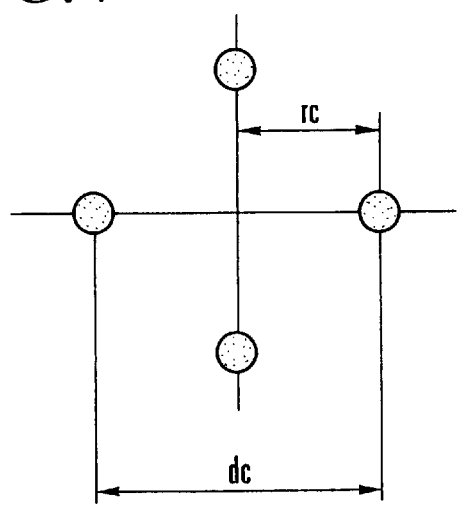
FIG. 4 is a view aiding in describing the distance between point images in an image plane and the distance from the center of the image plane to each of the point images.

If the direction of separation of the point images intersects the pixel-array direction of the CCD as shown in FIG. 4, the following relation is obtained:

$$rc=dc/2. \tag{13}$$

Figure 5:
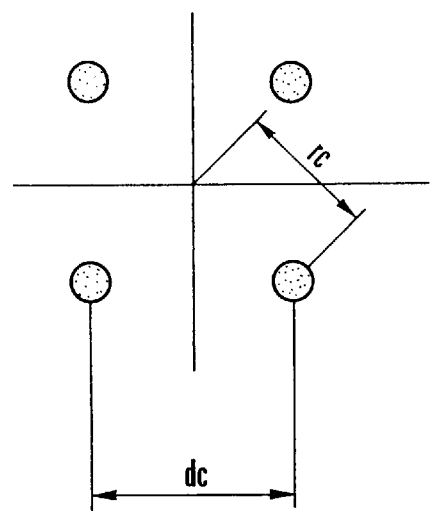
FIG. 5 is a view aiding in describing the distance between point images in an image plane and the distance from the center of the image plane to each of the point images.

If the direction of separation of the point images intersects the pixel-array direction of the CCD as shown in FIG. 5, the following relation is obtained:

$$rc=dc \cdot (\sqrt{2}/2). \tag{14}$$

Thus, vc in Expression (11) is obtained.

The integral of Expression (11) can reach its maximum when v=vc on the condition that:

$$J_1\{kA'R(\rho)\} \approx J_2(vc\rho). \tag{15}$$

If Expression (15) is satisfied, the optical low-pass filter according to the present invention can make MTF approximately zero at a predetermined spatial frequency even in a case where an aperture diameter varies according to photographing conditions.

In the low-pass filter according to the present invention, if a direction in which its phase advancing or retarding action is large is inclined in the range of 30° to 60°, most preferably by an angle of 45°, with respect to the direction of array of pixels of the CCD, a line spread relative to a direction perpendicular to the direction of array of pixels of the CCD is averaged, so that the low-pass effect of the low-pass filter can be effectively improved.

The low-pass filter according to the present invention can be formed to have a complex curved shape, by molding a synthetic resin material (plastic material) such as acrylic resin or a glass material, or by forming such a synthetic resin material on a glass substrate.

One surface of a plane-parallel plate to be provided in the vicinity of the stop may be formed to have such a shape, or the shape may be separated into two cylindrical shapes into which to form two surfaces, respectively.

If the shape of the optical low-pass filter according to the present invention is added to a surface of a lens which constitutes part of the photographing optical system, it is possible to realize an optical element having both the function of a lens and the function of an optical low-pass filter.

The optical low-pass filter according to the present invention may be formed in part of a variable-transmittance stop which is formed by an EC liquid crystal or the like and whose transmittance varies.

In addition, the shape of the optical low-pass filter according to the present invention may be formed in part of an infrared cut-filter which constitutes part of the photographing optical system, or the optical low-pass filter itself may be formed of an infrared cutting material.

A sufficient low-pass effect can be achieved by using only the optical low-pass filter according to the present invention. However, if the optical low-pass filter according to the present invention is used together with a crystal optical low-pass filter, it is possible to cope with different spatial frequencies to be cut off, by adjusting the thickness of crystal of the crystal optical low-pass filter. Accordingly, the optical low-pass filter according to the present invention can be applied to various optical apparatuses using different image pickup elements having different specifications.

By employing the optical low-pass filter according to the present invention, it is possible to set the MTF of an image forming optical system to not less than 5% at a desired spatial frequency and to not less than 20% in a frequency range higher than the desired spatial frequency.

Figure 6:
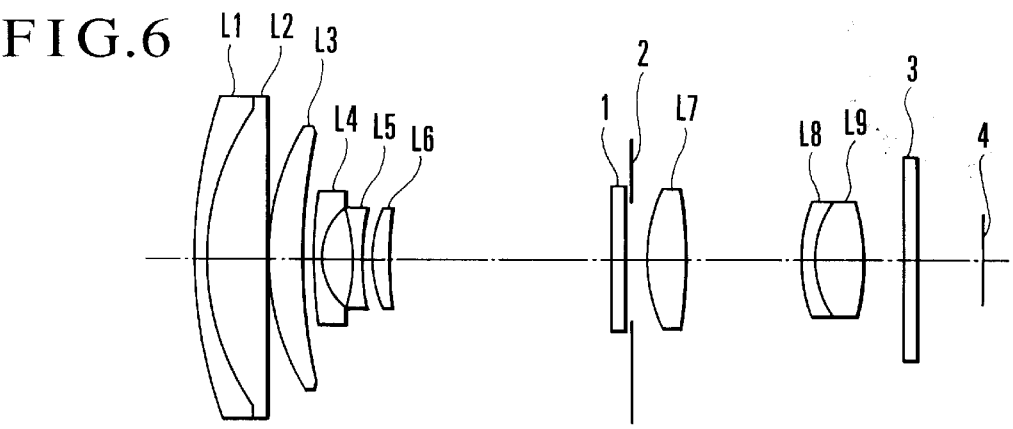
FIG. 6 is a diagrammatic view of the essential portion of a photographing optical system according to Embodiment 1.

FIG. 6 is a diagrammatic view of the essential portion of a photographing optical system for an optical apparatus which employs an optical low-pass filter according to Embodiment 1.

The shown photographing optical system includes lenses L1 to L9 which constitute an image forming optical system. The lenses L1 to L3 constitute a first lens unit of positive refractive power, the lenses L4 to L6 constitute a second lens unit of negative refractive power, the lens L7 constitutes a third lens unit of positive refractive power, and the lenses L8 to L9 constitute a fourth lens group of positive refractive power. In the photographing optical system according to Embodiment 1, its magnification is varied by the second lens unit moving along the optical axis of the photographing optical system, and compensation for its image plane and focusing are effected by the fourth lens group moving along the optical axis.

The shown photographing optical system also includes an optical low-pass filter 1 according to Embodiment 1 of the present invention, a stop 2, and an infrared cut-filter 3. Reference numeral 4 denotes a CCD (image pickup element). The optical low-pass filter 1 is provided in the vicinity of the stop 2 so that a phase change is equally given to the wavefronts of various pencils of rays having different angles of view so as to provide an effective low-pass effect.

Figure 7:
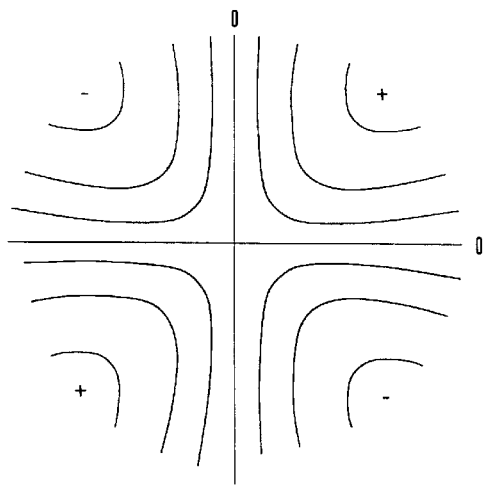
FIG. 7 is a view showing the contour lines of an optical low-pass filter according to a first numerical example.

The acting surface of the optical low-pass filter 1 which exerts a phase advancing/retarding action on the phase of the wavefront of an incident pencil of rays is formed as a flat surface made of a synthetic resin material such as acrylic resin. The shape of the acting surface is shown in FIG. 7 in contour line. As shown in FIG. 7, with respect to the center of the opening portion, each portion marked "+" is projected to a maximum degree, whereas each portion marked "−" is dented to a maximum degree.

As shown in FIG. 7, if the shape of the optical low-pass filter according to Embodiment 1 of the present invention is represented in a cylindrical coordinate system the origin of which corresponds to the center of the opening portion, the shape of the optical low-pass filter continuously changes in the rotational direction from a portion having a phase advancing action on the phase of an incident wavefront (either of the portions marked "−") to a portion having a phase retarding action on the phase of the incident wavefront (the adjacent one of the portions marked "+").

Figure 8:
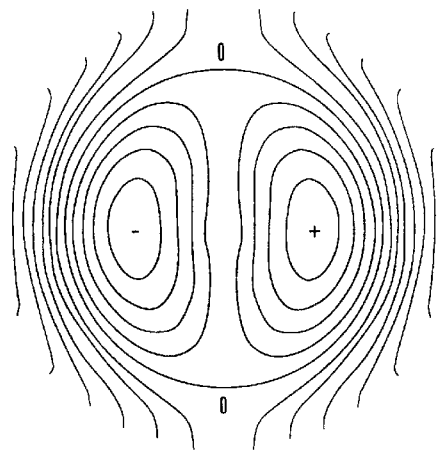
FIG. 8 is a view showing the contour lines of the shape of an optical low-pass filter which includes one phase advancing area and one phase retarding area.
Figure 9:
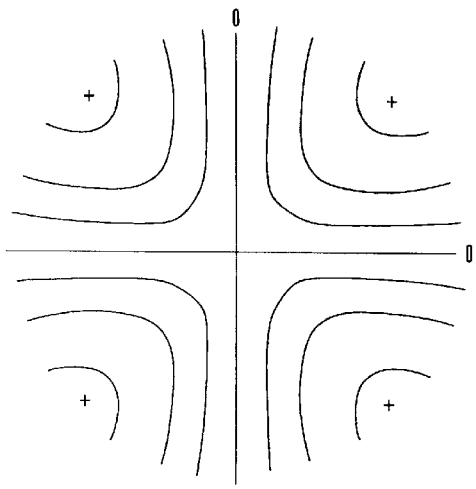
FIG. 9 is a view showing the contour lines of the shape of an optical low-pass filter which includes only phase retarding areas.

The acting surface of the optical low-pass filter needs to have two or more portions each having a phase advancing action and two or more portions each having a phase retarding action. For example, in the case of an acting surface which is only provided with one portion having a phase advancing action and one portion having a phase retarding action as shown in FIG. 8, the shape of the acting surface contains a large amount of slope component, so that the image in an image plane is only deviated in a particular direction without being effectively separated into point images. In the case of an acting surface which is composed of only portions having phase advancing actions or only portions having phase retarding actions as shown in FIG. 9, an image can be separated into a plurality of images in a particular image plane. However, since there is necessarily an image plane in which separated images are fused into one image, the low-pass effect of such acting surface is lowered similarly to the optical low-pass filter disclosed in Japanese Patent Publication No. Sho 44-1155.

A first numerical example of the surface shape of the optical low-pass filter according to Embodiment 1 is shown below:

$$S1(\rho,\phi)=A1\times R1(\rho)\times\cos(2\phi), \quad (16)$$

where $$R1(\rho)=(2.622\rho-1.140\rho^2)\lambda, \ 0\leq\rho\leq1, \ 0\leq\phi\leq2\pi. \quad (17)$$

Figure 10:
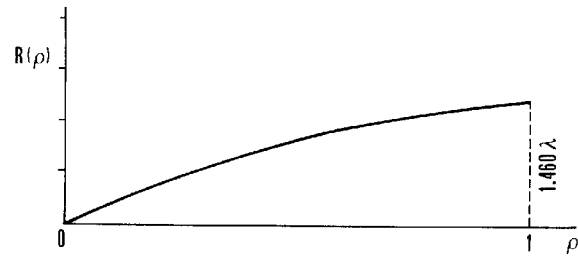
FIG. 10 is a cross-sectional view of the shape of the optical low-pass filter according to the first numerical example.

The cross-sectional shape of the acting surface of the first numerical example for $\phi=0$ is shown in FIG. 10.

Figure 11:
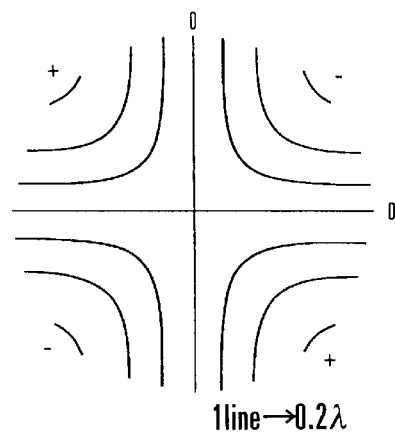
FIG. 11 is a view showing the contour lines of a wavefront aberration in an exit pupil in the first numerical example.
Figure 12:
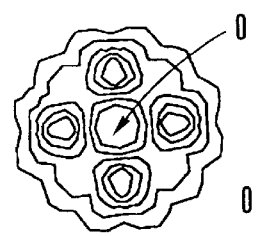
FIG. 12 is a view showing a point spread in an image plane in the first numerical example.
Figure 13:
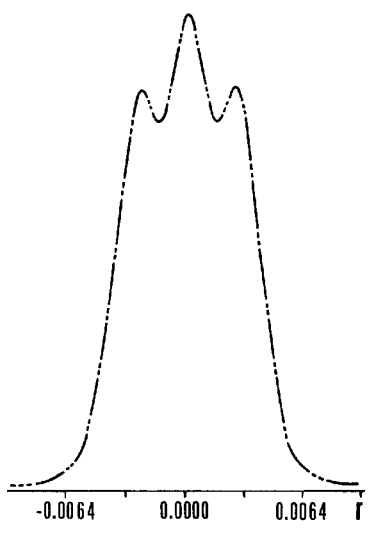
FIG. 13 is a view showing a line spread of the first numerical example at F2.8.
Figure 14:
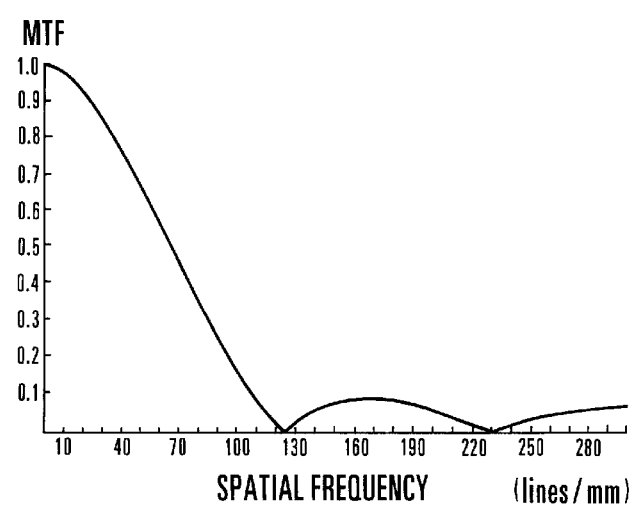
FIG. 14 is a graph showing the MTF curve of the first numerical example at F2.8.

The first numerical example of the optical low-pass filter according to Embodiment 1 produces a wavefront aberration, such as that shown in FIG. 11, which is analogous to the shape of the optical low-pass filter, in the exit pupil of an ideal optical system composed of aberration-free lenses, so that point images are annularly spaced apart from one another in an image plane, as shown in FIG. 12. It is, therefore, possible to decrease MTF relative to high-frequency components to a further extent. FIG. 13 shows the line spread function (LSF) obtained by performing an addition in a direction perpendicular to the pixel-array direction of a CCD, which is obtained at F2.8 from the first numerical example of the optical low-pass filter, and FIG. 14 shows the MTF curve of the first numerical example of the optical low-pass filter.

Figure 15:
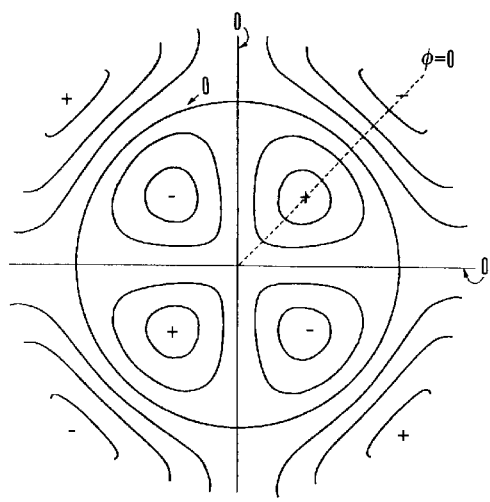
FIG. 15 is a view showing the contour lines of the shape of an optical low-pass filter according to a second numerical example.

FIG. 15 shows contour lines which represent the shape of the acting surface of a second numerical example of the optical low-pass filter according to Embodiment 1. This shape is expressed as the following expression:

$$S2(\rho,\phi)=A2\times R2(\rho)\times\cos(2\phi), \quad (18)$$

where $$R2(\rho)=(3.534\rho+2.867\rho^2-13.267\rho^3-7.079\rho^4+12.737\rho^5)\lambda,$$

$$0\leq\rho\leq1, \ 0\leq\phi\leq2\pi. \quad (19)$$

Figure 16:
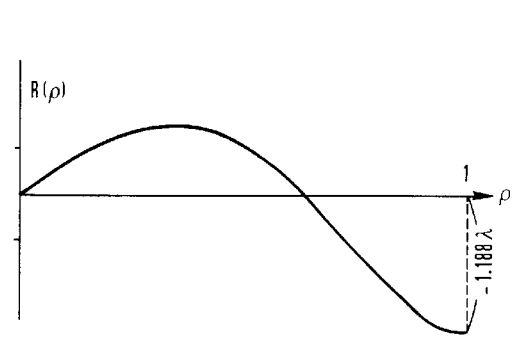
FIG. 16 is a cross-sectional view of the shape of the optical low-pass filter according to the second numerical example.

In the second numerical example, portions which has phase advancing actions on the phase of an incident wavefront and portions which has phase retarding actions on the phase of the incident wavefront are provided in the radial direction as well. The cross-sectional shape of the acting surface of the second numerical example for $\phi=0$ is shown in FIG. 16. The radial shape of the second numerical example must be such that the region of high-frequency components to be cut off does not vary with a variation in the F number of the photographing optical system. For this reason, it is desirable to use a nonlinear radial shape such as that shown in FIG. 15.

Figure 17:
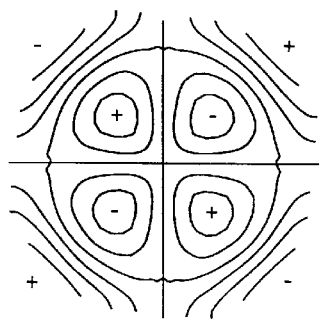
FIG. 17 is a view showing the contour lines of a wavefront aberration in an exit pupil in the second numerical example.
Figure 18:
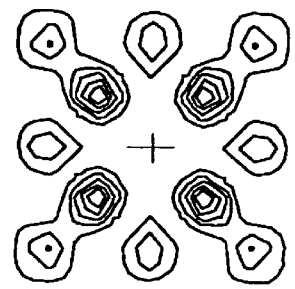
FIG. 18 is a view showing a point spread in an image plane in the second numerical example.
Figure 19:
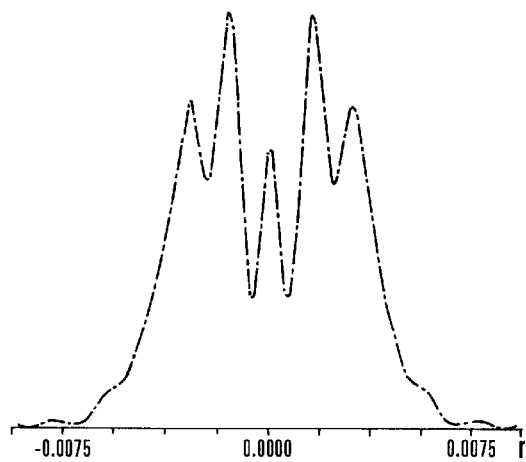
FIG. 19 is a view showing a line spread at F1.65 of the second numerical example.
Figure 20:
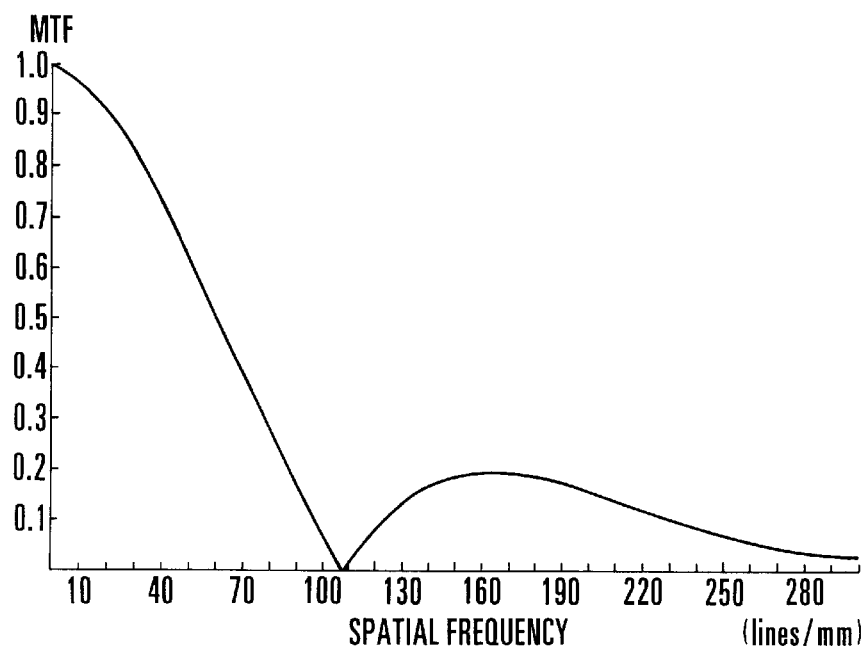
FIG. 20 is a graph showing the MTF curve of the second numerical example at F1.65.
Figure 21:
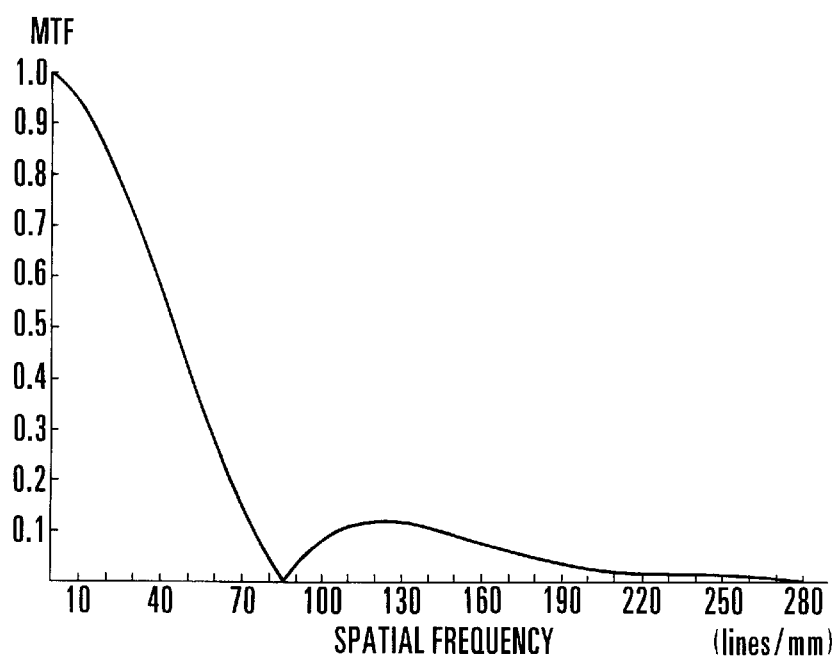
FIG. 21 is a graph showing the MTF curve of the second numerical example at F5.6.

FIG. 17 shows the contour lines of a wavefront aberration in the exit pupil of the second numerical example, and FIG. 18 shows the contour lines of the point spread in its image plane. FIG. 19 shows the line spread obtained by performing an addition in a direction perpendicular to the pixel-array direction of a CCD, which is obtained in the image plane at F1.65. FIGS. 20 and 21 are MTF curves for F1.65 and F5.6, respectively.

The above description has been given on the assumption that the photographing optical system is composed of aberration-free lenses, but even if aberration is present in a lens of the photographing optical system, the effect of the optical low-pass filter according to the present invention is not impaired. From the characteristics of the photographing optical system, letting Φ the wavefront aberration of a lens system, a pupil function h0 of the lens system and a pupil function h1 of the optical low-pass filter become:

$$h0 = exp(i\Phi), \qquad (20)$$

$$h1 = exp(iw(\rho,\phi)), \qquad (21)$$

and a pupil function h of the entire system becomes $$h = h0 \times h1. \qquad (22)$$

Since an amplitude distribution U is obtained as a Fourier transform F of h, $$U = F(h) = F(h0 \times h1) = F(h0) * F(h1), \qquad (23)$$

where the operator * represents a convolution. Since F(h1) coincides with the amplitude distribution due to each of the optical low-pass filters described previously, it is apparent that an equal low-pass effect is attained.

Figure 22:
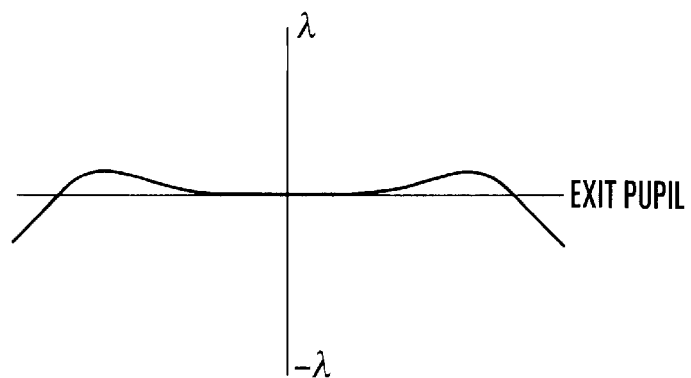
FIG. 22 is a view showing a wavefront aberration in an exit pupil which an actual photographing optical system has.
Figure 23:
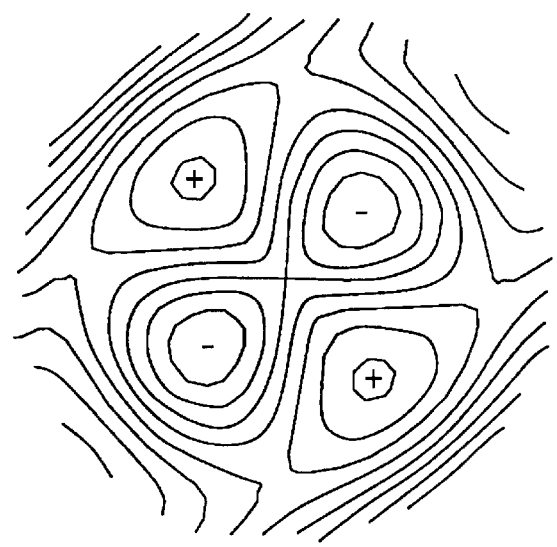
FIG. 23 is a view showing the contour lines of a wavefront aberration in the exit pupil of an optical system having the wavefront aberration shown in FIG. 22 which optical system is provided with the optical low-pass filter according to the second numerical example.
Figure 24:
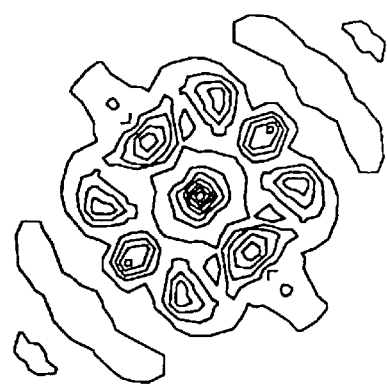
FIG. 24 is a view showing a point spread in the image plane of the optical system having the wavefront aberration shown in FIG. 22 which optical system is provided with the optical low-pass filter according to the second numerical example.
Figure 25:
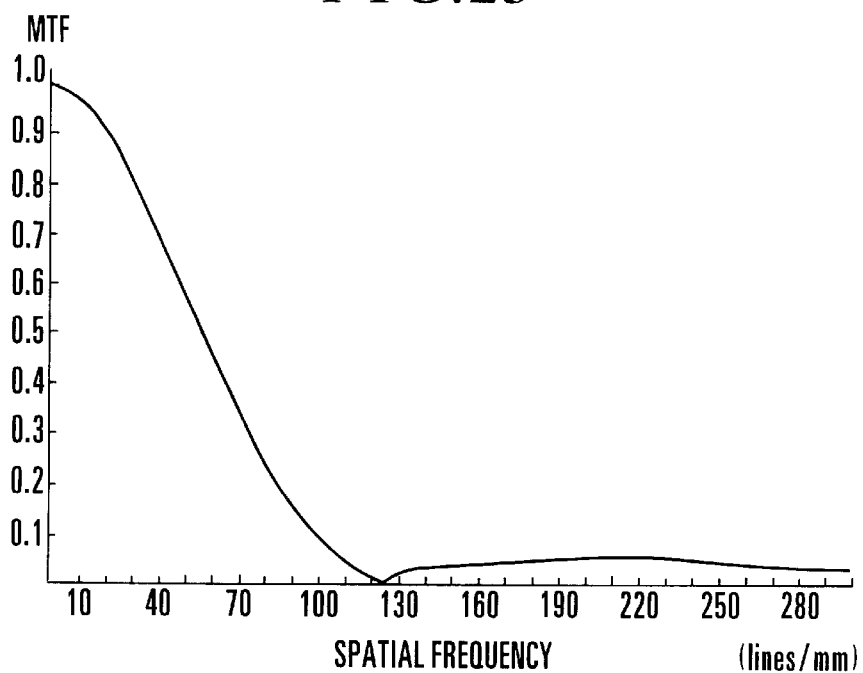
FIG. 25 is a graph showing the MTF curve at F1.65 of the optical system having the wavefront aberration shown in FIG. 22 which optical system is provided with the optical low-pass filter according to the second numerical example.
Figure 26:
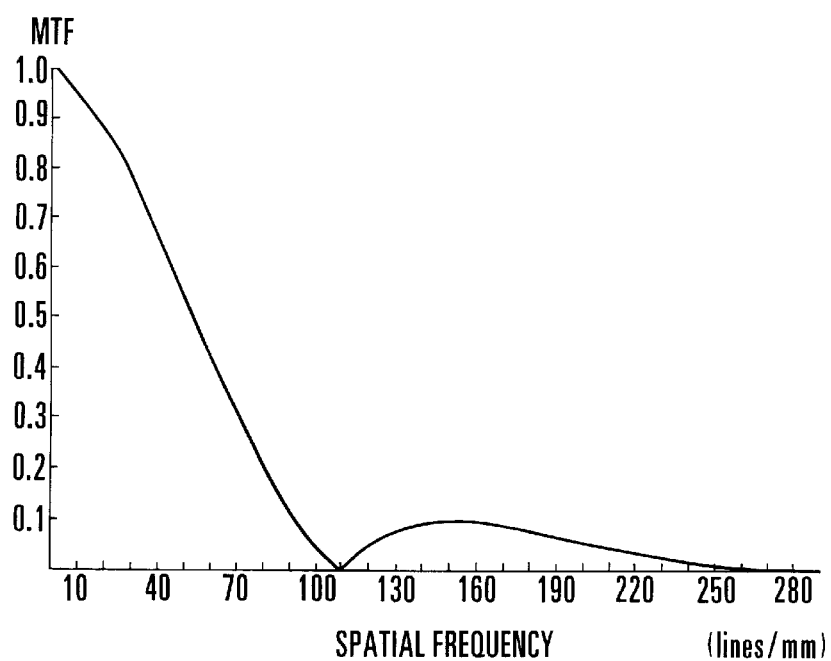
FIG. 26 is a graph showing the MTF curve at F5.6 of the optical system having the wavefront aberration shown in FIG. 22 which optical system is provided with the optical low-pass filter according to the second numerical example.

The optical low-pass filter of the second numerical example expressed by Expression (18) may be added to a photographing optical system having the wavefront aberration shown in FIG. 22. FIG. 23 shows the contour lines of a wavefront aberration in the exit pupil of this example, and FIG. 24 shows the contour lines of the point spread in its image plane. FIGS. 25 and 26 are MTF curves for F1.65 and F5.6, respectively. Incidentally, in accordance with such calculation results which take account of the wavefront aberration of the photographing optical system, the photographing optical system is defocused along its optical axis so that the low-frequency component of its MTF reaches a maximum.

Figure 27:
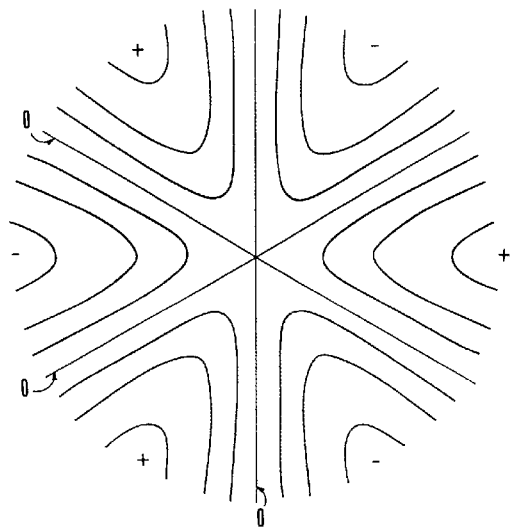
FIG. 27 is a view showing the contour lines of an optical low-pass filter having another shape.
Figure 28:
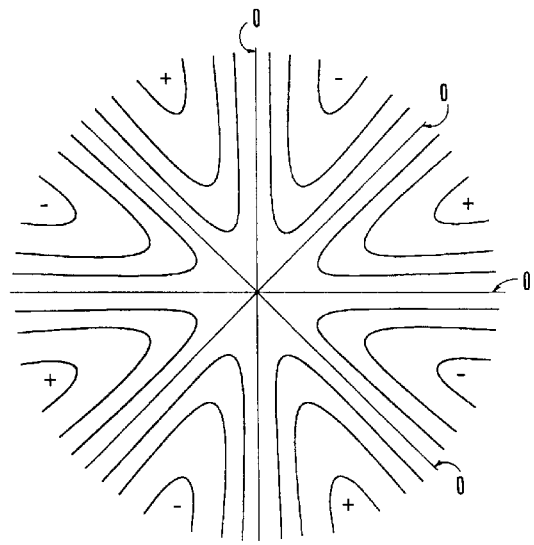
FIG. 28 is a view showing the contour lines of an optical low-pass filter having another shape.

FIGS. 27 and 28 show the contour lines of different optical low-pass filters having different shapes in their rotational directions.

The respective shapes shown in FIGS. 27 and 28 are expressed as:

$$S3(\rho,\phi) = A3 \times R3(\rho) \times \cos(3\phi), \qquad (24)$$

$$S4(\rho,\phi) = A4 \times R4(\rho) \times \cos(4\phi). \qquad (25)$$

From the integral of the second term of Expression (8), the optical low-pass filter expressed by Expression (24) has the spread characteristics of separating an image into six images in its image plane, while the optical low-pass filter expressed by Expression (25) has the spread characteristics of separating an image into eight images in its image plane.

Figure 29:
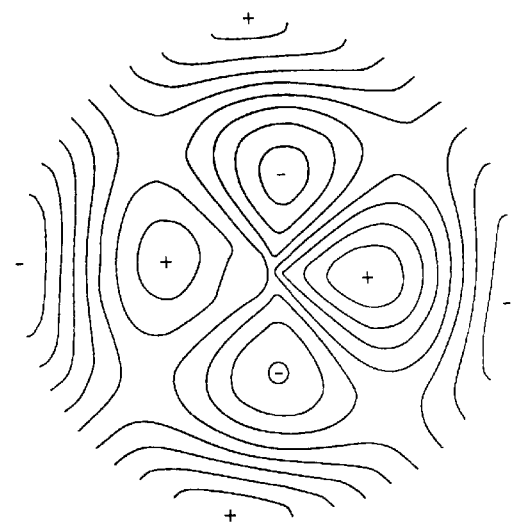
FIG. 29 is a view showing the contour lines of an optical low-pass filter having another shape.

Any of the above-described examples of the optical low-pass filter has a shape which is periodical in the rotational direction (φ) and in which portions having phase advancing actions and portions having phase retarding actions are symmetrical in shape. However, in the case of an optical low-pass filter having a shape which is asymmetrical and non-periodical as shown by contour lines in FIG. 29 or a shape in which portions which exert phase advancing/retarding actions are not uniform in height (depth), it is considered that a function which represents the shape of such a surface is not simple unlike any of the aforesaid functions and can be expressed like $$S(\rho,\phi) = \Sigma Am \times Rm(\rho) \times \cos(m\phi), \ m=1,2,3,\ldots n, \qquad (26)$$

and the result of Expression (8) which gives the diffraction integral of Expression (26) shows that a plurality of spots formed in an image plane are impaired in periodicity relative to the rotational direction and in the uniformity of their shapes.

Even in this case, if the shape of a line spread obtainable by integrating intensity spread in a direction perpendicular to the pixel-array direction of a CCD is approximately equal to a rectangular spread having a width equivalent to a pitch p of the pixels of the CCD, the function of the optical low-pass filter is not affected. To realize such an optical low-pass filter, the integral of the second term of Expression (8) needs only to have a limit value in the neighborhood of vc (Expression (13) or (14)) determined by the pixel pitch p, with respect to the wavefront aberration due to the shape represented by Expression (26).

(Embodiment 2)

Figure 30:
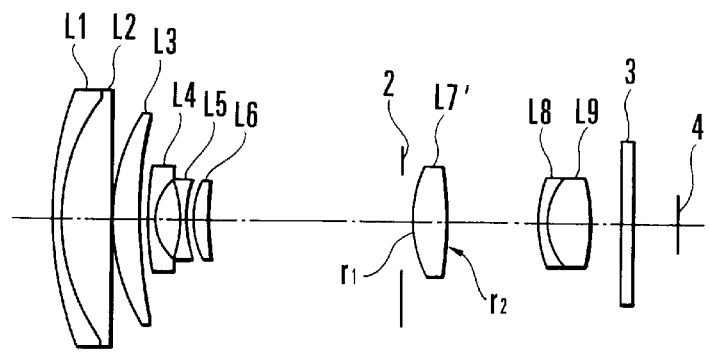
FIG. 30 is a diagrammatic view showing the essential portion of a photographing optical system according to Embodiment 2.

FIG. 30 is a diagrammatic view of the essential portion of a photographing optical system according to Embodiment 2.

In Embodiment 2, a surface having a low-pass effect is provided at the location of a surface of a lens which constitutes part of the photographing optical system. In FIG. 30, identical reference numerals are used to denote constituent elements whose functions are basically identical to those of the corresponding ones of Embodiment 1, and the description thereof is omitted herein for the sake of simplicity.

It is desirable that a surface having a low-pass effect be provided on a lens disposed in the vicinity of the stop 2. In Embodiment 2, such a surface is provided at the location of a surface r1 of a lens L7'. The shape of this lens surface can be expressed as follows:

$$S(\rho,\phi) = Sp(\rho) + Asp(\rho) + Lp(\rho,\phi), \qquad (27)$$

where Sp(ρ) represents the shape of a curved surface determined by a radius of the osculating sphere, "R", Asp(ρ) represents the axisymmetrical aspheric shape expressed by a polynomial of ρ or the like, and Lp(ρ, φ) represents a surface shape having the low-pass effect according to the present invention. As can be seen from Expression (27), the term of Sp(ρ)+Asp(ρ) is calculated as ordinary lens design, and the term of Lp(ρ, φ) is added to the term of Sp(ρ)+Asp(ρ) to determine the final shape of the lens surface.

Such a lens can readily be manufactured as a molded lens by melting and molding a synthetic resin material such as acrylic resin or glass, as by using a mold having a molding shape equivalent to the shape determined by Expression (27). The lens may also be manufactured by polishing a surface of a glass lens into the spheric surface expressed by Sp(ρ) of Expression (27) and covering the spheric surface with a synthetic resin material, such as acrylic resin, to add to the spheric surface the aspheric surface shape and the surface shape having the low-pass effect both of which are determined by Asp(ρ)+Lp(ρ, φ) of Expression (27).

Figure 31:
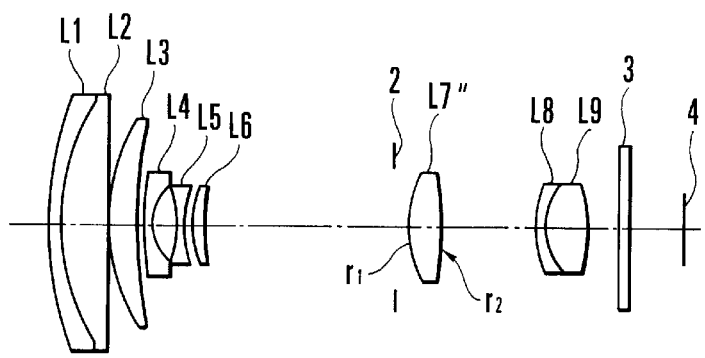
FIG. 31 is a diagrammatic view showing the essential portion of another photographing optical system according to Embodiment 2.

It is possible to adopt another arrangement in which, as shown in FIG. 31, a surface having a low-pass effect is provided at the location of a surface r2 of a lens L7", whereas an axisymmetrical aspheric surface is provided at the location of the surface r1 of the lens L7".

(Embodiment 3)

Figure 32:
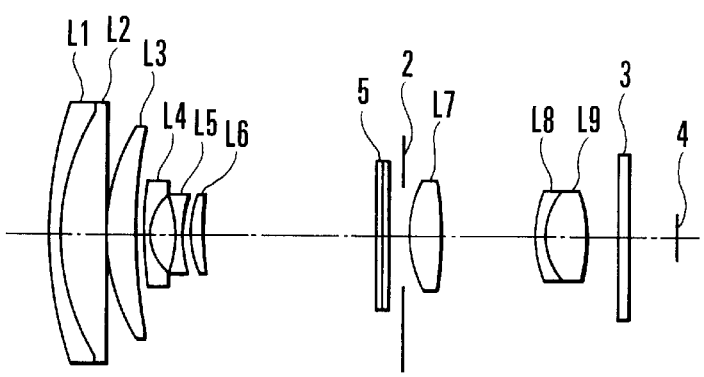
FIG. 32 is a diagrammatic view showing the essential portion of a photographing optical system according to Embodiment 3.

FIG. 32 is a diagrammatic view of the essential portion of a photographing optical system according to Embodiment 3.

In Embodiment 3, a surface having a low-pass effect according to the present invention is provided on a variable density element 5 which actively varies its transmittance to vary the amount of light, and the variable density element 5 is disposed in the vicinity of the stop 2. The variable density element 5 has a structure in which an EC liquid crystal or the like is hermetically sealed between flat plates, and the surface having the low-pass effect is formed on either of the flat plates. In FIG. 32, identical reference numerals are used to denote constituent elements whose functions are basically identical to those of the corresponding ones of Embodiment 1, and the description thereof is omitted herein for the sake of simplicity.

(Embodiment 4)

Figure 33:
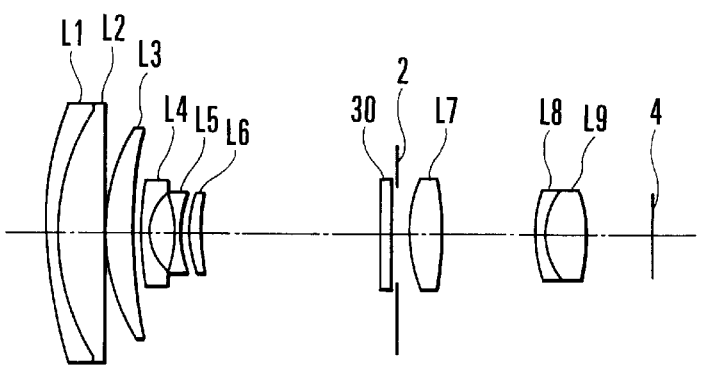
FIG. 33 is a diagrammatic view showing the essential portion of a photographing optical system according to Embodiment 4.

FIG. 33 is a diagrammatic view of the essential portion of a photographing optical system according to Embodiment 4.

In Embodiment 4, a surface having a low-pass effect is provided on an infrared cut-filter 30, and the infrared cut-filter 30 is disposed in the vicinity of the stop 2 of the photographing optical system. The surface having the low-pass effect may be prepared by forming a synthetic resin material having an infrared cutting function, such as that set forth in Japanese Laid-Open Patent Application No. Hei 6-118228, into a shape such as that stated in Embodiment 1, or by adding a shape, such as that stated in Embodiment 1, to a flat infrared cut-filter by using a material different from the material of the flat infrared cut-filter. In FIG. 33, identical reference numerals are used to denote constituent elements whose functions are basically identical to those of the corresponding ones of Embodiment 1, and the description thereof is omitted herein for the sake of simplicity.

(Embodiment 5)

Figure 34:
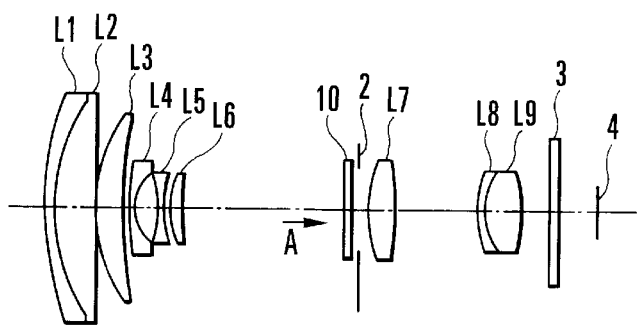
FIG. 34 is a diagrammatic view showing the essential portion of a photographing optical system according to Embodiment 5.

FIG. 34 is a diagrammatic view of the essential portion of a photographing optical system according to Embodiment 5.

Figure 35:
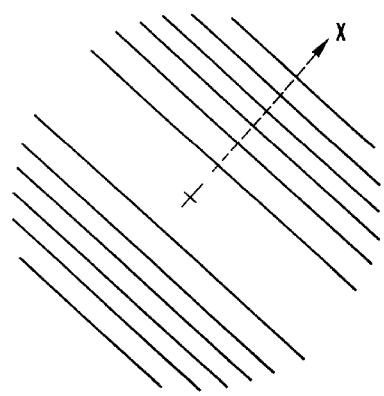
FIG. 35 is a view showing the contour lines of the shape of an optical low-pass filter according to Embodiment 5 as viewed from an object plane side.
Figure 36:
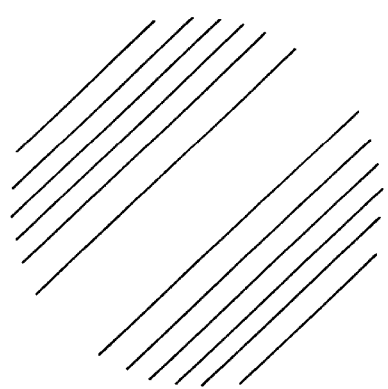
FIG. 36 is a view showing the contour lines of the shape of the optical low-pass filter according to Embodiment 5 as viewed from an image plane side.
Figure 37:
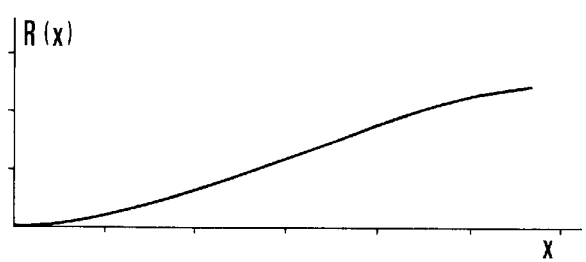
FIG. 37 is a cross-sectional view taken in the direction indicated by an arrow "x" in FIG. 35.

In Embodiment 5, surfaces which exert phase advancing/retarding actions on the phase of a wavefront are formed on the opposite sides of a flat plate made of a synthetic resin material such as acrylic resin, the flat plate being provided in the vicinity of the stop 2. The respective surfaces have cylindrical shapes as shown in FIGS. 35 and 36 in contour line, and the directions in which the respective surfaces have refractive powers are rotated 90° with respect to each other. FIG. 37 shows a cross-sectional shape taken in the direction indicated by an arrow "x" in FIG. 35.

Figure 38:
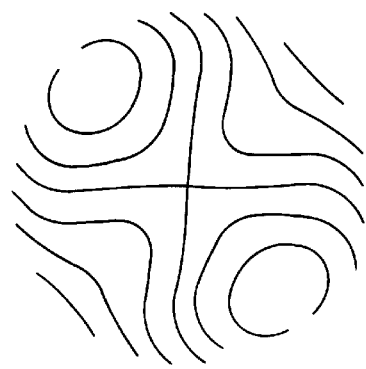
FIG. 38 is a view showing the contour lines of a wavefront aberration in an exit pupil in Embodiment 5.

Since the contour lines of the wavefront transmitted through an optical low-pass filter 10 is transformed as shown in FIG. 38, the optical low-pass filter 10 of Embodiment 5 achieves an effect similar to the above-described optical low-pass filter 1 of Embodiment 1. In FIG. 34, identical reference numerals are used to denote constituent elements whose functions are basically identical to those of the corresponding ones of Embodiment 1, and the description thereof is omitted herein for the sake of simplicity.

(Embodiment 6)

Figure 39:
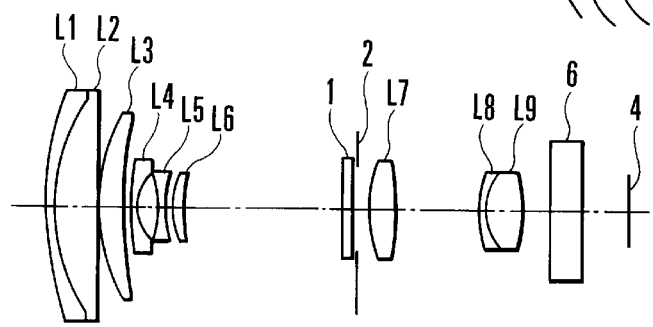
FIG. 39 is a diagrammatic view showing the essential portion of a photographing optical system according to Embodiment 6.

FIG. 39 is a diagrammatic view of the essential portion of a photographing optical system according to Embodiment 6.

In Embodiment 6, the acting surface of the optical low-pass filter 1 is provided in the vicinity of the stop 2, and a crystal plate 6 having inclined double refraction axes is provided in the photographing optical system. In FIG. 39, identical reference numerals are used to denote constituent elements whose functions are basically identical to those of the corresponding ones of Embodiment 1, and the description thereof is omitted herein for the sake of simplicity.

The optical low-pass filter 1 principally cuts a high frequency component, and the crystal plate 6 sets the cutoff frequency required for a CCD. This arrangement enables the photographing optical system to be used with different CCDs each having a different number of CCDs.

Figure 40:
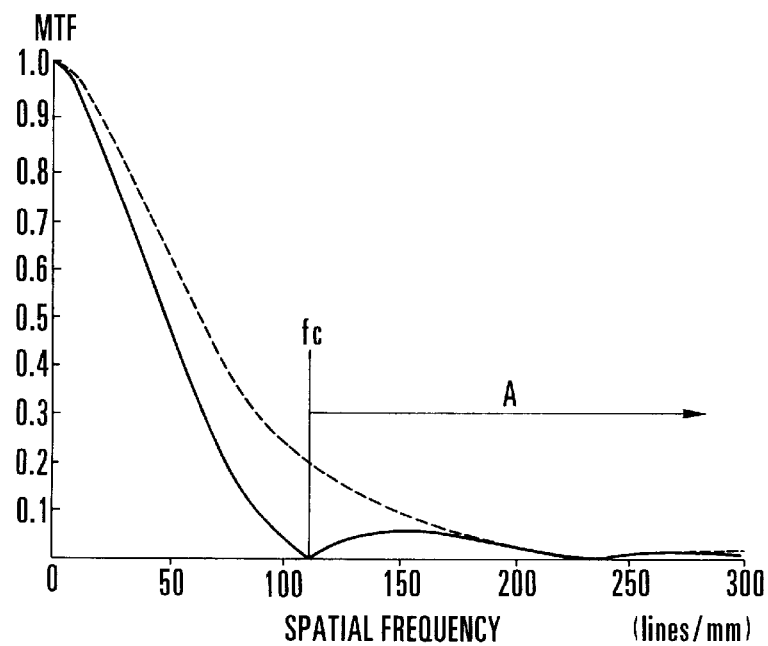
FIG. 40 is a graph showing the MTF curve of Embodiment 6 for a cutoff frequency of 110 lines/mm.
Figure 41:
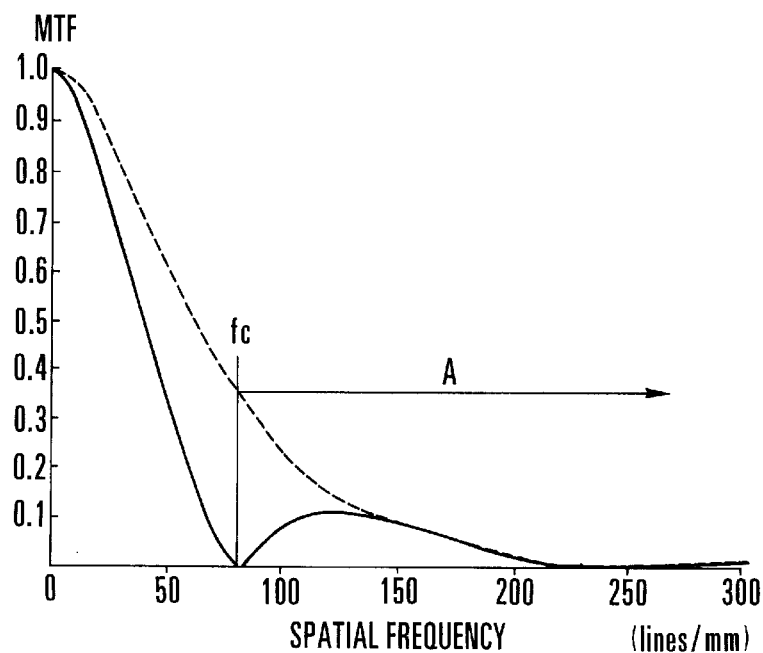
FIG. 41 is a graph showing the MTF curve of Embodiment 6 for a cutoff frequency of 80 lines/mm.

FIGS. 40 and 41 show the respective MTF curves for optical cutoff frequencies of 110 lines/mm and 80 lines/mm in the above-described arrangement. In each of FIGS. 40 and 41, a dotted curve represents the MTF curve of Embodiment 6 which uses the optical low-pass filter 1 alone, while a solid curve represents the MTF curve of Embodiment 6 which uses the crystal plate 6 in addition to the optical low-pass filter 1. The range denoted by an arrow A represents a domain in which a high-frequency suppression effect can be obtained, and symbol fc denotes the optical cutoff frequency determined by the crystal plate 6.

(Embodiment 7)

Each of the embodiments 1 to 6 is arranged to provide a low-pass effect by giving a wavefront aberration to an incident pencil of rays while the incident pencil of rays is passing through areas of different thicknesses of an optical low-pass filter. The wavefront aberration is caused by variations in the optical path length of the passing pencil of rays due to the different thicknesses of the respective areas of the optical low-pass filter. The optical path length is given by the product of the distance of the path traversed in a medium by a pencil of rays (thickness d) and the refractive index of the medium. Accordingly, not only by making the thickness d different for each of the areas of the optical low-pass filter but also by making the refractive index different for each of the areas, it is possible to vary the optical path length and realize the optical low-pass filter according to the present invention.

Embodiment 7 relates to an optical low-pass filter having different refractive indices for different areas.

The gradient refractive index of the optical low-pass filter of Embodiment 7 which is represented by a cylindrical coordinate system is obtained from the shape of a wavefront (aberration) which gives a point image spread such as that shown in FIG. 2.

The procedure for obtaining such gradient refractive index will be described below. The gradient refractive index of the optical low-pass filter which is represented by the cylindrical coordinate system is expressed as:

$$N(\rho,\phi)=N0+Nr(\rho)\times\cos(m\phi+\delta), \tag{28}$$

where N0 is the refractive index of the central portion of the optical low-pass filter, $\rho$ is coordinates relative to the radial direction of the optical low-pass filter, $Nr(\rho)$ is a gradient refractive index relative to the radial direction of the optical low-pass filter, $\phi$ is coordinates relative to the rotational direction of the optical low-pass filter, m is defined as m=2, 3, 4, . . . (an integer) on the basis of the periodicity of the optical low-pass filter relative to the rotational direction, and $\delta$ is a constant (in Embodiment 7, $\delta$=0).

Letting d be the thickness of the optical low-pass filter, from such gradient refractive index, the wavefront aberration given to a transmitted wavefront by the aforesaid shape is expressed as:

$$W(\rho,\phi)=A\times\delta N(\rho,\phi)\times d$$
$$=A\times Nr(\rho)\times\cos(m\phi)\times d$$
$$=A'\times Nr(\rho)\times\cos(m\phi). \tag{29}$$

Assuming that the second term of Expression (8) represents the amplitude distribution of Expression (1) referred to previously, it is desirable to set "m" of cos (m$\theta$) to 2. Thus, the distribution of the refractive index error of the optical low-pass filter becomes:

$$\delta N(\rho,\phi)=Nr(\rho)\times\cos(2\phi). \tag{30}$$

A numerical example of an optical low-pass filter according to Embodiment 7, which has a predetermined gradient refractive index, is shown below:

$$N1(\rho,\phi)=N0+Nr1(\rho)\times\cos(2\phi), \tag{31}$$

where $$N1(\rho)=(2.184\rho-0.949\rho^2)\lambda,\ 0\leq\rho\leq1,\ 0\leq\phi\leq2\pi. \tag{32}$$

The gradient refractive index of the numerical example for φ=0 is shown in FIG. 42.

The numerical example of the optical low-pass filter according to Embodiment 7 produces a wavefront aberration, such as that shown in FIG. 43, which is analogous to the shape of the optical low-pass filter, in the exit pupil of an ideal optical system composed of aberration-free lenses, so that point images are annularly separated from one another in an image plane, as shown in FIG. 44. It is, therefore, possible to decrease MTF relative to high-frequency components to a further extent. FIG. 45 shows the line spread obtained by performing an addition in a direction perpendicular to the pixel-array direction of a CCD, which is obtained at F2.8 from the numerical example of the optical low-pass filter, and FIG. 46 shows the MTF curve of the numerical example of the optical low-pass filter.

In this manner, it is possible to obtain a desired low-pass effect by giving a predetermined gradient refractive index to the optical low-pass filter.

As is apparent from the above description, an optical low-pass filter which makes the optical path length of its passing pencil of rays different by means of its varied thickness (shape) so that some areas of the optical low-pass filter exert phase advancing actions and the other areas exert phase retarding actions is equivalent in function and effect to an optical low-pass filter which makes the optical path length of its passing pencil of rays different by means of its gradient refractive index so that some areas of the optical low-pass filter exert phase advancing actions and the other areas exert phase retarding actions. Specifically, any of the optical low-pass filters of Embodiments 1 to 6 can be replaced with an optical low-pass filter having a gradient refractive index.

It is also possible to adopt an optical low-pass filter which differ in both thickness and refractive index for each area. (Embodiment 8)

Figure 47:
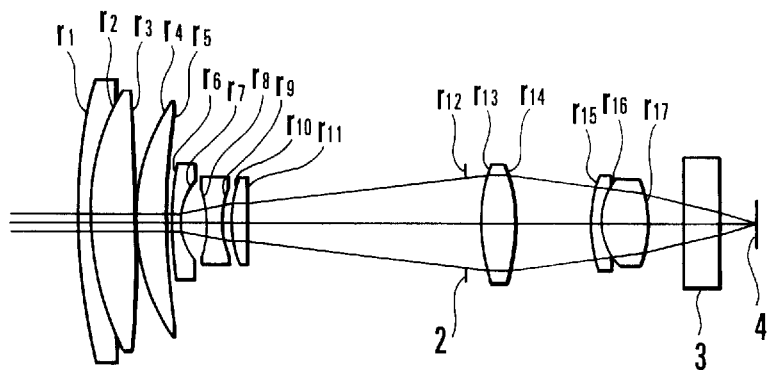
FIG. 47 is a diagrammatic view showing the essential portion of a photographing optical system according to Embodiment 8.

Embodiment 8 of the present invention is shown in FIG. 47. In Embodiment 8, the shape of an optical low-pass filter which will be described later is added to the shape of a surface of a lens which constitutes part of the photographing optical system shown in FIG. 47. The photographing optical system includes the stop 2 and the infrared cut-filter 3. Reference numeral 4 denotes a CCD.

Lens data for the photographing optical system are shown in Table 1.

TABLE 1

|  | Surface | Radius of Curvature | Separation | Refractive Index | Abbe Number |
|---|---|---|---|---|---|
| First Lens Unit | 1 | 47.30490 | 1.25000 | 1.847 | 23.9 |
|  | 2 | 24.99391 | 4.90000 | 1.603 | 31.1 |
|  | 3 | −422.44811 | 0.20000 | 1 |  |
|  | 4 | 22.00462 | 2.77000 | 1.697 | 55.1 |
|  | 5 | 52.79733 | D1 |  |  |
| Second Lens Unit | 6 | 36.64051 | 0.60000 | 1.773 | 49.6 |
|  | 7 | 5.72766 | 2.89700 | 1 |  |
|  | 8 | −11.03929 | 1.50000 | 1.530 | 55.5 |

TABLE 1-continued

|  |  |  |  |  |  |
|---|---|---|---|---|---|
|  | 9* | 9.01249 | 1.06000 | 1 |  |
|  | 10 | 12.47778 | 1.50000 | 1.847 | 23.9 |
|  | 11 | 82.77610 | D2 | 1 |  |
| Stop | 12 | 0.00000 | 1.20000 | 1 |  |
| Third Lens Unit | 13* | 14.31644 | 3.40000 | 1.530 | 55.5 |
|  | 14 | −30.92051 | D3 | 1 |  |
| Fourth Lens Unit | 15 | 11.08409 | 0.80000 | 1.847 | 23.9 |
|  | 16 | 5.18699 | 5.20000 | 1.530 | 55.5 |
|  | 17* | −18.46439 |  | 1 |  |

| f | 4.12 | 66.48 mm |
|---|---|---|
| F number | 1.65 | 2.84 |
| D1 | 0.950 | 23.416 |
| D2 | 23.716 | 1.250 |
| D3 | 7.938 | 8.939 |
| 2ω | 57.2° | 3.9° |

If the direction of the optical axis of the photographing optical system and a direction perpendicular to the optical axis are respectively taken as a z-axis and an h-axis and the direction of propagation of light is taken as a positive direction, each axisymmetrical aspheric surface of Embodiment 8 is expressed by the following expression:

$$Z = \frac{h^2/R}{1 + \sqrt{1-(1+k)(h/R)^2}} + ah^4 + bh^6 + ch^8 + dh^{10}, \quad (33)$$

where R is a radius of the osculating surface and k, a, b, c and d are aspheric coefficients.

Data for the respective aspheric surfaces are shown in Table 2.

TABLE 2

| Surface | k | a | b | c | d |
|---|---|---|---|---|---|
| 9 | −4.91288e−01 | −7.61380e−05 | −6024942e−06 | 8.03346e−07 | −2.42975e−08 |
| 13 | −9.08186e−01 | −6.54077e−05 | 6.23762e−08 | −2.94373e−09 | −1.30582e−11 |
| 17 | 6.23416e+00 | −2.18108e−05 | 1.14897e−06 | −5.82846e−07 | 1.72059e−08 |

The photographing optical system (zoom lens) of Embodiment 8 includes a first lens unit having a positive refractive power, a second lens unit having a negative refractive power, a stop, a third lens unit having a positive refractive power, and a fourth lens unit having a positive refractive power. The photographing optical system is arranged to vary its magnification by moving the second lens unit, and to effect compensation for its image plane and focusing by moving the fourth lens unit.

The optical low-pass filter of Embodiment 8 is realized by adding an asymmetrical variation in shape to the radius of curvature (shown in Table 1) of a surface r14 of the third lens unit disposed in the vicinity of the stop 2.

If the coordinate system of the lens surface is a cylindrical coordinate system (ρ, φ) which is, as shown in FIG. 3, represented by the coordinate system ρ relative to the radial direction and the coordinate system φ relative to the rotational direction, in each of which its origin corresponds to the center of the opening portion, a shape S(ρ, φ) of the optical low-pass filter of Embodiment 8 is expressed by the following expressions:

$$S(\rho, \phi) = \sum_m Am \times Rm(\rho) \times \cos\{m(\phi + \delta m)\}, \quad m = 2, 6, 10, \quad (34)$$

$$R2(\rho) = (a2\rho + b2\rho^2 + c2\rho^3)\lambda, \quad (35)$$

$$R6(\rho) = (a6\rho + b6\rho^2)\lambda, \quad (36)$$

$$R10(\rho) = (a10\rho + b10\rho^2)\lambda. \quad (37)$$

As expressed by Expressions (34) to (37), the shape of the optical low-pass filter of Embodiment 8 which is added to the third lens unit is asymmetrical about the axis thereof.

The coefficients used in Embodiment 8 are shown in Table 3.

TABLE 3

| $A_2 = A_6 = A_{10} = 1$ | $\delta_2 = \delta_6 = \delta_{10} = \dfrac{\pi}{4}$ | |
|---|---|---|
| $a_2 = 8.1687$ | $a_6 = -0.0924$ | $a_{10} = -0.0185$ |
| $b_2 = -13.925$ | $b_b = -0.2358$ | $b_{10} = -0.0472$ |
| $c_2 = 7.5154$ | | |

Figure 48:
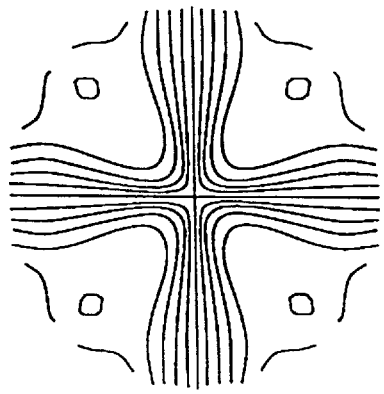
FIG. 48 is a view showing the contour lines of the shape of an optical low-pass filter according to Embodiment 8.
Figure 49:
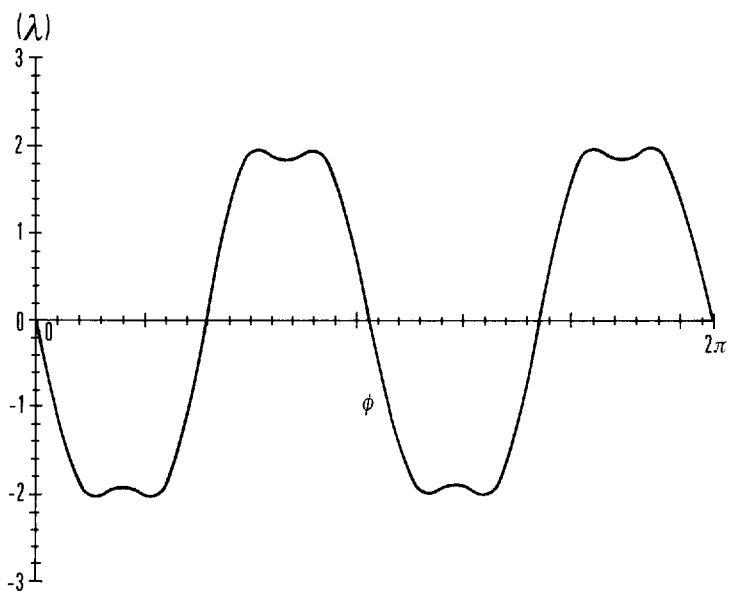
FIG. 49 is a view showing the variation in shape of the optical low-pass filter according to Embodiment 8, relative to the rotational direction of the optical low-pass filter.
Figure 50:
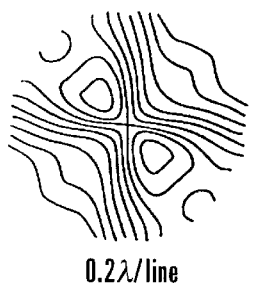
FIG. 50 is a view showing a wavefront aberration obtained on a shorter focal length side of the photographing optical system according to Embodiment 8.
Figure 54:
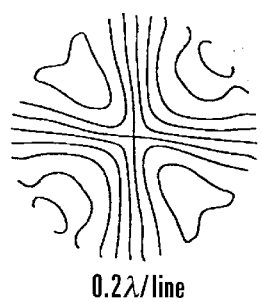
FIG. 54 is a view showing a wavefront aberration obtained on a longer focal length side of the photographing optical system according to Embodiment 8.
Figure 51:
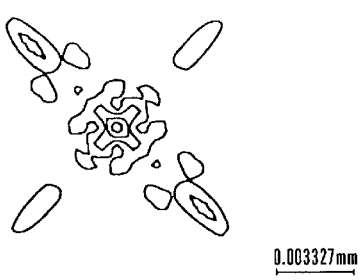
FIG. 51 is a view showing a relative point spread obtained on the shorter focal length side of the photographing optical system according to Embodiment 8.
Figure 55:
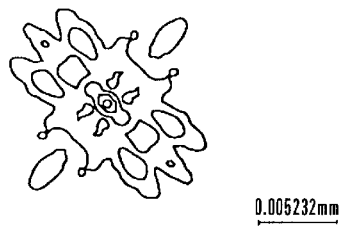
FIG. 55 is a view showing a relative point spread obtained on the longer focal length side of the photographing optical system according to Embodiment 8.
Figure 52:
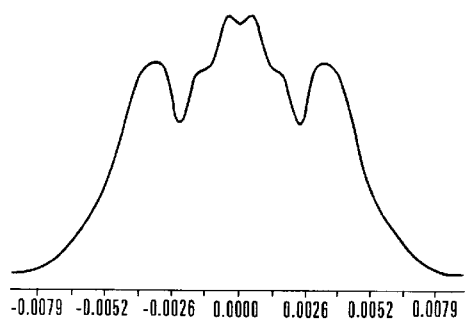
FIG. 52 is a view showing a relative line spread obtained on the shorter focal length side of the photographing optical system according to Embodiment 8.
Figure 56:
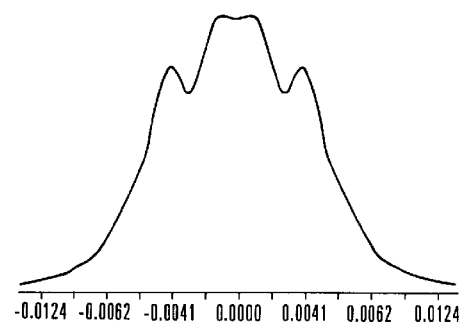
FIG. 56 is a view showing a relative line spread obtained on the longer focal length side of the photographing optical system according to Embodiment 8.
Figure 53:
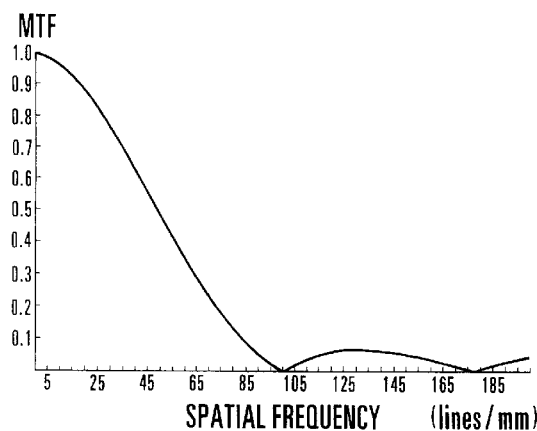
FIG. 53 is a graph showing an MTF curve obtained on the shorter focal length side of the photographing optical system according to Embodiment 8.
Figure 57:
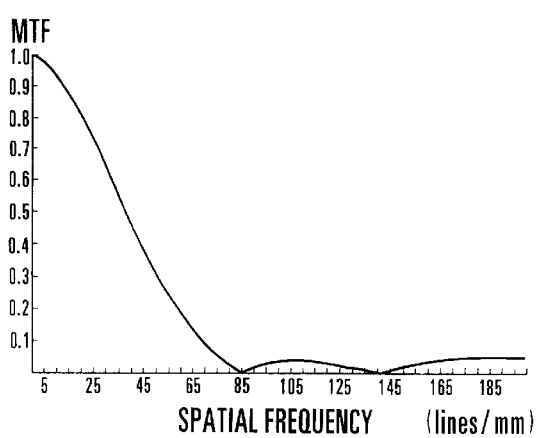
FIG. 57 is a graph showing an MTF curve obtained on the longer focal length side of the photographing optical system according to Embodiment 8.
Figure 58:
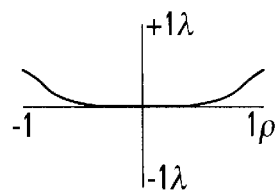
FIG. 58 is a view showing a wavefront aberration obtained on a shorter focal length side of a photographing optical system according to Embodiment 8, which is not provided with an optical low-pass filter.
Figure 62:
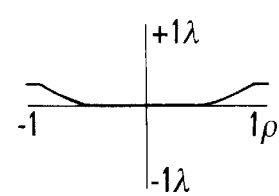
FIG. 62 is a view showing a wavefront aberration obtained on the longer focal length side of the photographing optical system according to Embodiment 8, which is not provided with an optical low-pass filter.
Figure 59:
FIG. 59 is a view showing a relative point spread obtained on the shorter focal length side of the photographing optical system according to Embodiment 8, which is not provided with an optical low-pass filter.
Figure 63:
FIG. 63 is a view showing a relative point spread obtained on the longer focal length side of the photographing optical system according to Embodiment 8, which is not provided with an optical low-pass filter.
Figure 60:
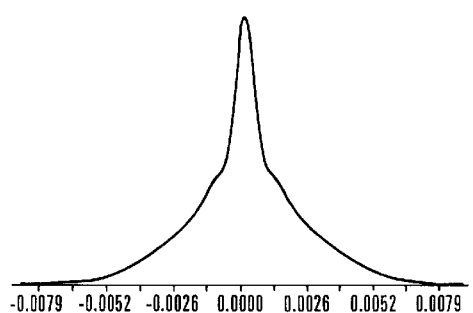
FIG. 60 is a view showing a relative line spread obtained on the shorter focal length side of the photographing optical system according to Embodiment 8, which is not provided with an optical low-pass filter.
Figure 64:
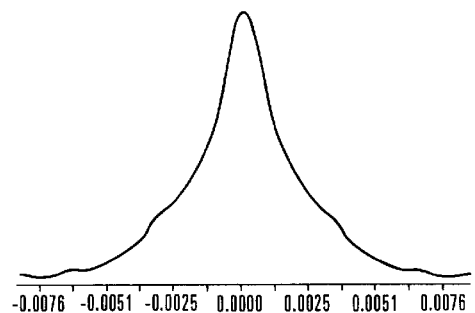
FIG. 64 is a view showing a relative line spread obtained on the longer focal length side of the photographing optical system according to Embodiment 8, which is not provided with an optical low-pass filter.
Figure 61:
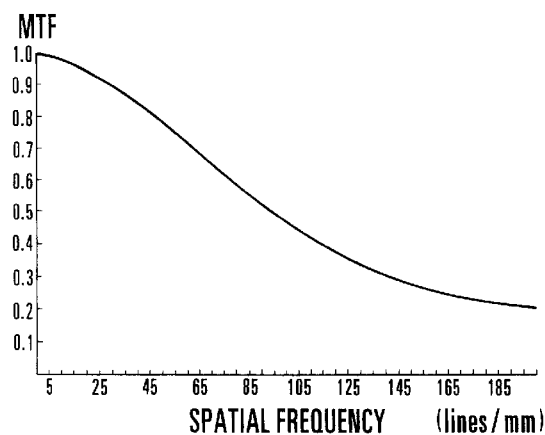
FIG. 61 is a graph showing an MTF curve obtained on a longer focal length side of the photographing optical system according to Embodiment 8, which is not provided with an optical low-pass filter.
Figure 65:
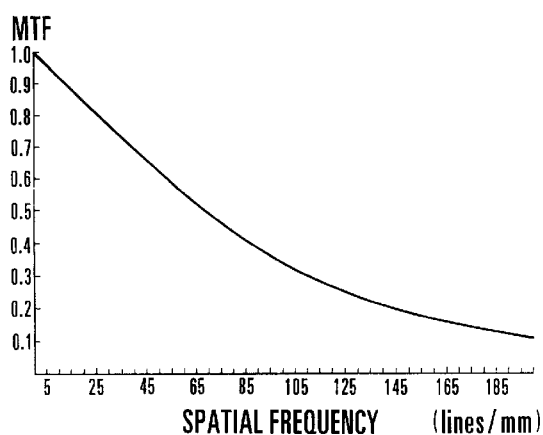
FIG. 65 is a graph showing an MTF curve obtained on the longer focal length side of the photographing optical system according to Embodiment 8, which is not provided with an optical low-pass filter.
Figure 66:
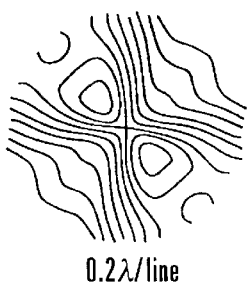
FIG. 66 is a view showing a wavefront aberration obtained on a shorter focal length side of a photographing optical system according to Embodiment 9.
Figure 67:
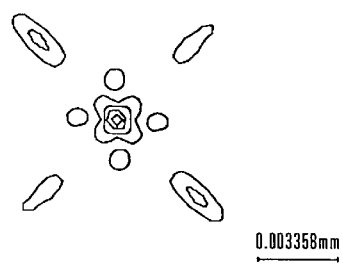
FIG. 67 is a view showing a relative point spread obtained on the shorter focal length side of the photographing optical system according to Embodiment 9.
Figure 68:
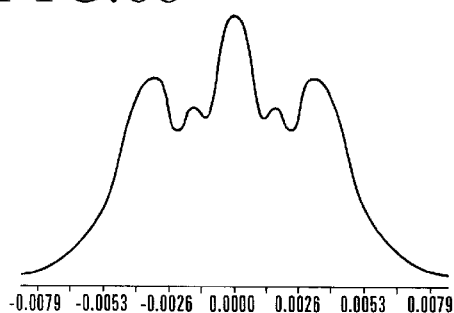
FIG. 68 is a view showing a relative line spread obtained on the shorter focal length side of the photographing optical system according to Embodiment 9.
Figure 69:
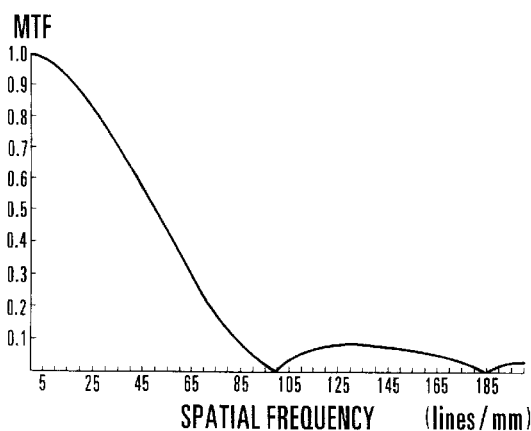
FIG. 69 is a graph showing an MTF curve obtained on the shorter focal length side of the photographing optical system according to Embodiment 9.
Figure 70:
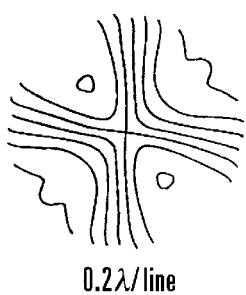
FIG. 70 is a view showing a wavefront aberration obtained on a longer focal length side of the photographing optical system according to Embodiment 9.
Figure 71:
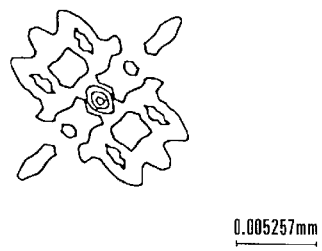
FIG. 71 is a view showing a relative point spread obtained on the longer focal length side of the photographing optical system according to Embodiment 9.
Figure 72:
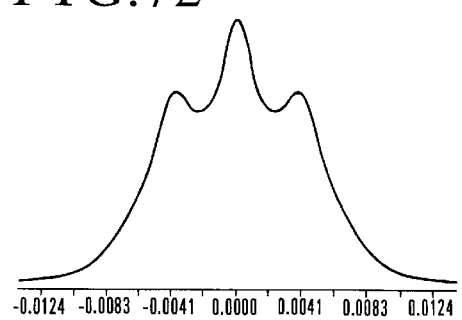
FIG. 72 is a view showing a relative line spread obtained on the longer focal length side of the photographing optical system according to Embodiment 9.
Figure 73:
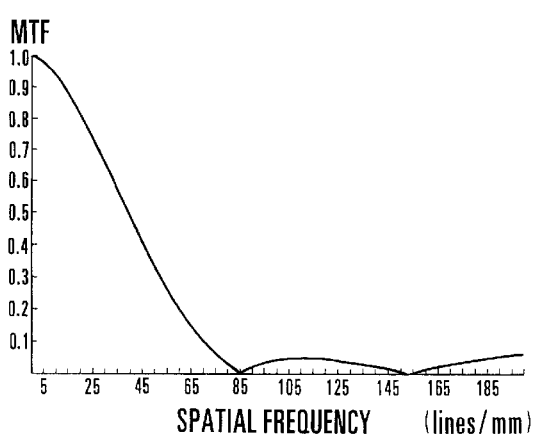
FIG. 73 is a graph showing an MTF curve obtained on the longer focal length side of the photographing optical system according to Embodiment 9.

The contour lines of the optical low-pass filter of Embodiment 8 (Expression (34)) are shown in FIG. 48, and the variation in shape of the optical low-pass filter relative to the rotational direction (the $\phi$ direction) for $\rho=1$ is shown in FIG. 49.

In the case of the optical low-pass filter which is realized as the amount of variation in shape of the lens, its wavefront aberration is:

$$W(\rho,\phi) = S(\rho,\phi) \times (1-n), \quad (38)$$

where n is the refractive index of the lens.

The wavefront aberration $W(\rho, \phi)$ is expressed as:

$$W(\rho, \phi) = \sum_m Am \times Wrm(\rho) \times \cos\{m(\phi + \delta m)\}, \quad (39)$$

where m is an integer and Am and $\delta m$ are constants.

FIGS. 50, 51, 52 and 53 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 54, 55, 56 and 57 respectively show a wavefront aberration ($\lambda$=587.56 nm), a relative point spread (white), a relative line spread (white) and an MTF curve (white) which are obtained on a longer focal length side of such photographing optical system. FIGS. 58, 59, 60 and 61 respectively show a wavefront aberration ($\lambda$=587.56 nm), a relative point spread (white), a relative line spread (white) and an MTF curve (white) which are obtained on a shorter focal length side of a photographing optical system including no optical low-pass filter (Table 1). FIGS. 62, 63, 64 and 65 respectively show a wavefront aberration ($\lambda$=587.56 nm), a relative point spread (white), a relative line spread (white) and an MTF curve (white) which are obtained on a longer focal length side of such photographing optical system.

As is apparent from the above description, the optical low-pass filter of Embodiment 8 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 8, the pixel pitch is 5 $\mu$m, and the cutoff frequency is 100 lines/mm.

(Embodiment 9)

In Embodiment 9, a shape for providing a low-pass effect is formed at a surface different from the surface r14.

Embodiment 9 uses the same functional expressions that express the shape $S(\rho, \phi)$ of the optical low-pass filter of Embodiment 8, and the coefficients used in Embodiment 9 are the same as those shown in Table 3, except for the coefficient Am (in Embodiment 9, $A_{10}=A_6=A_2=0.92$). The shape $S(\rho, \phi)$ of the optical low-pass filter is added to an aspheric surface r13 located in the vicinity of the stop 2. Lens data are the same as those used in Embodiment 8. The shape of the optical low-pass filter of Embodiment 9 is such that the shape of the optical low-pass filter of Embodiment 8 is squeezed by a small amount in the direction of the z-axis (optical axis).

FIGS. 66, 67, 68 and 69 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 70, 71, 72 and 73 respectively show a wavefront aberration ($\lambda$=587.56 nm), a relative point spread (white), a relative line spread (white) and an MTF curve (white) which are obtained on a longer focal length side of such photographing optical system.

Figure 74:
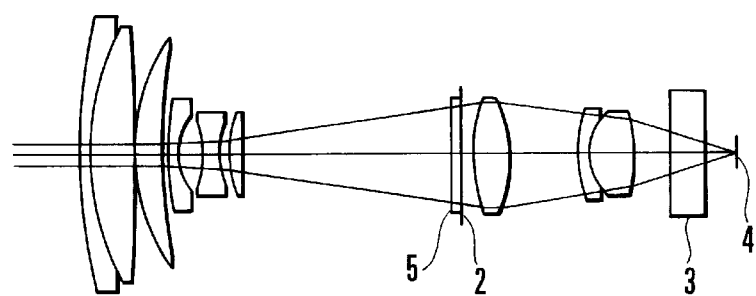
FIG. 74 is a diagrammatic view showing the essential portion of a photographing optical system having another arrangement.

As is apparent from the above description, the optical low-pass filter may be added to any surface that is located in the vicinity of the stop 2. As shown in FIG. 74, a flat plate 5 which does not greatly affect the photographing optical system and to which the optical low-pass filter is added may be provided in the vicinity of the stop 2.

(Embodiment 10)

In Embodiment 10, the setting of the angle $\delta$ is changed.

Embodiment 10 uses the same functional expressions that express the shape $S(\rho, \phi)$ of the optical low-pass filter of Embodiment 8, and the coefficients used in Embodiment 10 are the same as those shown in Table 3, except for the coefficient A (in Embodiment 10, A=0.73). Lens data are the same as those used in Embodiment 8.

FIGS. 75, 76, 77 and 78 respectively show a wavefront aberration ($\lambda$=587.56 nm), a relative point spread (white), a relative line spread (white) and an MTF curve (white) which are obtained on a shorter focal length side of a photographing optical system including an optical low-pass filter of $\delta=30°$.

FIGS. 79, 80, 81 and 82 respectively show a wavefront aberration ($\lambda$=587.56 nm), a relative point spread (white), a relative line spread (white) and an MTF curve (white) which are obtained on a shorter focal length side of a photographing optical system including an optical low-pass filter of $\delta=22.5°$ and A=0.9.

(Embodiment 11)

The shape $S(\rho, \phi)$ of the optical low-pass filter of Embodiment 11 is expressed by the following expressions:

$$S(\rho, \phi) = \sum_{m} Am \times Rm(\rho) \times \cos\{m(\phi + \delta m)\}, \quad (40)$$

$m = 2, 6, 10, 14,$ $R2(\rho) = (a2\rho + b2\rho^2 + c2\rho^3)\lambda, \quad (41)$ $R6(\rho) = (a6\rho + b6\rho^2)\lambda, \quad (42)$ $R10(\rho) = (a10\rho + n10\rho^2)\lambda, \quad (43)$ $R14(\rho) = (a14\rho + b14\rho^2)\lambda. \quad (44)$ The coefficients used in Embodiment 11 are shown in Table 4.

TABLE 4

| $A_2 = A_6 = A_{10} = A_{14} = 1$ | $\delta_2 = \delta_6 = \delta_{10} = \delta_{14} = \dfrac{\pi}{4}$ | | |
|---|---|---|---|
| $a_2 = 4.7591$ | $a_6 = -0.069311$ | $a_{10} = -0.023104$ | $a_{14} = -0.0033005$ |
| $b_2 = -8.1207$ | $b_6 = -0.17685$ | $b_{10} = -0.058950$ | $b_{14} = -0.0084211$ |
| $c_2 = 4.3586$ | | | |

Figure 83:
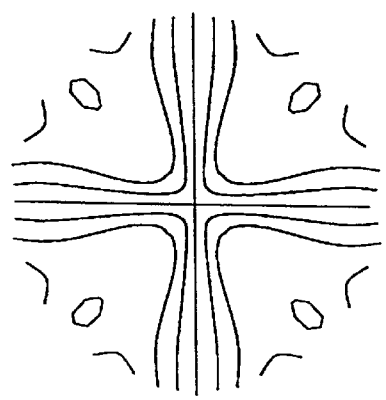
FIG. 83 is a view showing the contour lines of the shape of an optical low-pass filter according to Embodiment 11.
Figure 84:
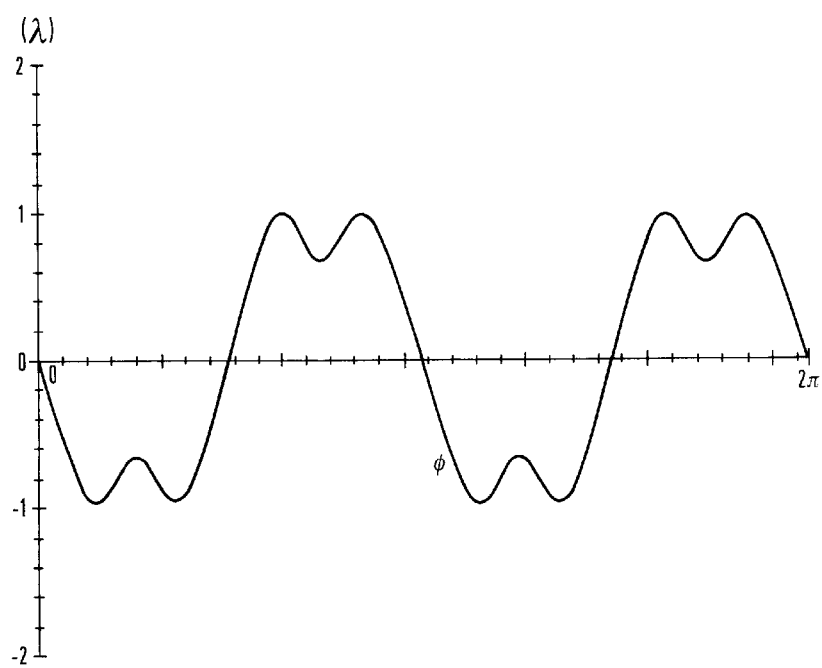
FIG. 84 is a view showing the variation in shape of the optical low-pass filter according to Embodiment 11, relative to the rotational direction of the optical low-pass filter.
Figure 75:
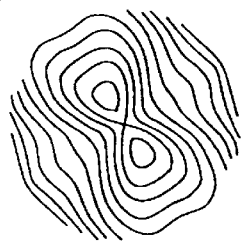
FIG. 75 is a view showing a wavefront aberration obtained on a shorter focal length side of a photographing optical system according to a first example of Embodiment 10.
Figure 79:
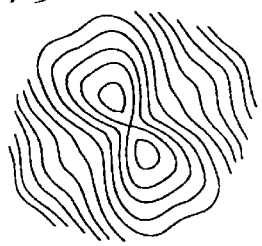
FIG. 79 is a view showing a wavefront aberration obtained on a shorter focal length side of a photographing optical system according to a second example of Embodiment 10.
Figure 76:
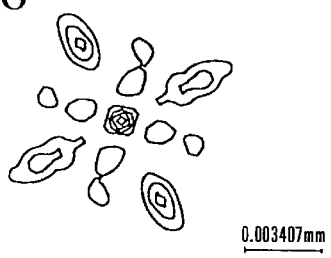
FIG. 76 is a view showing a relative point spread obtained on the shorter focal length side of the photographing optical system according to the first example of Embodiment 10.
Figure 80:
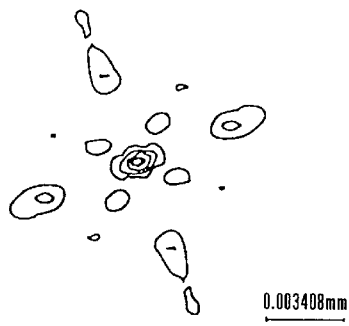
FIG. 80 is a view showing a relative point spread obtained on the shorter focal length side of the photographing optical system according to the second example of Embodiment 10.
Figure 77:
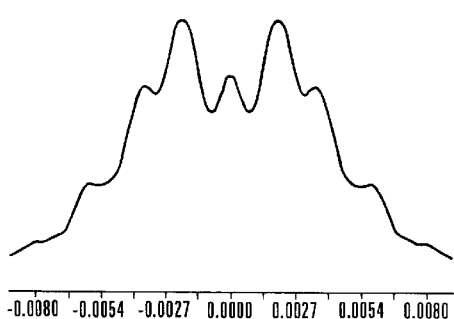
FIG. 77 is a view showing a relative line spread obtained on the shorter focal length side of the photographing optical system according to the first example of Embodiment 10.
Figure 81:
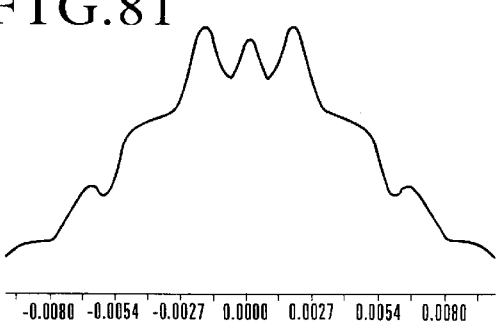
FIG. 81 is a view showing a relative line spread obtained on the shorter focal length side of the photographing optical system according to the second example of Embodiment 10.
Figure 78:
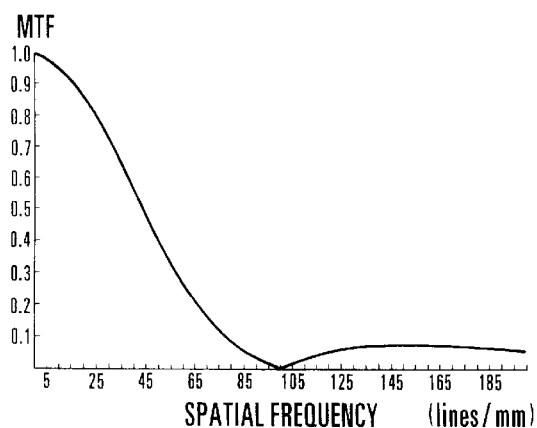
FIG. 78 is a graph showing an MTF curve obtained on the shorter focal length side of the photographing optical system according to the first example of Embodiment 10.
Figure 82:
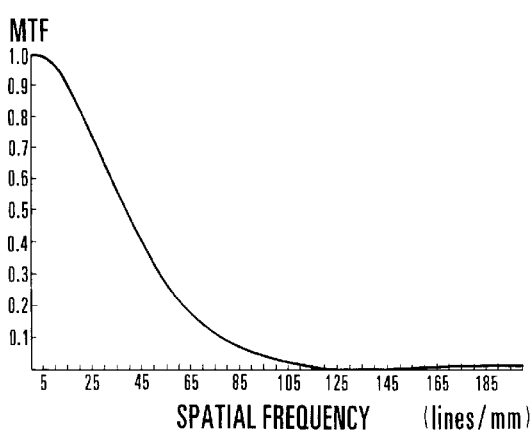
FIG. 82 is a graph showing an MTF curve obtained on the shorter focal length side of the photographing optical system according to the second example of Embodiment 10.
Figure 85:
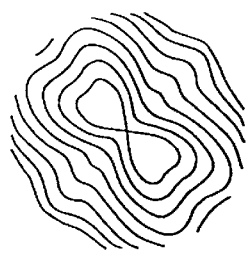
FIG. 85 is a view showing a wavefront aberration obtained on a shorter focal length side of the photographing optical system according to Embodiment 11.
Figure 89:
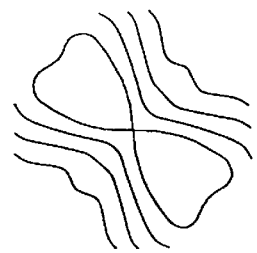
FIG. 89 is a view showing a wavefront aberration obtained on a longer focal length side of the photographing optical system according to Embodiment 11.
Figure 86:
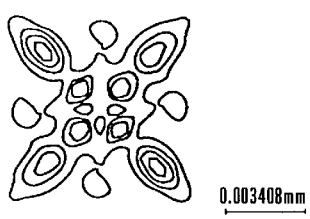
FIG. 86 is a view showing a relative point spread obtained on the shorter focal length side of the photographing optical system according to Embodiment 11.
Figure 90:
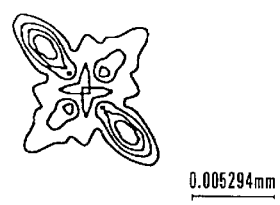
FIG. 90 is a view showing a relative point spread obtained on the longer focal length side of the photographing optical system according to Embodiment 11.
Figure 87:
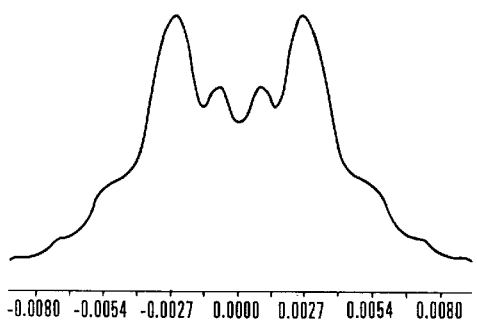
FIG. 87 is a view showing a relative line spread obtained on the shorter focal length side of the photographing optical system according to Embodiment 11.
Figure 91:
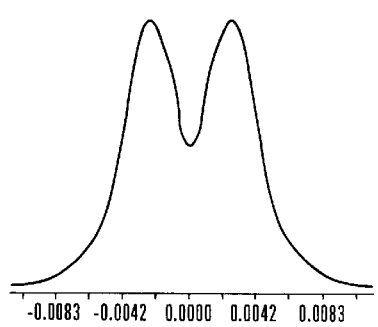
FIG. 91 is a view showing a relative line spread obtained on the longer focal length side of the photographing optical system according to Embodiment 11.
Figure 88:
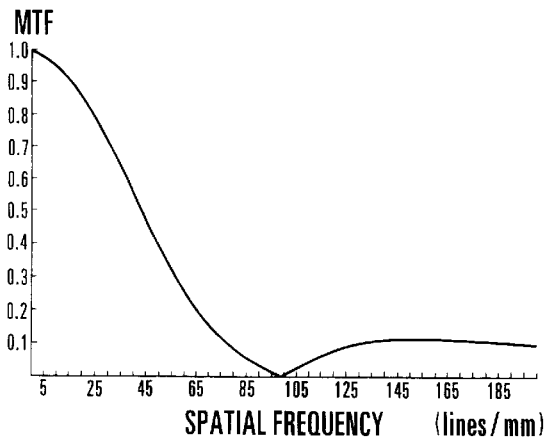
FIG. 88 is a graph showing an MTF curve obtained on the shorter focal length side of the photographing optical system according to Embodiment 11.
Figure 92:
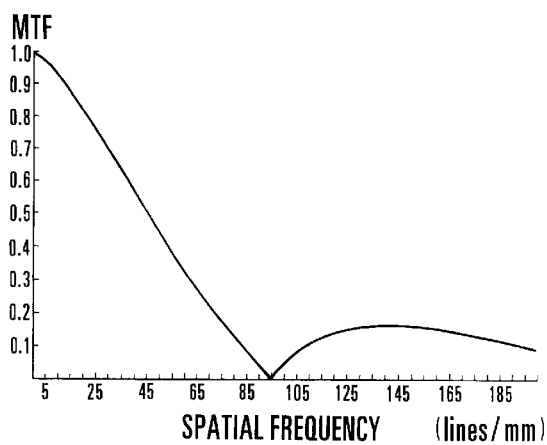
FIG. 92 is a graph showing an MTF curve obtained on the longer focal length side of the photographing optical system according to Embodiment 11.

The contour lines of the optical low-pass filter of Embodiment 11 (Expression (40)) are shown in FIG. 83, and the variation in shape of the optical low-pass filter relative to the rotational direction (the φ direction) for ρ=1 is shown in FIG. 84.

FIGS. 85, 86, 87 and 88 respectively show a wavefront aberration (λ=587.56 nm), a relative point spread (white), a relative line spread (white) and an MTF curve (white) which are obtained on a shorter focal length side of a photographing optical system in which the optical low-pass filter having the aforesaid shape is added to the surface r14 represented by the corresponding lens data shown in Embodiment 8. FIGS. 89, 90, 91 and 92 respectively show a wavefront aberration (λ=587.56 nm), a relative point spread (white), a relative line spread (white) and an MTF curve (white) which are obtained on a longer focal length side of such photographing optical system. As can be seen from FIGS. 85 to 92, Embodiment 11 can achieve an effect similar to the optical low-pass filter of Embodiment 8.

(Embodiment 12)

Figure 93:
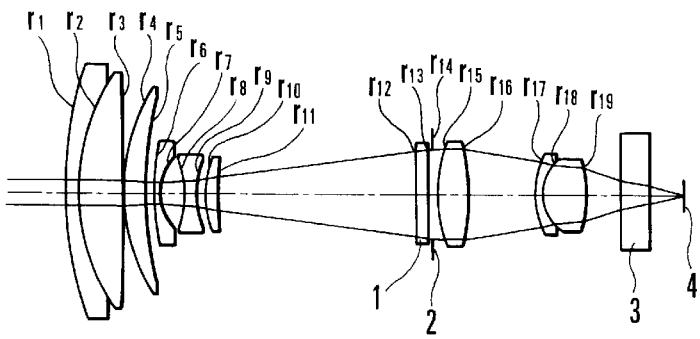
FIG. 93 is a diagrammatic view showing the essential portion of a photographing optical system according to Embodiment 12.
Figure 94:
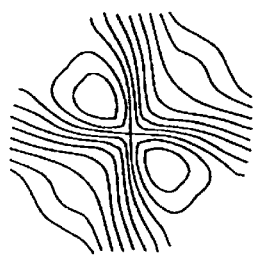
FIG. 94 is a view showing a wavefront aberration obtained on a shorter focal length side of the photographing optical system according to Embodiment 12.
Figure 95:
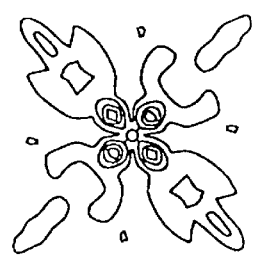
FIG. 95 is a view showing a relative point spread obtained on the shorter focal length side of the photographing optical system according to Embodiment 12.
Figure 96:
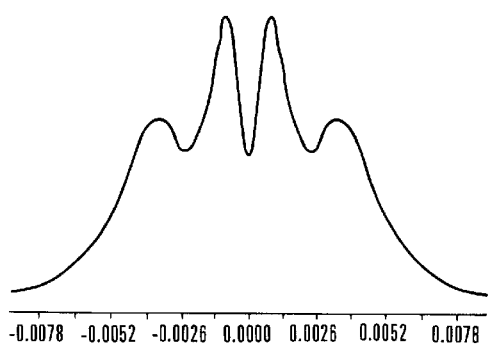
FIG. 96 is a view showing a relative line spread obtained on the shorter focal length side of the photographing optical system according to Embodiment 12.
Figure 97:
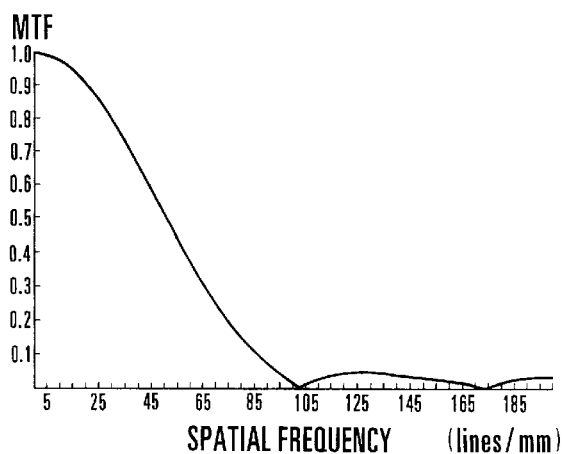
FIG. 97 is a graph showing an MTF curve obtained on the shorter focal length side of the photographing optical system according to Embodiment 12.

FIG. 93 shows Embodiment 12 of the present invention. In Embodiment 12, an optical low-pass filter having a gradient refractive index according to the present invention is added to a photographing optical system which includes the optical low-pass filter 1, the stop 2 and the infrared cut-filter 3. In FIG. 93, reference numeral 4 denotes a CCD.

Lens data for Embodiment 12 are shown in Table 5.

TABLE 5

| | Surface | Radius of Curvature | Separation | Refractive Index | Abbe Number |
|---|---|---|---|---|---|
| First Lens Unit | 1 | 47.30490 | 1.25000 | 1.847 | 23.9 |
| | 2 | 24.99391 | 4.90000 | 1.603 | 31.1 |
| | 3 | -422.44811 | 0.20000 | 1 | |
| | 4 | 22.00462 | 2.77000 | 1.697 | 55.1 |
| | 5 | 52.79733 | D1 | 1 | |
| Second Lens Unit | 6 | 36.64051 | 0.60000 | 1.773 | 49.6 |
| | 7 | 5.72766 | 2.89700 | 1 | |
| | 8 | -11.03929 | 1.50000 | 1.530 | 55.5 |
| | 9* | 9.01249 | 1.06000 | 1 | |

TABLE 5-continued

| | | | | | |
|---|---|---|---|---|---|
| | 10 | 12.47778 | 1.50000 | 1.847 | 23.9 |
| | 11 | 82.77610 | D2 | 1 | |
| LPF | 12 | 0.00000 | 1.00000 | 1.492 | 57.4 |
| | 13 | 0.00000 | 0.00000 | 1 | |
| Stop | 14 | 0.00000 | 1.20000 | 1 | |
| Third Lens Unit | 15* | 14.31644 | 3.40000 | 1.530 | 55.5 |
| | 16 | -30.92051 | D3 | 1 | |
| Fourth Lens Unit | 17 | 11.08409 | 0.80000 | 1.847 | 23.9 |
| | 18 | 5.18699 | 5.20000 | 1.530 | 55.5 |
| | 19* | -18.46439 | 4.00726 | 1 | |
| f | | 4.12 | | 66.48 mm | |
| F number | | 1.65 | | 2.843 | |
| D1 | | 0.950 | | 23.416 | |

TABLE 5-continued

| | | |
|---|---|---|
| D2 | 23.046 | 0.580 |
| D3 | 7.938 | 8.939 |
| 2ω | 57.2° | 3.9° |

If the direction of the optical axis of the photographing optical system and a direction perpendicular to the optical axis are respectively taken as a z-axis and an h-axis and the direction of propagation of light is taken as a positive direction, each axisymmetrical aspheric surface of Embodiment 12 is expressed by the following expression:

$$Z = \frac{h^2/R}{1 + \sqrt{1 - (1+k)(h/R)^2}} + ah^4 + bh^6 + ch^8 + dh^{10}, \quad (45)$$

where R is the radius of the osculating surface and k, a, b, c and d are aspheric coefficients.

Data for the respective aspheric surfaces are shown in Table 6.

| Surface | k | a | b | c | d |
|---|---|---|---|---|---|
| 9 | −4.91288e−01 | −7.61380e−05 | −6.24942e−06 | 8.03346e−07 | −2.43975e−08 |
| 15 | −9.08186e−01 | −6.54077e−05 | 6.23762e−08 | −2.94373e−09 | −1.30582e−11 |
| 19 | 6.23416e+00 | −2.18108e−05 | 1.14897e−06 | −5.82846e−07 | 1.72059e−08 |

The optical low-pass filter of Embodiment 12 is realized by adding a flat filter at the position of the stop 2 which is represented by the corresponding lens data shown in Embodiment 8.

If the coordinate system of the opening portion of the optical low-pass filter is the cylindrical coordinate system $(\rho, \phi)$ shown in FIG. 3, a gradient refractive index $N(\rho, \phi)$ of the optical low-pass filter of Embodiment 12 is expressed by the following expressions:

$$N(\rho,\phi)=N0+\delta N(\rho,\phi),$$

$$=N0+\Sigma Am \times Nrm(\rho) \times \cos\{m(\phi+\delta m)\},$$

$$m=2, 6, 10, \tag{46}$$

$$Nr2(\rho)=(a2\rho+b2\rho^2+c2\rho^3)\lambda, \tag{47}$$

$$Nr6(\rho)=(a6\rho+b6\rho^2)\lambda, \tag{48}$$

$$Nr10(\rho)=(a10\rho+b10\rho^2)\lambda. \tag{49}$$

The coefficients used in Embodiment 12 are shown in Table 7.

TABLE 7

| $A_2 = A_6 = A_{10} = 1$ | $\delta_2 = \delta_6 = \delta_{10} = \dfrac{\pi}{4}$ | |
|---|---|---|
| $a_2 = 9.5893$ | $a_6 = -0.0850$ | $a_{10} = -0.0170$ |
| $b_2 = -16.300$ | $b_6 = -0.2169$ | $b_{10} = -0.0434$ |
| $c_2 = 8.9421$ | | |

In the case of the optical low-pass filter which is realized by giving a variation in refractive index to an optical member, its wavefront aberration is:

$$W(\rho,\phi)=\delta N(\rho,\phi) \times d, \tag{50}$$

where d is the thickness of the optical low-pass filter.

FIGS. 94, 95, 96 and 97 respectively show a wavefront aberration ($\lambda$=587.56 nm), a relative point spread (white), a relative line spread (white) and an MTF curve (white) which are obtained on a shorter focal length side of the photographing optical system including the optical low-pass filter.

As is apparent from the above description of Embodiment 12, with an optical member having a gradient refractive index, it is possible to give a wavefront aberration to an incident pencil of rays while the incident pencil of rays is passing through different positions of the optical member. Accordingly, the optical member can be made to function as the optical low-pass filter according to the present invention.

The use of such a gradient refractive index is not limited to Embodiment 12, and the gradient refractive index can be used to produce a wavefront aberration which would be produced by the optical low-pass filter of any other embodiment.

In other words, the optical low-pass filter of the present invention can be realized only if one optical low-pass filter includes an area having a short optical path length (an area which advances the phase of an incident pencil of rays with respect to the central phase thereof) and an area having a long optical path length with respect to the optical path length of the center of the incident pencil of rays passing through the optical low-pass filter. Since the optical path length is given by the product of a distance "l" of the path traversed in a medium by a pencil of rays and a refractive index "n" of the medium, it is possible to set the optical path length to a desired value by making either or both of the distance "l" and the refractive index "n" different from those at the center.

(Embodiment 13)

Embodiment 13 of the present invention will be described below.

The optical low-pass filter of Embodiment 13 is added to the surface r14 of the third lens unit shown in FIG. 47 similarly to the optical low-pass filter of Embodiment 8, but Embodiment 13 differs in shape from Embodiment 8.

The shape $S(\rho, \phi)$ of the optical low-pass filter of Embodiment 13 is expressed by the following expressions:

$$S(\rho,\phi)=R(\rho) \times \cos\{2(\phi+k\rho+\delta)\}, \tag{51}$$

$$R(\rho)=(a\rho+b\rho^2+c\rho^3)\lambda. \tag{52}$$

The coefficients used in Embodiment 13 are shown in Table 8.

TABLE 8

| A = 1. |
|---|
| a = 4.0558 |
| b = −6.4442 |
| c = 3.7941 |
| $\delta = \dfrac{1}{4}\pi \qquad k = -\dfrac{1}{8}\pi$ |

Figure 98:
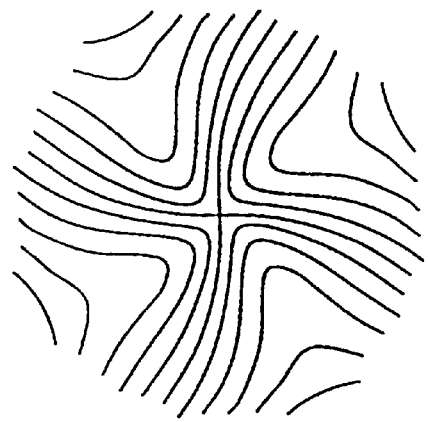
FIG. 98 is a view showing the contour lines of the shape of an optical low-pass filter according to Embodiment 13.
Figure 99:
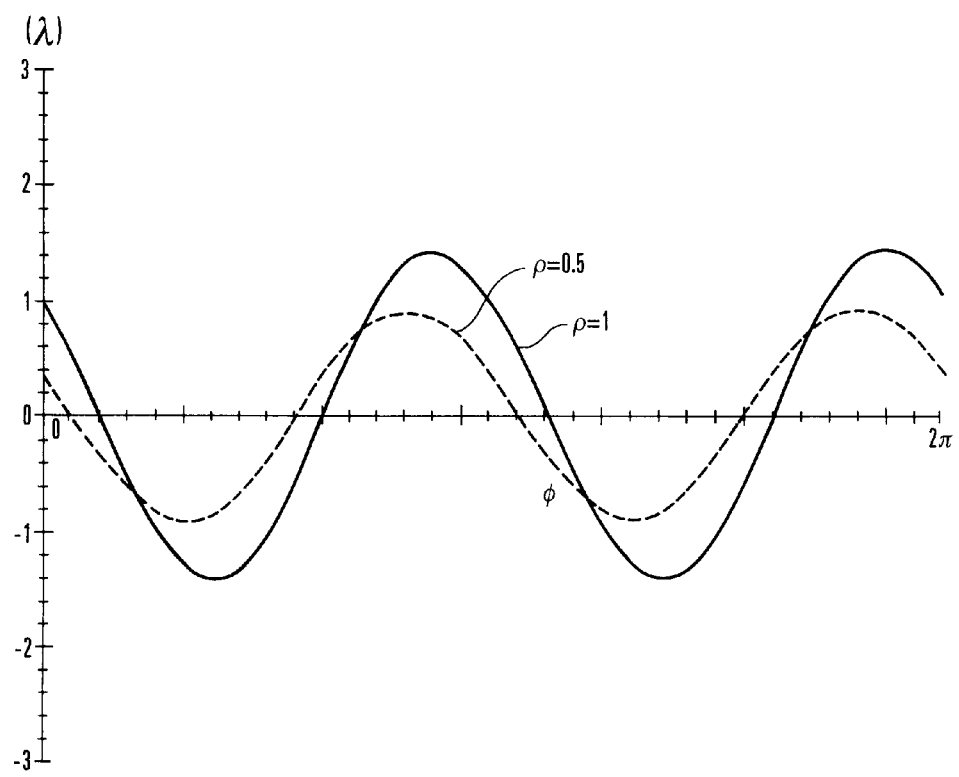
FIG. 99 is a view showing the variation in shape of the optical low-pass filter according to Embodiment 13, relative to the rotational direction of the optical low-pass filter.
Figure 100:
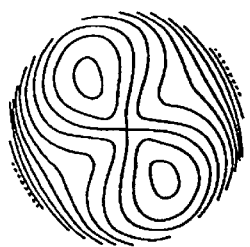
FIG. 100 is a view showing a wavefront aberration obtained on a shorter focal length side of the photographing optical system according to Embodiment 13.
Figure 101:
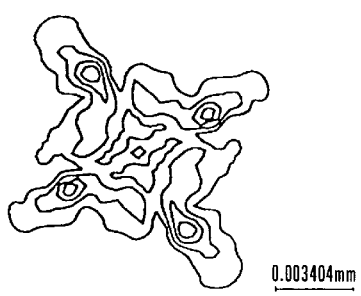
FIG. 101 is a view showing a relative point spread obtained on the shorter focal length side of the photographing optical system according to Embodiment 13.
Figure 102:
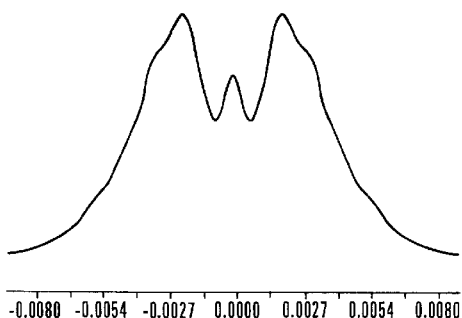
FIG. 102 is a view showing a relative line spread obtained on the shorter focal length side of the photographing optical system according to Embodiment 13.
Figure 103:
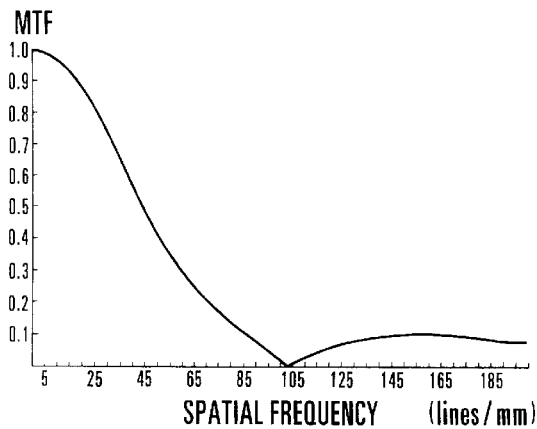
FIG. 103 is a graph showing an MTF curve obtained on the shorter focal length side of the photographing optical system according to Embodiment 13.
Figure 104:
FIG. 104 is a view showing a wavefront aberration obtained on a longer focal length side of the photographing optical system according to Embodiment 13.
Figure 105:
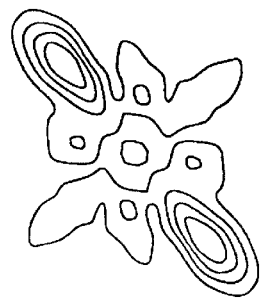
FIG. 105 is a view showing a relative point spread obtained on the longer focal length side of the photographing optical system according to Embodiment 13.
Figure 106:
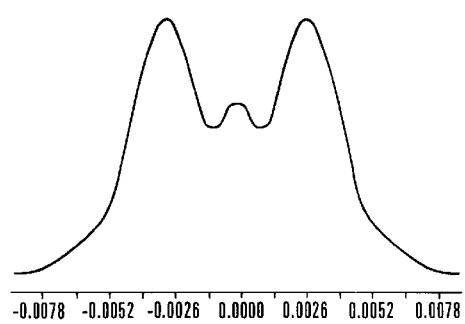
FIG. 106 is a view showing a relative line spread obtained on the longer focal length side of the photographing optical system according to Embodiment 13.
Figure 107:
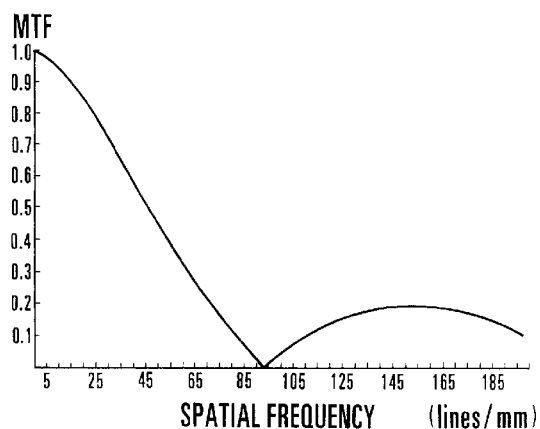
FIG. 107 is a graph showing an MTF curve obtained on the longer focal length side of the photographing optical system according to Embodiment 13.
Figure 108:
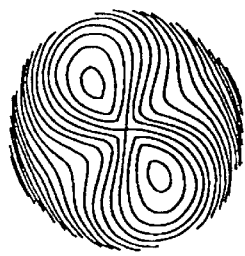
FIG. 108 is a view showing a wavefront aberration obtained on a shorter focal length side of a photographing optical system according to Embodiment 14.
Figure 109:
FIG. 109 is a view showing a relative point spread obtained on the shorter focal length side of the photographing optical system according to Embodiment 14.
Figure 110:
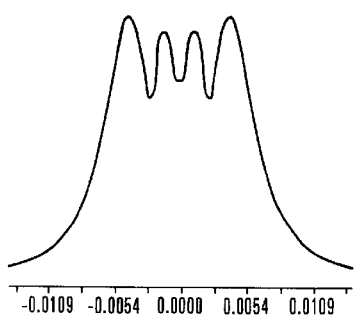
FIG. 110 is a view showing a relative line spread obtained on the shorter focal length side of the photographing optical system according to Embodiment 14.
Figure 111:
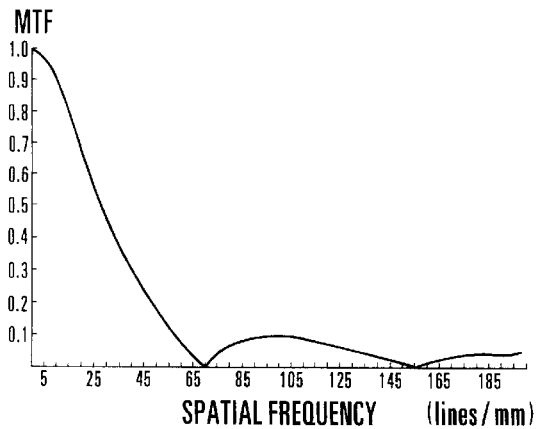
FIG. 111 is a graph showing an MTF curve obtained on the shorter focal length side of the photographing optical system according to Embodiment 14.
Figure 112:
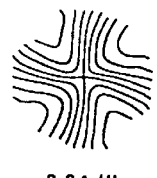
FIG. 112 is a view showing a wavefront aberration obtained on a longer focal length side of the photographing optical system according to Embodiment 14.
Figure 113:
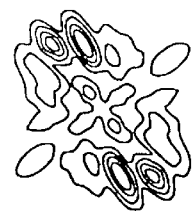
FIG. 113 is a view showing a relative point spread obtained on the longer focal length side of the photographing optical system according to Embodiment 14.
Figure 114:
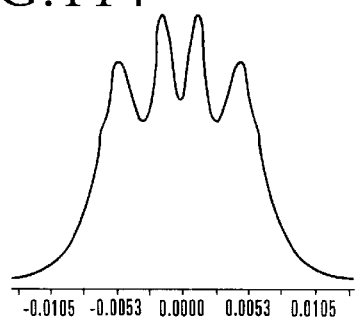
FIG. 114 is a view showing a relative line spread obtained on the longer focal length side of the photographing optical system according to Embodiment 14.
Figure 115:
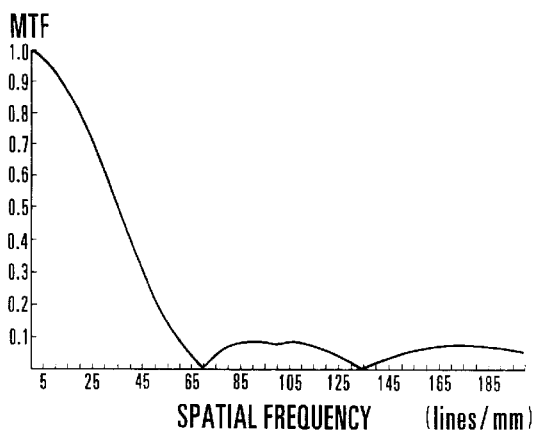
FIG. 115 is a graph showing an MTF curve obtained on the longer focal length side of the photographing optical system according to Embodiment 14.
Figure 116:
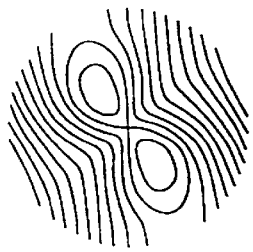
FIG. 116 is a view showing a wavefront aberration obtained on a shorter focal length side of a photographing optical system according to Embodiment 15.
Figure 117:
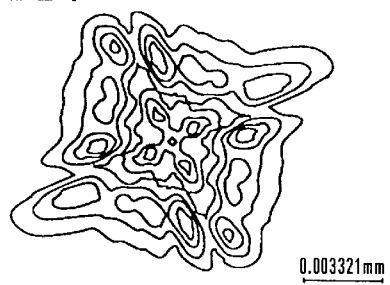
FIG. 117 is a view showing a relative point spread obtained on the shorter focal length side of the photographing optical system according to Embodiment 15.
Figure 118:
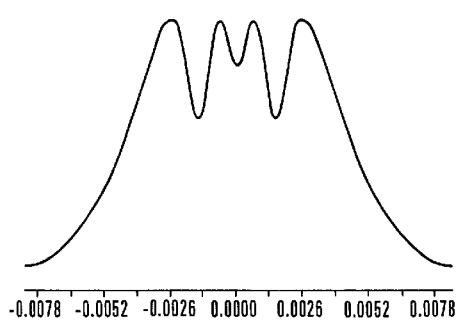
FIG. 118 is a view showing a relative line spread obtained on the shorter focal length side of the photographing optical system according to Embodiment 15.
Figure 119:
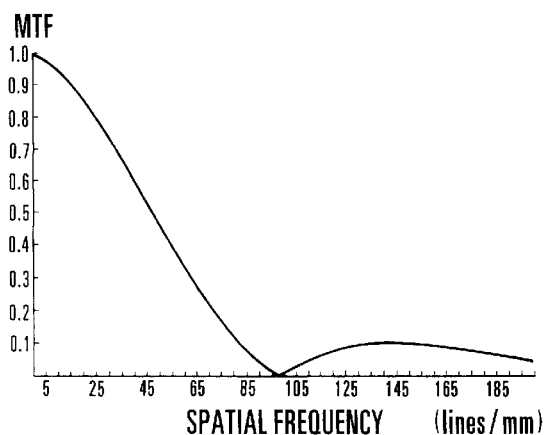
FIG. 119 is a graph showing an MTF curve obtained on the shorter focal length side of the photographing optical system according to Embodiment 15.
Figure 120:
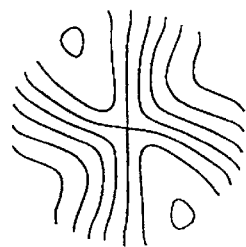
Figure 121:
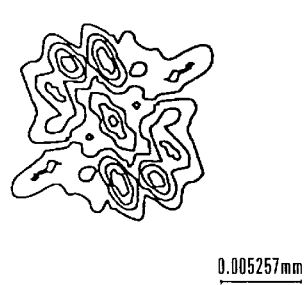
Figure 122:
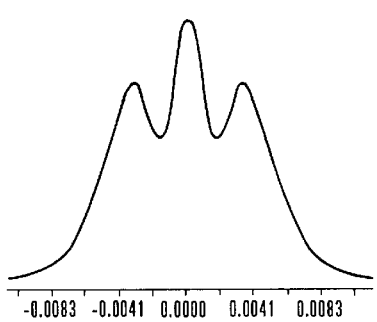
Figure 123:
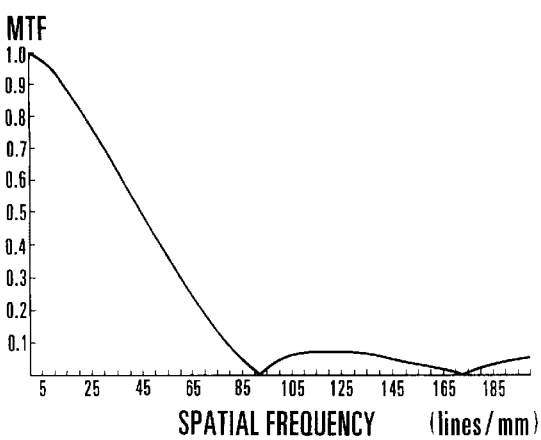

The contour lines of the optical low-pass filter of Embodiment 13 (Expression (51)) are shown in FIG. 98, and the variation in shape of the optical low-pass filter relative to the rotational direction (the $\phi$ direction) for $\rho$=0.5, 1 is shown in FIG. 99.

In the case of the optical low-pass filter which is realized as the amount of variation in shape of the lens, its wavefront aberration is:

$$W(\rho,\phi)=S(\rho,\phi) \times (1-n), \tag{53}$$

where n is the refractive index of the lens.

The wavefront aberration $W(\rho, \phi)$ which occurs in the optical low-pass filter of Embodiment 13 is expressed as:

$$W(\rho,\phi)=Wr(\rho) \times \cos[m\{\phi+kf(\rho)+\delta\}], \tag{54}$$

where m is an integer not less than 2, k and $\delta$ are constants, and $f(\rho)$ is an arbitrary function of $\rho$.

FIGS. 100, 101, 102 and 103 respectively show a wavefront aberration ($\lambda$=587.56 nm), a relative point spread (white), a relative line spread (white) and an MTF curve (white) relative to the x-direction, all of which are obtained on a shorter focal length side of the photographing optical system including the optical low-pass filter. FIGS. 104, 105, 106 and 107 respectively show a wavefront aberration (λ=587.56 nm), a relative point spread (white), a relative line spread (white) and an MTF curve (white) which are obtained on a longer focal length side of such photographing optical system.

As is apparent from the above description, the optical low-pass filter of Embodiment 13 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 13, the pixel pitch is 5 μm, and the cutoff frequency is 100 lines/mm.

(Embodiment 14)

In Embodiment 14 of the present invention, the cutoff frequency is set to a lower frequency than the cutoff frequency of Embodiment 13.

Embodiment 14 uses the same functional expressions that express the shape $S(\rho, \phi)$ of the optical low-pass filter of Embodiment 13, and the coefficients used in Embodiment 14 are the same as those shown in Table 7, except for the coefficient A (in Embodiment 14, A=1.7). Lens data are the same as those used in Embodiment 8. The shape of the optical low-pass filter of Embodiment 14 is such that the shape of the optical low-pass filter of Embodiment 13 is stretched in the direction of the z-axis.

FIGS. 108, 109, 110 and 111 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 112, 113, 114 and 115 respectively show a wavefront aberration (λ=587.56 nm), a relative point spread (white), a relative line spread (white) and an MTF curve (white) which are obtained on a longer focal length side of such photographing optical system. As can be seen from FIGS. 111 and 115, if the optical low-pass filter is formed into the aforesaid shape, the cutoff frequency is shifted to the lower frequency than the cutoff frequency of Embodiment 13.

Accordingly, it is possible to readily cope with a modification of the specifications (the number of pixels) of an image pickup element such as a CCD.

(Embodiment 15)

In Embodiment 15 of the present invention, a shape for providing a low-pass effect is formed at a surface different from the surface r14.

Embodiment 15 uses the same functional expressions that express the shape $S(\rho, \phi)$ of the optical low-pass filter of Embodiment 13, and the coefficients used in Embodiment 15 are the same as those shown in Table 7, except for the coefficient A (in Embodiment 15, A=1.35). The shape $S(\rho, \phi)$ of the optical low-pass filter is added to the aspheric surface r13 located in the vicinity of the stop 2. Lens data are the same as those used in Embodiment 8. The shape of the optical low-pass filter of Embodiment 15 is such that the shape of the optical low-pass filter of Embodiment 13 is stretched in the direction of the z-axis.

FIGS. 116, 117, 118 and 119 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 120, 121, 122 and 123 respectively show a wavefront aberration (λ=587.56 nm), a relative point spread (white), a relative line spread (white) and an MTF curve (white) which are obtained on a longer focal length side of such photographing optical system.

As is apparent from the above description, the optical low-pass filter may be added to any surface that is located in the vicinity of the stop 2. As shown in FIG. 74, the flat plate 5 which does not greatly affect the photographing optical system and to which the optical low-pass filter is added may be provided in the vicinity of the stop 2.

(Embodiment 16)

Figure 124:
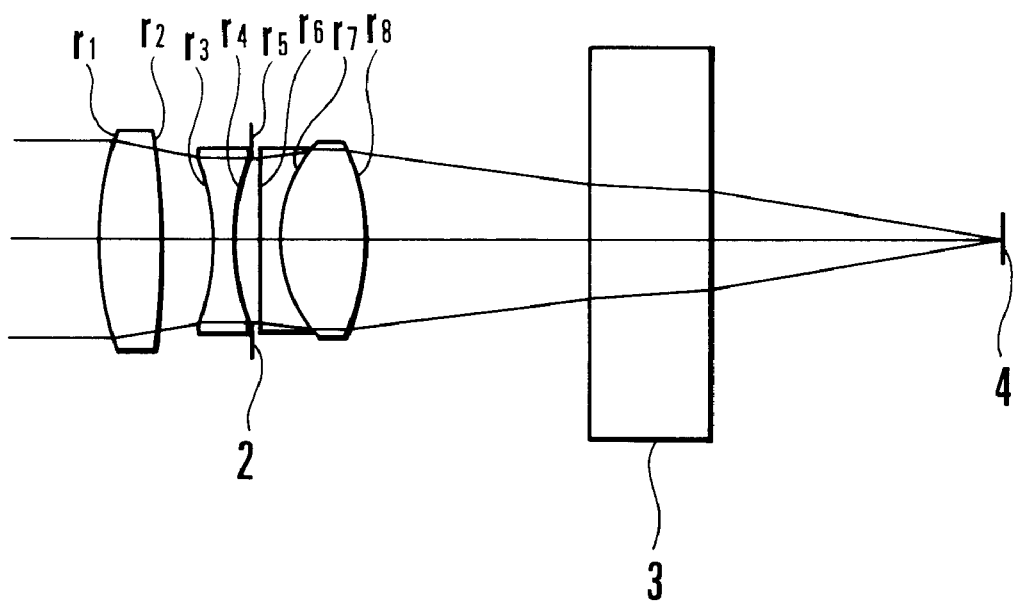
Figure 125:
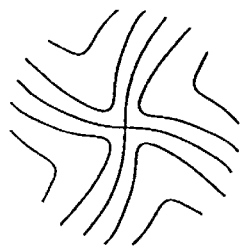
Figure 126:
Figure 127:
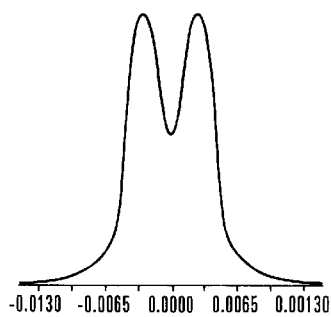
Figure 128:
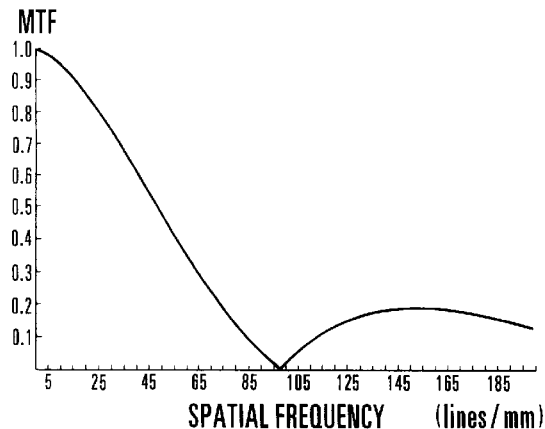
Figure 129:
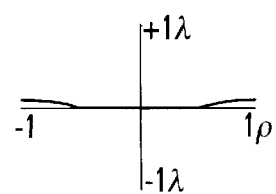
Figure 130:
Figure 131:
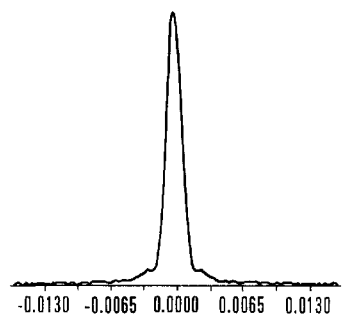

Embodiment 16 of the present invention is shown in FIG. 124. In Embodiment 16, the shape of an optical low-pass filter according to the present invention is added to the shape of a surface r6 which constitutes part of a single-focus lens in the photographing optical system shown in FIG. 124. The photographing optical system includes the stop 2 and the infrared cut-filter 3. Reference numeral 4 denotes a CCD.

Lens data for the photographing optical system are shown in Table 9.

TABLE 9

| Surface | Radius of Curvature | Separation | Refractive Index | Abbe Number |
| --- | --- | --- | --- | --- |
| 1 | 2.56858 | 0.50000 | 1.620 | 60.3 |
| 2 | −14.32671 | 0.45521 | 1 | |
| 3 | −2.67743 | 0.20000 | 1.575 | 41.5 |
| 4 | 1.95389 | 0.12908 | 1 | |
| 5 | 0.00000 | 0.10000 | 1 | |
| 6 | 28.28168 | 0.20000 | 1.569 | 56.3 |
| 7 | 1.26838 | 0.70000 | 1.620 | 60.3 |
| 8 | −2.23688 | | 1 | |

| f | 6 |
| --- | --- |
| F number | 3.5 |
| 2ω | 41.1° |

Embodiment 16 uses the same functional expressions that express the shape $S(\rho, \phi)$ of the optical low-pass filter of Embodiment 13, and the coefficients used in Embodiment 16 are the same as those shown in Table 8, except for the coefficient A (in Embodiment 16, A=0.74).

FIGS. 125, 126, 127 and 128 respectively show a wavefront aberration (λ=587.56 nm), a relative point spread (white), a relative line spread (white) and an MTF curve (white) which are obtained in the photographing optical system including the optical low-pass filter. FIGS. 129, 130, 131 and 132 respectively show a wavefront aberration (λ=587.56 nm), a relative point spread (white), a relative line spread (white) and an MTF curve (white) which are obtained in a photographing optical system (Table 8) which is not provided with the optical low-pass filter. As is apparent from the above description, the optical low-pass filter of the present invention is capable of readily coping with different kinds of lens systems having different characteristics (aberrations).

(Embodiment 17)

In Embodiment 17 of the present invention, the setting of the angle δ of the shape for providing a low-pass effect is changed.

Embodiment 17 uses the same functional expressions that express the shape $S(\rho, \phi)$ of the optical low-pass filter of Embodiment 12, and the coefficients used in Embodiment 17 are the same as those shown in Table 8, except for the coefficient A (in Embodiment 10, A=0.74). Lens data are the same as those used in Embodiment 16.

FIGS. 133, 134, 135 and 136 respectively show a wavefront aberration ($\lambda$=587.56 nm), a relative point spread (white), a relative line spread (white) and an MTF curve (white) which are obtained in a photographing optical system including an optical low-pass filter of $\delta$=22.5°.

FIGS. 137, 138, 139 and 140 respectively show a wavefront aberration ($\lambda$=587.56 nm), a relative point spread (white), a relative line spread (white) and an MTF curve (white) which are obtained in a photographing optical system including an optical low-pass filter of $\delta$=0° and A=0.79.

(Embodiment 18)

The shape $S(\rho, \phi)$ of the optical low-pass filter of Embodiment 18 of the present invention is expressed by the following expressions:

$$S(\rho,\phi)=R(\rho)\times\cos\{2(\phi+k\rho^2+\delta)\}, \tag{55}$$

$$R(\rho)=A\{15c\rho^6+(-20c+4b)\rho^4+(a+6c-3b)\rho^2\}\lambda \tag{56}$$

$$=A(a\rho^2+b(4\rho^4-3\rho^2)+c(15\rho^6-20\rho^2+6\rho^2))\lambda. \tag{57}$$

The coefficients used in Embodiment 18 are shown in Table 10.

TABLE 10

| A = 1. |  |
|---|---|
| a = 1.451742609 |  |
| b = −.5237310811 |  |
| c = .3263970323 |  |
| $\delta = \frac{1}{4}\pi$ | $k = -\frac{1}{8}\pi$ |

The contour lines of the optical low-pass filter of Embodiment 18 (Expression (55)) are shown in FIG. 141, and the variation in shape of the optical low-pass filter relative to the rotational direction (the $\phi$ direction) for $\rho$=0.5, 1 is shown in FIG. 142.

FIGS. 143, 144, 145 and 146 respectively show a wavefront aberration ($\lambda$=587.56 nm), a relative point spread (white), a relative line spread (white) and an MTF curve (white) which are obtained from a photographing optical system in which the optical low-pass filter having the aforesaid shape is added to the surface r4 represented by the corresponding lens data shown in Table 9 of Embodiment 16. As shown in FIG. 146, Embodiment 18 can achieve an effect similar to that of the optical low-pass filter of Embodiment 16.

(Embodiment 19)

In Embodiment 19, an optical low-pass filter having a gradient refractive index is added to the photographing optical system (zoom lens) shown in FIG. 93, similarly to Embodiment 12.

The gradient refractive index $N(\rho, \phi)$ of the optical low-pass filter of Embodiment 19 is expressed by the following expressions:

$$N(\rho,\phi)=N0+\delta N(\rho,\phi)=N0+Nr(\rho)\times\cos\{2(\phi+k\rho+\delta)\}, \tag{58}$$

$$Nr(\rho)=A(a\rho+b\rho^2+c\rho^3)\lambda. \tag{59}$$

The coefficients used in Embodiment 12 are shown in Table 11.

TABLE 11

| A = 1. |  |
|---|---|
| a = 6.053535057 | $\delta = \frac{1}{4}\pi$ |
| b = −9.618170038 |  |
| c = 5.66276797 | $k = -\frac{1}{8}\pi$ |

FIGS. 147, 148, 149 and 150 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 151, 152, 153 and 154 respectively show a wavefront aberration ($\lambda$=587.56 nm), a relative point spread (white), a relative line spread (white) and an MTF curve (white) which are obtained on a longer focal length side of such photographing optical system.

(Embodiment 20)

The optical low-pass filter of Embodiment 20 is added to the surface r14 of the third lens unit shown in FIG. 47 similarly to the optical low-pass filter of Embodiment 8, but Embodiment 20 differs in shape from any of the above-described embodiments.

The shape $S(\rho, \phi)$ of the optical low-pass filter of Embodiment 20 is expressed by the following expressions:

$$S(\rho, \phi) = \sum_m Am \times Rm(\rho) \times \cos\{m(\phi + km\rho + \delta m)\}, \tag{60}$$

$$m = 2, 6, 10,$$

$$m=2, 6, 10, \tag{60}$$

$$R2(\rho)=(a2\rho+b2\rho^2+c2\rho^3)\lambda, \tag{61}$$

$$R6(\rho)=(a6\rho+b6\rho^2)\lambda, \tag{62}$$

$$R10(\rho)=(a10\rho+b10\rho^2)\lambda, \tag{63}$$

where m is an integer and $\delta$m and km are constants.

The coefficients used in Embodiment 20 are shown in Table 12.

TABLE 12

| $A_2 = A_6 = A_{10} = 1$ | $K_2 = K_6 = K_{10} = -\frac{\pi}{8}$ | $\delta_2 = \delta_6 = \delta_{10} = \frac{\pi}{4}$ |
|---|---|---|
| $a_2 = -4.538$ | $a_6 = -0.606$ | $a_{10} = 0.121$ |
| $b_2 = 9.613$ | $b_6 = -0.238$ | $b_{10} = 0.048$ |
| $c_2 = -5.380$ |  |  |

The contour lines of the optical low-pass filter of Embodiment 20 (Expression (60)) are shown in FIG. 155, and the variation in shape of the optical low-pass filter relative to the rotational direction (the $\phi$ direction) for $\rho$=0.5, 1 is shown in FIG. 156.

In the case of the optical low-pass filter which is realized as the amount of variation in shape of the lens, its wavefront aberration is:

$$W(\rho,\phi)=S(\rho,\phi)\times(1-n), \tag{64}$$

where n is the refractive index of the lens.

The wavefront aberration $W(\rho, \phi)$ which occurs in the optical low-pass filter of Embodiment 20 is expressed as:

$$W(\rho, \phi) = \sum_m Am \times Wrm(\rho) \times \cos\{m(\phi + fm(\rho) + \delta m)\}, \quad (65)$$

where $fm(\rho)$ is an arbitrary function of $\rho$, m is an integer not less than 2, Am and $\delta m$ are constants.

FIGS. 157, 158, 159 and 160 respectively show a wavefront aberration ($\lambda$=587.56 nm), a relative point spread (white), a relative line spread (white) and an MTF curve (white) relative to the x-direction, all of which are obtained on a shorter focal length side of the photographing optical system including the optical low-pass filter. FIGS. 161, 162, 163 and 164 respectively show a wavefront aberration ($\lambda$=587.56 nm), a relative point spread (white), a relative line spread (white) and an MTF curve (white) which are obtained on a longer focal length side of such photographing optical system.

As is apparent from the above description, the optical low-pass filter of Embodiment 20 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 13, the pixel pitch is 5 $\mu$m, and the cutoff frequency is 100 lines/mm.

(Embodiment 21)

In Embodiment 21 of the present invention, the cutoff frequency is set to a lower frequency than the cutoff frequency of Embodiment 20.

Embodiment 21 uses the same functional expressions that express the shape $S(\rho, \phi)$ of the optical low-pass filter of Embodiment 20, and the coefficients used in Embodiment 21 are the same as those shown in Table 12, except for the coefficient Am (in Embodiment 20, $A_{10}=A_6=A_2=1.6$). Lens data are the same as those used in Embodiment 8. The shape of the optical low-pass filter of Embodiment 21 is such that the shape of the optical low-pass filter of Embodiment 20 is stretched in the direction of the z-axis.

FIGS. 165, 166, 167 and 168 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 169, 170, 171 and 172 respectively show a wavefront aberration ($\lambda$=587.56 nm), a relative point spread (white), a relative line spread (white) and an MTF curve (white) which are obtained on a longer focal length side of such photographing optical system. As can be seen from FIGS. 168 and 172, if the optical low-pass filter is formed into the aforesaid shape, the cutoff frequency is shifted to the lower frequency than the cutoff frequency of Embodiment 13. Accordingly, it is possible to readily cope with a modification of the specifications (the number of pixels) of an image pickup element such as a CCD.

(Embodiment 22)

In Embodiment 22 of the present invention, a shape for providing a low-pass effect is formed at a surface different from the surface r14.

Embodiment 22 uses the same functional expressions that express the shape $S(\rho, \phi)$ of the optical low-pass filter of Embodiment 20, and the coefficients used in Embodiment 22 are the same as those shown in Table 12, except for the coefficient Am (in Embodiment 22, $A_{10}=A_6=A_2=0.96$). The shape $S(\rho, \phi)$ of the optical low-pass filter is added to the aspheric surface r13 disposed in the vicinity of the stop 2. Lens data are the same as those used in Embodiment 8. The shape of the optical low-pass filter of Embodiment 22 is such that the shape of the optical low-pass filter of Embodiment 20 is squeezed by a small amount in the direction of the z-axis.

FIGS. 173, 174, 175 and 176 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 177, 178, 179 and 180 respectively show a wavefront aberration ($\lambda$=587.56 nm), a relative point spread (white), a relative line spread (white) and an MTF curve (white) which are obtained on a longer focal length side of such photographing optical system. As is apparent from the above description, the optical low-pass filter may be added to any surface that is located in the vicinity of the stop 2. As shown in FIG. 74, the flat plate 5 which does not greatly affect the photographing optical system and to which the optical low-pass filter is added may be provided in the vicinity of the stop 2.

(Embodiment 23)

In Embodiment 23 of the present invention, the setting of the angle $\delta$ of the shape for providing a low-pass effect is changed.

Embodiment 23 uses the same functional expressions that express the shape $S(\rho, \phi)$ of the optical low-pass filter of Embodiment 23, and the coefficients used in Embodiment 23 are the same as those shown in Table 12, except for the coefficient Am (in Embodiment 20, $A_{10}=A_6=A_2=1.05$). Lens data are the same as those used in Embodiment 8.

FIGS. 181, 182, 183 and 184 respectively show a wavefront aberration ($\lambda$=587.56 nm), a relative point spread (white), a relative line spread (white) and an MTF curve (white) which are obtained on a shorter focal length side of a photographing optical system including an optical low-pass filter of $\delta$=22.5°. FIGS. 185, 186, 187 and 188 respectively show a wavefront aberration ($\lambda$=587.56 nm), a relative point spread (white), a relative line spread (white) and an MTF curve (white) which are obtained on a longer focal length side of such photographing optical system.

(Embodiment 24)

The shape $S(\rho, \phi)$ of the optical low-pass filter of Embodiment 24 of the present invention is expressed by the following expressions:

$$S(\rho,\phi)=\Sigma Am \times Rm(\rho) \times \cos\{m(\phi+km\rho^2+\delta m)\},$$

$$m=2, 6, 10, \quad (66)$$

$$R2(\rho)=(b2\rho^2+c2\rho^3+d2\rho^4+f2\rho^6)\lambda, \quad (67)$$

$$R6(\rho)=(b6\rho^2+c6\rho^3+d6\rho^4)\lambda, \quad (68)$$

$$R10(\rho)=(b10\rho^2+c10\rho^3+d10\rho^4)\lambda. \quad (69)$$

The coefficients used in Embodiment 18 are shown in Table 13.

TABLE 13

| $A_2 = A_6 = A_{10} = 1$ | $K_2 = K_6 = K_{10} = -\frac{\pi}{8}$ | $\delta_2 = \delta_6 = \delta_{10} = \frac{\pi}{4}$ |
|---|---|---|
| $b_2 = -3.123$ | $b_6 = -3.069$ | $b_{10} = 0.614$ |
| $c_2 = -7.417$ | $c_6 = 3.708$ | $c_{10} = -0.742$ |
| $d_2 = 19.100$ | $d_6 = -1.535$ | $d_{10} = 0.307$ |
| $f_2 = -9.102$ | | |

The contour lines of the optical low-pass filter of Embodiment 24 (Expression (66)) are shown in FIG. 189, and the variation in shape of the optical low-pass filter relative to the rotational direction (the φ direction) for ρ=0.5, 1 is shown in FIG. 190.

FIGS. 191, 192, 193 and 194 respectively show a wavefront aberration (λ=587.56 nm), a relative point spread (white), a relative line spread (white) and an MTF curve (white) which are obtained on a shorter focal length side of a photographing optical system in which the optical low-pass filter having the aforesaid shape is added to the surface r4 represented by the corresponding lens data shown in Embodiment 8. FIGS. 195, 196, 197 and 198 respectively show a wavefront aberration (λ=587.56 nm), a relative point spread (white), a relative line spread (white) and an MTF curve (white) which are obtained on a longer focal length side of such photographing optical system.

(Embodiment 25)

In Embodiment 25, an optical low-pass filter having a gradient refractive index is added to the photographing optical system (zoom lens) shown in FIG. 93, similarly to each of Embodiments 12 and 19.

The gradient refractive index N(ρ, φ) of the optical low-pass filter of Embodiment 25 is expressed by the following expressions:

$$N(\rho,\phi)=N0+\delta N(\rho,\phi)=N0+\Sigma Am \times Nm(\rho) \times \cos(m\phi+km\rho+\delta m),$$

m=2, 6, 10, (70)

$$Nr2(\rho)=(a2\rho+b2\rho^2+c2\rho^3)\lambda, \quad (71)$$

$$Nr6(\rho)=(a6\rho+b6\rho^2)\lambda, \quad (72)$$

$$Nr10(\rho)=(b10\rho+b10\rho^2)\lambda. \quad (73)$$

The coefficients used in Embodiment 25 are shown in Table 14.

TABLE 14

| $A_2 = A_6 = A_{10} = 1$ | $K_2 = K_6 = K_{10} = -\frac{\pi}{8}$ | $\delta_2 = \delta_6 = \delta_{10} = \frac{\pi}{4}$ |
|---|---|---|
| $a_2 = -0.528$ | $a_6 = -0.667$ | $a_{10} = 0.133$ |
| $b_2 = 11.031$ | $b_6 = -0.261$ | $b_{10} = 0.052$ |
| $c_2 = -6.186$ | | |

FIGS. 199, 200, 201 and 202 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 203, 204, 205 and 206 respectively show a wavefront aberration (λ=587.56 nm), a relative point spread (white), a relative line spread (white) and an MTF curve (white) which are obtained on a longer focal length side of such photographing optical system.

(Embodiment 26)

Embodiment 26 of the present invention will be described below.

The optical low-pass filter of Embodiment 26 is added to the surface r14 of the third lens unit shown in FIG. 47 similarly to the optical low-pass filter of Embodiment 8, but Embodiment 26 differs in shape from Embodiment 8.

The shape S(ρ, φ) of the optical low-pass filter of Embodiment 26 is expressed by the following expressions:

$$S(\rho,\phi)=R(\rho) \times T(\phi), \quad (74)$$

$$R(\rho)=1.8\lambda\rho, \quad (75)$$

$$T(\phi)=\cos\{2(\phi+\pi/4)\}. \quad (76)$$

As expressed by Expressions (74) to (76), the shape of the optical low-pass filter of Embodiment 26 is a shape which is asymmetrical about the axis of the third lens unit and is added to the axisymmetrical shape thereof.

If the respective x- and y-axes of the coordinate system shown in FIG. 3 represent the directions of arrangement of the pixels of an image pickup element such as a CCD to be used with the photographing optical system, a radial direction (cos{2(φ+π/4)}=1) in which a phase advancing or retarding action is large inclines by 45° with respect to each of the directions of arrangement of the pixels. The contour lines of the optical low-pass filter (Expression (74)) taken in such radial direction are shown in FIG. 207.

In the case of the optical low-pass filter which is realized as the amount of variation in shape of the lens, its wavefront aberration is:

$$W(\rho,\phi)=S(\rho,\phi) \times (1-n), \quad (77)$$

where n is the refractive index of the lens.

FIGS. 208, 209, 210 and 211 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 212, 213, 214 and 215 respectively show a wavefront aberration (λ=587.56 nm), a relative point spread (white), a relative line spread (white) and an MTF curve (white) which are obtained on a longer focal length side of such photographing optical system.

As is apparent from the above description, the optical low-pass filter of Embodiment 26 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 26, the pixel pitch is 5 μm, and the cutoff frequency is 100 lines/mm.

FIG. 216 shows the contour lines of the optical low-pass filter taken in a radial direction in which (cos{4(φ+π/8)}=1) in which its phase advancing or retarding action is large if the period of the period function T(φ) relative to the rotational direction is made shorter and if $$R(\rho)=1.07\lambda\rho, \quad (78)$$

$$T(\phi)=\cos\{4(\phi+\pi/8)\}. \quad (79)$$

FIGS. 217, 218, 219 and 220 respectively show a wavefront aberration (λ=587.56 nm), a relative point spread (white), a relative line spread (white) and an MTF curve (white) which are obtained on a shorter focal length side of the photographing optical system including the optical low-pass filter.

As is apparent from the above description, by reducing the period of the period function $T(\phi)$, it is possible to reduce the value of MTF over the range of far higher spatial frequencies.

Incidentally, if the wavefront aberration which occurs in a pencil of rays passing through the optical low-pass filter is expressed by the following expressions:

$$W(\rho,\phi)=Wr(\phi) \times Wt(\phi), \tag{80}$$

where $Wr(\rho)$ is a wavefront aberration relative to the radial direction and $Wt(\phi)$ is a wavefront aberration relative to the rotational direction, the wavefront aberration at a predetermined radial position of the pencil of rays which has passed through the optical low-pass filter of Embodiment 26 satisfies the following conditions:

$$Wr(0.3)/Wr(0.6)>0, \tag{81}$$

$$Wr(0.6)/Wr(0.9)>0. \tag{82}$$

In Embodiment 26, since the optical low-pass filter is arranged so that such a wavefront aberration occurs, it is possible to achieve the aforesaid effect.

(Embodiment 27)

Embodiment 27 of the present invention provides an optical low-pass filter having a shape which is set to produce a wavefront aberration which satisfies the following conditions:

$$Wr'(0.3)/Wr'(0.6)>1, \tag{83}$$

$$Wr'(0.6)/Wr'(0.9)<1. \tag{84}$$

The shape $S(\rho, \phi)$ of the optical low-pass filter of Embodiment 27 is expressed by the following expressions:

$$S(\rho,\phi)=R(\rho) \times T(\phi), \tag{85}$$

$$R(\rho)=A_1(a_1\rho+b_1\rho^2+c_1\rho^3)\lambda, \tag{86}$$

$$T(\phi)=\cos\{2(\phi+\delta)\}. \tag{87}$$

The coefficients used in Embodiment 27 are shown in Table 15.

TABLE 15

$a_1 = 3.8111$
$b_1 = -4.7586$
$c_1 = 2.6334$
$A_1 = 1$
$\delta = \pi/4$

The contour lines and the cross section of the optical low-pass filter (Expression (86)) taken in a direction in which its phase advancing or retarding action is large are shown in FIGS. 221 and 222, respectively. Lens data are the same as those used in Embodiment 8.

Since the amount of variation in the wavefront aberration with respect to the direction in which the phase advancing or retarding action is large is proportional to the amount of variation in the shape of the optical low-pass filter, the amount of variation in the wavefront aberration is expressed as follows by using the amount of variation in the shape of the optical low-pass filter with respect to the direction in which the phase advancing or retarding action is large:

$$Wr(\rho)R(\rho), \tag{88}$$

$$Wr'(\rho)=\partial Wr(\rho)/\partial\rho \; \partial R(\rho)/\partial\rho. \tag{89}$$

Therefore, the following conditions are satisfied:

$$Wr'(0.3)/Wr'(0.6)=1.764>1, \tag{90}$$

$$Wr'(0.6)/Wr'(0.9)=0.574<1. \tag{91}$$

FIGS. 223, 224, 225 and 226 respectively show a wavefront aberration ($\lambda$=587.56 nm), a relative point spread (white), a relative line spread (white) and an MTF curve (white) which are obtained at F1.65 (fully open) on a shorter focal length side of the photographing optical system including the optical low-pass filter. FIGS. 227, 228, 229 and 230 respectively show a wavefront aberration ($\lambda$=587.56 nm), a relative point spread (white), a relative line spread (white) and an MTF curve (white) which are obtained in the photographing optical system which is set to F2.8. FIGS. 231, 232, 233 and 234 respectively show a wavefront aberration ($\lambda$=587.56 nm), a relative point spread (white), a relative line spread (white) and an MTF curve (white) which are obtained in the photographing optical system which is set to F5.6. By satisfying the aforesaid Expressions (83) and (84) in this manner, it is possible to obtain a stable low-pass effect for each F number.

(Embodiment 28)

In Embodiment 28 of the present invention, the cutoff frequency is set to a lower frequency than the cutoff frequency of Embodiment 27.

Embodiment 28 uses the same functional expressions that express the shape $S(\rho, \phi)$ of the optical low-pass filter of Embodiment 27, and the coefficients used in Embodiment 28 are the same as those shown in Table 15, except for the coefficient A (in Embodiment 28, A=1.875). Lens data are the same as those used in Embodiment 8. The shape of the optical low-pass filter of Embodiment 28 is such that the shape of the optical low-pass filter of Embodiment 27 is stretched in the direction of the z-axis (in the direction of the optical axis).

FIGS. 235, 236, 237 and 238 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 239, 240, 241 and 242 respectively show a wavefront aberration ($\lambda$=587.56 nm), a relative point spread (white), a relative line spread (white) and an MTF curve (white) which are obtained on a longer focal length side of such photographing optical system. As can be seen from FIGS. 238 and 242, if the optical low-pass filter is formed into the aforesaid shape, the cutoff frequency is shifted to the lower frequency than the cutoff frequency of Embodiment 27. Accordingly, it is possible to readily cope with a modification of the specifications (the number of pixels) of an image pickup element such as a CCD.

(Embodiment 29)

In Embodiment 29 of the present invention, a shape for providing a low-pass effect is formed at a surface different from the surface r14.

Embodiment 29 uses the same functional expressions that express the shape $S(\rho, \phi)$ of the optical low-pass filter of Embodiment 27, and the coefficients used in Embodiment 29 are the same as those shown in Table 15, except for the coefficient A (in Embodiment 29, A=0.963). The shape $S(\rho, \phi)$ of the optical low-pass filter is added to the aspheric surface r13 located in the vicinity of the stop 2. Lens data are the same as those used in Embodiment 8. The shape of the optical low-pass filter of Embodiment 29 is such that the shape of the optical low-pass filter of Embodiment 26 is squeezed by a small amount in the direction of the z-axis.

FIGS. 243, 244, 245 and 246 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 247, 248, 249 and 250 respectively show a wavefront aberration (λ=587.56 nm), a relative point spread (white), a relative line spread (white) and an MTF curve (white) which are obtained on a longer focal length side of such photographing optical system. As is apparent from the above description, the optical low-pass filter may be added to any surface that is located in the vicinity of the stop 2. As shown in FIG. 74, the optical low-pass filter may be added to the flat plate 5 which is provided in the vicinity of the stop 2.

(Embodiment 30)

Embodiment 30 of the present invention will be described below. In Embodiment 30, similarly to Embodiment 16, the shape of an optical low-pass filter is added to the shape of the surface r6 which constitutes part of a single-focus lens in the photographing optical system shown in FIG. 124, but Embodiment 30 differs in shape from Embodiment 16.

Embodiment 30 uses the same functional expressions that express the shape S(ρ, φ) of the optical low-pass filter of Embodiment 27, and the coefficients used in Embodiment 30 are the same as those used in Embodiment 16, except for the coefficient A (in Embodiment 30, A=0.75).

FIGS. 251, 252, 253 and 254 respectively show a wavefront aberration (λ=587.56 nm), a relative point spread (white), a relative line spread (white) and an MTF curve (white) which are obtained from the photographing optical system including the optical low-pass filter. As is apparent from the above description, the optical low-pass filter of the present invention can readily be applied to different kinds of lens systems having different characteristics (aberrations), by modifying the design (or shape) of the optical low-pass filter.

(Embodiment 31)

In Embodiment 31 of the present invention, the setting of the angle δ is changed.

Embodiment 31 uses the same functional expressions that express the shape S(ρ, φ) of the optical low-pass filter of Embodiment 27, and the coefficients used in Embodiment 31 are the same as those shown in Table 3, except for the coefficient A (in Embodiment 31, A=0.65). Lens data are the same as those used in Embodiment 16. In Embodiment 31, since δ=22.5°, a radial direction (cos{2(φ+δ)}=1) in which its phase advancing or retarding action is large inclines by 22.5° with respect to each of the directions of arrangement of the pixels.

FIGS. 255, 256, 257 and 258 respectively show a wavefront aberration (λ=587.56 nm), a relative point spread (white), a relative line spread (white) and an MTF curve (white) which are obtained from the photographing optical system including the optical low-pass filter.

FIGS. 259, 260, 261 and 262 respectively show a wavefront aberration (λ=587.56 nm), a relative point spread (white), a relative line spread (white) and an MTF curve (white) which are obtained from a photographing optical system including an optical low-pass filter of A=0.625 and δ=0°.

As is apparent from the above description, by varying the phase δ and the coefficient A relative to the rotational direction, the cutoff frequency is set to a predetermined spatial frequency so that an effect equivalent to that of Embodiment 29 can be achieved.

(Embodiment 32)

The shape S(ρ, φ) of the optical low-pass filter of Embodiment 32 of the present invention is expressed by the following expressions:

$$S(\rho,\phi)=R(\rho) \times T(\phi), \tag{92}$$

$$R(\rho)=A_2(a_2\rho^2+b_2(4\rho^4-3\rho^2)+c_2(15\rho^6-20\rho^4+6\rho^2)+d_2(56\rho^8+105\rho^6+60\rho^4-10\rho^2))\lambda \tag{93}$$

$$=\{56A_2d_2\rho^8+(-105A_2d_2+15A_2c_2)\rho^6+(-20A_2c_2+60A_2d_2+4A_2b_2)\rho^4+(6A_2c_2-10A_2d_2+A_2a_2-3A_2b_2)\rho^6\}\lambda, \tag{94}$$

$$T(\phi)=\cos\{2(\phi+\delta)\}. \tag{95}$$

The coefficients used in Embodiment 32 are shown in Table 16.

TABLE 16

| |
|---|
| $a_2$ = 1.48247238 |
| $b_2$ = −.495094038 |
| $c_2$ = .309258846 |
| $d_2$ = .190947222 |
| $A_2$ = 1. |
| δ = π/4 |

The contour lines and the cross section of the optical low-pass filter (Expression (93)) taken in a direction (cos(2φ+δ)=1) in which its phase advancing or retarding action is large are shown in FIGS. 263 and 264, respectively.

Thus, the following conditions are satisfied:

$$Wr'(0.3)/Wr'(0.6)=9.065>1, \tag{96}$$

$$Wr'(0.6)/Wr'(0.9)=0.172<1. \tag{97}$$

FIGS. 265, 266, 267 and 268 respectively show a wavefront aberration (λ=587.56 nm), a relative point spread (white), a relative line spread (white) and an MTF curve (white) which are obtained from a photographing optical system in which the optical low-pass filter having the aforesaid shape is added to the surface r4 represented by the corresponding lens data shown in Table 9 of Embodiment 16. As shown in FIG. 268, Embodiment 32 can achieve an effect similar to that of the optical low-pass filter of Embodiment 30.

(Embodiment 33)

In Embodiment 33, an optical low-pass filter having a gradient refractive index is added to the photographing optical system (zoom lens) shown in FIG. 93, similarly to Embodiment 12.

The gradient refractive index N(ρ, φ) of the optical low-pass filter of Embodiment 33 is expressed by the following expressions:

$$N(\rho,\phi)=N0+\delta N(\rho,\phi)=N0+Nr(\rho) \times Nt(\phi), \tag{98}$$

$$Nr(\rho)=A_2(a_2\rho+b_2\rho^2+c_2\rho^3)\lambda, \tag{99}$$

$$Nt(\phi)=\cos(2\phi+\delta). \tag{100}$$

The coefficients used in Embodiment 33 are shown in Table 17.

TABLE 17

| |
|---|
| $a_2$ = 3.8111 |
| $b_2$ = −4.7586 |
| $c_2$ = 2.6334 |

TABLE 17-continued $A_2 = 1.125$
$\delta = \pi/4$

In the case of the optical low-pass filter which is realized by giving a variation in refractive index to an optical member, its wavefront aberration is $$W(\rho,\phi)=\delta N(\rho,\phi) \times d, \quad (101)$$

where d is the thickness of the optical low-pass filter.

A wavefront aberration relative to the direction in which the phase advancing or retarding action is large is proportional to a function $Nr(\rho)$, and the amount of variation in the wavefront aberration is proportional to the amount of variation in the shape of the optical low-pass filter. Therefore, $$Wr(\rho) Nr(\rho), \quad (102)$$

$$Wr'(\rho)=\partial Wr(\rho)/\partial \rho \; \partial Nr(\rho)/\partial \rho, \quad (103)$$

so that the following conditions are satisfied:

$$Wr'(0.3)/Wr'(0.6)=1.764>1, \quad (104)$$

$$Wr'(0.6)/Wr'(0.9)=0.574<1. \quad (105)$$

FIGS. 269, 270, 271 and 272 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 273, 274, 275 and 276 respectively show a wavefront aberration ($\lambda$=587.56 nm), a relative point spread (white), a relative line spread (white) and an MTF curve (white) which are obtained on a longer focal length side of such photographing optical system.

As is apparent from the above description of Embodiment 33, with an optical member having a gradient refractive index, it is possible to give a wavefront aberration to an incident pencil of rays while the incident pencil of rays is passing through different positions of the optical member. Accordingly, the optical member can be made to function as the optical low-pass filter according to the present invention.

(Embodiment 34)

Embodiment 34 of the present invention will be described below. The optical low-pass filter of Embodiment 34 is added to the surface r14 of the third lens unit shown in FIG. 47 similarly to the optical low-pass filter of Embodiment 8, but Embodiment 34 differs in shape from Embodiment 8.

Furthermore, in Embodiment 34, the shape of the optical low-pass filter is set to produce a wavefront aberration which satisfies the following conditions:

$$Wr(0.25)/Wr(0.75)<0, \quad (158)$$

$$Wr'(0.3)/Wr'(0.6)<0. \quad (159)$$

The shape $S(\rho, \phi)$ of the optical low-pass filter of Embodiment 34 is expressed by the following expressions:

$$S(\rho,\phi)=R(\rho) \times T(\phi), \quad (106)$$

$$R(\rho)=A_2(a_2\rho+b_2\rho^2+c_2\rho^3+d_2\rho^4+e_2\rho^5)\lambda, \quad (107)$$

$$T(\phi)=\cos\{2(\phi+\delta)\}. \quad (108)$$

The coefficients used in Embodiment 34 are shown in Table 18.

TABLE 18

$a_2 = 3.7868$
$b_2 = 3.0715$
$c_2 = -14.235$
$d_2 = -7.5854$
$e_2 = 13.647$
$A_2 = 1$
$\delta = \pi/4$ The contour lines and the cross section of the optical low-pass filter (Expression (107)) taken in a radial direction in which its phase advancing or retarding action is large are shown in FIGS. 277 and 278, respectively.

The optical low-pass filter of Embodiment 34 satisfies the following conditions:

$$Wr(0.25)/Wr(0.75)=-1.502<0, \quad (109)$$

$$Wr'(0.3)/Wr'(0.6)=-0.278<0. \quad (110)$$

FIGS. 279, 280, 281 and 282 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 283, 289, 285 and 286 respectively show a wavefront aberration ($\lambda$=587.56 nm), a relative point spread (white), a relative line spread (white) and an MTF curve (white) which are obtained on a longer focal length side of such photographing optical system.

As is apparent from the above description, the optical low-pass filter of Embodiment 34 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 34, the pixel pitch is 5 $\mu$m, and the cutoff frequency is 100 lines/mm.

(Embodiment 35)

In Embodiment 35, the cutoff frequency is set to a lower frequency than the cutoff frequency of Embodiment 34.

Embodiment 35 uses the same functional expressions that express the shape $S(\rho, \phi)$ of the optical low-pass filter of Embodiment 34, and the coefficients used in Embodiment 34 are the same as those shown in Table 18, except for the coefficient A (in Embodiment 35, A=1.422). Lens data are the same as those used in Embodiment 8. The shape of the optical low-pass filter of Embodiment 35 is such that the shape of the optical low-pass filter of Embodiment 34 is stretched in the direction of the z-axis.

FIGS. 287, 288, 289 and 290 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 291, 292, 293 and 294 respectively show a wavefront aberration ($\lambda$=587.56 nm), a relative point spread (white), a relative line spread (white) and an MTF curve (white) which are obtained on a longer focal length side of such photographing optical system. As can be seen from FIGS. 290 and 294, if the optical low-pass filter is formed into the aforesaid shape, the cutoff frequency is shifted to the lower frequency than the cutoff frequency of Embodiment 34. Accordingly, it is possible to readily cope with a modification of the specifications (the number of pixels) of an image pickup element such as a CCD.

(Embodiment 36)

In Embodiment 36, a shape for providing a low-pass effect is formed at a surface different from the surface r14.

Embodiment 36 uses the same functional expressions that express the shape $S(\rho, \phi)$ of the optical low-pass filter of Embodiment 34, and the coefficients used in Embodiment 36 are the same as those shown in Table 18, except for the coefficient A (in Embodiment 36, A=0.978). The shape $S(\rho, \phi)$ of the optical low-pass filter is added to the aspheric surface r13 located in the vicinity of the stop 2. Lens data are the same as those used in Embodiment 8. The shape of the optical low-pass filter of Embodiment 36 is such that the shape of the optical low-pass filter of Embodiment 34 is squeezed by a small amount in the direction of the z-axis.

FIGS. 295, 296, 297 and 298 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 299, 300, 301 and 302 respectively show a wavefront aberration ($\lambda$=587.56 nm), a relative point spread (white), a relative line spread (white) and an MTF curve (white) which are obtained on a longer focal length side of such photographing optical system. As is apparent from the above description, the optical low-pass filter may be added to any surface that is located in the vicinity of the stop 2. As shown in FIG. 74, the optical low-pass filter may be added to the flat plate 5 which is provided in the vicinity of the stop 2.

(Embodiment 37)

In Embodiment 37, the shape of an optical low-pass filter is added to the shape of the surface r6 which constitutes part of a single-focus lens in the photographing optical system of Embodiment 16 shown in FIG. 124.

Embodiment 37 uses the same functional expressions that express the shape $S(\rho, \phi)$ of the optical low-pass filter of Embodiment 34, and the coefficients used in Embodiment 37 are the same as those shown in Table 18, except for the coefficient A (in Embodiment 37, A=0.462).

FIGS. 303, 304, 305 and 306 respectively show a wavefront aberration ($\lambda$=587.56 nm), a relative point spread (white), a relative line spread (white) and an MTF curve (white) which are obtained from the photographing optical system including the optical low-pass filter. As is apparent from the above description, the optical low-pass filter of the present invention can readily be applied to different kinds of lens systems having different characteristics (aberrations).

(Embodiment 38)

In Embodiment 38, the setting of the angle $\delta$ is changed.

Embodiment 38 uses the same functional expressions that express the shape $S(\rho, \phi)$ of the optical low-pass filter of Embodiment 34, and the coefficients used in Embodiment 38 are the same as those shown in Table 18, except for the coefficient A (in Embodiment 38, A=0.489). Lens data are the same as those used in Embodiment 16. In Embodiment 38, since $\delta$=30°, a radial direction (cos ($\phi+\delta$)=1) in which its phase advancing or retarding action is large inclines by 30° with respect to each of the directions of arrangement of the pixels.

FIGS. 307, 308, 309 and 310 respectively show a wavefront aberration ($\lambda$=587.56 nm), a relative point spread (white), a relative line spread (white) and an MTF curve (white) which are obtained from the photographing optical system including the optical low-pass filter.

FIGS. 311, 312, 313 and 314 respectively show a wavefront aberration ($\lambda$=587.56 nm), a relative point spread (white), a relative line spread (white) and an MTF curve (white) which are obtained from a photographing optical system including an optical low-pass filter of $\delta$=60°.

As is apparent from the above description, by varying the phase $\delta$ and the coefficient A relative to the rotational direction, the cutoff frequency is set to a predetermined spatial frequency so that an effect equivalent to that of Embodiment 37 can be achieved.

(Embodiment 39)

The shape $S(\rho, \phi)$ of the optical low-pass filter of Embodiment 39 is expressed by the following expressions:

$$S(\rho,\phi)=R(\rho)\times T(\phi), \tag{111}$$

$$R(\rho)=\{A(a\rho^2+b(4\rho^4-3)\rho^2+c(15\rho^4-20\rho^2+6)\rho^2+d(56\rho^6+105\rho^4+60\rho^2-10)\rho^2\}\lambda \tag{112}$$

$$=\{56A_2d_2\rho^8+(15A_2c_2-105A_2d_2)\rho^6+(-20A_2c_2+60A_2d_2+4A_2b_2)\rho^4+(A_2a_2+6A_2c_2-3A_2b_2-10A_2d_2)\rho^2\}\lambda, \tag{113}$$

$$T(\phi)=\cos\{2(\phi+\delta)\}. \tag{114}$$

The coefficients used in Embodiment 39 are shown in Table 19.

TABLE 19

| |
|---|
| $a_2$ = 0.1342 |
| $b_2$ = -0.1909 |
| $c_2$ = 0.1467 |
| $d_2$ = -0.04997 |
| $A_2$ = 1 |
| $\delta$ = $\pi/4$ |

The contour lines and the cross section of the optical low-pass filter (Expression (112)) taken in a direction ($\cos\{2(\phi+\delta)\}=1$) in which the phase advancing or retarding action of Embodiment 39 is large are shown in FIGS. 315 and 316, respectively.

Thus, the following conditions are satisfied:

$$Wr(0.25)/Wr(0.75)=-1.770<0, \tag{115}$$

$$Wr'(0.3)/Wr'(0.6)=-0.624<0. \tag{116}$$

FIGS. 317, 318, 319 and 320 respectively show a wavefront aberration ($\lambda$=587.56 nm), a relative point spread (white), a relative line spread (white) and an MTF curve (white) which are obtained from a photographing optical system in which the optical low-pass filter having the aforesaid shape is added to the surface r4 represented by the corresponding lens data shown in Table 9 of Embodiment 16. As shown in FIG. 320, Embodiment 39 can achieve an effect similar to that of the optical low-pass filter of Embodiment 37.

(Embodiment 40)

In Embodiment 40, an optical low-pass filter having a gradient refractive index is added to a photographing optical system (zoom lens) in a manner similar to Embodiment 33.

The gradient refractive index $N(\rho, \phi)$ of the optical low-pass filter of Embodiment 40 is expressed by the following expressions:

$$N(\rho,\phi)=N0+\delta N(\rho,\phi)=N0+Nr(\rho)\times Nt(\phi), \tag{117}$$

$$Nr(\rho)=A_2(a_2\rho+b_2\rho^2+c_2\rho^3+d_2\rho^5)\lambda, \tag{118}$$

$$Nt(\phi)=\cos\{2(\phi+\delta)\}. \tag{119}$$

The coefficients used in Embodiment 40 are shown in Table 20.

TABLE 20

$a_2 = 3.7868$
$b_2 = 3.0715$
$c_2 = -14.235$
$d_2 = -7.5854$
$e_2 = 13.647$
$A_2 = 1.067$
$\delta = \pi/4$ The optical low-pass filter of Embodiment 40 satisfies the following conditions:

$$Wr(0.25)/Wr(0.75) = -1.502 < 0, \tag{120}$$

$$Wr'(0.3)/Wr'(0.6) = -0.278 < 0. \tag{121}$$

FIGS. 321, 322, 323 and 324 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 325, 326, 327 and 328 respectively show a wavefront aberration (λ=587.56 nm), a relative point spread (white), a relative line spread (white) and an MTF curve (white) which are obtained on a longer focal length side of such photographing optical system.

Each of Expressions (81) to (84), (158) and (159) is expressed as the ratio of wavefront aberrations relative to the radial direction, but such a wavefront aberration is proportional to the radial shape of the optical low-pass filter if the gradient refractive index thereof is uniform, or to the gradient refractive index if the shape of the optical low-pass filter is flat.

Therefore, each of Expressions (81) to (84), (158) and (159) may also be expressed as follows:

if the gradient refractive index is uniform, $$Wr(0.3)/Wr(0.6) = R(0.3)/R(0.6) > 0, \tag{81}$$

$$Wr(0.6)/Wr(0.9) = R(0.6)/R(0.9) > 0, \tag{82}$$

$$Wr'(0.3)/Wr'(0.6) = R'(0.3)/R'(0.6) > 1, \tag{83}$$

$$Wr'(0.6)/Wr'(0.9) = R'(0.6)/R'(0.9) < 1, \tag{84}$$

$$Wr(0.25)/Wr(0.75) = R(0.25)/R(0.75) < 0, \tag{158}$$

$$Wr'(0.3)/Wr'(0.6) = R'(0.3)/R'(0.6) < 0; \tag{159}$$

and if the shape of the optical low-pass filter is flat, $$Wr(0.3)/Wr(0.6) = Nr(0.3)/Nr(0.6) > 0, \tag{81}$$

$$Wr(0.6)/Wr(0.9) = Nr(0.6)/Nr(0.9) > 0, \tag{82}$$

$$Wr'(0.3)/Wr'(0.6) = Nr'(0.3)/Nr'(0.6) > 1, \tag{83}$$

$$Wr'(0.6)/Wr'(0.9) = Nr'(0.6)/Nr'(0.9) < 1, \tag{84}$$

$$Wr(0.25)/Wr(0.75) = Nr(0.25)/Nr(0.75) < 0, \tag{158}$$

$$Wr'(0.3)/Wr'(0.6) = Nr'(0.3)/Nr'(0.6) < 0, \tag{159}$$

where $R'(\rho) = \partial R(\rho)/\partial \rho$ and $Nr'(\rho) = \partial Nr(\rho)/\partial \rho$.

(Embodiment 41)

Embodiment 41 of the present invention will be described below. The optical low-pass filter of Embodiment 34 is added to the surface r14 of the third lens unit shown in FIG. 47 similarly to the optical low-pass filter of Embodiment 8, but Embodiment 41 differs in shape from Embodiment 8.

The shape $S(\rho, \phi)$ of the optical low-pass filter of Embodiment 41 is expressed by the following expressions:

$$S(\rho, \phi) = \begin{cases} A \cdot R2(\rho)\cos\{2(\phi + \delta 2)\} \cdot \lambda, & 0 \le \rho \le 0.31, \\ A \cdot R4(\rho)\cos\{4(\phi + \delta 4)\} \cdot \lambda, & 0.31 \le \rho \le 1, \end{cases} \tag{122}$$

$$R2(\rho) = 0.56 \sin(\pi \rho'), \tag{123}$$

$$R4(\rho) = 2.969\rho'' + 2.408\rho''^2 - 11.16\rho''^3 - 5.947\rho''^4 + 10.70\rho''^5, \tag{124}$$

$A=1$, $\rho'=\rho/0.31$, $\delta 2=\pi/4$, $\delta 4=\pi/8$, $\rho''=(\rho-0.31)/0.69$.

The shape of the optical low-pass filter of Embodiment 41 is a shape which is asymmetrical about the axis of the third lens unit and is added to the axisymmetrical shape thereof.

The contour lines of the optical low-pass filter represented by Expression (122) is shown in FIG. 329.

In the case of the optical low-pass filter which is realized as the amount of variation in shape of the lens, its wavefront aberration is $$W(\rho, \phi) = S(\rho, \phi) \times (1-n), \tag{125}$$

where n is the refractive index of the lens.

Therefore, the wavefront aberration $W(\rho, \phi)$ which occurs in the wavefront of the pencil of rays transmitted through the optical low-pass filter of Embodiment 41 is expressed by the following expression:

$$W(\rho, \phi) = \tag{126}$$
$$\begin{cases} A \cdot \lambda \cdot (n-1) \cdot R2(\rho)\cos\{2(\phi + \delta 2)\}, & 0 \le \rho \le 0.31, \\ A \cdot \lambda \cdot (n-1) \cdot R4(\rho)\cos\{4(\phi + \delta 4)\}, & 0.31 \le \rho \le 1, \end{cases}$$

In the optical low-pass filter of Embodiment 41, since the period of its phase advancing and retarding areas is made shorter in its periphery than in its center, it is possible to achieve a stable low-pass effect even if a photographing lens system into which to incorporate the optical low-pass filter has a variable F number.

FIGS. 330, 331, 332 and 333 respectively show a wavefront aberration (λ=587.56 nm), a relative point spread (white), a relative line spread (white) and an MTF curve (white) which are obtained at F1.65 (fully open) on a shorter focal length side of the photographing optical system including the optical low-pass filter. FIGS. 334, 335, 336 and 337 respectively show a wavefront aberration (λ=587.56 nm), a relative point spread (white), a relative line spread (white) and an MTF curve (white) which are obtained at F2.8 on the shorter focal length side of the photographing optical system. FIGS. 338, 339, 340 and 341 respectively show a wavefront aberration (λ=587.56 nm), a relative point spread (white), a relative line spread (white) and an MTF curve (white) which are obtained at F5.6 on the shorter focal length side of the photographing optical system. FIGS. 342, 343, 344 and 345 respectively show a wavefront aberration (λ=587.56 nm), a relative point spread (white), a relative line spread (white) and an MTF curve (white) which are obtained at F1.65 (fully open) on a longer focal length side of the photographing optical system.

As is apparent from the above description, the optical low-pass filter of Embodiment 41 produces a wavefront aberration analogous to its shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 41, the pixel pitch is 5 μm, and the cutoff frequency is 100 lines/mm.

(Embodiment 42)

In Embodiment 42, the cutoff frequency is set to a lower frequency than the cutoff frequency of the optical low-pass filter in the photographing optical system (zoom lens) of Embodiment 41.

The optical low-pass filter of Embodiment 42 uses the same functional expressions that express the shape $S(\rho, \phi)$ of the optical low-pass filter of Embodiment 41, and the coefficients used in Embodiment 42 are the same as those used in Expression (122), except for the coefficient A (in Embodiment 42, A=1.4). Lens data are the same as those used in Embodiment 8. The shape of the optical low-pass filter of Embodiment 42 is such that the shape of the optical low-pass filter of Embodiment 41 is stretched in the direction of the z-axis (in the direction of the optical axis).

FIGS. 346, 347, 348 and 349 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 350, 351, 352 and 353 respectively show a wavefront aberration (λ=587.56 nm), a relative point spread (white), a relative line spread (white) and an MTF curve (white) which are obtained on a longer focal length side of such photographing optical system. As can be seen from FIGS. 349 and 353, if the optical low-pass filter is formed into the shape used in Embodiment 42, the cutoff frequency is shifted to the lower frequency than the cutoff frequency of the optical low-pass filter of Embodiment 41. Accordingly, it is possible to readily cope with a modification of the specifications (the number of pixels) of an image pickup element such as a CCD.

(Embodiment 43)

In Embodiment 43, a shape for providing a low-pass effect is formed at a surface different from the surface r14 used in each of Embodiments 41 and 42.

Embodiment 43 uses the same functional expressions that express the shape $S(\rho, \phi)$ of the optical low-pass filter of the optical low-pass filter of Embodiment 41, but the shape $S(\rho, \phi)$ of the optical low-pass filter is added to the aspheric surface r13 located in the vicinity of the stop 2. The other lens data are the same as those used in Embodiment 8.

FIGS. 354, 355, 356 and 357 respectively show a wavefront aberration (λ=587.56 nm), a relative point spread (white), a relative line spread (white) and an MTF curve (white) which are obtained on a shorter focal length side of the photographing optical system including the optical low-pass filter. FIGS. 358, 359, 360 and 361 respectively show a wavefront aberration (λ=587.56 nm), a relative point spread (white), a relative line spread (white) and an MTF curve (white) which are obtained on a longer focal length side of such photographing optical system.

As is apparent from the above description, a surface to which to add the optical low-pass filter is not limited to a specific surface, but it is desirable to provide the optical low-pass filter in the vicinity of the stop 2. For example, as shown in FIG. 74, the flat plate 5 which does not greatly affect the photographing optical system and to which the optical low-pass filter is added may be provided in the vicinity of the stop 2.

(Embodiment 44)

The shape $S(\rho, \phi)$ of the optical low-pass filter of Embodiment 44 of the present invention is expressed by the following expressions:

$$S(\rho,\phi)=\{S1(\rho,\phi)+S2(\rho,\phi)\}\lambda, \tag{127}$$

$$S1(\rho, \phi) = \begin{cases} R1(\rho)\cos\{2(\phi + \delta 2)\}, & 0 \leq \rho \leq 0.335, \\ 0, \ \delta 2 = \pi/4, & 0.335 \leq \rho \leq 1, \end{cases} \tag{128}$$

$$R1(\rho)=61.64\rho^2-197.75\rho^3-1113.7\rho^4+5523.4\rho^5-8012.9\rho^6+9798.5\rho^7-13079.0\rho^8, \tag{129}$$

$$S2(\rho, \phi) = \begin{cases} 0, \ \delta 4 = \pi/8, & 0 \leq \rho < 0.24, \\ R2(\rho)\cos\{4(\phi + \delta 4)\}, & 0.24 \leq \rho \leq 1, \end{cases} \tag{130}$$

$$R2(\rho)=79.56\rho'^2-603.3\rho'^3+1704.8\rho'^4-1679.3\rho'^5-1105.9\rho'^6+3187.3\rho'^7-1607.6\rho'^8,$$

$$\rho'=\rho-0.24. \tag{131}$$

The contour lines of the optical low-pass filter (Expression (127)) are shown in FIG. 362.

FIGS. 363, 364, 365 and 366 respectively show a wavefront aberration (λ=587.56 nm), a relative point spread (white), a relative line spread (white) and an MTF curve (white) which are obtained at F1.65 (fully open) on a shorter focal length side of a photographing optical system, in which system the optical low-pass filter having the aforesaid shape is added to the surface r14 represented by the corresponding lens data shown in Embodiment 8. FIGS. 367, 368, 369 and 370 respectively show a wavefront aberration (λ=587.56 nm), a relative point spread (white), a relative line spread (white) and an MTF curve (white) which are obtained at F2.8 on the shorter focal length side of the photographing optical system. FIGS. 371, 372, 373 and 374 respectively show a wavefront aberration (λ=587.56 nm), a relative point spread (white), a relative line spread (white) and an MTF curve (white) which are obtained at F5.6 on the shorter focal length side of the photographing optical system. FIGS. 375, 376, 377 and 378 respectively show a wavefront aberration (λ=587.56 nm), a relative point spread (white), a relative line spread (white) and an MTF curve (white) which are obtained at F1.65 (fully open) on a longer focal length side of the photographing optical system. As is apparent from the above description, the optical low-pass filter of Embodiment 44 can achieve an effect similar to that of the optical low-pass filter of Embodiment 41.

(Embodiment 45)

In Embodiment 45, an optical low-pass filter having a gradient refractive index is added to the photographing optical system (zoom lens) shown in FIG. 93, similarly to Embodiment 12.

The gradient refractive index $N(\rho, \phi)$ of the optical low-pass filter of Embodiment 45 is expressed by the following expressions:

$$N(\rho,\phi)=N0+\delta N(\rho,\phi), \tag{132}$$

$$\delta N(\rho, \phi) = \begin{cases} Nr2(\rho)\cos(2\phi + \delta 2)\lambda, & 0 \leq \rho \leq 0.31, \\ Nr4(\rho)\cos(4\phi + \delta 4)\lambda, & 0.31 \leq \rho \leq 1, \end{cases}$$

$$Nr2(\rho)=0.64 \sin(\pi\rho'), \ \rho'=\rho/0.31, \tag{134}$$

$$Nr4(\rho)=3.414\rho''+2.769\rho''^2-12.83\rho''^3-6.839\rho''^4+12.305\rho''^5,$$

$$\rho''=(\rho-0.31)/0.69. \tag{135}$$

In the case of the optical low-pass filter which is realized by giving a variation in refractive index to an optical member, its wavefront aberration is $$W(\rho,\phi)=\delta N(\rho,\phi)\times d, \tag{136}$$

where d is the thickness of the optical low-pass filter.

FIGS. 379, 380, 381 and 382 respectively show a wavefront aberration ($\lambda$=587.56 nm), a relative point spread (white), a relative line spread (white) and an MTF curve (white) which are obtained on a shorter focal length side of the photographing optical system including the optical low-pass filter. FIGS. 383, 384, 385 and 386 respectively show a wavefront aberration ($\lambda$=587.56 nm), a relative point spread (white), a relative line spread (white) and an MTF curve (white) which are obtained on a longer focal length side of such photographing optical system.

As is apparent from the above description of Embodiment 45, with an optical member having a gradient refractive index, it is possible to give a wavefront aberration to an incident pencil of rays while the incident pencil of rays is passing through different positions of the optical member. Accordingly, the optical member can be made to function as the optical low-pass filter according to the present invention.

In each of the optical low-pass filters of Embodiments 41 to 45 of the present invention, since the period of the area having a phase advancing action and that of the area having a phase retarding actions are varied with respect to the radial direction (the $\rho$ direction), it is possible to effectively decrease MTF relative to high-frequency components even if the stop 2 is placed in any state from a fully open state to the state of a maximum reduced aperture, and it is also possible to realize a low-pass effect on various kinds of stops having different aperture shapes.

(Embodiment 46)

In the optical low-pass filter of Embodiment 46 is, its basic shape to be represented by a continuous function is approximated by a step-formed shape having a step size smaller than the wavelength of light. The shape of the optical low-pass filter of Embodiment 46 is expressed by the following expression using a step function which converts a continuous function into a step-formed shape:

$$S(\rho,\phi)=\text{Step}(A\times R(\rho)\times T(\phi)). \tag{b 137}$$

The step function is, for example, a function which converts a continuous function into a step-formed shape having a ¼ pitch of the wavelength of light.

The shape of the optical low-pass filter of Embodiment 46 is added to the flat plate 1 provided in the vicinity of the stop 2 in the photographing optical system shown in FIG. 6. The contour lines which represent the shape of the optical low-pass filter of Embodiment 46 are shown in FIG. 387. In FIG. 387, the region defined by each contour line corresponds to a step size of ¼ wavelength, and the portion between each contour line and an adjacent contour line is flat. In the shape of the optical low-pass filter shown in FIG. 387, with respect to the center of the opening portion, each portion marked "+" is projected to a maximum degree, whereas each portion marked "−" is dented to a maximum degree.

As shown in FIG. 387, if the shape of the optical low-pass filter of Embodiment 46 of the present invention is represented by a cylindrical coordinate system the origin of which corresponds to the center of the opening portion, the shape of the optical low-pass filter stepwise changes in the rotational direction from a portion having a phase advancing action on the phase of an incident wavefront (any of the portions marked "−") to a portion having a phase retarding action on the phase of the incident wavefront (the adjacent one of the portions marked "+").

A numerical example of the basic shape of the surface of the optical low-pass filter according to Embodiment 46 is shown below:

$$S1(\rho,\phi)=A1\times R1(\rho)\times\cos 2(\phi), \tag{138}$$

where A1 is a constant and $\lambda$ is a wavelength.

$$R1(\rho)=(3.534\rho+2.867\rho^2-13.267\rho^3-7.079\rho^4+12.737\rho^5)\lambda,$$

$$0\leq\rho\leq1, 0\leq\phi\leq2\pi. \tag{139}$$

In the optical low-pass filter of Embodiment 46, portions which have phase advancing actions on the phase of an incident wavefront and portions which have phase retarding actions on the phase of the incident wavefront are provided in the radial direction as well. The radial basic shape for $\phi$=0 is shown in FIG. 388, and the actual cross-sectional shape of the optical low-pass filter is shown in FIG. 389.

FIG. 390 shows the contour lines of the point spread in an image plane, and FIG. 391 shows the line spread obtained at F1.65 by performing an addition in a direction perpendicular to the pixel-array direction of a CCD. FIGS. 392 and 393 show the respective MTF curves of the optical low-pass filter of Embodiment 46 which is set to F1.65 and F5.6.

The continuous shape of the optical low-pass filter of any other embodiment can be approximated by a step-formed shape such as that of the optical low-pass filter of Embodiment 46, and the optical performance obtained from the step-formed shape is approximately equivalent to that obtained from the continuous shape.

(Embodiment 47)

FIG. 394 shows Embodiment 47 of the present invention. The optical system of Embodiment 47 is composed of a single molded lens L10 made of a PMMA material, and focuses a single wavelength onto the CCD 4. Lens data are shown in Table 21.

TABLE 21

| Surface | Radius of Curvature | Separation | Refractive Index (n) | Abbe Number |
|---|---|---|---|---|
| 1* | 22.85257 | 5.00000 | 1.49171 | 57.4 |
| 2 | −130.97850 | | | | f=40 F2.0

The shape of the reference surface of a surface r1 and the rotationally symmetrical aspheric terms of the surface r1 are expressed by the following expressions:

$$S0(\rho) = \frac{(r\rho)^2 / R}{1 + \sqrt{1 - (1+k)(r\rho/R)^2}}, \tag{140}$$

$$ASP(\rho)=a(r\rho)^4+b(r\rho)^6+c(r\rho)^8+d(r\rho)^{10}, \tag{141}$$

where R is a radius of the osculating surface and k, a, b, c and d are aspheric coefficients.

The aspheric coefficients are shown in Table 22.

TABLE 22

| k | a | b | c | d |
|---|---|---|---|---|
| −7.83171e−01 | −2.09422e−07 | −2.66250e−09 | 0 | 0 |

In Embodiment 47, a shape which has an optical low-pass action (a low-pass shape) is added to the surface r1 so that the lens L10 itself can be made to function as an optical low-pass filter.

This low-pass shape ($V(\rho, \phi)$) is expressed by the following expressions:

$$V(\rho,\phi)=R(\rho)\cos\{2(\phi+\pi/4)\}, \quad (142)$$

$$R(\rho)=A_V(a_V\rho+b_V\rho^2+c_V\rho^3+d_V\rho^4+e_V\rho^5)\lambda. \quad (143)$$

Each coefficient of the low-pass shape of Embodiment 47 is shown in Table 23.

TABLE 23

$A_v = 1$
$a_v = 3.16$, $b_v = 2.58$, $c_v = -11.9$, $d_v = -6.34$
$e_v = 11.4$

The contour lines of the low-pass shape expressed by Expressions (142) and (143) are shown in FIG. 395.

The wavefront aberration given to a passing pencil of rays by the low-pass shape is $$W(\rho,\phi)=V(\rho,\phi)\times(1-n) \quad (144)$$

where n is the refractive index of the lens L10.

FIGS. 396, 397, 398 and 399 respectively show a wavefront aberration, a relative point spread, a relative line spread and an MTF curve which are obtained from the optical system ($\lambda$=587.56 nm) of Embodiment 47. FIGS. 400, 401, 402 and 403 respectively show a wavefront aberration, a relative point spread, a relative line spread and an MTF curve which are obtained from an optical system in which no low-pass shape is formed at the surface r1.

As is apparent from the above description, the optical system of Embodiment 47 produces a wavefront aberration analogous to the low-pass shape to separate a point image into a plurality of point images in an image plane so that the value of MTF can be effectively reduced over the range of spatial frequencies higher than a predetermined spatial frequency at which the value of MTF is made zero. The predetermined spatial frequency (cutoff frequency) at which the value of MTF is made zero is obtained from the pitch of the pixels of an image pickup element such as a CCD to be used. In Embodiment 47, the pixel pitch is 5 $\mu$m, and the cutoff frequency is 100 lines/mm.

However, a lens actually molded on the basis of such design values undergoes complicated deformation and non-uniform distribution of an inner refractive index owing to molding conditions and the like. FIGS. 404 to 406 respectively show in contour line an example of deformation of the surface r1 (E1), an example of deformation of a surface r2 (E2), and an example of non-uniform distribution of the inner refractive index (E3).

Such error shape can be approximated by using Zernike's polynomial represented by $$E(\rho,\phi)=c1+c2\rho\cos(\phi)+c3\rho\sin(\phi)+c4\rho^2\cos(2\phi)+c5(2\rho^2-1)+c6\rho^2\sin(2\phi)+c7\rho^3\cos(3\phi)+c8(3\rho^3-2\rho)\cos(\phi)+$$

$$c9(3\rho^3-2\rho)\sin(\phi)+c10\rho^3\sin(3\phi)+c11\rho^4\cos(4\phi)+c12(4\rho^4-3\rho^2)\cos(2\phi)+c13(6\rho^4-6\rho^2+1)+$$

$$c14(4\rho^4-3\rho^2)\sin(2\phi)+c15\rho^4\sin(4\phi)+c16\rho^5\cos(5\phi)+c17(5\rho^5-4\rho^3)\cos(3\phi)+c18(10\rho^5-12\rho^3+3\rho)\cos(\phi)+$$

$$c19(10\rho^5-12\rho^3+3\rho)\sin(\phi)+c20(5\rho^5-4\rho^3)\sin(3\phi)+c21\rho^5\sin(5\phi)+\ldots \quad (145)$$

Tables 24, 25 and 26 respectively show the coefficients obtained by approximating the shapes shown in FIGS. 404 to 406 by using Expression (145).

TABLE 24

| c1 | −0.3538 | c8 | 0.0384 | c15 | −0.0129 |
|---|---|---|---|---|---|
| c2 | 0.1128 | c9 | 0.0606 | c16 | −0.0243 |
| c3 | 0.0657 | c10 | 0.1647 | c17 | −0.3672 |
| c4 | −0.2735 | c11 | −0.1535 | c18 | 0.0795 |
| c5 | 0.0875 | c12 | 0.0331 | c19 | 0.0048 |
| c6 | −0.0593 | c13 | 0.0028 | c20 | −0.0113 |
| c7 | 0.0580 | c14 | −0.0060 | c21 | −0.0045 |

TABLE 25

| c1 | −0.7858 | c8 | 0.1091 | c15 | 0 |
|---|---|---|---|---|---|
| c2 | 0.4593 | c9 | −0.0329 | c16 | 0 |
| c3 | 0.2183 | c10 | 0 | c17 | 0 |
| c4 | −0.8197 | c11 | 0 | c18 | 0 |
| c5 | −0.3799 | c12 | 0 | c19 | 0 |
| c6 | 0.5056 | c13 | 0 | c20 | 0 |
| c7 | 0.2297 | c14 | 0 | c21 | 0 |

TABLE 26

| c1 | −0.0175 | c8 | 0.0024 | c15 | 0.0035 |
|---|---|---|---|---|---|
| c2 | 0 | c9 | 0.0028 | c16 | 0 |
| c3 | −0.0058 | c10 | 0 | c17 | 0 |
| c4 | −0.0147 | c11 | −0.0023 | c18 | 0 |
| c5 | 0.1097 | c12 | −0.0029 | c19 | 0 |
| c6 | 0 | c13 | 0 | c20 | 0 |
| c7 | 0 | c14 | 0 | c21 | 0 |

The respective deformations (E1 and E2) of the surfaces r1 and r2 are obtained by measuring the wavefronts reflected at the surfaces r1 and r2 by means of an interferometer, and the non-uniformity (E3) of the inner gradient refractive index is obtained by measuring a transmitted wavefront by means of an interferometer while taking E1 and E2 into account.

Such a molding error can be prevented by slowly molding the lens L10 in such a manner as to prevent non-uniformity from occurring in its refractive index, while correcting the shapes of the respective surfaces r1 and r2, but this molding method incurs an increase in cost. For this reason, in accordance with Embodiment 47 of the present invention, the aforesaid low-pass shape and a shape for correcting the molding error are simultaneously formed at the surface r1 to which to add the aforesaid low-pass shape.

The shape for correcting the molding error will be described below. Since the shape of the surface r1 is to be corrected, the error (E1) of the surface r1 is corrected by adding a shape having signs opposite to the signs of the shape shown in FIG. 404 to the molding shape of a mold. The error (E2) of the surface r2 is corrected by setting the amount of error of the surface r2 and redesigning the surface r1 on the basis of the amount of error. The non-uniformity of the inner gradient refractive index (E3) is corrected by setting the amount of error of a medium or approximating the inner gradient refractive index by converting the inner gradient refractive index into the amount of error of the shape of the surface r1 or r2, and redesigning the surface r1 on the basis of the amount of error which has been set in this manner. The mold is prepared by adding the low-pass shape shown in FIG. 395 to the thus-redesigned shape of the surface r1. The error occurring during molding is fully corrected by molding an optical low-pass filter by using such mold.

FIG. 407 shows the contour lines of a transmitted wavefront obtainable when the amounts of errors E2 and E3 shown in FIGS. 405 and 406 are added to the surface r2. The shape of the surface r1 which is redesigned within the degree of freedom of the surface r1 for the purpose of correcting such a wavefront is described below. In the following description, the aspheric terms other than the low-pass shape are represented by Zernike's polynomial $Z(\rho, \phi)$ which contains axisymmetrical terms. Therefore, $$ASP(\rho)+H(\rho,\phi) \rightarrow Z(\rho,\phi), \quad (146)$$

and a shape $S1(\rho,\phi)$ of the surface r1 which does not contain the low-pass shape is expressed as $$S1(\rho,\phi)=S0(\rho)+Z(\rho,\phi), \quad (147)$$

$$S0(\rho) = \frac{\rho^2/R}{1+\sqrt{1-(1+k)(\rho/R)^2}}, \quad (148)$$

$Z(\rho,\phi)=c1+c2\rho\cos(\phi)+c3\rho\sin(\phi)+c4\rho^2\cos(2\phi)+c5(2\rho^2-1)+c6\rho^2\sin(2\phi)+c7\rho^3\cos(3\phi)+c8(3\rho^3-2\rho)\cos(\phi)+$ $c9(3\rho^3-2\rho)\sin(\phi)+c10\rho^3\sin(3\phi)+c11\rho^4\cos(4\phi)+c12(4\rho^4-3\rho^2)\cos(2\phi)+c13(6\rho^4-6\rho^2+1)+$ $c14(4\rho^4-3\rho^2)\sin(2\phi)+c15\rho^4\sin(4\phi)+c16\rho^5\cos(5\phi)+c17(5\rho^5-4\rho^3)\cos(3\phi)+c18(10\rho^5-12\rho^3+3\rho)\cos(\phi)+$ $c19(10\rho^5-12\rho^3+3\rho)\sin(\phi)+c20(5\rho^5-4\rho^3)\sin(\phi)+c21\rho^5\sin(5\phi) + ...$ $$(149)$$

The coefficients contained in the above expressions are shown in Table 27.

TABLE 27

| K = −0.842 | | | | | |
|---|---|---|---|---|---|
| c1 | 0.8452 | c8 | −0.0218 | c15 | 0 |
| c2 | −0.0551 | c9 | 0 | c16 | 0 |
| c3 | −0.0436 | c10 | −0.0013 | c17 | 0 |
| c4 | 0.8452 | c11 | 0.0244 | c18 | 0 |
| c5 | −0.4465 | c12 | 0 | c19 | 0 |
| c6 | −0.0629 | c13 | 0 | c20 | 0 |
| c7 | −0.0276 | c14 | 0 | c21 | 0 |

A deviation from a spheric surface having the shape expressed by Expression (147) is shown in FIG. 408 in contour line.

Therefore, the actual shape $S(\rho, \phi)$ of the surface r1 which includes the low-pass shape is expressed as $$S(\rho,\phi)=S1(\rho,\phi)=S0(\rho)+Z(\rho,\phi)+V(\rho,\phi) \quad (150)$$

Contour lines which represent the deviation of the surface r1 from the spheric surface are shown in FIG. 409.

Since the surface r1 of the optical low-pass filter is molded in such a manner that a correction shape having the amount of error E1 is cancelled in the shape of the surface r1, by a mold based on the shape expressed by Expression (150), the shape of the surface r1 becomes an aspheric shape expressed by subtracting the correcting shape having the amount of error E1 from the reference surface shape $S0(\rho)$, the low-pass shape $V(\rho, \phi)$ and $Z(\rho, \phi)$. In other words, the surface r1 of the optical low-pass filter, when it is finished, is formed of only correction shapes having the amounts of errors E2 and E3.

(Embodiment 48)

In Embodiment 48, a low-pass shape is added to the surface r14 of the photographing optical system shown in FIG. 47. The low-pass shape formed at the surface r14 is expressed by the following expressions using a cylindrical coordinate system:

$$V(\rho, \phi) = \sum_m Am\, Rm(\rho)\cos\{2(\phi - \pi/8\rho + \pi/4)\}, \quad (151)$$

$m = 2, 6, 10,$ $m=2, 6, 10, \quad (151)$ $R2(\rho)=A2(a2\rho+b2\rho^2+c2\rho^3)\lambda, \quad (152)$ $R6(\rho)=A6(a6\rho+b6\rho^2)\lambda, \quad (153)$ $R10(\rho)=A10(a10\rho+b10\rho^2)\lambda. \quad (154)$ The coefficients used in Embodiment 48 are shown in Table 28.

TABLE 28

| $A_2 = A_6 = A_{10} = 1$ | $a_2 = 4538$ | $a_6 = -0.606$ | $a_{10} = 0.121$ |
|---|---|---|---|
| | $b_2 = 9.613$ | $b_6 = -0.238$ | $b_{10} = 0.048$ |
| | $c_2 = -5.380$ | | |

The contour lines of the low-pass shape of Embodiment 48 are shown in FIG. 410.

FIGS. 411, 412, 413 and 414 respectively show a wavefront aberration ($\lambda$=587.56 nm), a relative point spread (white), a relative line spread (white) and an MTF curve (white) which are obtained on a shorter focal length side of a zoom lens using the design values of Embodiment 48. FIGS. 415, 416, 417 and 418 respectively show a wavefront aberration ($\lambda$=587.56 nm), a relative point spread (white), a relative line spread (white) and an MTF curve (white) which are obtained from a longer focal length side of such zoom lens.

In Embodiment 48, a correction shape for correcting the error of a lens which occurs during molding is added to the surface r14 in a manner similar to that described above in connection with Embodiment 47. The shape $S(\rho, \theta)$ of the surface r14 which is set in the mold is expressed by the following expressions:

$$S(\rho,\phi)=S0(\rho)+Z(\rho,\phi)+V(\rho,\phi), \quad (155)$$

$$S0(\rho) = \frac{(r\rho)^2/R}{1+\sqrt{1-(r\rho/R)^2}}, \quad (156)$$

$Z(\rho,\phi)=-0.00397\rho\cos(\phi)-0.0927\rho\sin(\phi)+0.410\rho^2\cos(2\phi)+0.0190\rho^2\sin(2\phi)-0.253\rho^3\cos(3\phi)+0.115(3\rho^3-2\rho)\sin(\phi)-$ $0.546\rho^3\sin(3\phi)+0.0165(4\rho^4-3\rho^2)\cos(2\phi). \quad (157)$ A deviation from the spheric shape of the surface r14 expressed by Expression (155) is shown in FIG. 419 in contour line.

As is apparent from the above description of each of Embodiments 47 and 48 of the present invention, since a shape for correcting a shape error which occurs during the molding of an optical low-pass filter is added to a surface at which a low-pass shape is formed, the optical low-pass filter can exhibit a good low-pass effect and optical performance equivalent to design values.

(Embodiment 49)

FIG. 420 shows an example in which a photographing optical system (zoom lens) according to any of the above-described embodiments is applied to an optical apparatus. The optical apparatus shown in FIG. 420 includes a photographing optical system 100 according to any of the above-described embodiments, the CCD 4 and a recording part 200. A light image coming from a subject is formed on the CCD 4 by the photographing optical system 100, and the image signal produced in the CCD 4 is sent to the recording part 200. An observer can observe in a viewfinder optical system (not shown) an image displayed on image display means (not shown).

As is apparent from the above description, it is possible to obtain a good image by means of an inexpensive apparatus and arrangement by employing any of the optical low-pass filters of the disclosed embodiments of the present invention in an optical apparatus such as a video camera or a digital camera.

What is claimed is:

1. An optical low-pass filter comprising:
   a phase advancing area which advances a phase of a wavefront of an incident pencil of rays with respect to a phase of a wavefront of a center of the incident pencil of rays; and
   a phase retarding area which retards the phase of the wavefront of the incident pencil of rays with respect to the phase of the wavefront of the center of the incident pencil of rays,
   said phase advancing area and said phase retarding area being alternately formed in a generally non-linear pattern, and in a rotational direction centered at an origin corresponding to the center of the incident pencil of rays.

2. An optical low-pass filter according to claim 1, wherein said phase advancing area is formed as a shape having a phase advancing action and said phase retarding area is formed as a shape having a phase retarding action.

3. An optical low-pass filter according to claim 1, wherein said phase advancing area is formed of a material having a refractive index having a phase advancing action and said phase retarding area is formed of a material having a refractive index having a phase retarding action.

4. An optical low-pass filter according to claim 1, wherein said phase advancing area and said phase retarding area are continuously formed in a rotational direction.

5. An optical low-pass filter according to claim 1, wherein a shape $S(\rho, \phi)$ of said optical low-pass filter is expressed as follows by a cylindrical coordinate system $(\rho, \phi)$ whose origin corresponds to the center of the incident pencil of rays and in which p is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$S(\rho,\phi) = R(\rho) \times \cos(m\phi + \delta),$$

where $R(\rho)$ is a radial shape of said optical low-pass filter, m is an integer not less than 2, and $\delta$ is a constant.

6. An optical low-pass filter according to claim 1, wherein a shape $S(\rho, \phi)$ of said optical low-pass filter is expressed as follows by a cylindrical coordinate system $(\rho, +)$ whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$S(\rho, \phi) = \sum_m Am \times Rm(\rho) \times \cos\{m(\phi + \delta m)\},$$

where $Rm(\rho)$ is a radial shape of said optical low-pass filter, m is an integer, and Am and $\delta m$ are constants.

7. An optical low-pass filter according to claim 1, wherein a shape $S(\rho, \phi)$ of said optical low-pass filter is expressed as follows by a cylindrical coordinate system $(\rho, \phi)$ whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$S(\rho,\phi) = R(\rho) \times \cos\{m(\phi + kf(\rho) + \delta)\},$$

where $R(\rho)$ is a radial shape of said optical low-pass filter, $f(\rho)$ is an arbitrary function of $\rho$, m is an integer, and k and $\delta$ are constants.

8. An optical low-pass filter according to claim 1, wherein a shape $S(\rho, \phi)$ of said optical low-pass filter is expressed as follows by a cylindrical coordinate system $(\rho, \phi)$ whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$S(\rho, \phi) = \sum_m Am \times Rm(\rho) \times \cos\{m(\phi + fm(\rho) + \delta m)\},$$

where $Rm(\rho)$ is a radial shape of said optical low-pass filter, $fm(\rho)$ is an arbitrary function of $\rho$, m is an integer, and Am and $\delta m$ are constants.

9. An optical low-pass filter according to claim 1, wherein a gradient refractive index $N(\rho, \phi)$ of said optical low-pass filter is expressed as follows by a cylindrical coordinate system $(\rho, \phi)$ whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$N(\rho,\phi) = N0 + Nr(\rho) \times \cos(m\phi + \delta),$$

where N0 is a refractive index relative at the origin, $Nr(\rho)$ is a gradient refractive index relative to the radial direction, m is an integer not less than 2, and $\delta$ is a constant.

10. An optical low-pass filter according to claim 1, wherein a gradient refractive index $N(\rho, \phi)$ of said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to the rotational direction of said optical low-pass filter:

$$N(\rho, \phi) = N0 + \sum_m Am \times Nrm(\rho) \times \cos\{m(\phi + \delta m)\},$$

where N0 is a refractive index relative at the origin, Nrm(ρ) is a gradient refractive index relative to the radial direction, m is an integer, and Am and δm are constants.

11. An optical low-pass filter according to claim 1, wherein a gradient refractive index N(ρ, φ) of said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to the rotational direction of said optical low-pass filter:

$$N(\rho,\phi)=N0+Nr(\rho)\times\cos\{m(\phi+kf(\rho)+\delta)\},$$

where N0 is a refractive index relative at the origin, Nr(ρ) is a gradient refractive index relative to the radial direction, f(ρ) is an arbitrary function of ρ, m is an integer, and k and δ are constants.

12. An optical low-pass filter according to claim 1, wherein a gradient refractive index N(ρ, φ) of said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to the rotational direction of said optical low-pass filter:

$$N(\rho, \phi) = N0 + \sum_m Am \times Nrm(\rho) \times \cos\{m(\phi + fm(\rho) + \delta m)\},$$

where N0 is a refractive index relative at the origin, Nrm(ρ) is a gradient refractive index relative to the radial direction, fm(ρ) is an arbitrary function of ρ, m is an integer, and Am and δm are constants.

13. An optical low-pass filter according to claim 1, wherein a wavefront aberration W(ρ, φ) which occurs in a pencil of rays transmitted through said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to a rotational direction of said optical low-pass filter:

$$W(\rho,\phi)=Wr(\rho)\times Wt(\phi),$$

provided that the following conditions are satisfied:

$$Wr(0.3)/Wr(0.6)>0$$

$$Wr(0.6)/Wr(0.9)>0$$

where Wr(ρ) is a wavefront aberration relative to the radial direction and Wt(φ) is a wavefront aberration relative to the rotational direction.

14. An optical low-pass filter according to claim 1, wherein a wavefront aberration W(ρ, φ) which occurs in a pencil of rays transmitted through said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to a rotational direction of said optical low-pass filter:

$$W(\rho,\phi)=Wr(\rho)\times Wt(\phi),$$

and an amount of variation, Wr'(ρ), in the wavefront aberration relative to the radial direction is expressed as $$Wr'(\rho)=\partial W(\rho)/\partial \rho,$$

provided that the following conditions are satisfied:

$$Wr'(0.3)/Wr'(0.6)>1,$$

$$Wr'(0.6)/Wr'(0.9)<1,$$

where Wr(ρ) is a wavefront aberration relative to the radial direction and Wt(φ) is a wavefront aberration relative to the rotational direction.

15. An optical low-pass filter according to claim 1, wherein a shape S(ρ, φ) of said optical low-pass filter is expressed as follows by a cylindrical coordinate system (ρ, φ) whose origin corresponds to the center of the incident pencil of rays and in which p is a coordinate system (0≦ρ≦1) relative to a radial direction of said optical low-pass filter, which coordinate system is standardized on a radius of an effective portion of said optical low-pass filter, and φ is a coordinate system (0≦φ≦2π) relative to a rotational direction of said optical low-pass filter:

$$S(\rho,100)=R(\rho)\times T(\phi),$$

and an amount of variation in shape, R'(ρ), relative to the radial direction is expressed as $$R'(\rho)=\partial R(\rho)/\partial \rho,$$

provided that the following conditions are satisfied:

$$R'(0.3)/R'(0.6)>1,$$

$$R'(0.6)/R'(0.9)<1,$$

where R(ρ) is a shape of said optical low-pass filter relative to the radial direction and T(φ) is a shape of said optical low-pass filter relative to the rotational direction.

16. An optical low-pass filter according to claim 1, wherein a gradient refractive index N(ρ, φ) of said optical low-pass filter is expressed as follows by a cylindrical coordinate system (ρ, φ) whose origin corresponds to the center of the incident pencil of rays and in which ρ is a coordinate system (0≦ρ≦1) relative to a radial direction of said optical low-pass filter, which coordinate system is standardized on a radius of an effective portion of said optical low-pass filter, and φ is a coordinate system ($0 \leq \phi \leq 2\pi$) relative to a rotational direction of said optical low-pass filter:

$$N(\rho,\phi)=N0+Nr(\rho) \times Nt(\phi),$$

and an amount of variation in refractive index, $Nr'(\rho)$, relative to the radial direction is expressed as $$Nr'(\rho)=\partial N(\rho)/\partial \rho,$$

provided that the following conditions are satisfied:

$$Nr'(0.3)/Nr'(0.6)>1,$$

$$Nr'(0.6)/Nr'(0.9)>1,$$

where N0 is a refractive index at the origin, $Nr(\rho)$ is a gradient refractive index relative to the radial direction, and $Nt(\phi)$ is a gradient refractive index relative to the rotational direction.

17. An optical low-pass filter according to claim 1, wherein a wavefront aberration $W(\rho, \phi)$ which occurs in a pencil of rays transmitted through said optical low-pass filter is expressed as follows by a cylindrical coordinate system ($\rho$, $\phi$) whose origin corresponds to the center of the incident pencil of rays and in which p is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to a rotational direction of said optical low-pass filter:

$$W(\rho,\phi)=Wr(\rho) \times Wt(\phi),$$

and an amount of variation, $Wr'(\rho)$, in the wavefront aberration relative to the radial direction is expressed as $$Wr'(\rho)=\partial W(\rho)/\partial \rho,$$

provided that the following conditions are satisfied:

$$Wr(0.25)/Wr(0.75)<0,$$

$$Wr'(0.3)/Wr'(0.6)<0,$$

where $Wr(\rho)$ is a wavefront aberration relative to the radial direction and $Wt(\phi)$ is a wavefront aberration relative to the rotational direction.

18. An optical low-pass filter according to claim 1, wherein a shape $S(\rho, \phi)$ of said optical low-pass filter is expressed as follows by a cylindrical coordinate system ($\rho$, $\phi$) whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to a rotational direction of said optical low-pass filter:

$$S(\pi,\phi)=R(\rho) \times T(+),$$

and an amount of variation in shape, $R'(\rho)$, relative to the radial direction is expressed as $$R'(\rho)=\partial R(\rho)/\partial \rho,$$

provided that the following conditions are satisfied:

$$R(0.25)/R(0.75)<0,$$

$$R'(0.3)/R'(0.6)<0,$$

where $R(\rho)$ is a shape of said optical low-pass filter relative to the radial direction and $T(\phi)$ is a shape of said optical low-pass filter relative to the rotational direction.

19. An optical low-pass filter according to claim 1, wherein a gradient refractive index $N(\rho, \phi)$ of said optical low-pass filter is expressed as follows by a cylindrical coordinate system ($\rho$, $\phi$) whose origin corresponds to the center of the incident pencil of rays and in which $\rho$ is a coordinate system ($0 \leq \rho \leq 1$) relative to a radial direction of said optical low-pass filter, which coordinate system is standardized on a radius of an effective portion of said optical low-pass filter, and $\phi$ is a coordinate system ($0 \leq \phi \leq 2\pi$) relative to a rotational direction of said optical low-pass filter:

$$N(\rho,\phi)=N0+Nr(\rho) \times Nt(\phi),$$

and an amount of variation in refractive index, $Nr'(\rho)$, relative to the radial direction is expressed as $$Nr'(\rho)=\partial N(\rho)/\partial \rho,$$

provided that the following conditions are satisfied:

$$Nr(0.25)/Nr(0.75)<0,$$

$$Nr'(0.3)/Nr'(0.6)<0,$$

where N0 is a refractive index at the origin, $Nr(\rho)$ is a gradient refractive index function relative to the radial direction, and $Nt(\phi)$ is a gradient refractive index function relative to the rotational direction.

20. An optical low-pass filter according to claim 1, wherein said phase advancing area and said phase retarding area exist with a predetermined period in a rotational direction centered at an origin corresponding to the center of the incident pencil of rays, said predetermined period differing from area to area in a radial direction.

21. An optical low-pass filter according to claim 20, wherein a wavefront aberration $W(\rho, \phi)$ which occurs in a pencil of rays transmitted through said optical low-pass filter is expressed as follows by a cylindrical coordinate system ($\rho$, $\phi$) whose origin corresponds to the center of the incident pencil of rays and in which $\rho$ is a coordinate system ($0 \leq \rho \leq 1$) relative to the radial direction of said optical low-pass filter, which coordinate system is standardized on a radius of an effective portion of said optical low-pass filter, and $\phi$ is a coordinate system ($0 \leq \phi \leq 2\pi$) relative to the rotational direction of said optical low-pass filter:

$$W(\rho, \phi) = \begin{cases} Wr1(\rho)\cos(m1\phi + \delta 1), & 0 \leq \rho \leq s, \\ Wr2(\rho)\cos(m2\phi + \delta 2), & s \leq \rho \leq 1, \end{cases}$$

where $Wri(\rho)$ is a wavefront aberration relative to the radial direction and mi and $\delta i$ are constants.

22. An optical low-pass filter according to claim 21, wherein said optical low-pass filter satisfies the following condition:

$$m1<m2.$$

23. An optical low-pass filter according to claim 1, wherein said phase advancing area and said phase retarding area are formed in a step-formed shape.

24. An optical low-pass filter according to claim 23, wherein said phase advancing area and said phase retarding area are alternately formed in the rotational direction centered at an origin corresponding to the center of the incident pencil of rays.

25. An optical low-pass filter according to claim 24, wherein a shape S(ρ, φ) of said optical low-pass filter is expressed as follows by a cylindrical coordinate system (ρ, φ) whose origin corresponds to the center of the incident pencil of rays and in which ρ is a coordinate system ($0 \leq \rho \leq 1$) relative to a radial direction of said optical low-pass filter, which coordinate system is standardized on a radius of an effective portion of said optical low-pass filter, and φ is a coordinate system ($0 \leq \phi \leq 2\pi$) relative to the rotational direction of said optical low-pass filter:

$$S(\rho,\phi) = \text{Step}(R(\rho) \times \cos(m\phi+\delta)),$$

where R(ρ) is a basic shape of said optical low-pass filter relative to the radial direction, δ is a constant and Step(f) is a function for converting the continuous function f into a predetermined step function.

26. An optical low-pass filter according to claim 1, further comprising a shape which corrects an error occurring during molding.

27. An optical low-pass filter comprising:

an area having an optical path length longer than an optical path length of a center of said optical low-pass filter; and an area having an optical path length shorter than the optical path length of the center of said optical low-pass filter, said area having the longer optical path length and said area having the shorter optical path length being alternately formed in a generally non-linear pattern, and in a rotational direction centered at an origin corresponding to the center of the incident pencil of rays.

28. An optical apparatus comprising:

an image forming optical system;

an image pickup element; and an optical low-pass filter, said optical low-pass filter alternately including a phase advancing area which advances a phase of a wavefront of an incident pencil of rays with respect to a phase of a wavefront of a center of the incident pencil of rays, and a phase retarding area which retards the phase of the wavefront of the incident pencil of rays with respect to the phase of the wavefront of the center of the incident pencil of rays, said phase advancing area and said phase retarding area being alternately formed in a generally non-linear pattern, and in a rotational direction centered at an origin corresponding to the center of the incident pencil of rays.

29. An optical apparatus according to claim 28, wherein said optical low-pass filter is provided in a vicinity of a stop of said image forming optical system.

30. An optical apparatus according to claim 28, wherein said optical low-pass filter is arranged in such a manner that a direction in which its phase advancing or retarding action is large is inclined in the range of 30° to 60° with respect to a direction of array of pixels of said image pickup element.

31. An optical apparatus according to claim 28, wherein said optical low-pass filter is arranged in such a manner that a direction in which its phase advancing or retarding action is large is inclined by approximately 45° with respect to a direction of array of pixels of said image pickup element.

* * * * *

UNITED STATES PATENT AND TRADEMARK OFFICE
CERTIFICATE OF CORRECTION

PATENT NO. : 6,144,493
DATED : November 7, 2000
INVENTOR(S) : Atsushi Okuyama et al.

It is certified that error appears in the above-identified patent and that said Letters Patent is hereby corrected as shown below:

Column 1,
Line 51, "an good" should read -- a good --.

Column 4,
Line 21, "6for" should read -- 6 for --.

Column 26,
Lines 44 and 46, "has" should read -- have --.

Column 30,
Lines 36 and 39, "coordinates" should read -- a coordinate --.

Column 42,
Line 38, "m=2,6,10,　(60)" should be deleted.

Column 47,
Line 65, "Wr($\rho$) R($\rho$)," should read -- Wr($\rho$)$\propto$R($\rho$), --.

Column 51,
Line 18, "Wr($\rho$) R($\rho$)," should read -- Wr($\rho$)$\propto$R($\rho$), --.
Line 20, "Wr'($\rho$)=$\partial$Wr($\rho$)/$\partial\rho$ $\partial$Nr($\rho$)/$\partial\rho$," should read -- Wr'($\rho$)=$\partial$Wr($\rho$)/$\partial\rho$ $\propto$ $\partial$Nr($\rho$)/$\partial\rho$, --.

Column 58,
Line 64, "N($\rho,\phi$)=N0+$\delta$N($\rho,\phi$),　　(132)

$$\delta N(\rho,\delta) = \begin{cases} Nr2(\rho)\cos(2\phi+\delta 2)\lambda, 0 \leq \rho \leq 0.31, \\ Nr4(\rho)\cos(4\phi+\delta 4)\lambda, 0.31 \leq \rho \leq 1, \end{cases}"$$

should read

--N($\rho,\phi$)= N0+$\delta$N($\rho,\phi$),　　(132)

$$\delta N(\rho,\phi) = \begin{cases} Nr2(\rho)\cos(2\phi+\delta 2)\lambda, 0 \leq \rho \leq 0.31, \\ Nr4(\rho)\cos(4\phi+\delta 4)\lambda, 0.31 \leq \rho \leq 1. \end{cases}$$

$$\delta^2 = \pi/4, \delta^4 = \pi/8,\quad (133)--.$$

Column 63,
Line 36, "c19(10$\rho^5$-12$\rho^3$+3$\rho$)sin($\phi$)+c20(5$\rho^5$-4$\rho^3$)sin($\phi$)+c21$\rho^5$ sin(5$\phi$)+..(149)" should read -- c19(10$\rho^5$-12$\rho^3$+3$\rho$)sin($\phi$)+c20(5$\rho^5$- 4$\rho^3$)sin(3$\phi$)+c21$\rho^5$ sin(5$\phi$)+..(149) --.

UNITED STATES PATENT AND TRADEMARK OFFICE
CERTIFICATE OF CORRECTION

PATENT NO. : 6,144,493
DATED : November 7, 2000
INVENTOR(S) : Atsushi Okuyama et al.

It is certified that error appears in the above-identified patent and that said Letters Patent is hereby corrected as shown below:

Column 64,
Line 19, "m=2,6,10     (151)" (second occurrence) should be deleted.
Line 29, Table 28, "$a_2 = 4538$" should read -- $a_2 = -4.538$ --.
Line 58, "$S(\rho,\phi)=S1)(\rho,\phi)=S0(\rho)+Z(\rho,\phi)+V(\rho,\phi)$" should read -- $S(\rho,\phi)=S1)(\rho\phi+V(\rho,\phi)=S0(\rho)+Z(\rho,\phi)$ --.
Line 59, "$Z(\rho,\phi)=-0.00397\rho \cos(\phi)-0.0927\rho \sin(\phi)+0.410\rho^2 \cos(2\phi)+0.0190\rho^2 \sin(2\phi)-0.253\rho^3\cos(3\phi)+0.115(3\rho^3-2\rho)\sin(\phi) - 0.546\rho^3 \sin(3\phi)+0.0165(4\rho^4- 3\rho^2)\cos(2\phi). (157)$"
should read
-- $Z(\rho,\phi)=-0.00397\rho \cos(\phi)-0.0927\rho \sin(\phi)+0.410\rho^2 \cos(2\phi)+0.190\rho^2 \sin(2\phi)-0.253\rho^3\cos(3\phi)+0.115(3\rho^3-2\rho)\sin(\phi) - 0.546\rho^3 \sin(3\phi)+0.0165(4\rho^4- 3\rho^2)\cos(2\phi). (157)$ --.

Column 65,
Line 56, "p" should read -- $\rho$ --.

Column 66,
Line 3, "$(\rho,+)$" should read -- $(\rho,\phi)$ --.

Column 68,
Line 44, "$S(\rho,100)=R(\rho)xT(\phi),$" should read -- $S(\rho,\phi)=RxT(\phi),$ --.

Column 69,
Line 15, "$Nr'(0.6)/Nr'(0.9)>1,$" should read -- $Nr' (0.6)/Nr'(0.9)<1,$ --.
Line 61, "$S(\pi,\phi)=R(\rho)x T(+),$" should read -- $S(\rho,\phi)=R(\rho)x T(\phi),$ --.

Signed and Sealed this

Twenty-eighth Day of January, 2003

JAMES E. ROGAN
*Director of the United States Patent and Trademark Office*